United States Patent
Arimoto et al.

(10) Patent No.: US 6,181,819 B1
(45) Date of Patent: *Jan. 30, 2001

(54) IMAGE PROCESSING APPARATUS INCLUDING MEANS FOR JUDGING A CHROMATIC PORTION OF AN IMAGE

(75) Inventors: Shinobu Arimoto; Masahiro Funada; Michio Kawase; Takashi Suzuki, all of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/426,628

(22) Filed: Apr. 21, 1995

Related U.S. Application Data

(60) Continuation of application No. 08/085,176, filed on Jul. 2, 1993, now abandoned, which is a division of application No. 08/002,679, filed on Jan. 8, 1993, now Pat. No. 5,251,023, which is a continuation of application No. 07/561,292, filed on Aug. 2, 1990, now abandoned.

(30) Foreign Application Priority Data

| Aug. 2, 1989 | (JP) | 1-199343 |
| Aug. 2, 1989 | (JP) | 1-200471 |
| Aug. 2, 1989 | (JP) | 1-200472 |
| Aug. 2, 1989 | (JP) | 1-200473 |
| Aug. 2, 1989 | (JP) | 1-200474 |
| Aug. 2, 1989 | (JP) | 1-200475 |
| Aug. 2, 1989 | (JP) | 1-200476 |
| Aug. 2, 1989 | (JP) | 1-200499 |

(51) Int. Cl.[7] .................................................. H04N 1/40

(52) U.S. Cl. .......................................... 382/181; 358/462

(58) Field of Search .................................. 358/457, 462, 358/532, 536, 538, 540; 382/181–182, 186, 187

(56) References Cited

U.S. PATENT DOCUMENTS

| 4,727,434 | * | 2/1988 | Kawamura | 358/448 |
| 4,903,145 | | 2/1990 | Funada | 358/462 |
| 5,014,124 | * | 5/1991 | Fujisawa | 358/457 |
| 5,031,034 | * | 7/1991 | Shimizu et al. | 358/529 |
| 5,047,844 | * | 9/1991 | Ikeda et al. | 358/540 |

FOREIGN PATENT DOCUMENTS

| 49-57716 | 6/1974 | (JP) . |
| 55-40493 | 3/1980 | (JP) . |
| 55-40492 | 9/1980 | (JP) . |
| 55-142342 | 11/1980 | (JP) . |
| 58-14270 | 1/1983 | (JP) . |
| 58-27145 | 2/1983 | (JP) . |
| 5960580 | 4/1984 | (JP) . |
| 59-141871 | 8/1984 | (JP) . |
| 61-97788 | 5/1986 | (JP) . |
| 61-157076 | 7/1986 | (JP) . |
| 62-101179 | 5/1987 | (JP) . |
| 62-165477 | 7/1987 | (JP) . |
| 62-272756 | 11/1987 | (JP) . |
| 63-19969 | 1/1988 | (JP) . |

(List continued on next page.)

Primary Examiner—Thomas D. Lee
Assistant Examiner—Stephen Brinich
(74) Attorney, Agent, or Firm—Fitzpatrick, Cella, Harper & Scinto

(57) ABSTRACT

An image processing apparatus and method includes a device for judging the degree of color or lack of color of an input color image signal, judging dot areas in input color image signal and controlling a spacial filter or a density conversion device for processing the input image signal according to a judgment by the first and second judging results, the spacial filter or the density conversion device being controlled according to the judgment by the first and second judging results, wherein the image processing also includes the ability to independently set sharpness of each of a plurality of color component signals.

22 Claims, 123 Drawing Sheets

FOREIGN PATENT DOCUMENTS

| | | |
|---|---|---|
| 63-48073 | 2/1988 | (JP) . |
| 63-240256 | 10/1988 | (JP) . |
| 63-263974 | 10/1988 | (JP) . |
| 64-72662 | 3/1989 | (JP) . |
| 64-86173 | 3/1989 | (JP) . |
| 1-95673 | 4/1989 | (JP) . |
| 1-143564 | 6/1989 | (JP) . |
| 1-173971 | 7/1989 | (JP) . |
| 1-184139 | 7/1989 | (JP) . |
| 1-264847 | 10/1989 | (JP) . |
| 2-84879 | 3/1990 | (JP) . |
| 2-144567 | 6/1990 | (JP) . |
| 2-244876 | 9/1990 | (JP) . |
| 2-280573 | 11/1990 | (JP) . |
| 2-288672 | 11/1990 | (JP) . |

* cited by examiner

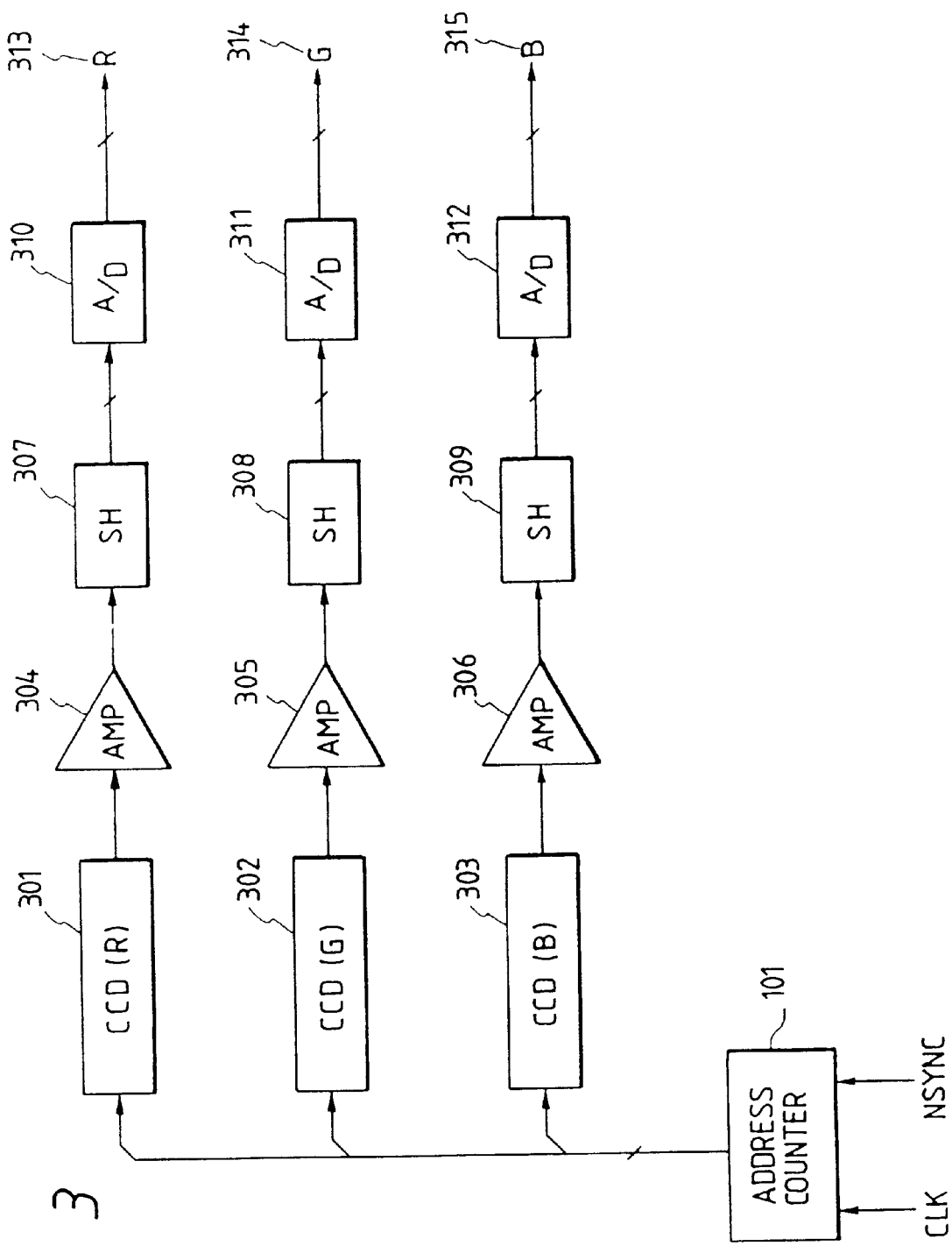

| S10 | S11 | S12 | Y |
|-----|-----|-----|---|
| 1 | 0 | 0 | A |
| 0 | 1 | 0 | B |
| 0 | 0 | 1 | C |

|   | BLP | UNKP | COLP |
|---|-----|------|------|
| A | 1   | 0    | 0    |
| B | 0   | 1    | 0    |
| C | 0   | 0    | 1    |
| D | 0   | 0    | 0    |

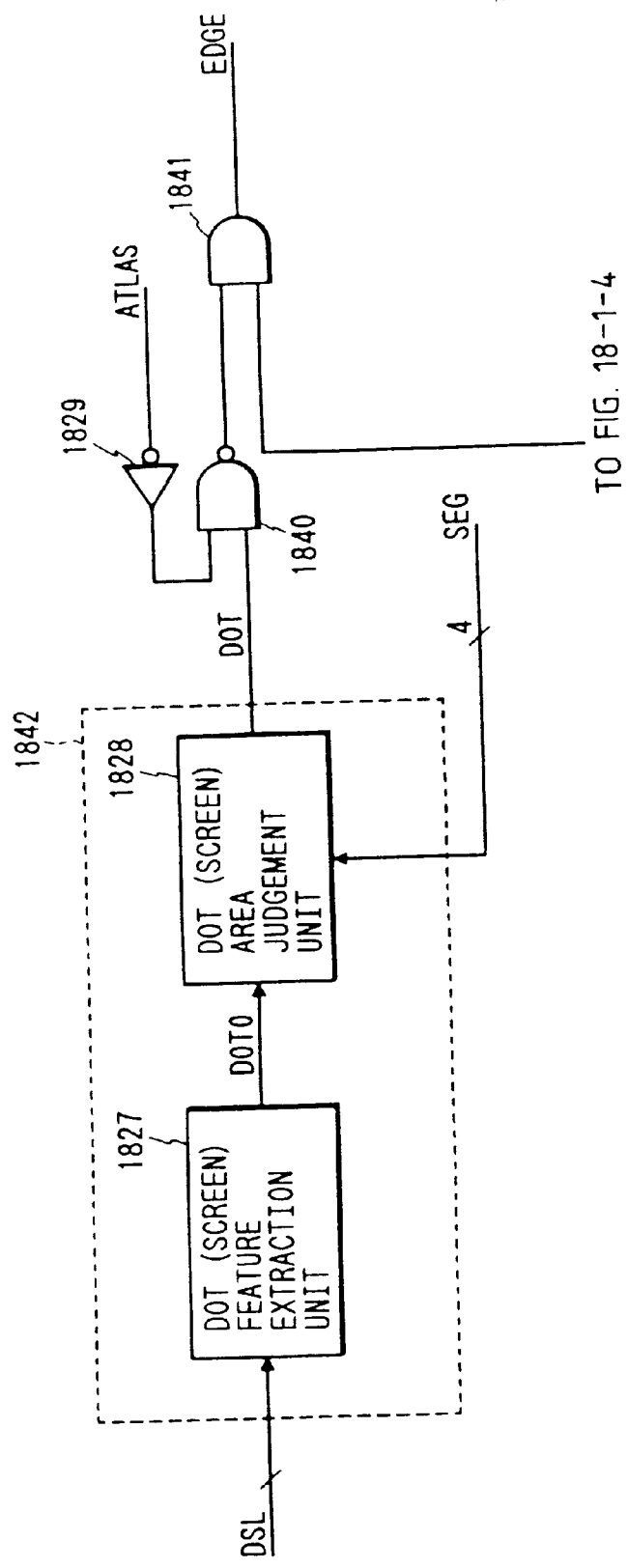

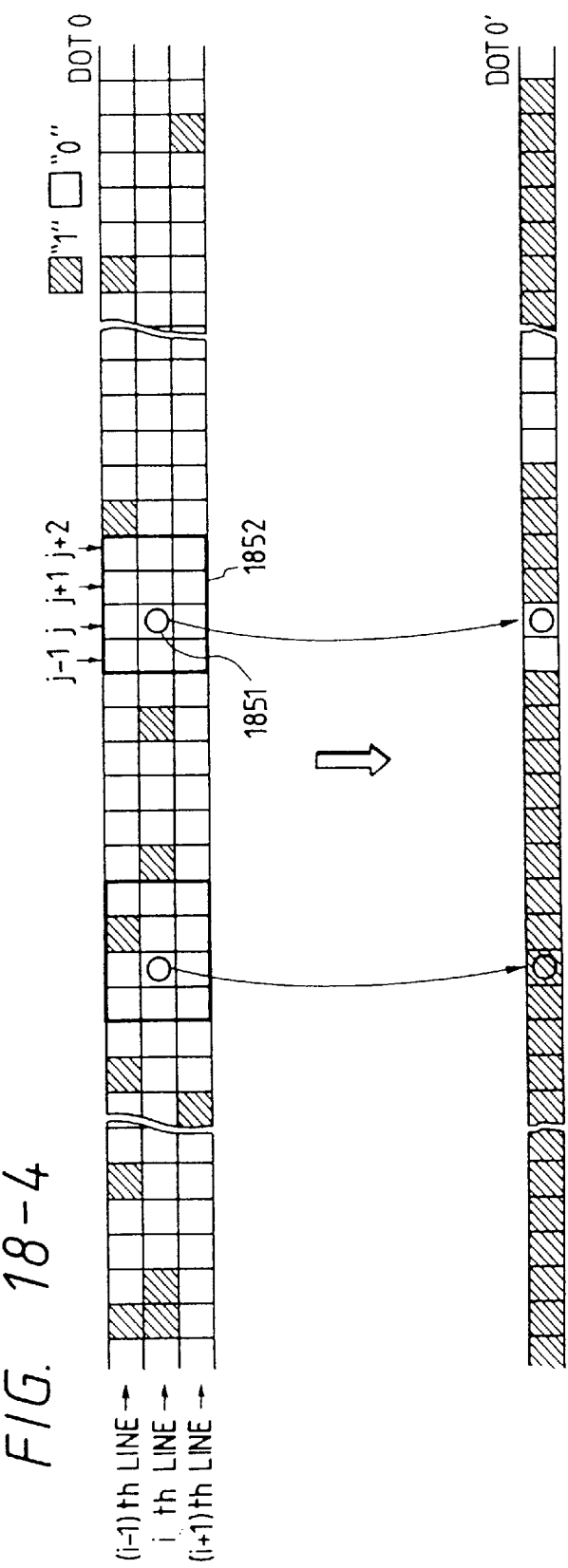

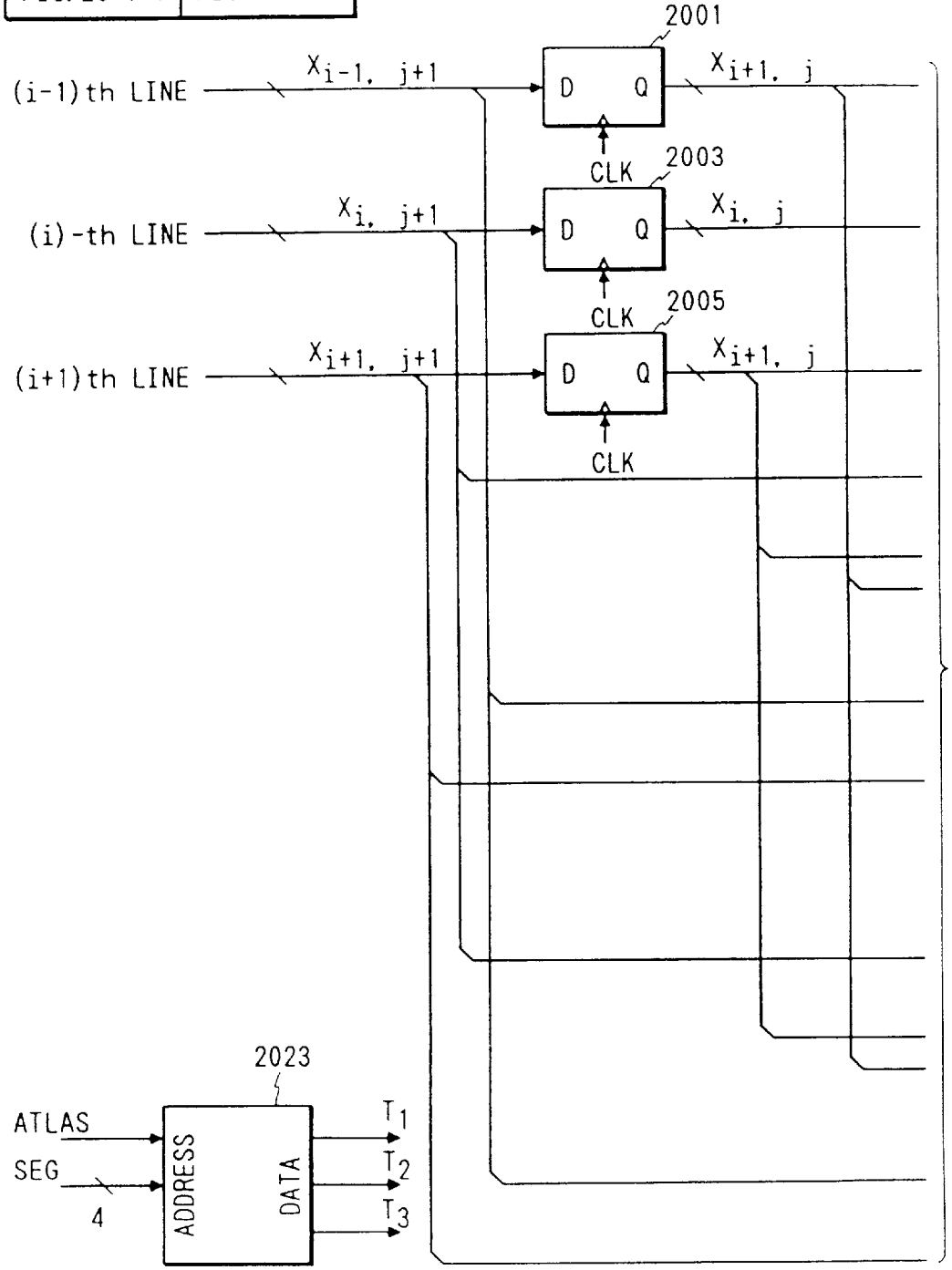

FIG. 20-2

| ATLAS | SEG | MAIN SCAN DIRECTION SLICE LEVEL $T_1$ | SUB SCAN DIRECTION SLICE LEVEL $T_2$ | INCLINED DIRECTION SLICE LEVEL $T_3$ |
|---|---|---|---|---|
| 0 | 0 | 25 | 30 | 35 |
| | 1 | 30 | 40 | 45 |
| | 2 | 35 | 50 | 60 |
| | 3 | 40 | 60 | 70 |
| | 4 | 50 | 70 | 80 |
| | 5 | 60 | 80 | 90 |
| | 6 | 80 | 100 | 110 |
| | 7 | 100 | 120 | 130 |
| | 8 | 120 | 140 | 150 |
| 1 | 0 | 13 | 16 | 19 |
| | 1 | 16 | 19 | 22 |
| | 2 | 19 | 22 | 26 |
| | 3 | 22 | 25 | 30 |
| | 4 | 25 | 30 | 35 |
| | 5 | 30 | 35 | 40 |
| | 6 | 35 | 40 | 45 |
| | 7 | 40 | 45 | 50 |
| | 8 | 45 | 50 | 55 |

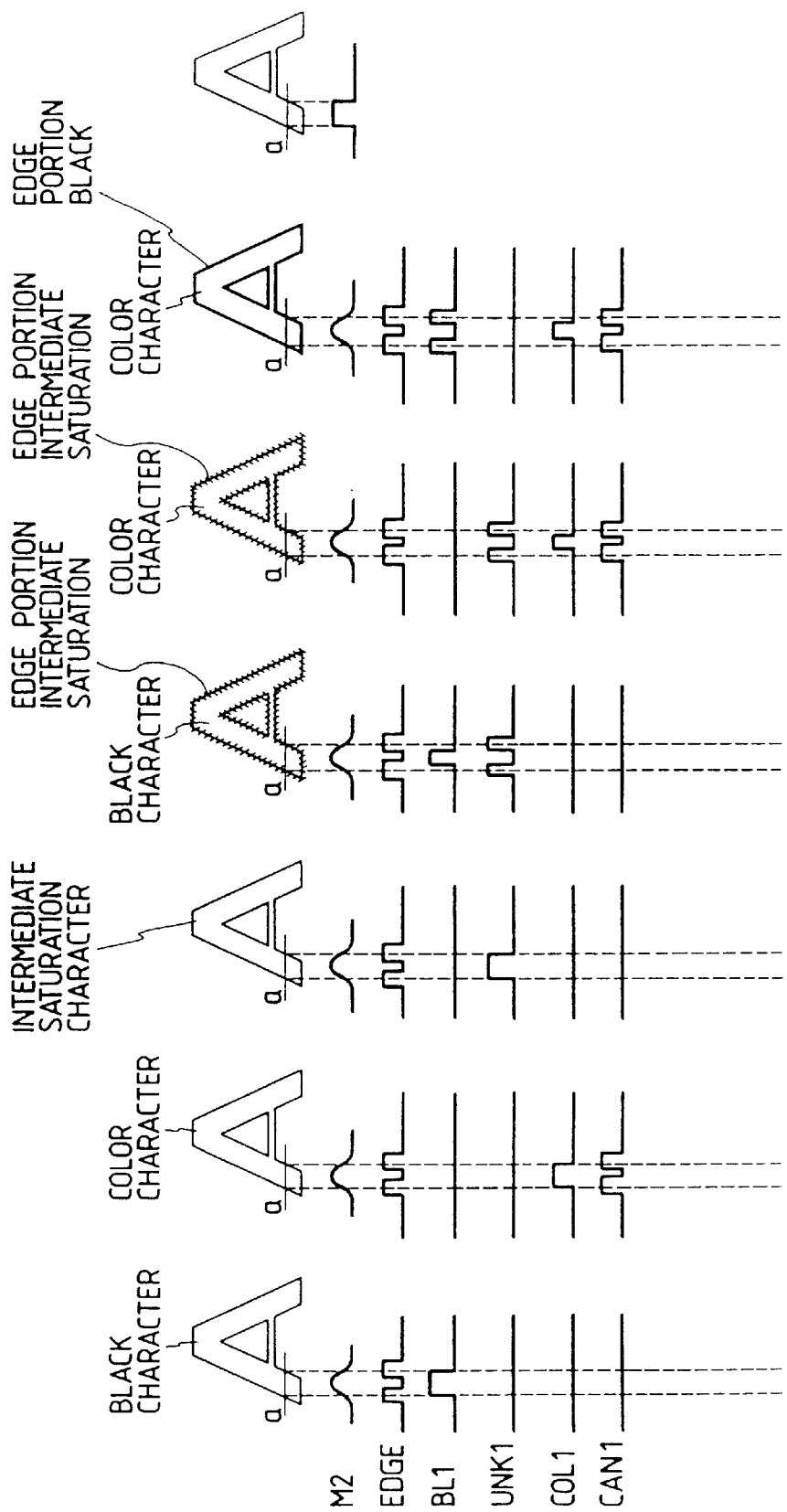

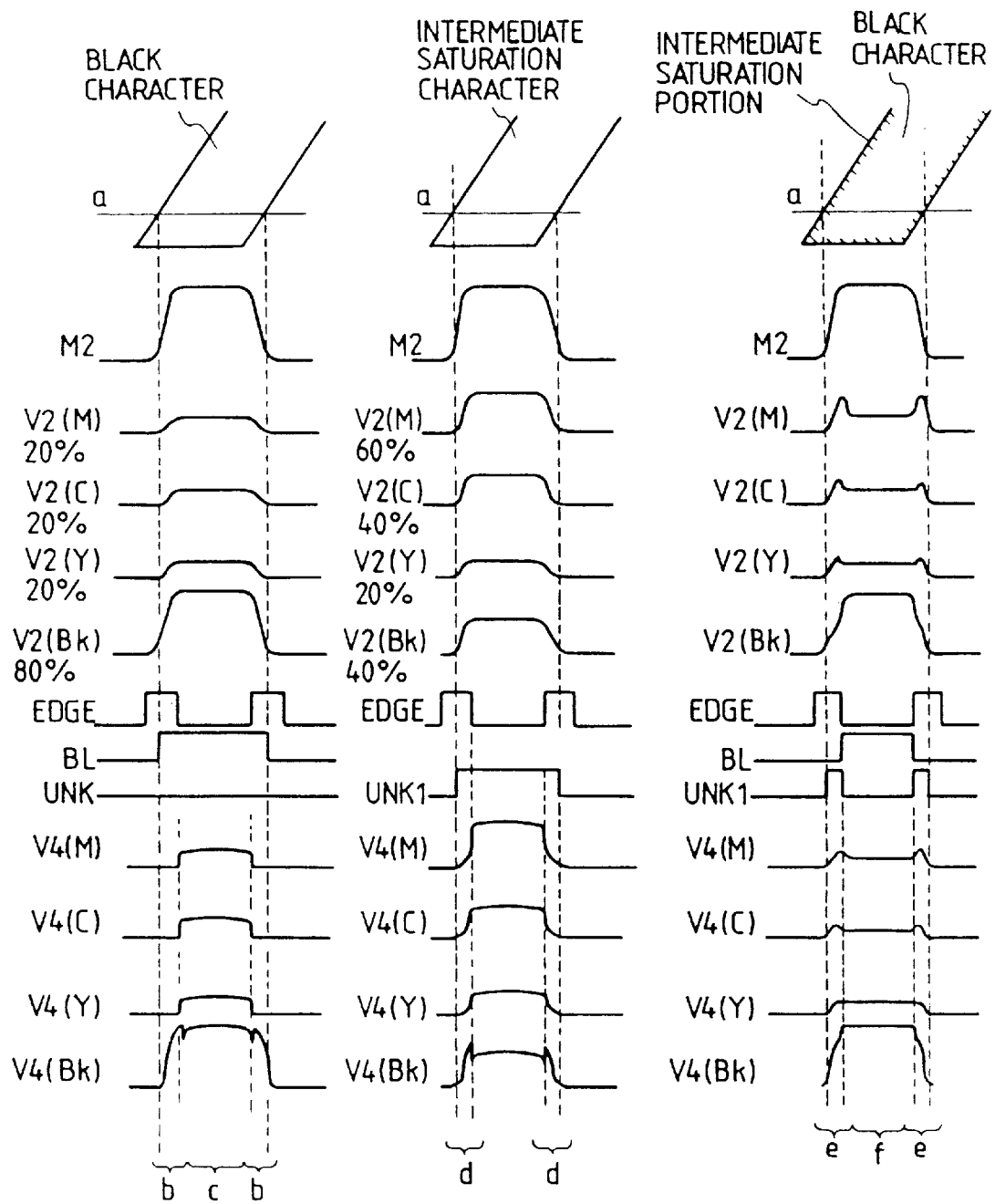

FIG. 26

| | EDGE | BL 1 | UNK 1 | COL 1 | CAN 1 | PHASE=0, 1, 2 (M, C, Y) $V_4$ | PHASE=3 (BK) $V_4$ |
|---|---|---|---|---|---|---|---|
| (a) | 1 | 1 | 0 | 0 | 0 | 0 | M2 |
| (b) | 1 | 1 | 0 | 0 | 1 | $V_2$ | $V_2$ |
| (c) | 1 | 0 | 1 | 0 | 0 | $\frac{V_2}{2}$ | $\frac{V_2}{2} + \frac{1}{2}M2$ |
| (d) | 1 | 0 | 1 | 0 | 1 | $V_2$ | $V_2$ |
| (e) | 1 | 0 | 0 | 1 | x | $V_2$ | $V_2$ |
| (f) | 0 | 1 | 0 | 0 | 0 | $\frac{3}{4}V_2$ | $\frac{3}{4}V_2 + \frac{1}{4}M2$ |
| (g) | 0 | 1 | 0 | 0 | 1 | $V_2$ | $V_2$ |
| (h) | 0 | 0 | x | x | x | $V_2$ | $V_2$ |

| PHASE | EDGE | BL 1 | UNK 1 | COL 1 | CAN 1 | GAIN 1 | GAIN 2 |
|---|---|---|---|---|---|---|---|
| 0<br>\<br>2 | 1 | 1 | 0 | 0 | 0 | 0 | 0 |
|  | 1 | 1 | 0 | 0 | 1 | 4 | 0 |
|  | 1 | 0 | 1 | 0 | 1 | 2 | 0 |
|  | 1 | 0 | 1 | 1 | x | 4 | 0 |
|  | 0 | 0 | 0 | 0 | 0 | 4 | 0 |
|  | 0 | 1 | 0 | 0 | 1 | 3 | 0 |
|  | 0 | 0 | x | x | x | 4 | 4 |
| 3 | 1 | 1 | 0 | 0 | 0 | 0 | 4 |
|  | 1 | 1 | 0 | 0 | 1 | 4 | 2 |
|  | 1 | 0 | 1 | 0 | 1 | 2 | 0 |
|  | 1 | 0 | 1 | 1 | x | 4 | 0 |
|  | 0 | 0 | 0 | 0 | 0 | 4 | 1 |
|  | 0 | 1 | 0 | 0 | 1 | 3 | 0 |
|  | 0 | 0 | x | x | x | 4 | 0 |

|   | FIL(1) | FIL(0) | FILTER PROC | LOGICAL EXPRESSION |
|---|---|---|---|---|
| (a) | 0 | 1 | LOW-LEVEL EDGE EMPHASIS | {(UNK1∩$\overline{CAN1}$) ∪ COL1} ∩ EDGE |
| (b) | 1 | 1 | HIGH-LEVEL EDGE EMPHASIS | BL1 ∩ EDGE ∩ CAN1 |
| (c) | x | 0 | THROUGH | OTHER THAN ABOVE |

| EDGE | BL1 | UNK1 | COL1 | CAN1 | CAM |
|------|-----|------|------|------|-----|
| 1 | 1 | 0 | 0 | 0 | 3 |
| 1 | 1 | 0 | 0 | 1 | 0 |
| 1 | 0 | 1 | 0 | 0 | 2 |
| 1 | 0 | 1 | 0 | 1 | 0 |
| 1 | 0 | 0 | 1 | X | 1 |
| 1 | 0 | 0 | 0 | X | 0 |
| 0 | X | X | X | X | 0 |

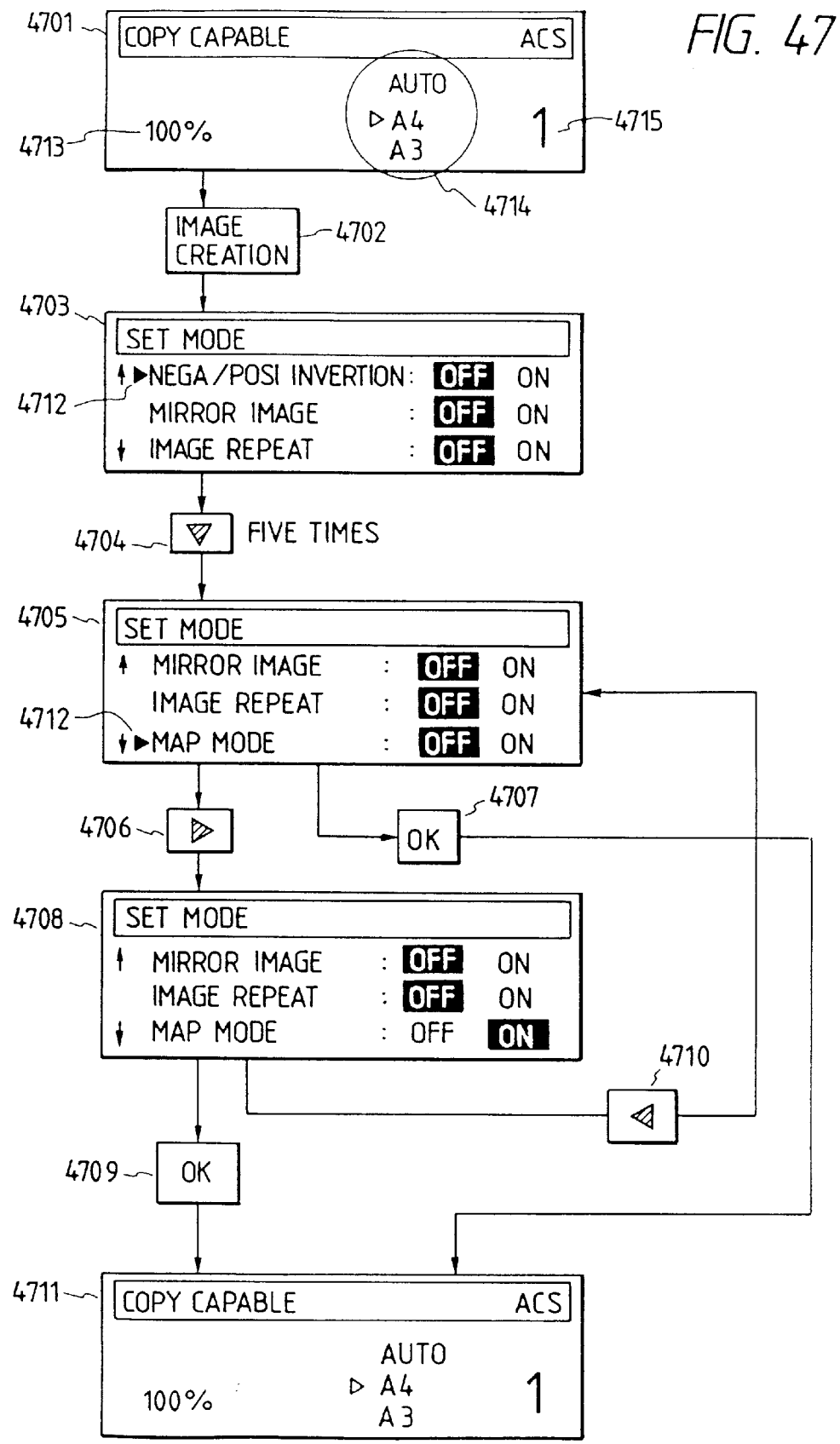

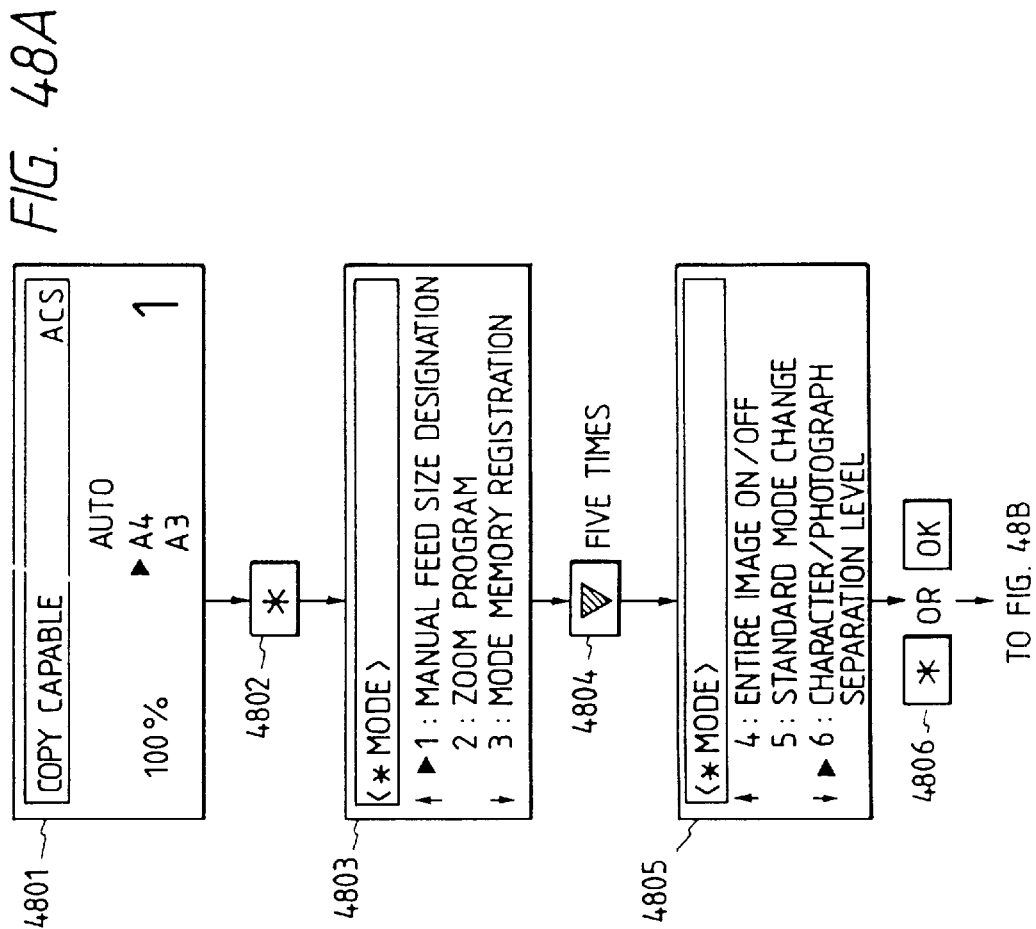

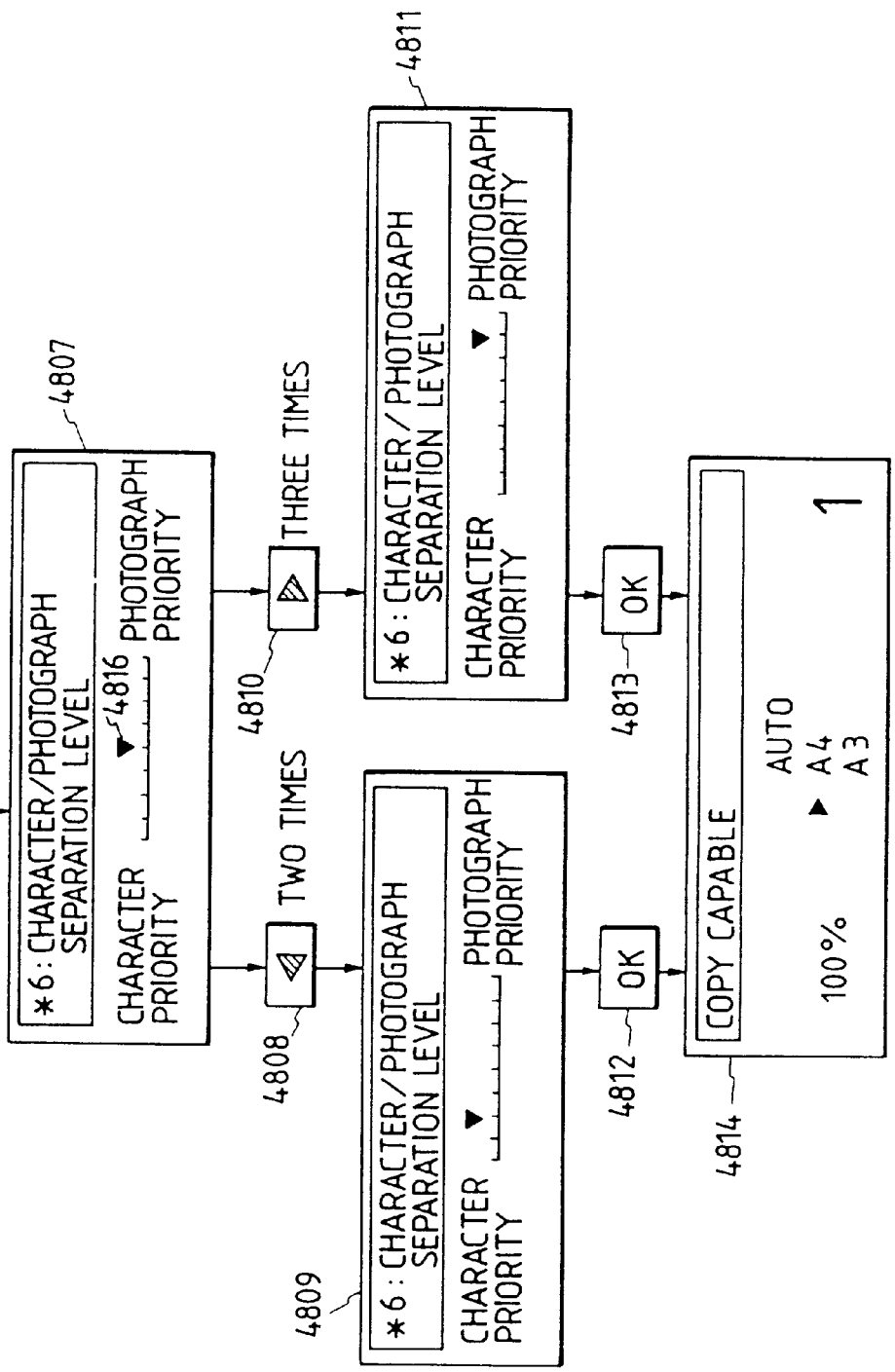

FIG. 50

| ATLAS | SEG | $T_1$ | $T_2$ | $T_3$ |
|---|---|---|---|---|
| 0 | 0 | 15 | 20 | 25 |
|  | 1 | 20 | 25 | 30 |
|  | 2 | 25 | 30 | 35 |
|  | 3 | 30 | 40 | 45 |
|  | 4 | 35 | 50 | 60 |
|  | 5 | 40 | 60 | 70 |
|  | 6 | 50 | 70 | 80 |
|  | 7 | 60 | 80 | 90 |
|  | 8 | 80 | 100 | 110 |
|  | 9 | 100 | 120 | 130 |
|  | 10 | 120 | 140 | 150 |
|  | 11 | 140 | 160 | 170 |
|  | 12 | 160 | 180 | 190 |
| 1 | 0 | 7 | 10 | 13 |
|  | 1 | 10 | 13 | 16 |
|  | 2 | 13 | 16 | 19 |
|  | 3 | 16 | 19 | 22 |
|  | 4 | 19 | 22 | 26 |
|  | 5 | 22 | 25 | 30 |
|  | 6 | 25 | 30 | 35 |
|  | 7 | 30 | 35 | 40 |
|  | 8 | 35 | 40 | 45 |
|  | 9 | 40 | 45 | 50 |
|  | 10 | 45 | 50 | 55 |
|  | 11 | 50 | 55 | 70 |
|  | 12 | 55 | 65 | 80 |

FIG. 51

| SEG | 0 | 1 | 2 | 3 | 4 | 5 | 6 | 7 | 8 | 9 | 10 | 11 | 12 |
|---|---|---|---|---|---|---|---|---|---|---|---|---|---|
| T₄ | 31 | 31 | 31 | 29 | 27 | 25 | 24 | 22 | 20 | 18 | 16 | 15 | 14 |

FIG. 52

| CENTER | CHARACTER/PHOTOGRAPH SEPARATION LEVEL (5 : CENTRAL DISPLAY) | | | | | | | | |
|---|---|---|---|---|---|---|---|---|---|
| | (LEFT EDGE) 1 | 2 | 3 | 4 | 5 | 6 | 7 | 8 | (RIGHT EDGE) 9 |
| 0 | SEG 0 | SEG 1 | SEG 2 | SEG 3 | SEG 4 | SEG 5 | SEG 6 | SEG 7 | SEG 8 |
| 1 | 1 | 2 | 3 | 4 | SEG 5 | 6 | 7 | 8 | 9 |
| 2 | 2 | 3 | 4 | 5 | SEG 6 | 7 | 8 | 9 | 10 |
| 3 | 3 | 4 | 5 | 6 | SEG 7 | 8 | 9 | 10 | 11 |
| 4 | 4 | 5 | 6 | 7 | SEG 8 | 9 | 10 | 11 | 12 |

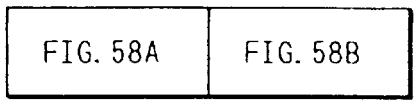
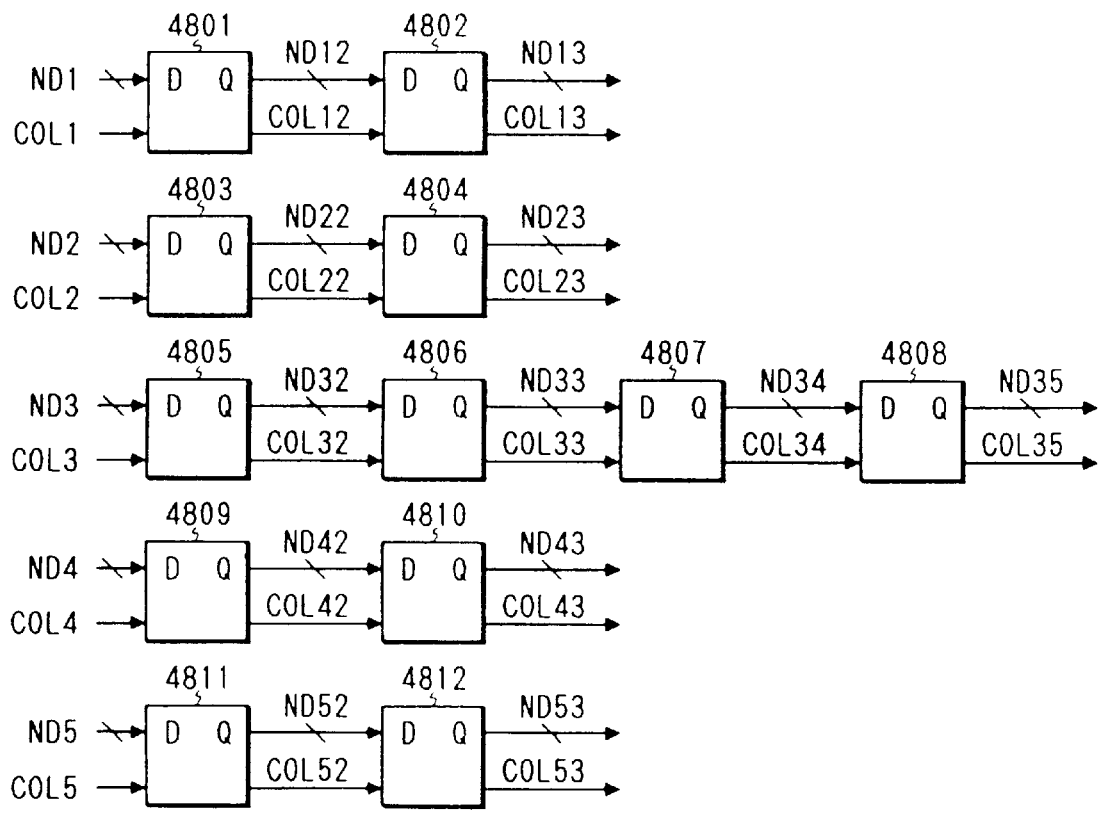

FIG. 63

| | DOT 1 | EDGE | BL 1 | UNK 1 | COL 1 | CAN 1 | PHASE=0, 1, 2 (M, C, Y) V4 | PHASE=3 (BK) V4 |
|---|---|---|---|---|---|---|---|---|
| (a) | X | 1 | 1 | 0 | 0 | 0 | 0 | M2 |
| (b) | X | 1 | 1 | 0 | 0 | 1 | $V_2$ | $V_2$ |
| (c) | X | 1 | 0 | 1 | 0 | 0 | $\frac{V_2}{2}$ | $\frac{V_2}{2} + \frac{1}{2}M2$ |
| (d) | X | 1 | 0 | 1 | 0 | 1 | $V_2$ | $V_2$ |
| (e) | X | 1 | 0 | 0 | 1 | X | $V_2$ | $V_2$ |
| (f) | 0 | 0 | 1 | 0 | 0 | 0 | $\frac{3}{4}V_2$ | $\frac{3}{4}V_2 + \frac{1}{4}M2$ |
| (g) | 0 | 0 | 1 | 0 | 0 | 1 | $V_2$ | $V_2$ |
| (h) | 0 | 0 | 0 | X | X | X | $V_2$ | $V_2$ |
| (i) | 1 | 0 | 1 | X | X | X | 0 | M2 |
| (j) | 1 | 0 | 0 | X | X | X | $V_2$ | $V_2$ |

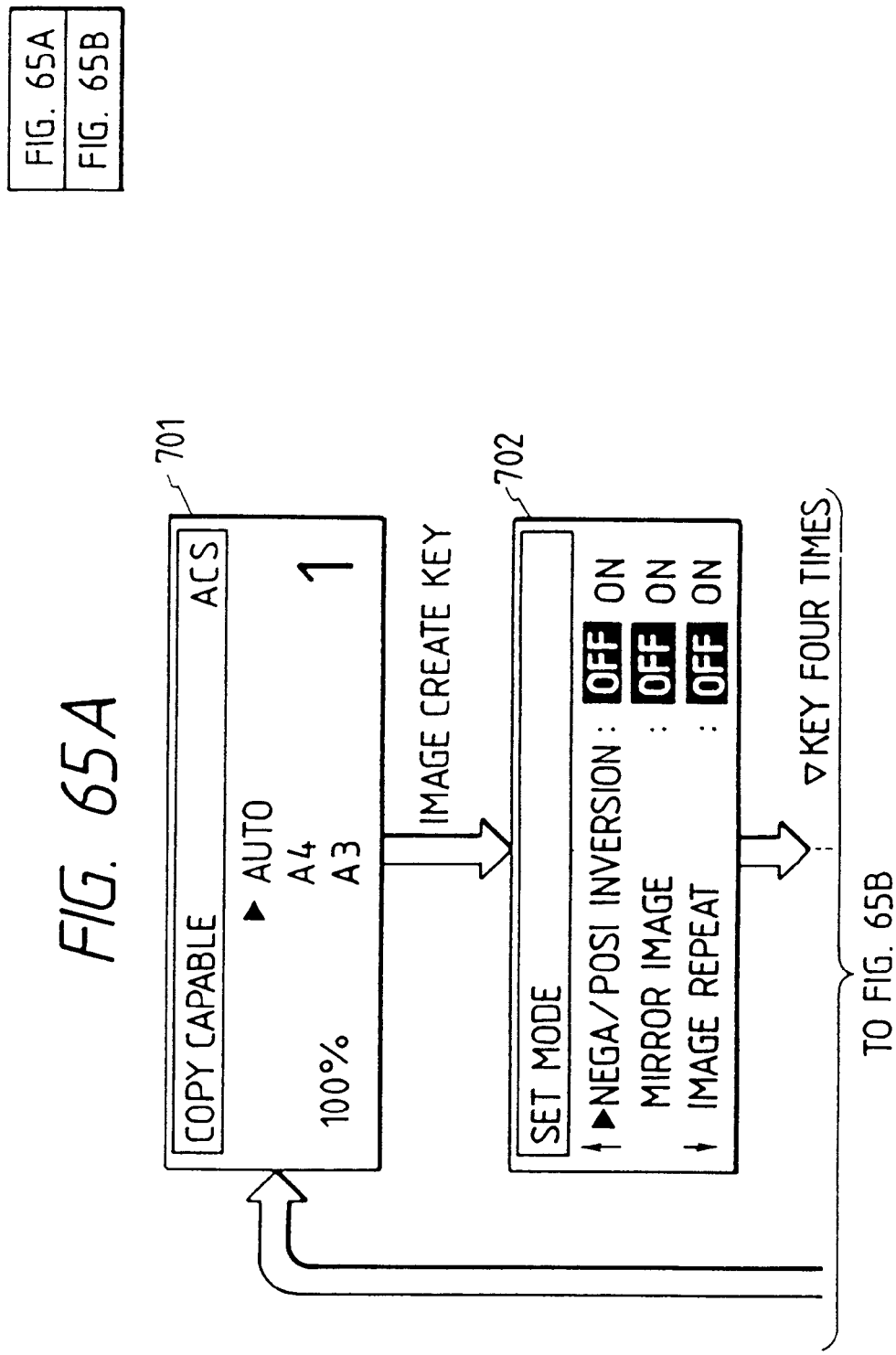

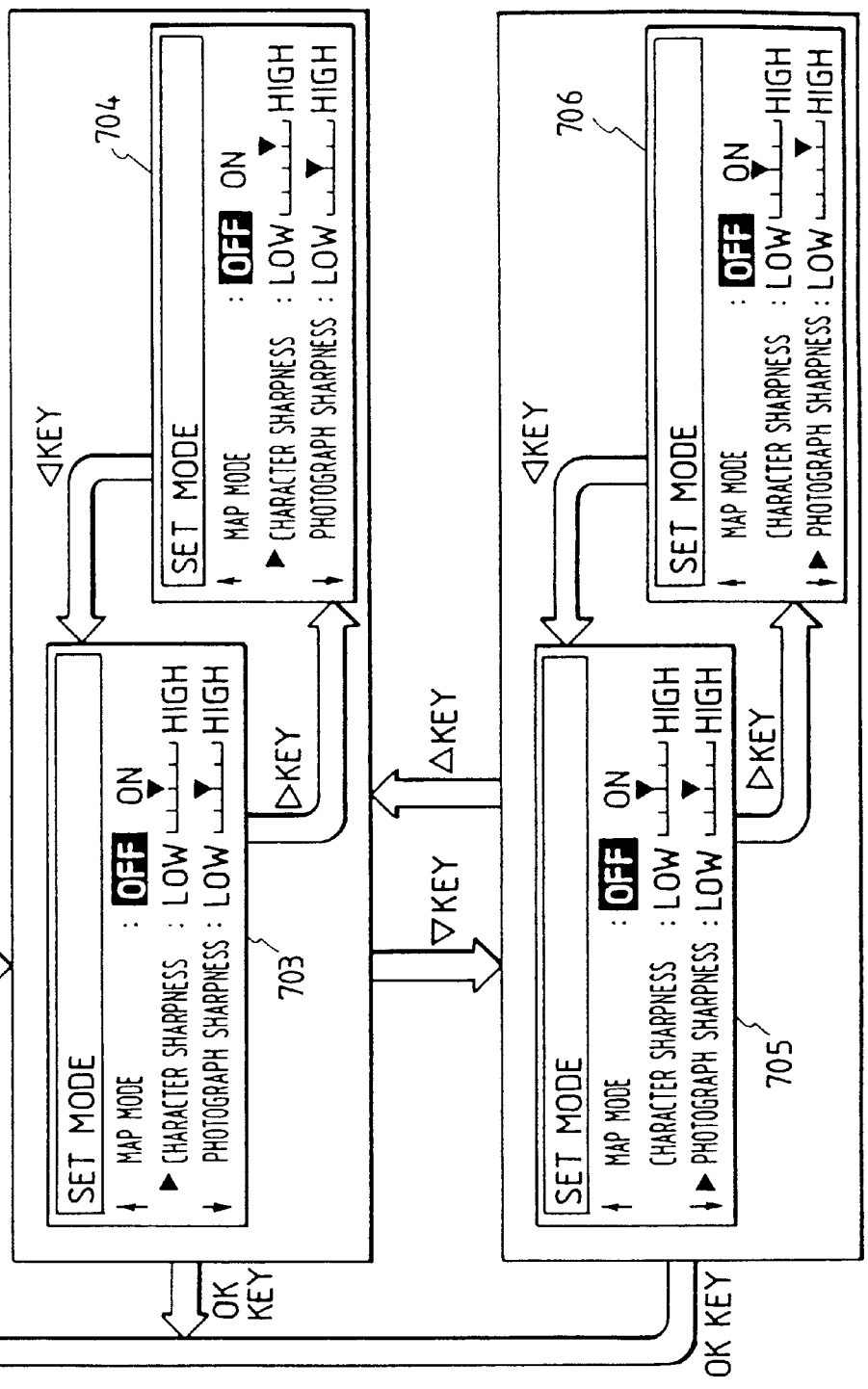

FIG. 66

| KIND OF MODE | FEATURE | MODE SW SIGNAL | | |
|---|---|---|---|---|
| | | MOD 0 | MOD 1 | ATLAS |
| CHARACTER MODE | CHARACTER IS CLEARLY COPIED | 0 | 1 | MAP MODE WHEN ON, ATLAS=1 WHEN OFF, ATLAS=0 |
| PHOTOGRAPH MODE | PHOTOGRAPH(INCLUDING DOTS OR SCREEN) IS REALISTICALLY COPIED | 1 | 0 | — |
| CHARACTER/ PHOTOGRAPH MODE | ORIGINAL INCLUDING CHARACTER/PHOTOGRAPH (INCLUDING DOTS OR SCREEN) IS COPIED | 1 | 1 | MAP MODE WHEN ON, ATLAS=1 WHEN OFF, ATLAS=0 |

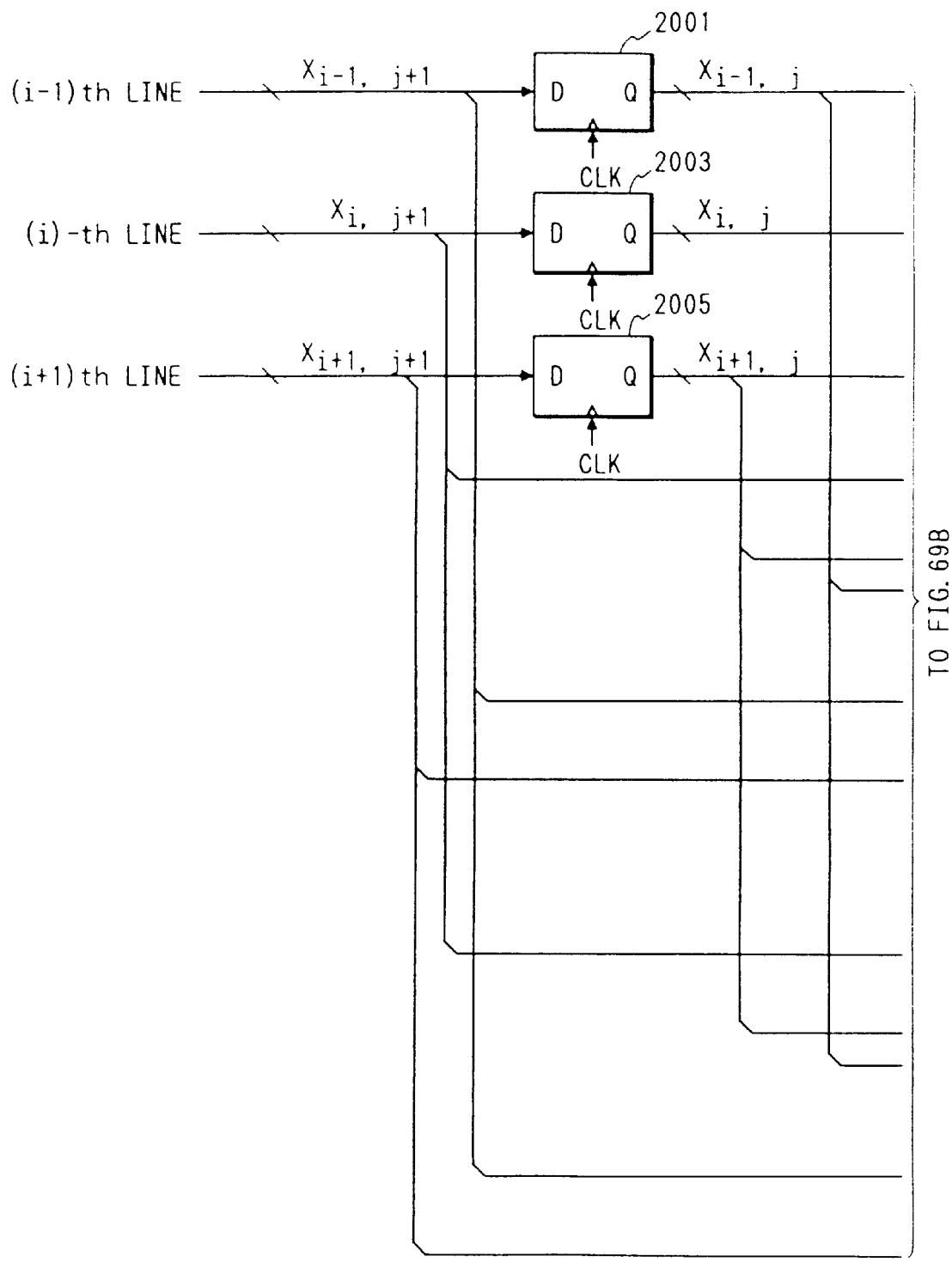

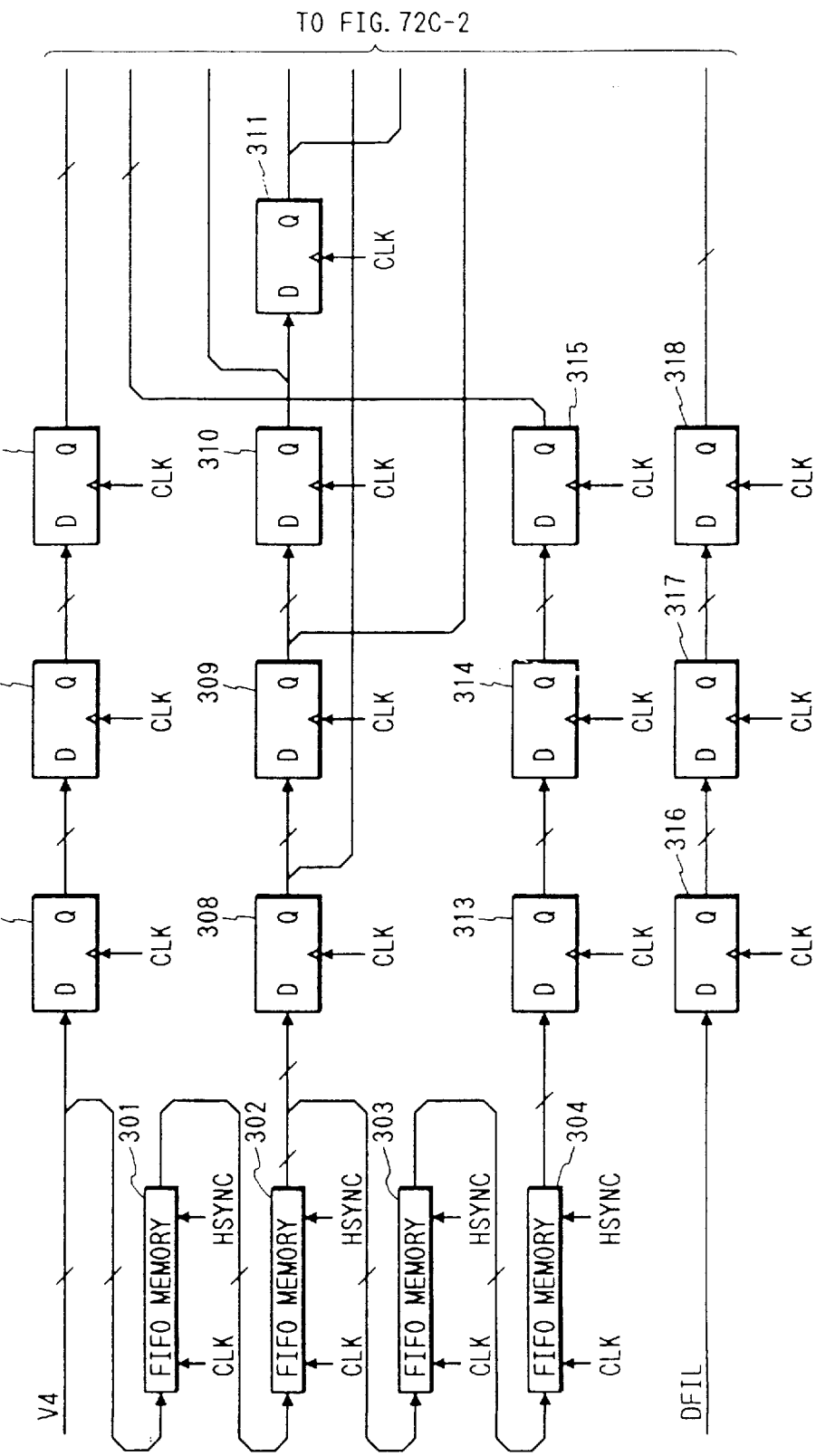

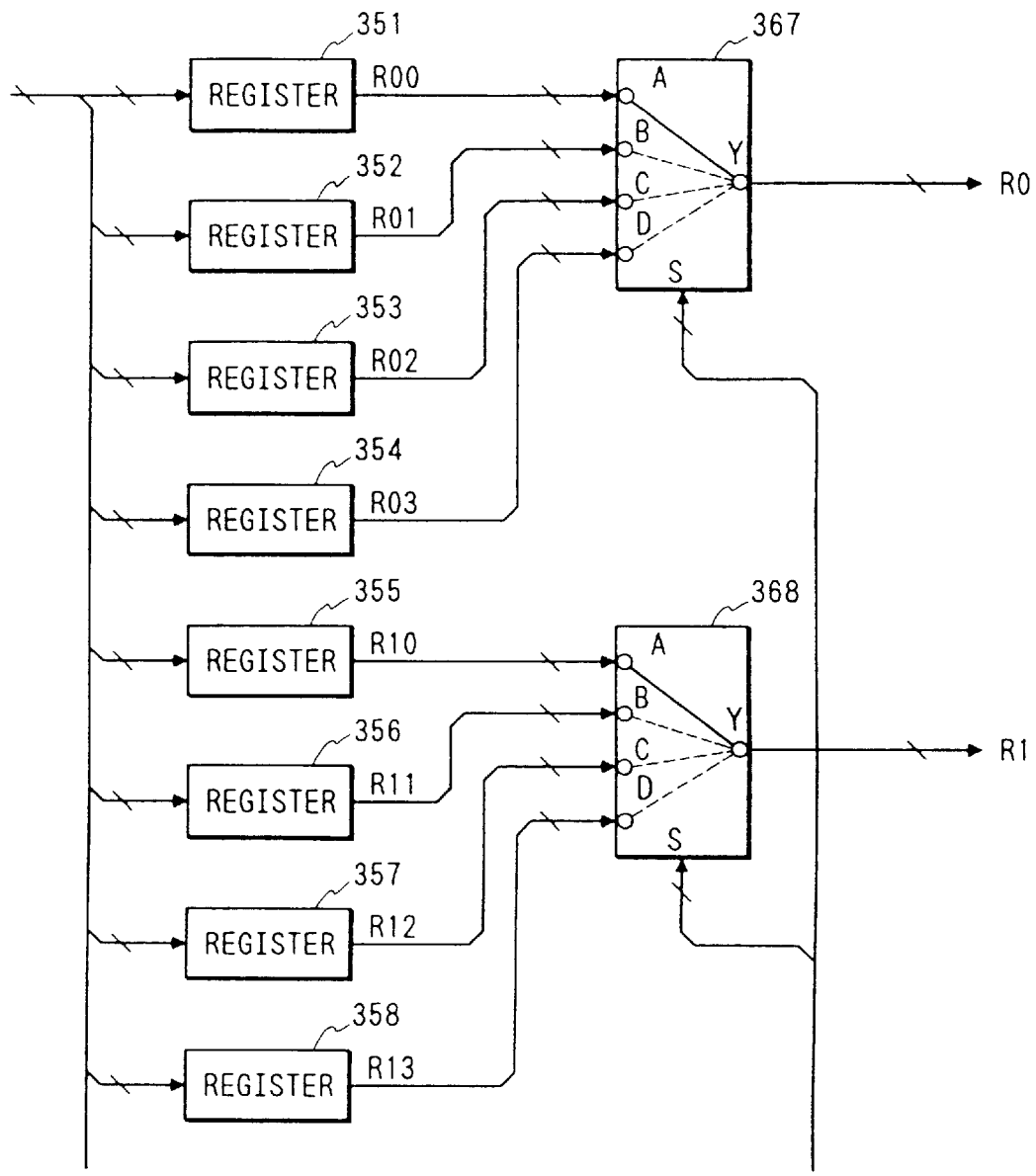

| S | Y |
|---|---|
| 0 | Y ← A |
| 1 | Y ← B |
| 2 | Y ← C |
| 3 | Y ← D |

FIG. 72G

| REGISTER \ SHARPNESS VALUE | 1 | 2 | 3 | 4 | 5 |
|---|---|---|---|---|---|
| R00 | 2 | 4 | 8 | 10 | 18 |
| R01 | 2 | 8 | 10 | 14 | 22 |
| R02 | 10 | 14 | 18 | 26 | 42 |
| R03 | 10 | 18 | 26 | 42 | 58 |
| R10 | 1 | 0 | 0 | 0 | -2 |
| R11 | 1 | 0 | 0 | -1 | -3 |
| R12 | 0 | -1 | -2 | -4 | -8 |
| R13 | 0 | -2 | -4 | -8 | -12 |
| R20 | 1 | 0 | 0 | -1 | -3 |
| R21 | 1 | 0 | -1 | -2 | -4 |
| R22 | -1 | -2 | -3 | -5 | -9 |
| R23 | -1 | -3 | -5 | -9 | -13 |
| R30 | 1 | 2 | 0 | 0 | 0 |
| R31 | 1 | 0 | 0 | 0 | 0 |
| R32 | 0 | 0 | 0 | 0 | 0 |
| R33 | 0 | 0 | 0 | 0 | 0 |

(NOTE) SET VALUE=(VALUE IN THIS FIGURE)/8

FIG. 72H

| SHARPNESS VALUE \ DFIL | 0 | 1 | 2 | 3 |
|---|---|---|---|---|
| 1 | $(1/8)\begin{bmatrix} 1 & 1 & 1 \\ 1 & 2 & 1 \\ 1 & 1 & 1 \end{bmatrix}$ | $(1/8)\begin{bmatrix} 1 & 1 & 1 \\ 1 & 2 & 1 \\ 1 & 1 & 1 \end{bmatrix}$ | $(1/8)\begin{bmatrix} 0 & 0 & 0 \\ -1 & 10 & -1 \\ 0 & 0 & 0 \end{bmatrix}$ | $(1/8)\begin{bmatrix} 0 & 0 & 0 \\ -1 & 10 & -1 \\ 0 & 0 & 0 \end{bmatrix}$ |
| 2 | $(1/8)\begin{bmatrix} 0 & 0 & 0 \\ 2 & 4 & 2 \\ 0 & 0 & 0 \end{bmatrix}$ | $(1/8)\begin{bmatrix} 0 & 0 & 0 \\ 0 & 8 & 0 \\ 0 & 0 & 0 \end{bmatrix}$ | $(1/8)\begin{bmatrix} -1 & 0 & -2 \\ -2 & 14 & 0 \\ -1 & 0 & -2 \end{bmatrix}$ | $(1/8)\begin{bmatrix} -2 & 0 & -3 \\ -3 & 18 & 0 \\ -2 & 0 & -3 \end{bmatrix}$ |
| 3 | $(1/8)\begin{bmatrix} 0 & 0 & 0 \\ 0 & 8 & 0 \\ 0 & 0 & 0 \end{bmatrix}$ | $(1/8)\begin{bmatrix} 0 & 0 & 0 \\ -1 & 10 & -1 \\ 0 & 0 & 0 \end{bmatrix}$ | $(1/8)\begin{bmatrix} -2 & 0 & -3 \\ -3 & 18 & 0 \\ -2 & 0 & -3 \end{bmatrix}$ | $(1/8)\begin{bmatrix} -4 & 0 & -5 \\ -5 & 26 & 0 \\ -4 & 0 & -5 \end{bmatrix}$ |
| 4 | $(1/8)\begin{bmatrix} 0 & 0 & -1 \\ -1 & 10 & 0 \\ 0 & 0 & -1 \end{bmatrix}$ | $(1/8)\begin{bmatrix} -1 & 0 & -2 \\ -2 & 14 & 0 \\ -1 & 0 & -2 \end{bmatrix}$ | $(1/8)\begin{bmatrix} -4 & 0 & -5 \\ -5 & 26 & 0 \\ -4 & 0 & -5 \end{bmatrix}$ | $(1/8)\begin{bmatrix} -8 & 0 & -9 \\ -9 & 42 & 0 \\ -8 & 0 & -9 \end{bmatrix}$ |
| 5 | $(1/8)\begin{bmatrix} -2 & 0 & -3 \\ -3 & 18 & 0 \\ -2 & 0 & -3 \end{bmatrix}$ | $(1/8)\begin{bmatrix} -3 & 0 & -4 \\ -4 & 22 & 0 \\ -3 & 0 & -4 \end{bmatrix}$ | $(1/8)\begin{bmatrix} -8 & 0 & -9 \\ -9 & 42 & 0 \\ -8 & 0 & -9 \end{bmatrix}$ | $(1/8)\begin{bmatrix} -12 & 0 & -13 \\ -13 & 58 & 0 \\ -12 & 0 & -13 \end{bmatrix}$ |

FIG. 74A

| FIL VALUE | CHARACTER MODE | CHARACTER/PHOTOGRAPH MODE | PHOTOGRAPH MODE | NOTE |
|---|---|---|---|---|
| 0 | — | AT A TIME OF Y, M, C TONER DEVELOPMENT IN PLANE PORTION AND CHROMATIC PORTION | AT A TIME OF Y, M, C TONER DEVELOPMENT | CORRESPONDING TO PHOTOGRAPH SHARPNESS |
| 1 | — | AT A TIME OF BK TONER DEVELOPMENT IN PLANE PORTION AND CHROMATIC PORTION | AT A TIME OF BK TONER DEVELOPMENT | CORRESPONDING TO PHOTOGRAPH SHARPNESS |
| 2 | — | INTERMEDIATE COLOR CHARACTER PORTION | — | CORRESPONDING TO CHARACTER SHARPNESS |
| 3 | ALL IMAGE AREAS | BLACK CHARACTER PORTION | — | CORRESPONDING TO CHARACTER SHARPNESS |

FIG. 74B

| FIL VALUE | FIL(0) | FIL(1) |
|---|---|---|
| 0 | 0 | 0 |
| 1 | 0 | 1 |
| 2 | 1 | 0 |
| 3 | 1 | 1 |

FIG. 93

DEPRESS COLOR MODE KEY ONE TIME

⇩

| SELECT KIND OF COLOR MODE | | | |
|---|---|---|---|
| ▷ RED | MAGENTA | THREE COLORS | |
| GREEN | CYAN | FOUR COLORS | |
| BLUE | YELLOW | BLACK | |

~701

⇩

DEPRESS [V] KEY ONE TIME

⇩

| SELECT KIND OF COLOR MODE | | | |
|---|---|---|---|
| RED | MAGENTA | THREE COLORS | |
| ▷ GREEN | CYAN | FOUR COLORS | |
| BLUE | YELLOW | BLACK | |

~702

⇩

DEPRESS [OK] KEY ONE TIME

⇩

| COPY CAPABLE | | G |
|---|---|---|
| | ▷ AUTO | |
| | A4 | |
| 100% | A3 | 1 |

~703

| COLOR MODE | C MODE SIGNAL | |
|---|---|---|
| | UPPER | LOWER |
| | C1 | C0 |
| FOUR COLORS | 1 | 1 |
| THREE COLORS | 1 | 0 |
| MONO COLOR (RED, GREEN, BLUE, MAGENTA, CYAN, YELLOW, BLACK) | 0 | 0 |

FIG. 96

| | EDGE | BL 1 | UNK 1 | COL 1 | CAN 1 | PHASE=0, 1, 2 (M, C, Y) V4 | PHASE=3 (BK) V4 | C1 | C0 |
|---|---|---|---|---|---|---|---|---|---|
| (a) | 1 | 1 | 0 | 0 | 0 | 0 | M2 | | |
| (b) | 1 | 1 | 0 | 0 | 1 | $V_2$ | $V_2$ | | |
| (c) | 1 | 0 | 1 | 0 | 0 | $\frac{V_2}{2}$ | $\frac{V_2}{2} + \frac{1}{2}M2$ | 1 | 1 |
| (d) | 1 | 0 | 1 | 0 | 1 | $V_2$ | $V_2$ | | |
| (e) | 1 | 0 | 0 | 1 | X | $V_2$ | $V_2$ | | |
| (f) | 0 | 1 | 0 | 0 | 0 | $\frac{3}{4}V_2$ | $\frac{3}{4}V_2 + \frac{1}{4}M2$ | | |
| (g) | 0 | 1 | 0 | 0 | 1 | $V_2$ | $V_2$ | | |
| (h) | 0 | 0 | X | X | X | $V_2$ | $V_2$ | | |
| FOUR COLORS | | | | | | | | | |
| THREE COLORS | X | X | X | X | X | $V_2$ | | 1 | 0 |
| MONO COLOR | X | X | X | X | X | $V_2$ | | 0 | 0 |

FIG. 98

| | PHASE | EDGE | BL 1 | UNK 1 | COL 1 | CAN 1 | GAIN 1 | GAIN 2 | C1 | C0 |
|---|---|---|---|---|---|---|---|---|---|---|
| FOUR COLORS | 0~2 | 1 | 1 | 0 | 0 | 0 | 0 | 0 | 1 | 1 |
| | | 1 | 0 | 0 | 0 | 1 | 4 | 0 | | |
| | | 1 | 0 | 1 | 0 | 1 | 2 | 0 | | |
| | | 0 | 0 | 0 | 1 | 1 | 4 | 0 | | |
| | | 0 | 1 | 0 | 0 | x | 4 | 0 | | |
| | | 0 | 1 | 0 | 0 | 1 | 3 | 0 | | |
| | | 0 | 0 | 0 | x | x | 4 | 0 | | |
| | 3 | 1 | 1 | 0 | 0 | 0 | 0 | 4 | | |
| | | 1 | 0 | 0 | 0 | 1 | 4 | 0 | | |
| | | 1 | 0 | 1 | 0 | 0 | 2 | 2 | | |
| | | 0 | 0 | 0 | 1 | 1 | 4 | 0 | | |
| | | 0 | 1 | 0 | 0 | x | 4 | 1 | | |
| | | 0 | 1 | 0 | 0 | 1 | 3 | 0 | | |
| | | 0 | 0 | 0 | x | x | 4 | 0 | | |
| THREE COLORS | 0~2 | x | x | x | x | x | 4 | 0 | 1 | 0 |
| MONO COLOR | 0~3 | x | x | x | x | x | 4 | 0 | 0 | 0 |

FIG. 100

| | C1 | C0 | EDGE | FIL(1) | FIL(0) | FILTER PROC | LOGICAL EXPRESSION |
|---|---|---|---|---|---|---|---|
| FOUR COLORS | 1 | 1 | ACCORDING TO LOGICAL EXPRESSION | 0 | 1 | (a) LOW-LEVEL EDGE EMPHASIS | {(UNK1 ∩ $\overline{CAN1}$) ∪ COL1} ∩ EDGE |
| | | | | 1 | 1 | (b) HIGH-LEVEL EDGE EMPHASIS | BL1 ∩ EDGE ∩ $\overline{CAN1}$ |
| | | | | x | 0 | (c) THROUGH | OTHER THAN ABOVE |
| THREE COLORS | 1 | 0 | 1 | 0 | 1 | (a) | |
| | | | 0 | x | 0 | (c) | |
| MONO COLOR | 0 | 0 | 1 | 1 | 1 | (b) | |
| | | | 1 | x | 0 | (c) | |

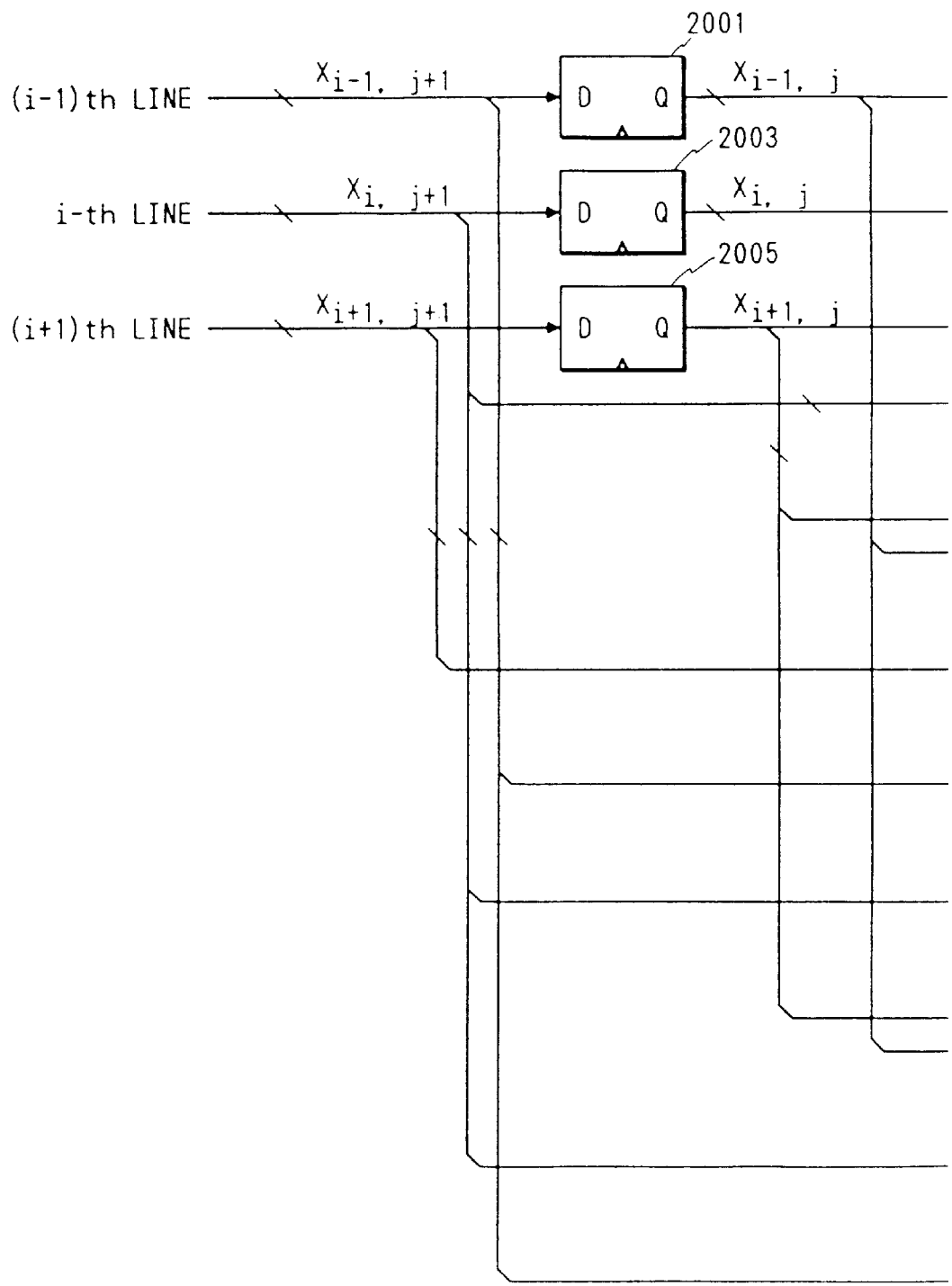

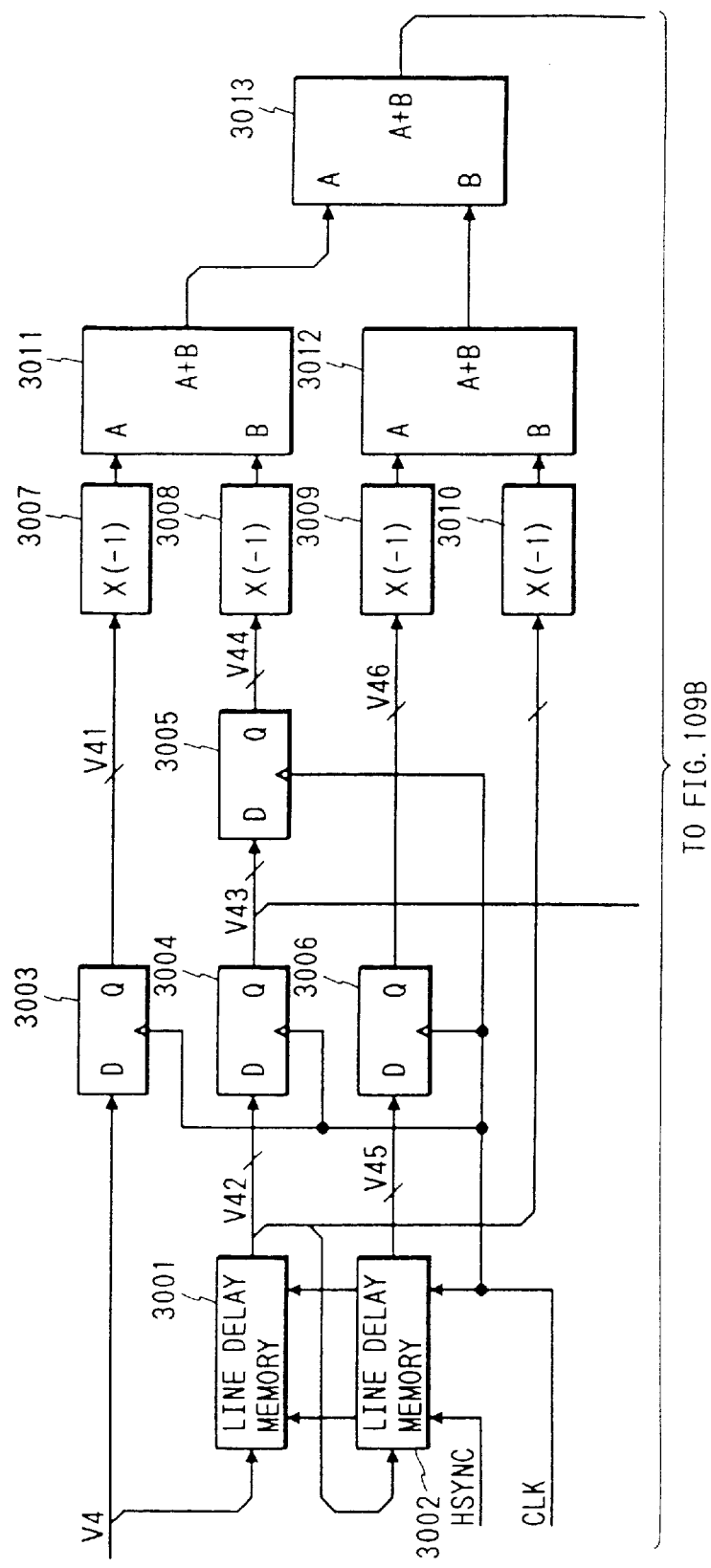

IMAGE PROCESSING APPARATUS INCLUDING MEANS FOR JUDGING A CHROMATIC PORTION OF AN IMAGE

This application is a continuation of application Ser. No. 08/085,176 filed Jul. 2, 1993, now abandoned, which was a division of application Ser. No. 08/002,679 filed Jan. 8, 1993, now U.S. Pat. No. 5,251,023, issued Oct. 5, 1993, which was a continuation of application Ser. No. 07/561,292 filed Aug. 2, 1990, now abandoned.

BACKGROUND OF THE INVENTION

1. Field of the Invention

This invention relates to a method of and an apparatus for image processing and, more particularly, to a method of and an apparatus for image processing, which permits various kinds of image processing.

2. Related Art

As prior art apparatus for color image reproduction, there are those using recording means of silver salt photographic type, electrophotographic type, thermal transfer type and so forth.

In electrophotographic and thermal transfer type recording means, three colors of yellow, magenta and cyan are used for color formation. In many recording means, a color material of black color is used to enhance the reproducibility of black. For example, it has been provided an apparatus wherein if a color of original is judged to be a black, only a black color material is used.

In some prior art image processing apparatuses, spacial frequency characteristics of the original are judged, and the sharpness of recorded image is improved using edge emphasizing or like space filter means such that image areas with sharp image density changes are given sharper image density changes.

These apparatuses, however, have the following drawbacks.

Usually, for sharply recording edges of characters density changes of the original are extracted. Even in this case, erroneous judgement is prone in screen areas of the original, resulting in an unseemly screen reproduction image and in different color shades of edges of color characters from those in the original. Further, heretofore, a judgement level for judging character edges in images is fixed absolutely, making it difficult to select an adequate judgement level according to characteristics of a given image.

Further, heretofore character areas and intermedate image areas in a given image are judged as such, and these different areas are processed separately, i.e., the character areas are processed by pure binarization while the intermediate image areas are processed by providing a systematic dither process, for instance, thereby obtaining a satisfactory image.

Even this prior art method, however, still requires great improvement in connection with the function of discriminating character areas and intermediate image areas, and problems are encountered in connection with character areas and intermediate image areas, i.e., particular areas of image.

Further, as noted above in electrophotographic and thermal transfer type apparatuses three colors of yellow, magenta and cyan are used in superimposition on one another for color formation, and in many of these apparatuses color materials for black color are used to enhance the reproducibility of black.

In some of these apparatuses, colors of color originals is reproduced faithfully, and characters (particularly black characters) contained in color originals are reproduced sharply.

As an example, according to Japanese Patent Publication (Kokoku) No. 56-48869, the color of original is judged, and for a black area a sole color material for black color is used.

Further, in some apparatuses spacial frequency characteristics of original are determined, and the sharpness of recorded image is improved using edge emphasizing or like spacial filter means such that image areas with sharp image density changes are given sharper image density changes.

Further, in some of the recording means noted above a particular resolution of recording is generated psuedowise for graduation expression by using a systematic dither process or the like. Some of these apparatuses use such means as varying the dither matrix size by determining spacial frequency characteristics of the original or switching binarized image and dither image for clearly recording character edges or the like in the recorded image.

However, these apparatuses have the following drawbacks.

In an apparatus for monochromatic recording in black by judging original colors, black dots contained in a four-color screen print original produced by off-set printing or the like are emphasized, and an unseemly replica of image is obtained.

Further, in case where character edges are recorded sharply by extraction of original image density changes, screen areas of the original cause erroneous judgement to result in an unseemly replica of screen image. Further, color character edges cause different color shades from those in the original. Still further, there is no apparatus, which permits optimal separation of character areas, screen areas and photograph areas in case of full color copying and also in case of monochromatic copying.

There has been proposed a system, in which an original image is read out, edge areas containing characters and drawings and intermediate image areas containing photographs in the read-out image are separated from one another, and appropriate processes are provided for the respective separated areas (as disclosed in, for instance, "Nikkei Electronics", 1987, No. 425, p-p. 100–101.

In the prior art technique, however, when an original with intermediate images expressed by screen is read out for processing, the screen areas are judged as edge areas, and therefore undesired processing is provided.

Hitherto, there is known a technique of processing a read-out color image by spacial filtering using wellknown digital filter techniques. Further, there is an apparatus, in which the sharpness of the image quality (hereinafter referred to as sharpness) is changed continuously by continuously changing spacial frequency characteristics in spacial filter.

Meanwhile, there has been proposed a system, in which edge areas containing characters or the like and intermediate image areas containing photographs are separated from a read-out image, and appropriate processes are provided to the respective separated areas.

In the prior art apparatus, however, the same sharpness is provided for any of the developing colors of magenta (M), cyan (C), yellow (Y) and black (Br). Therefore, there are the following difficiencies.

When the sharpness is reduced in order to prevent noise in photograph areas or moire of screen, the sharpness of character areas is lost, and an image lacking sharpness is obtained.

Further, where the same sharpness is provided for character areas and flat areas such as photograph areas in an original at all times, in case of desiring an increased sharpness for increasing the sharpness of character areas, noise components in photograph areas are emphasized as well, or in case of desiring reduced sharpness to prevent noise in photograph areas or moire in screen the sharpness of character areas is lost.

Further, it is liable to judge intermediate tone areas expressed by screen in a portion of original to be edge areas or judge very thin characters as screen, and such "erroneous judgement" causes undesired processing of a portion of image.

Further, there is a problem in the prior art that with such areas as black characters a color blut of a certain color is generated around black areas due to such causes characteristics of processing circuits for processing individual color components of color image signal or lack of uniformity for individual colors of the sensitivity of a sensor section for converting a given image into a color image signal.

For this reason, there has been proposed a method of preventing the generation of color blurs (color bleeding) in colors round black character areas.

However, it has been confirmed by the inventors that black blur is generated around color characters in addition to color blurs around black characters.

More specifically, the black component is clearly recorded in areas corresponding to color character edges, thus degradating the quality of the reproduced image.

SUMMARY OF THE INVENTION

An object of the invention is to provide an apparatus for or a method of image processing, which can solve the above problems at the same time or individually.

Another object of the invention is to provide an apparatus for or a method of image processing, which permits adequate judgement of characteristics of a subject image.

A further object of the invention is to provide an apparatus for or method of image processing, which permits adequate judgement of characteristicds of a subject color image.

A still further object of the invention is to provide an apparatus for or a method of image processing, which permits adequately judging and making adequate character edge portions, dot portions and photograph portions of a subject color image.

A yet further object of the invention is to provide a novel apparatus for image processing, which can be readily operated.

To attain the above objects there is provided as an embodiment of the invention an apparatus for image processing, which comprises first means for judging the degree of color or freedom from color of an input color image singal, second means for judging dot areas in said input color image singal and control means for controlling spacial filter means or density conversion means for processing input image signal according to judgement by said first and second means, said spacial filter means or density conversion means being controlled according to judgement by said first and second judgement means.

According to the invention, there is also provided an apparatus for image processing, which permits independent setting of sharpness of each of a plurality of color component signals.

A further object of the invention is to provide an apparatus for image processing, which permits improvement of the quality of reproduced images.

The above and other objects and features of the invention will become more apparent from the following description and accompanying drawings.

BRIEF DESCRIPTION OF THE DRAWINGS

FIG. 3 is a view showing the circuit construction of the neighborhood of sensor 210 shown in FIG. 1;

FIGS. 14-1 and 14-2 are block diagrams showing the construction and operation of MAX/MIN detection circuit shown in FIG. 13;

FIGS. 15-1 and 15-2 are views showing the construction and operation of each selector shown in FIG. 13;

FIGS. 16-1 and 16-2 are views for explaining the operation of pixel color judgement unit 1101 shown in FIG. 13;

FIG. 17-1 is a block diagram showing the construction of a CAN signal generation unit in the area processing unit shown in FIG. 11;

FIG. 17-2 is a block diagram showing the construction of calculation unit 1722 shown in FIG. 17-1;

FIGS. 18-1-1 to 18-1-4 are diagrams showing the construction of character edge judgement unit 107;

FIG. 18-2 is a block diagram showing the construction of dot feature extraction unit 1827 shown in FIG. 18-1;

FIG. 18-3 is a block diagram showing the construction of dot area judgement unit 1828 shown in FIG. 18-1;

FIGS. 18-4 and 18-5 are views for explaining the operation of circuit shown in FIG. 18-3;

FIG. 18-6 is a view showing contents of table 1830 shown in FIG. 18-6:

FIG. 18-7 is a view showing the construction of signal conversion table 1826 shown in FIG. 18-1;

FIGS. 20-1-1 and 20-1-2 are diagrams showing the internal construction of 1805 shown in FIG. 18;

FIG. 20-2 is a view showing the relation between input address and output data in table 2023 shown in FIG. 20-1;

FIG. 22-1 is a view showing a detection pattern for detecting the dot array shown in FIG. 21;

FIG. 22-2 is a view showing a pattern of character end;

FIG. 23-1 is a view showing a status of dot judgement;

FIG. 23-2 is a view for explaining the operation of dot judgement;

FIGS. 24-1 to 24-7 are views showing outputs of feature extraction units 403 when various different kinds of character are read out;

FIGS. 25-1 to 25-3 are views showing, to an enlarged scale, part of FIGS. 24-1, 24-3 and 24-4, respectively;

FIG. 26 is a view showing the operation of multipliers 114 and 115, adder 116 and multiplication factor generation unit shown in FIG. 1;

FIGS. 45-1 to 45-6 are views corresponding to FIG. 24-1 to 24-6, respectively, and timing charts showing characteristics of individual detection signals;

FIGS. 46-1 to 46-2 are views showing FIG. 45-1 in detail;

FIGS. 47, 48A and 48B are views showing display examples in operation unit shown in FIG. 6;

FIG. 50 is a view showing a different example of the contents of table 2023 in FIG. 20-1;

FIG. 51 is a view showing a different example of the contents of table 1830 in FIG. 18-3;

FIG. 52 is a view showing SEG value selected by control unit 401 in correspondence to display scale of character/photograph separation level in 4807 in FIG. 48;

FIGS. 58, 58A and 58B are block diagrams showing a different example of the construction of FIG. 17-2;

FIGS. 59 to 63 are views showing modifications of FIGS. 1, 31, 32, 42 and 26, respectively;

FIGS. 65, 65A and 65B are views for explaining sharpness setting;

FIG. 66 is a view for explaining mode switching signal;

FIGS. 69, 69A, 69B and 69C are circuit diagrams showing a density change point detection unit;

FIGS. 72, 72A, 72B, 72C-1, 72C-2, 72-C, 72-D, 72D-1, 72D-2 and 72E to 72H are views for explaining spacial filter;

FIGS. 74A and 74B are views for explaining filter switching;

FIGS. 87A-1, 87A-2 are flow charts showing different examples from the flow chart shown in FIG. 80;

FIG. 93 is a view showing an example of display in FIG. 92;

FIG. 96 is a view showing a modification of the embodiment of FIG. 26;

FIG. 98 is a view showing a modification of the embodiment of FIG. 28;

FIG. 100 is a view showing a modification of the embodiment of FIG. 32;

FIGS. 108, 108A, 108B and 108C are views showing a modification of the embodiment of FIG. 20-1;

FIG. 109, 109A and 109B are views showing a modification of the embodiment of FIG. 30;

DESCRIPTION OF THE PREFERRED EMBODIMENTS

Embodiment

Now, an embodiment of the invention applied to a full-color digital copy machine will be described. It is to be construed, however, that this embodiment is by no means limitative, and the invention is applicable as well to various other apparatuses, for instance an apparatus having only a function of converting a given image into an electrical signal.

Overall Construction

Figure 2:
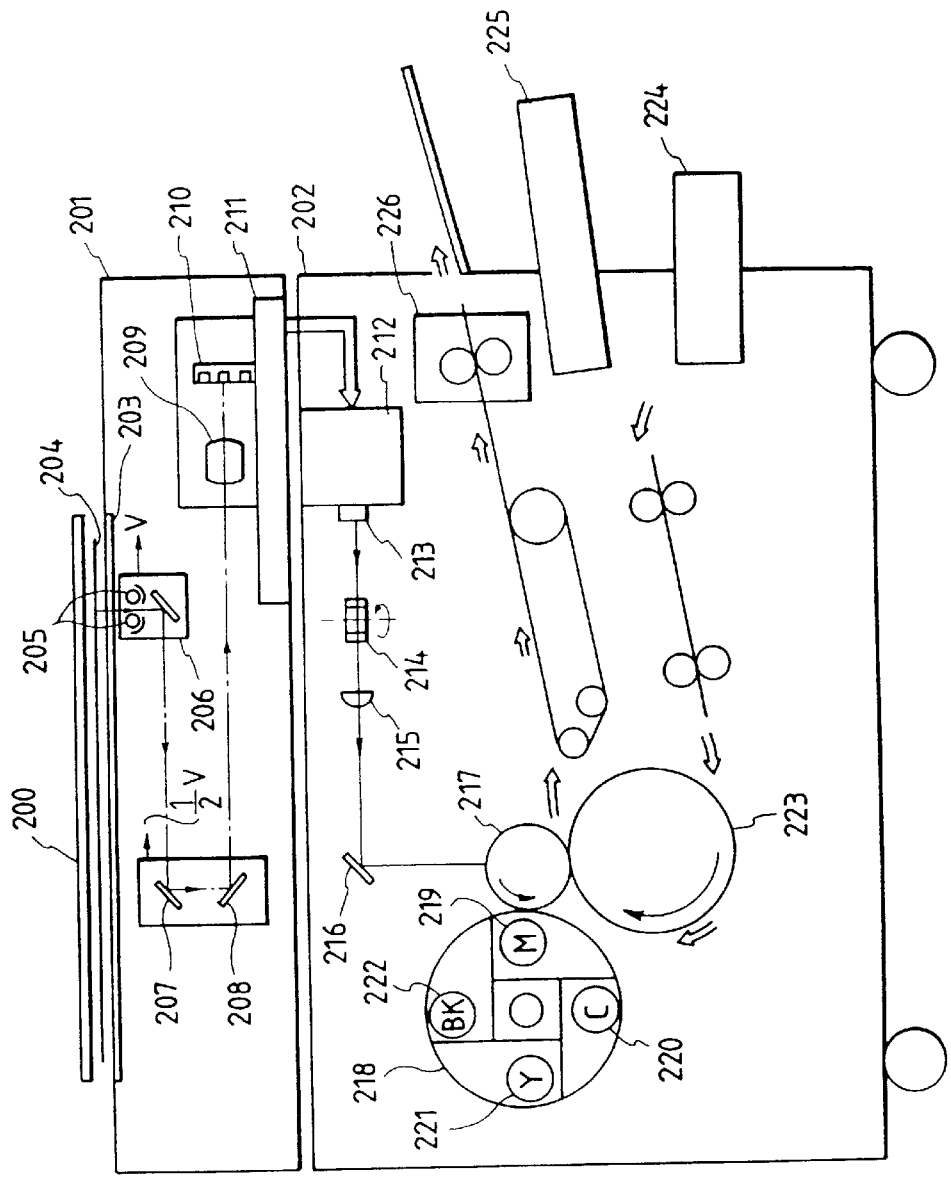
FIG. 2 is a view showing the construction of a copier in one embodiment of the invention.

FIG. 2 shows an overall construction of the full-color digital copier.

Image scanner 201 reads out an original and performs digital signal processing on the read-out image. Printer 202 prints out a full-color image on a sheet in correspondence to the original image read out by image scanner 201.

In image scanner 201, original 204 urged against original table glass (as hereinafter referred to as platen) 203 by mirror surface plate 200 is illuminated by lamps 205. Image light from the original is led by mirrors 206 to 208 to lens 209 to be focused on three-line sensor (hereinafter referred to as CCD) 210. CCD 210 supplies red (R), green (G) and blue (B) components of full color data of the focused image to signal processing unit 211. Lamps 205 and mirrors 206 to 208 scan the entire original area by being moved mechanically in directions perpendicular to an electric scanning direction of the CCD. Lamps 205 and mirror 206 are moved at speed v, while mirrors 207 and 208 are moved at one half the speed v (v/2). In signal processing unit 211, the read-out image is electrically processed to provide magenta (M), cyan (C), yellow (Y) and black (Bk) components which are supplied to printer 202. In one scanning cycle of image scanner 201 one of the components M, C, Y and Bk is supplied to printer 202, and one printing-out cycle is completed by four original scanning cycles.

The image signals M, C, Y and Bk provided from image scanner 201 are also supplied to laser driver 212. Laser driver 212 drives semiconductor laser 213 according to the input image signals. Laser 213 produces a modulated laser beam, which is led by polygon mirror 214, f-θ lens 215 and mirror 216 to scan photosensitive drum 217.

Reference numeral 218 designates a rotary developing unit including magenta, cyan, yellow and black developing sections 219 to 222. Four developing devices are sequentially brought into contact with photosensitive drum 217 to develop electrostatic latent images formed on drum 217 with toners.

Visible images formed by development on photosensitive drum 217 is transferred onto a sheet supplied from sheet cassette 224 or 225 and wound on transfer drum 223.

After four colors M, C, Y and Bk are consequtively transferred, the sheet is led through fixing unit 226 and then discharged.

Image Scanner

Figures 1, 2, 18:
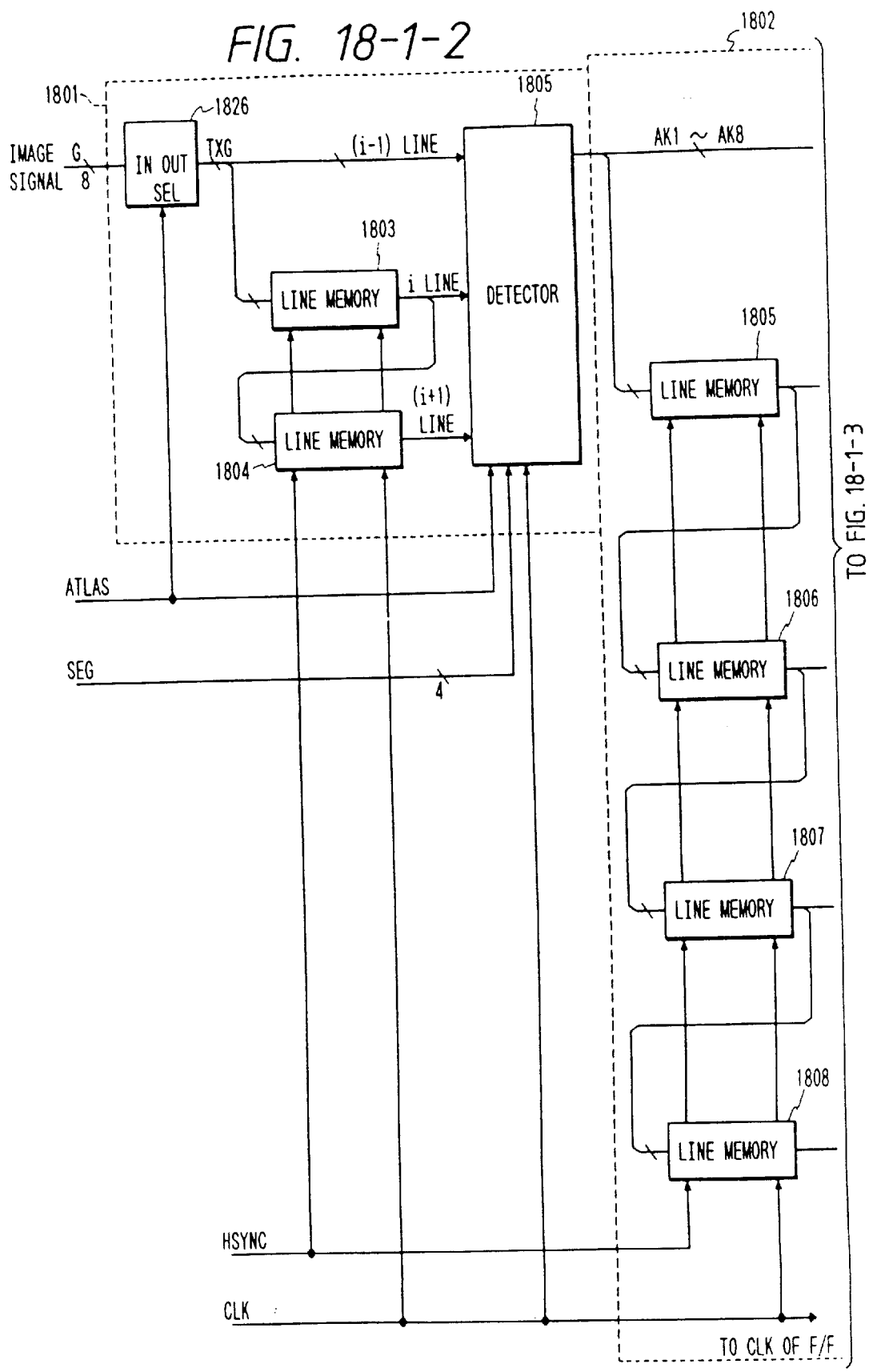
Figures 1, 3, 18:
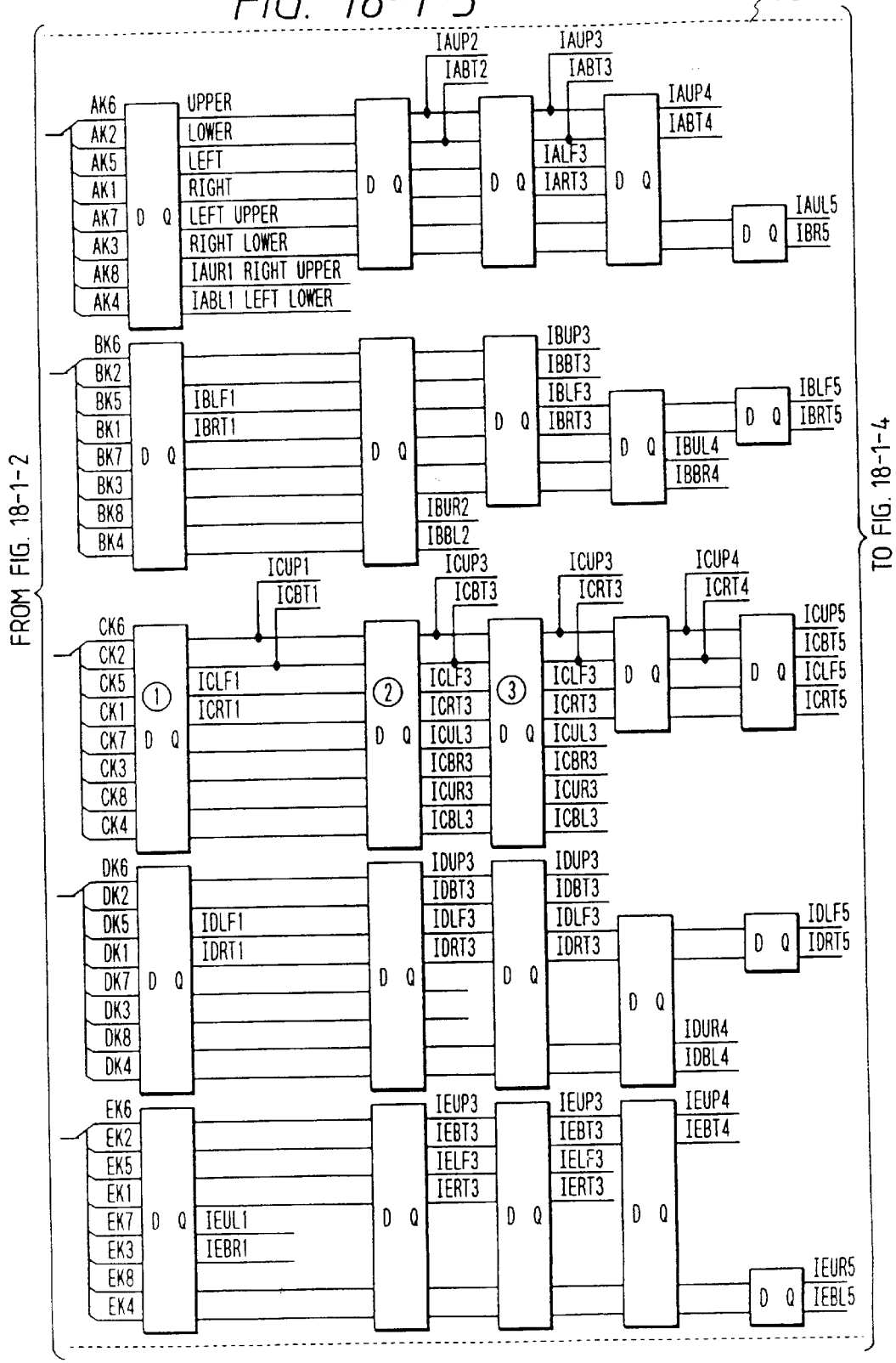
Figures 1, 4, 18:
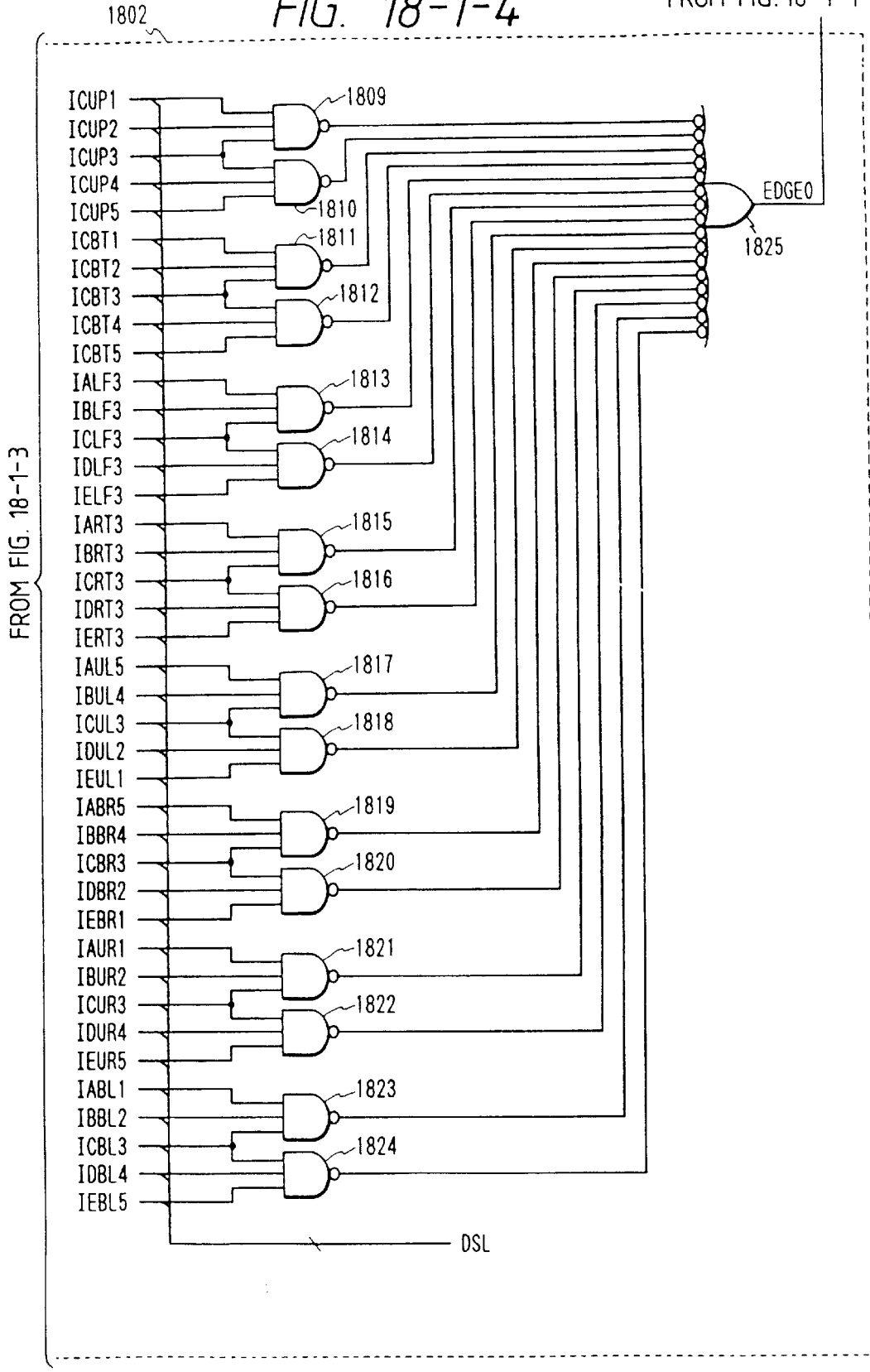
Figures 2, 18:
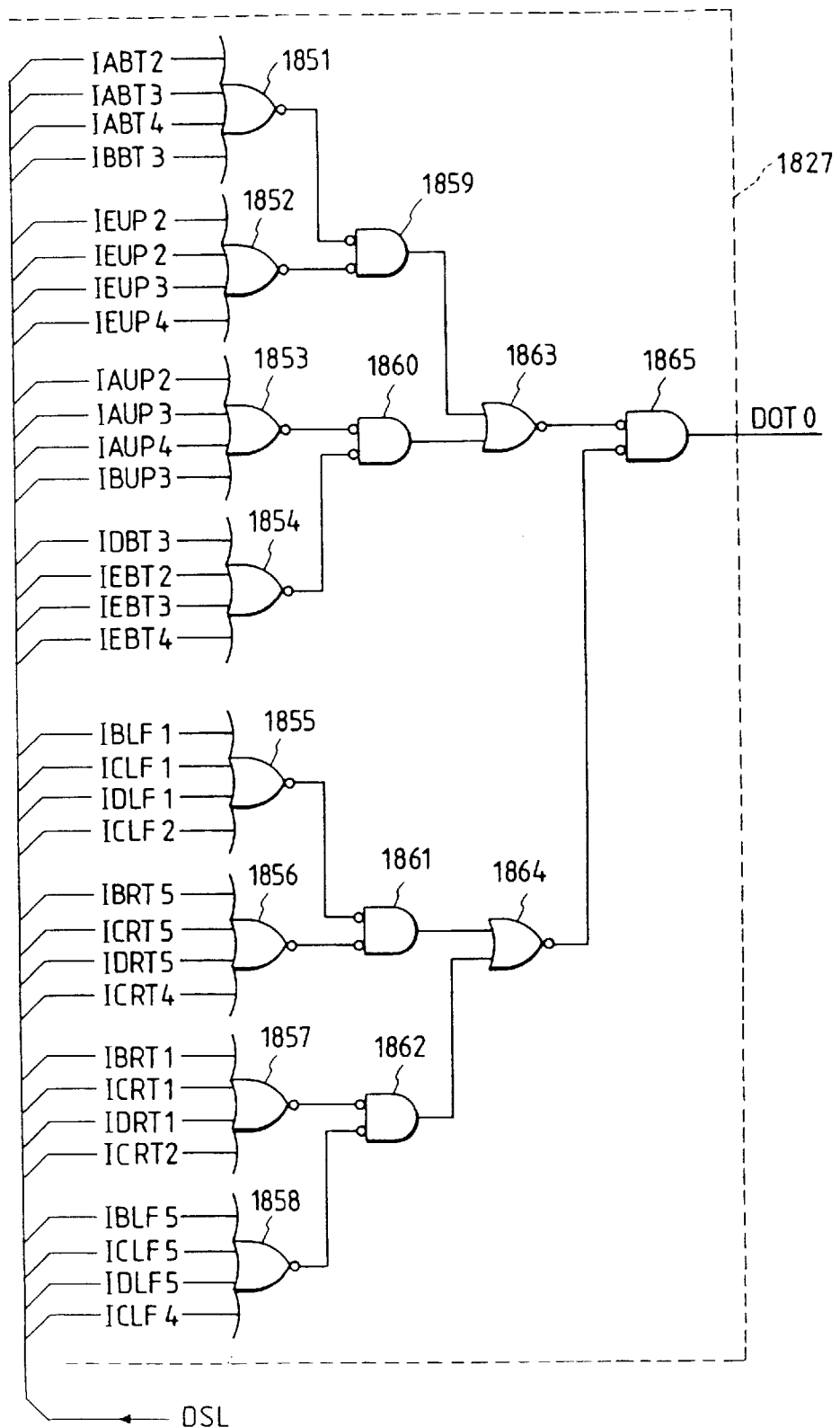
Figures 3, 18:
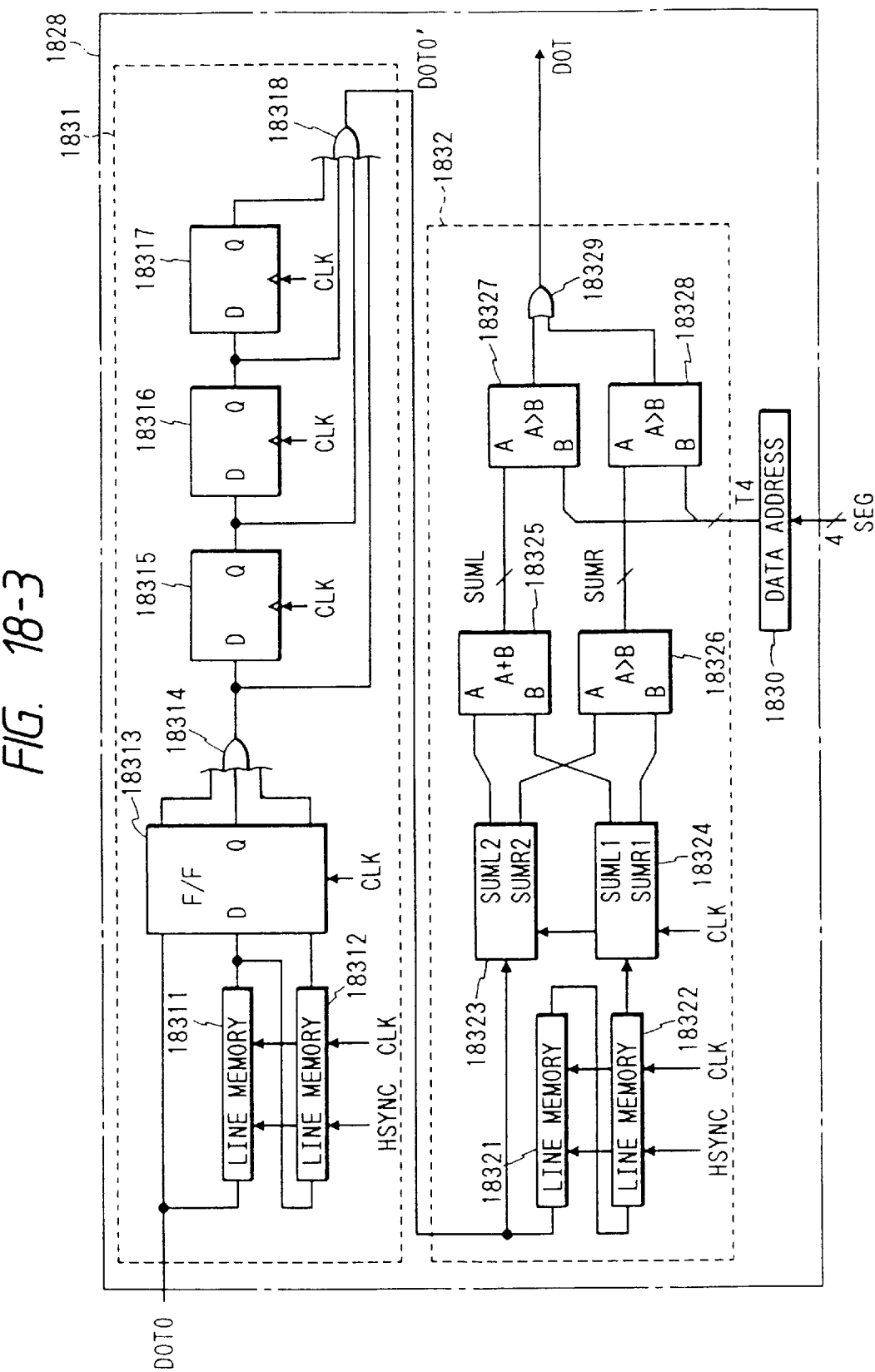
Figures 5, 18:
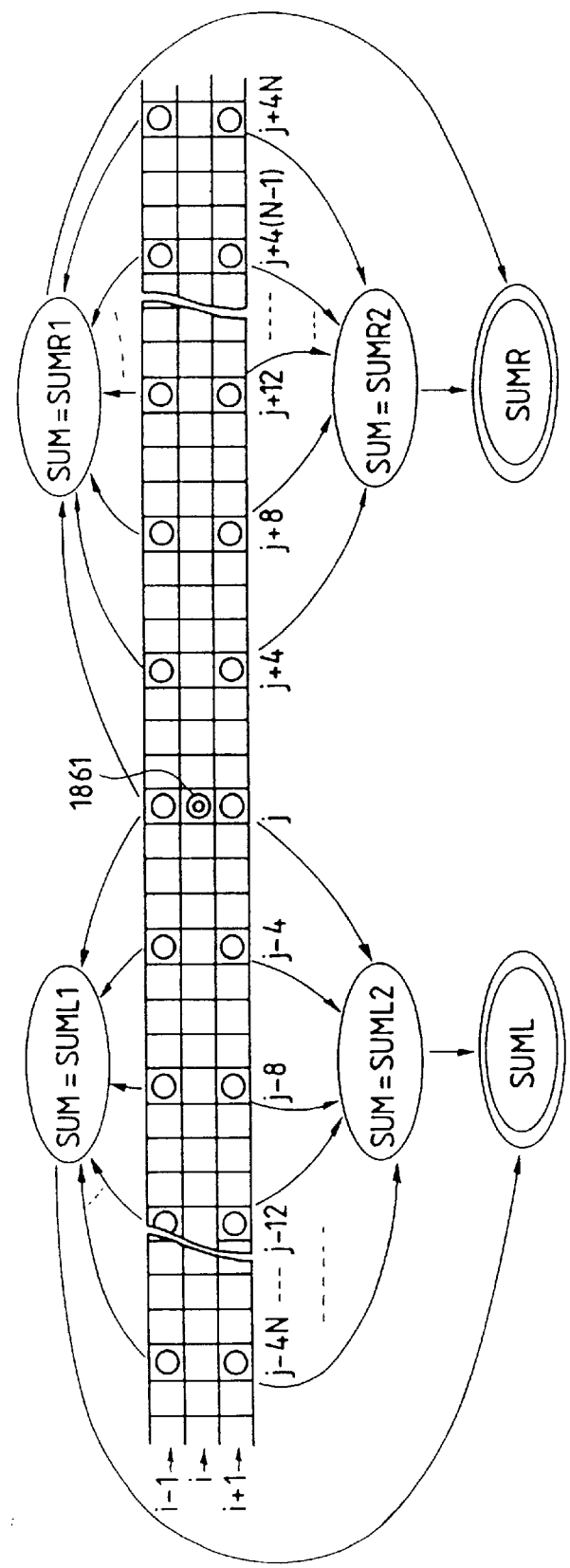
Figures 7, 18:
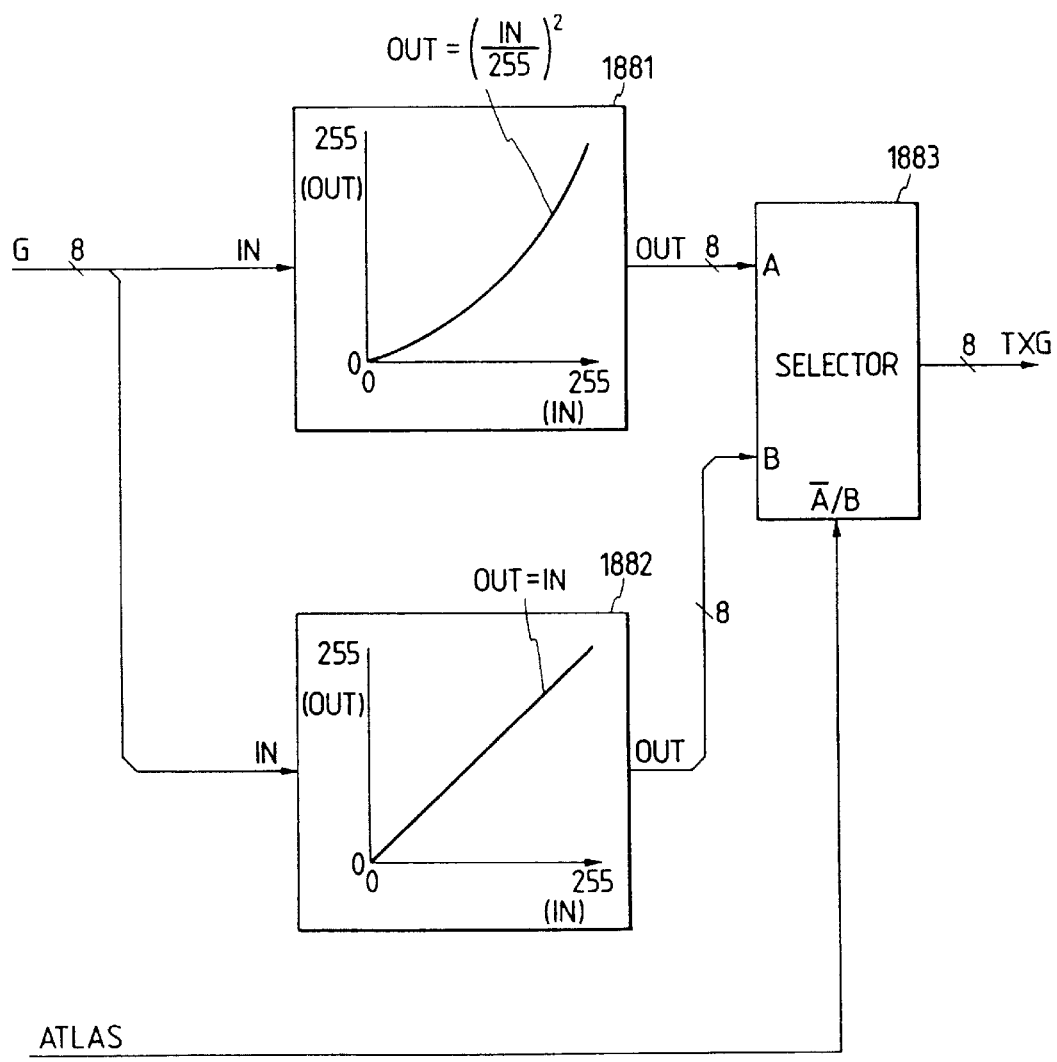

FIG. 3 is a block diagram showing the internal construction of the image scanner. Referring to the Figure, address counter 101 provides main scanning address data 102 designating main scanning position in CCD 210. More specifically, when horizontal sync signal HSYNC is "1", a CPU (not shown) sets a predetermined value as address, which is then incremented according to pixel clock signal CLK.

An image focused on CCD 201 is photoelectrically converted by three line sensors 301 to 303 into R, G and B component signals, which are coupled through amplifiers 304 to 306, sampling-and-holding (SH) circuits 307 to 309 and A/D converters 310 to 312 to provide respective 8-bit digital image signals 313 (R), 314 (G) and 315 (B).

Flow of Signals

Figure 4:
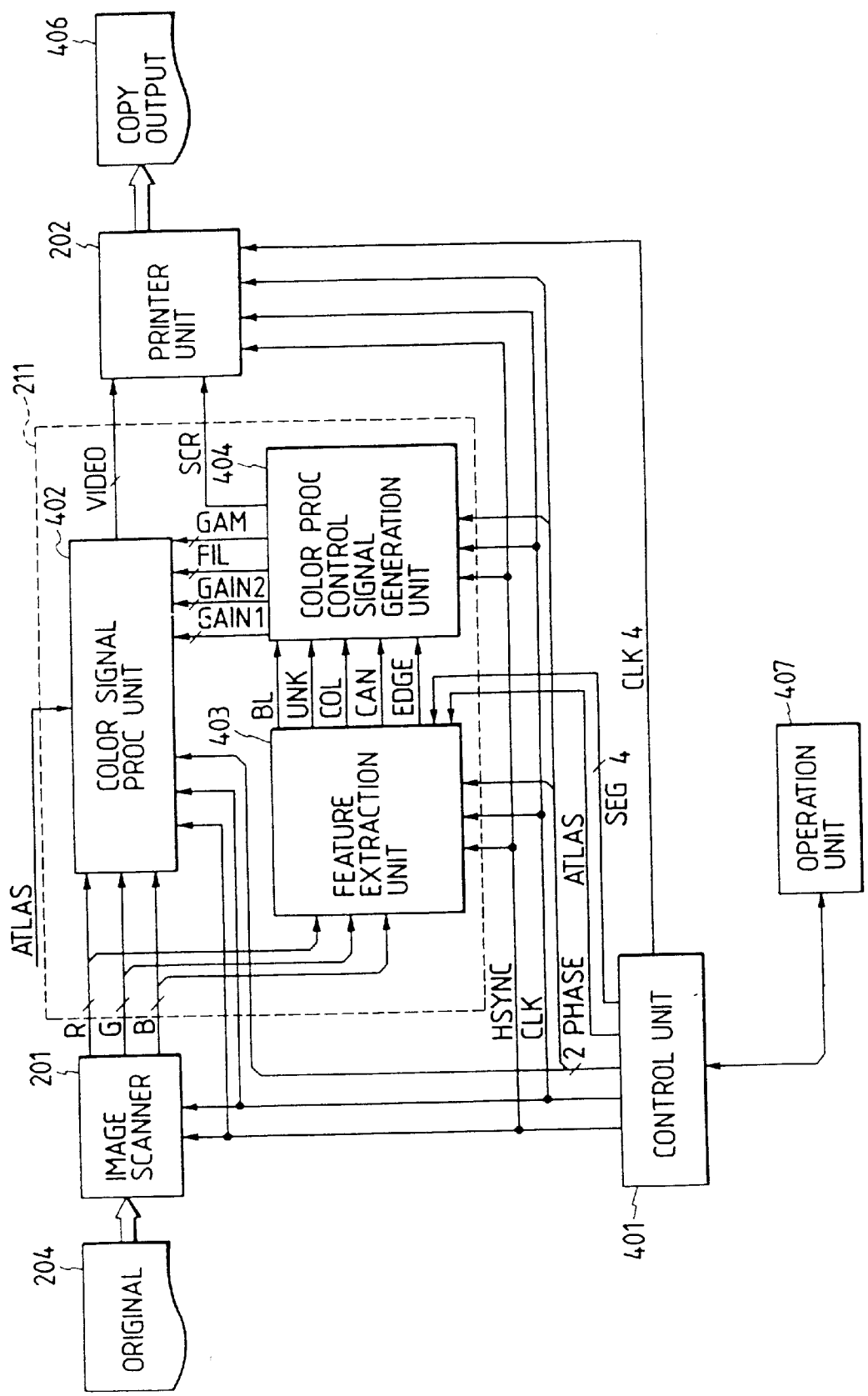
FIG. 4 is a circuit block diagram showing the embodiment shown in FIG. 2.
Figure 5:
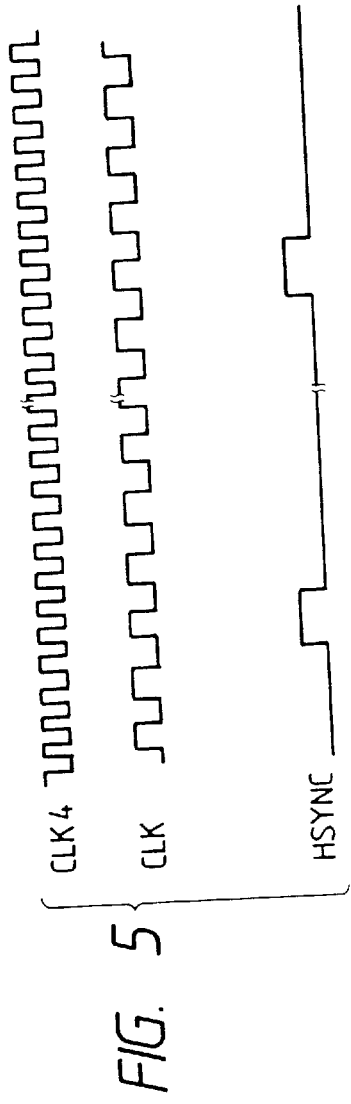
FIG. 5 is a view showing waveforms of clocks CLK and CLK4 shown in FIG. 4.

FIG. 4 shows overall flow of signals. In FIG. 2, the same parts as those in FIG. 2 are designated by the same reference numerals. Designated as CLK is a pixel transfer clock signal, HSYNC is a horizontal sync signal and also a main scanning start sync signal, and CLK4 is a clock signal for generating a 400-line screen as will be described later. These signals are as shown in FIG. 5, and are supplied from control unit 401 to image scanner 201, color signal processing unit 211 and printer unit 202.

Image scanner 201 reads out original 204 and supplies R, G and B signals as electrical signals to color signal processing unit 402 and feature extraction unit 403. Feature extraction unit 403 supplies to color processing control signal generation unit 404 a BL signal representing black image represented by pixel under processing, a COL signal indicating image with a color shade, an UNK signal indicating the possibility of either black image or image with a color shade, a CAN signal cancelling the BL signal and an EDGE signal indicating a character edge.

Control unit 401 further provides an ATLAS signal, which is an image processing operation switching signal when copying a thin character original such as a map and is supplied to feature extraction unit 403 and also to color signal processing unit 402.

Control unit 401 further provides a 4-bit SEG signal, which is a control signal for varying the extent of character extraction and is supplied to feature extraction unit 403.

Control unit 401 further controls operation panel 407 under control of the CPU for key input reception and display operations.

Figure 6:
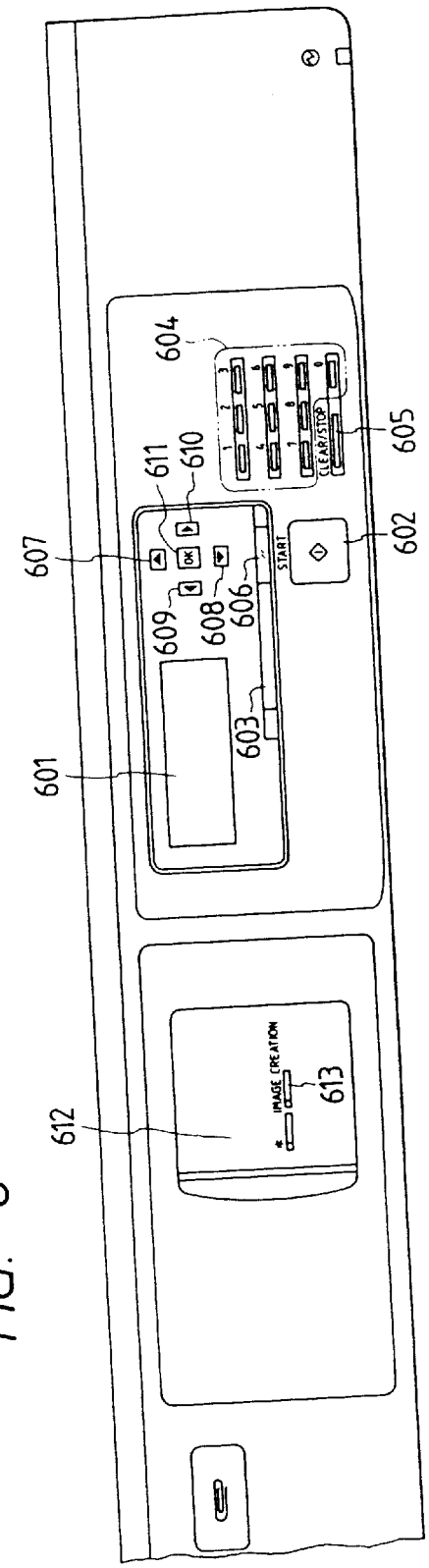
FIG. 6 is a view showing a display unit in the copier shown in FIG. 2.

FIG. 6 shows details of operation panel 407. As is shown, operation panel 407 has dot matrix liquid crystal display section 601 having 64×109 dots, copy start key 602, recording sheet cassette selection key 603, ten key section 604, ten key input clear key and copy stop key 605 display reset key 606, keys 607 to 610 for moving cursor in the liquid crystal display section upwards, downwards, leftwards and rightwards, respectively, key 611 for ending the selection with the liquid crystal display section, asterisk (*) key 612 for setting various copy modes, and image creation key 613 for setting an image editing mode.

Referring back to FIG. 4, color processing control signal generation unit 404 generates color processing control signals supplied to the color signal processing unit according to signals noted above from feature extraction unit 403. These signals are multiplication factor signals GAIN1 and GAIN2 for superimposition calculation of two different image signals, FIL signal for spacial filter switching and GAM signal for switching a plurality of image density conversion characteristics. Control unit 401 provides a 2-bit PHASE signal to the individual processing elements or blocks. This signal corresponds to the developing color in the printer, and when the PHASE singal is "0", "1", "2" and "3", it represents respective developing colors of magenta (M), cyan (C), yellow (Y) and black (Bk).

The color signal processing unit generates a VIDEO signal or recording image signal supplied to printer unit 202 according to the PHASE signal and color processing control signals noted above.

In printer unit 202 the laser beam emission time is pulse width modulated according to the VIDEO signal, thus producing shade-expressing copy signal (output) 406.

To printer unit 202 a SCR signal GA is supplied from color processing control signal generation unit 404. In printer unit 202 a plurality of pulse width modulation basic clocks (screen clocks) are switched according to the SCR signal for optimal image density expression of the original. In this embodiment, one-pixel unit pulse width modulation is performed when the SCR signal is "0", and two-pixel unit pulse width modulation is performed when the SCR signal is "1". More specifically, when the SCR signal is "0", a high resolution mode is set up for image formation, and when the SCR signal is "1", a high graduation mode is set up.

Now, the operation of color signal processing unit 402, feature extraction unit 403 and color processing control signal generation unit 404 will be described in detail with reference to FIG. 1.

Feature Extraction Unit

Feature extraction unit 403 includes color judgement unit 106 and character edge judgement unit 107.

Figure 11:
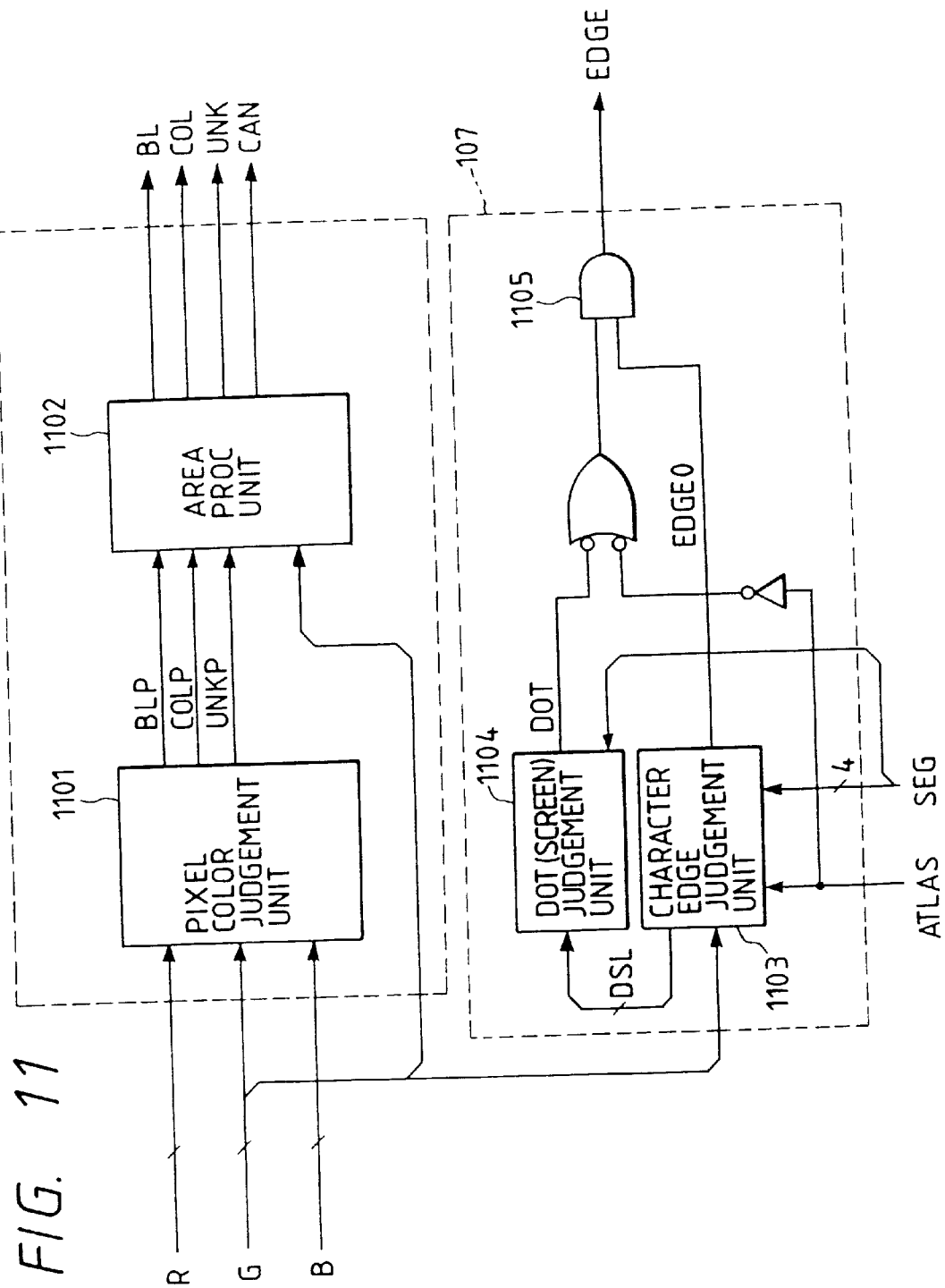
FIG. 11 is a view showing the construction of color judgement unit 106 and character edge judgement unit 107 shown in FIG. 1.

FIG. 11 shows detailed constructions of the individual units of the feature extraction unit.

Pixel color judgement unit 1101 generates a BLP signal indicating black represented by each pixel, a COLP signal indicating a color shade, and a UNKP signal indicating failure of judgement of either black or presence of a color shade, these signals being supplied to area processing unit 1102. Area processing unit 1102 judges BLP, COLP, UNKP and G signals in each 5×5 area and removes errors, thus generating BL, COL and UNK signals and also generating CAN signal.

Figure 12:
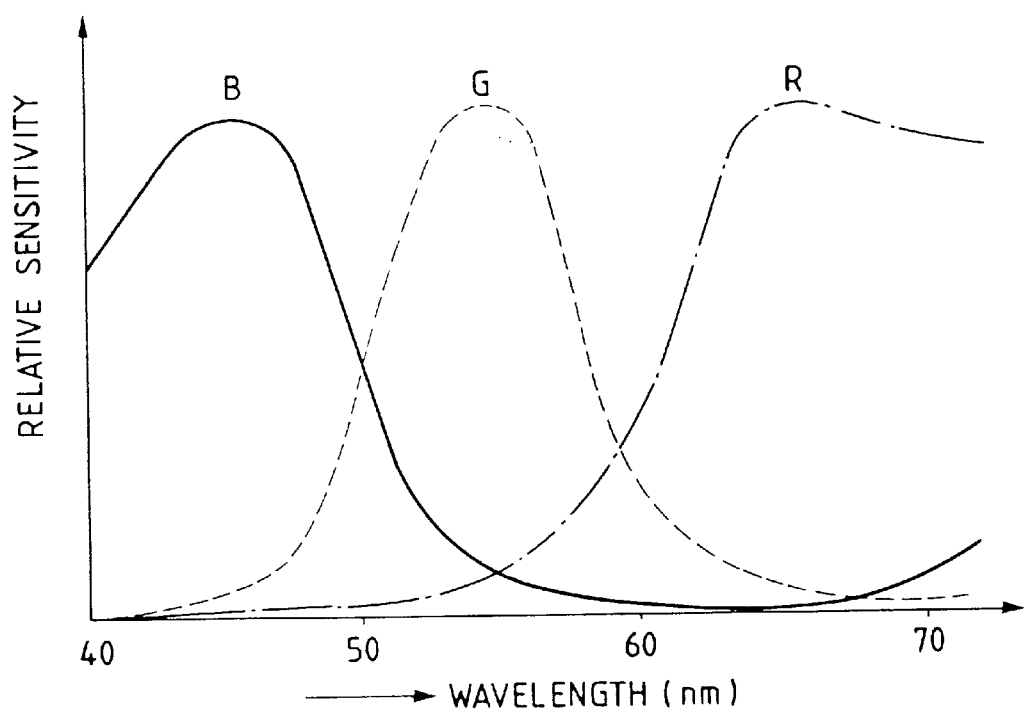
FIG. 12 is a view showing relative sensitivities of sensor 210 to R, G and B.

Character edge judgment unit 1103 executes judgment (judgement) according to G signal as to whether the area under judgment is a character edge area and generates EDGEO signal. The judgment as to whether an area is a character edge area is effected according to sole G signal for the following reason. Among R, G and B signals, B signal is closest in relative sensitivity to the spectral luminous efficiency as shown in FIG. 12 and thus it is possible for G signal to represent a black/white image character edge detection signal.

Dot judgement unit provides according to a DSL signal or density direction signal from character edge judgement unit 1103 a DOT signal indicating a result of judgment for each pixel as to whether a pixel under judgment is contained in a dot area. When the original is a dot print, character edge judgement unit 1103 often judges a dot to be a character. In this embodiment, such processing as providing edge emphasis or increasing the resolution of recording is provided for character edges for improving the sharpness of the recorded image, as will be described later in detail. If such processing is executed for a dot image (or a screen image), moire is generated to extremely deteriorate the quality of the recorded image. Therefore, judgment that the original is a dot area (a screen area) is effected according to the DOT or dot (screen) judgement signal to prevent generation of EDGE or character edge signal from gate 1105.

The ATLAS and SEG singals are provided from control unit 407. As will be described later in detail, the ATLAS signal is a control signal for clearly recording thin characters, and the SEG signal is for varying the character edge detection slice level.

Figure 13:
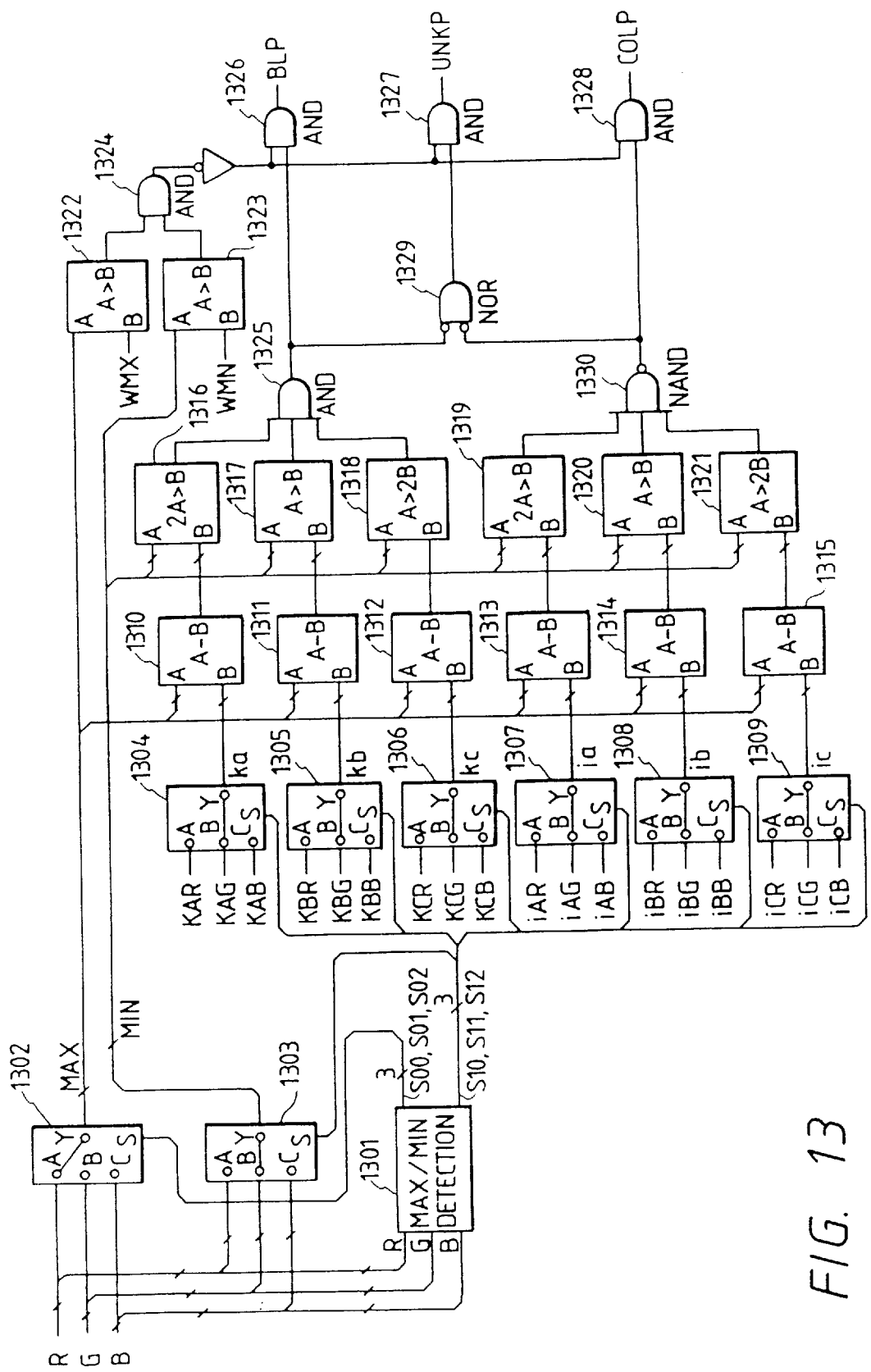
FIG. 13 is a block diagram showing the construction of pixel color judgement unit 1101 in color judgement unit 106 shown in FIG. 11.

FIG. 13 is a block diagram illustrating color degree (saturation) judgement in color pixel judgement unit 1101.

Referring to FIG. 13, reference numeral 1301 designates a MAX/MIN detector, 1302 to 1309 selectors, and 1310 to 1315 subtractors for providng output (A–B) according to inputs A and B. Reference numerals 1316 to 1323 designate comparators for comparing inputs A and B. Comparators 1316 and 1319 provide output "1" if 2A>B, comparators 1317, 1320, 1322 and 1323 provide output "1" if A>B, and comparators 1318 and 1321 provide output "1" if A>2B. Otherwise, these comparators provide output "0". Reference numerals 1324 to 1328 designate AND gates, 1329 a NOR gate, and 1330 a NAND gate.

Figure 1:
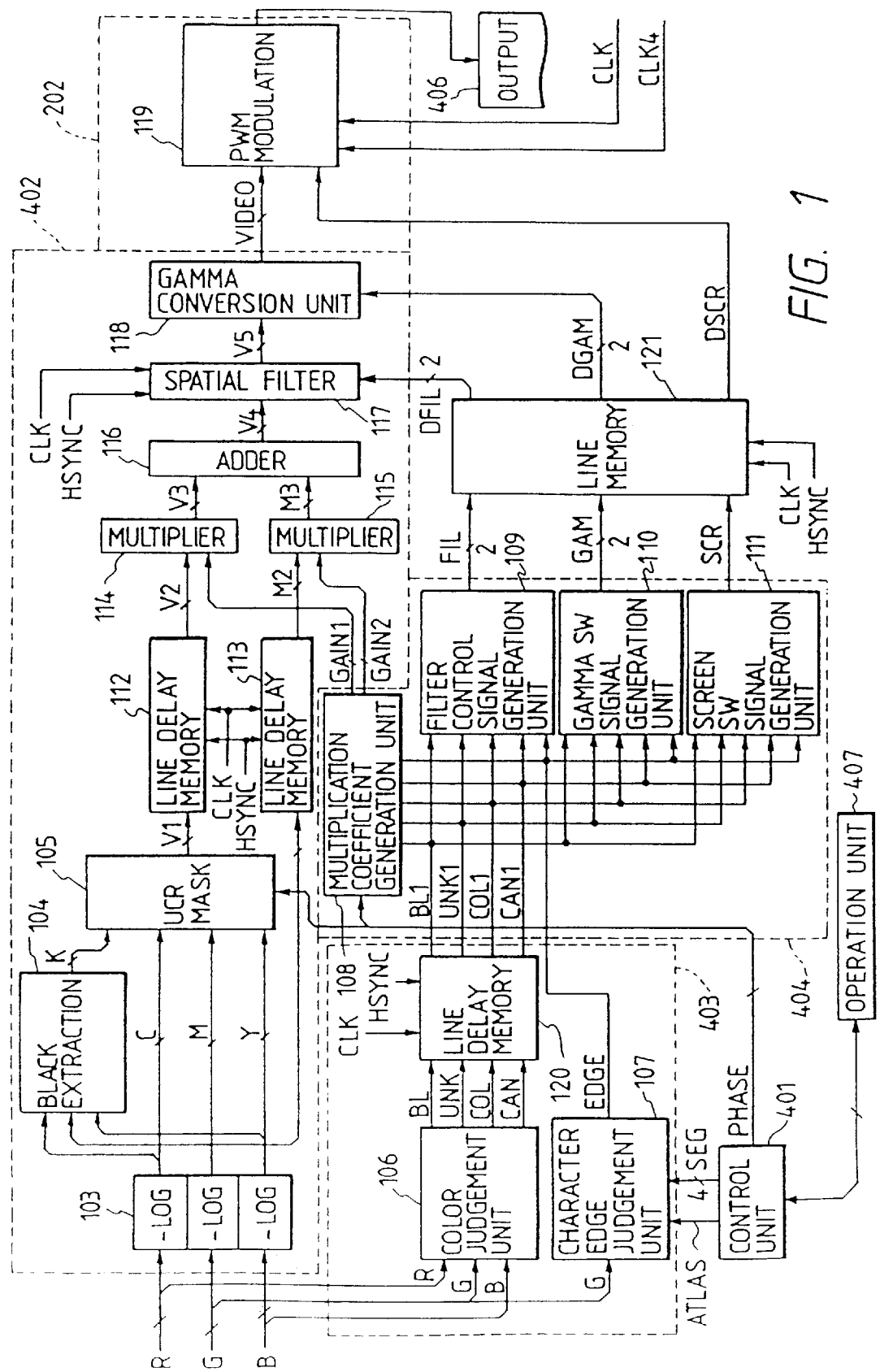
FIG. 1 is a circuit block diagram showing one embodiment of the invention.
Figures 1, 2, 14:
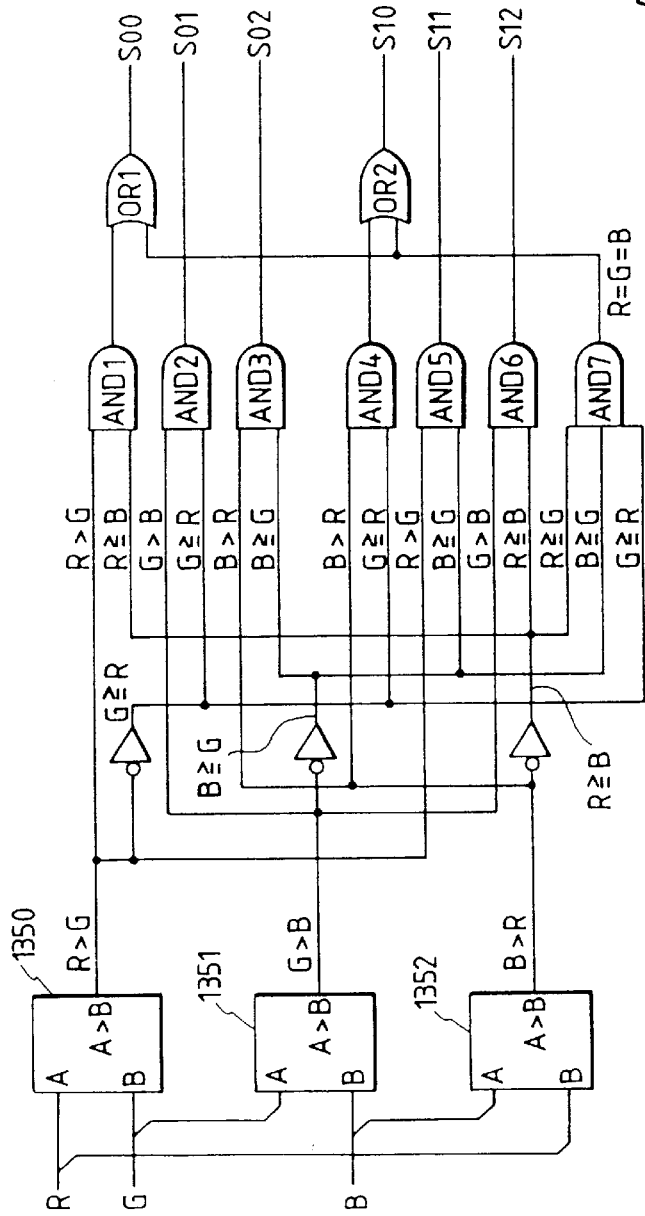

MAX/MIN detector 1301 has a circuit construction as shown in FIG. 14-1. Referring to FIG. 14-1, comparators 1350 to 1352 provide output "1" in respective cases of R>G, G>B and B>R. The circuit shown in FIG. 14-1 generates judgement signals S00, S01, S02, S10, S11 and S12 as shown in FIG. 14-2. More specifically, if MAX is R, or if R, G and B are all equal, S00=1 and S01=S02=0. If MAX is G, S01=1 and S00=S02=0. If MAX is B, S02=1 and S00=S01=0. If MIN is R or if R, G and B are all equal, S10=1 and S11=S12=0. If MIN is G, S11=1 and S10=S12=0. If MIN is B, S12=1 and S10=S11=0.

For example, if MAX is R, R>G and R≧B. Thus, comparators 1350 and 1352 provide respective outputs "1" and "0", AND gate AND1 provides output "1", OR gate OR1 provides output "1", and AND gates AND2 and AND3 each provide output "0". That is, S00=1 and S01=S02=0. Tables in FIG. 14-2 show such results of judgement.

Outputs S00, S01 and S02 of the MAX/MIN detector are supplied to selector 1302, while outputs S10, S11 and S12 are supplied to selectors 1303 to 1309.

Figures 1, 2, 15:
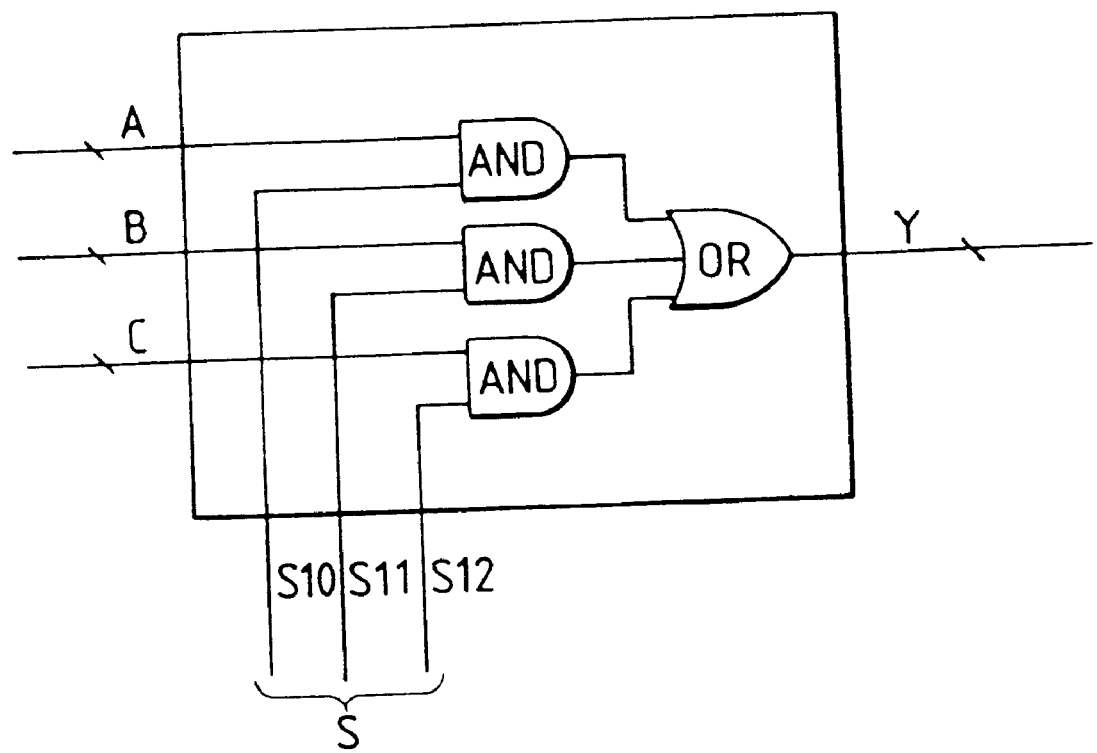

Selectors 1302 to 1309 have a construction as shown in FIG. 15-1, consisting of AND and OR gates. These selectors receive inputs A, B and C and provide A if S0=1 and S1=S2=0, provide B if S1=1 and S0=S2=0, and provide C if S2=1 and S0=S1=0. In this embodiment, R, G and B signals correspond to respective inputs A, B and C.

Figures 1, 2, 16:
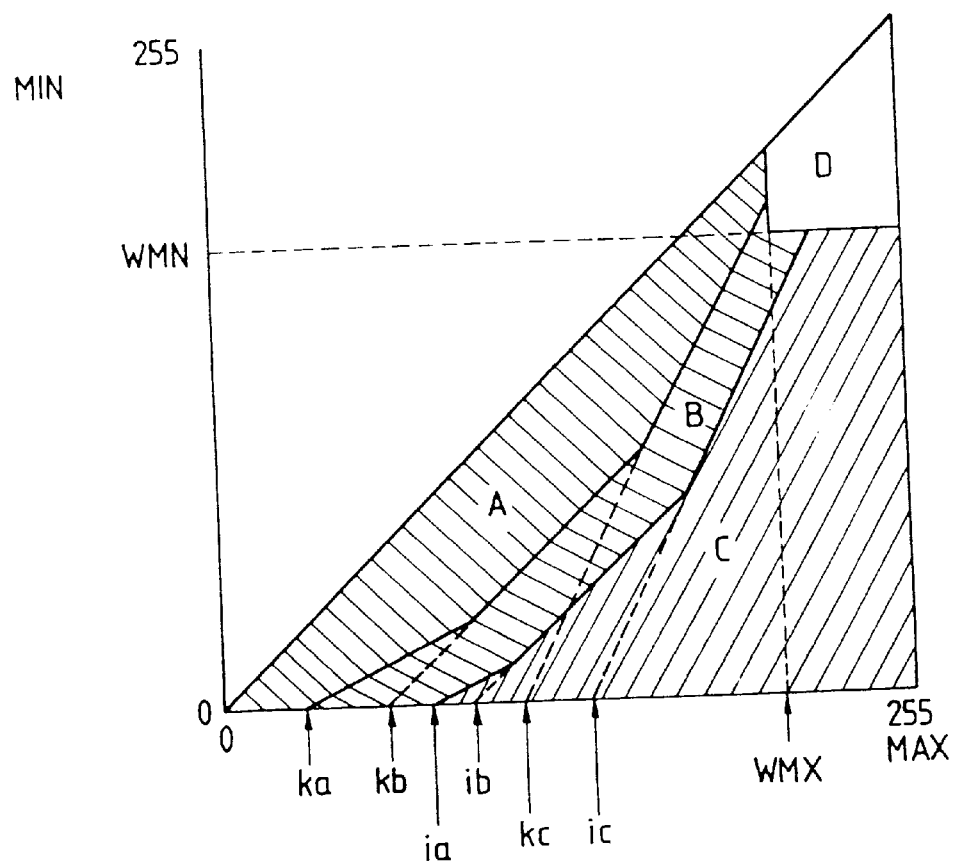

In this embodiment, the pixel color judgement is performed by providing four area divisions A to D with the maximum and minimum values in R, G and B signals as MAX and MIN, respectively, as shown in FIG. 16-1.

More specifically, it is utilized that the difference between MAX and MIN is small in a color-free area and is increased as one approaches a color, and a MAX-MIN plane is divided using linear simultaneous inequalities with MAX and MIN as parameters.

Specifically, the plane is divided into the four divisions A to D as shown in FIG. 16-1 with ka, kb, kc, ia, ib, ic, WMX and WMN as predetermined constants.

Division A is a dark color-free (i.e., black) area. point (MAX, MIN) is contained in this area if MIN ≦ WMN or MAX ≦ WMX and $$\begin{cases} MAX - ka < 2MIN \\ MAX - kb < MIN \\ MAX - kc < 1/2MIN \end{cases}$$

Division B is an area intermediate between dark color-free and colored areas. Point (MAX, MIN) is contained in this area if MIN ≦ WMN or MAX ≦ WMX and
either one of conditions $$\begin{cases} MAX - ka \geq 2MIN \\ MAX - kb \geq MIN \\ MAX - kc \geq 1/2MIN \end{cases}$$

is met and all conditions $$\begin{cases} MAX - ia < 2MIN \\ MAX - ib < MIN \\ MAX - ic < 1/2MIN \end{cases}$$

are met.

Division C is a colored area. Point (MAX, MIN) is contained in this area if

MIN≦WMN or MAX≦WMX and either one of conditions $$\begin{cases} MAX - ia \geq 2MIN \\ MAX - ib \geq MIN \\ MAX - ic \geq 1/2MIN \end{cases}$$

is met.

Division D is a bright color-free (i.e., white) area. Point (MAX, MIN) is contained in this are if all conditions $$\begin{cases} MIN > WMN \\ MAX > WMX \end{cases}$$

are met.

FIG. 16-2 shows output signals corresponding to the respective states of division areas A to D.

Area A is in case if BLP=1 and UNKP=COLP=0.
Area B is in case if UNKP=1 and BLP=COLP=0.
Area C is in case if COLP=1 and BLP=UNKP=0.
Area D is in case if BLP=1 and UNKP=COLP=0.

These area judgements are effected by circuits 1304 to 1330 shown in FIG. 13. Selectors 1302 and 1303 select MAX and MIN signals from among R, G and B according to the output of MAX/MIN detector 1301, and selectors 1304 to 1309 select values of constants ka, kb, kc, ia, ib and ic in an interlocked relation to the operation of selector 1303. For example, if MAX and MIN are respectively R and G signals, selectors 1304 to 1309 respectively select KAG, KBG, KCG, iAG, iBG and iCG as constants ka, kb, kc, ia, ib and ic. The values of constants ka, kb, kc, ia, ib and ic are varied depending on whether the minimum value is R, G or B for the following reason.

The division of the color space area shown in FIG. 16-1 is done using R, G and B color disassembling signals from CCD sensors. The MAX/MIN plane of the R. G and B signals has a deviation from the human's sight characteristic. This means that the drawing of color-free and colored areas has to be switched according to the color of the original.

Accordingly, in this embodiment the MAX axis intercept values of ka, kb, kc, ia, ib and ic are made variable according to the color of the original. In this embodiment, the original color is specified according to the result of judgement of the MIN signals in R, G and B light amount signals for the following reason. The color hue of original as judged by the man greatly depends on the reflected densities of C, M and Y contained in the original, and the maximum reflected density color corresponds to the minimum light amount signal color. Further, the R, G and B light amount signals are converted to C, M and Y density signals using -log functions, and therefore the range is compressed on the maximum value side of light amount signal and expanded on the minimum value side thereof. It will be seen that it is advantageous in the aspect of judgement accuracy to use the MIN color signal of light amount signal for the separation of color signal determining the color hue of density signal.

Thus, selectors 1304 to 1309, each of which has a construction as shown in detail in FIG. 15-1, generate MAX intercept values ka, kb, kc, ia, ib and ic using decoding signals S10, S11 and S12 indicating MIN color.

In this embodiment, ka, kb, kc, ia, ib and ic are made to be as follows according to values determined experimentally by taking CCD sensor color disassembling (color separation) filters into considerations, the ranges of R, G and B being from "0" to "255".

$$KAR = KAG = KAB = 0$$
$$KBR = 24, KBG = 36, KBB = 36$$
$$KCR = 96, KCG = 96, KCB = 112$$
$$iAR = iAG = iAB = 4$$
$$iBR = 64, iBG = 64, iBB = 80$$
$$iCR = 128, iCG = 128, iCB = 144$$

(equations 5)

In the above way, subtractors 1316 to 1315 use different MAX axis intercept values for subtraction from the MAX value for respective MIN colors. Comparator 1316 detects that the combination of MAX and MIN values is found above line 5 in FIG. 16-1 when it determines that 2×MIN> (MAX−ka). Likewise, comparators 1317 to 1321 detect that respective combinations of MAX and MIN values are above lines t, u, v, w and x.

Comparators 1322 and 1323 detect that the MAX and MIN values are both greater than respective predetermined values WMX and WMN, and AND gate 1324 executes AND process of the comparator outputs to obtain a WB signal indicating white background represented by a read-out pixel.

BL1, UNK1 and COL1 signals are generated through the following encoding of the above signals. The BL1 signal corresponds to area A in FIG. 16-1. Hence, AND gate 1325 detects that the point under judgement is above lines s, t and u, and AND gate 1326 adds a condition that the point is not in area D. The COL1 signal is generated as NAND gate 1330 detects that the point under judgement is below lines v, w and x and AND gate 1328 adds a condition that the point is not in area D.

The UNK1 singal is generated as NOR gate 1329 detects that the point under judgement is below lines s, t and u and above lines v, w and x and AND gate 1327 adds a condition that the point is not in area D.

Area Processing Unit

Figure 7:
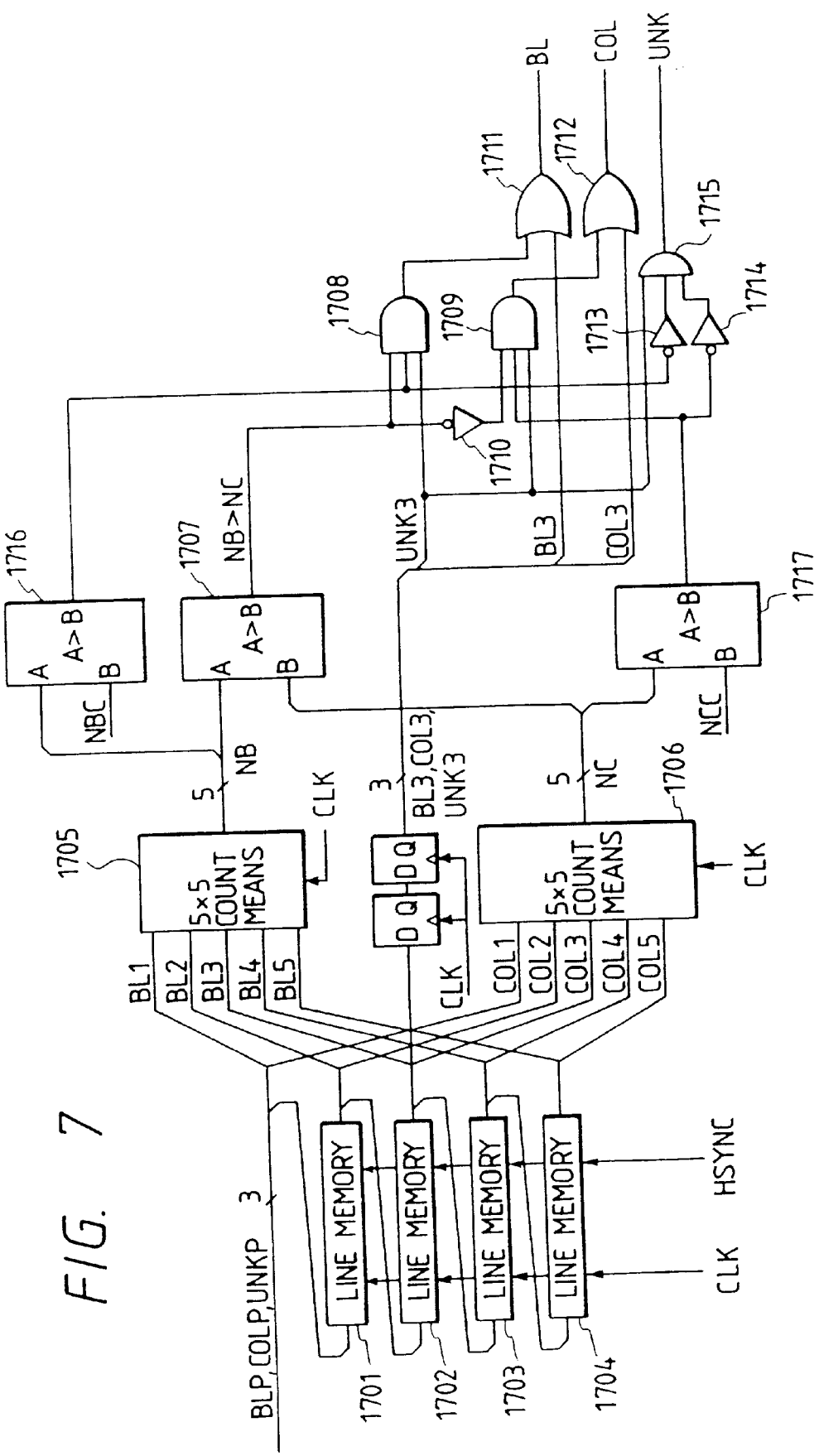
FIG. 7 is a block diagram showing the construction of an area processing unit shown in FIG. 11.

FIG. 7 is a block diagram showing aree processing unit 1102 shown in FIG. 11.

Figure 8:
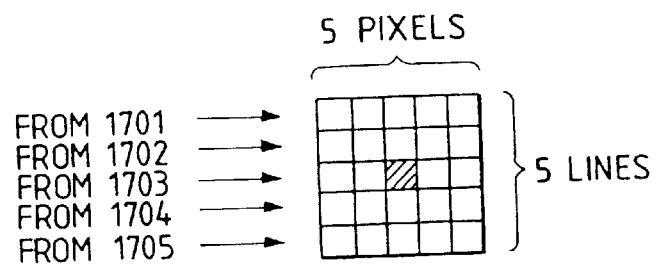
FIG. 8 is a view for explaining the operation of the block shown in FIG. 7.

The BLP, COLP and UNKP signals judged by pixel color judgement unit 1101 are line delayed by line memories 1701 to 1704, and five line outputs are provided simultaneously under synchronization control of HSYNC and CLK signals shown in FIG. 3. Here, signals obtained by delaying the BKP, COLP and UNKP signals by one line are denoted by BL2, COL2 and UNK2, signals obtained by delaying the signals noted above by two lines are denoted by BL3, COL3 and UNK3, signals obtained by delaying the above signals by three lines are denoted by BL4, COL4 and UNK4, and signals obtained by delaying the above signals are denoted by BL5, COL5 and UNK5. 5×5 count means 1705 provides count output NB representing the number of black pixels BL in a 5×5 area as shown in FIG. 8 resulting from 5-pixel delay of individual signals. Comparator 1707 compares number NB of black pixels in 5×5 area and number NC of colored pixels therein.

Further, gate circuits 1708 to 1715 calculate the outputs of the circuits 1706 and 1707 along with results of outputs BK3, COL3 and UNK3 of pixel color judgement unit 1101 with respect to the center pixel in the 5×5 area, thus providing BL signal indicating that the center pixel is black, COL signal indicating that the center pixel is colored and UNK signal indicating that the center pixel is intermediate between color-free and colored. As for the reference of judgement at this time, the judgement result is not upset if the judgement result of a first judgement reference corresponds to a black pixel and a colored pixel. That is, if BL3=1 or COL3=1, BL=1 or COL=1. If the judgement result of the first judgement reference corresponds to an intermediate pixel between colored and color-free pixels, comparator 1716 judges whether the number of black pixels is above predetermined number (NBC), and comparator 1717 judges whether the number of colored pixels is above a predetermined number. Further, comparator 1707 judges which of the black and colored pixel numbers is greater. In case if the black pixel number is above a predetermined value and NB>NC, i.e., if there many black pixels in a 5×5 area containing a given pixel even through the given pixel is UNK, UNK3 is made BL by gate 1708.

On the other hand, if the colored pixel number is above a predetermined value and NB≦NC, i.e., if there are many colored pixels in a 5×5 matrix containing a given pixel even through the given pixel is UNK, UNK3 is made COL by gate 1709.

In this embodiment, the judgement as to whether a given pixel is colored or color-free is carried out in the above algorithm in order to remove color bleeding at color change points in original due to scanning irregularities in optical scanning systems 206 to 208 and magnification error in optical image-focusing system 209. If neither black pixels nor colored pixels are present in excess of a predetermined number around UNK3 signal, gates 1713 to 1715 detect it and provide UNK signal, representing intermediate status between colored and color-free.

Figures 1, 17:
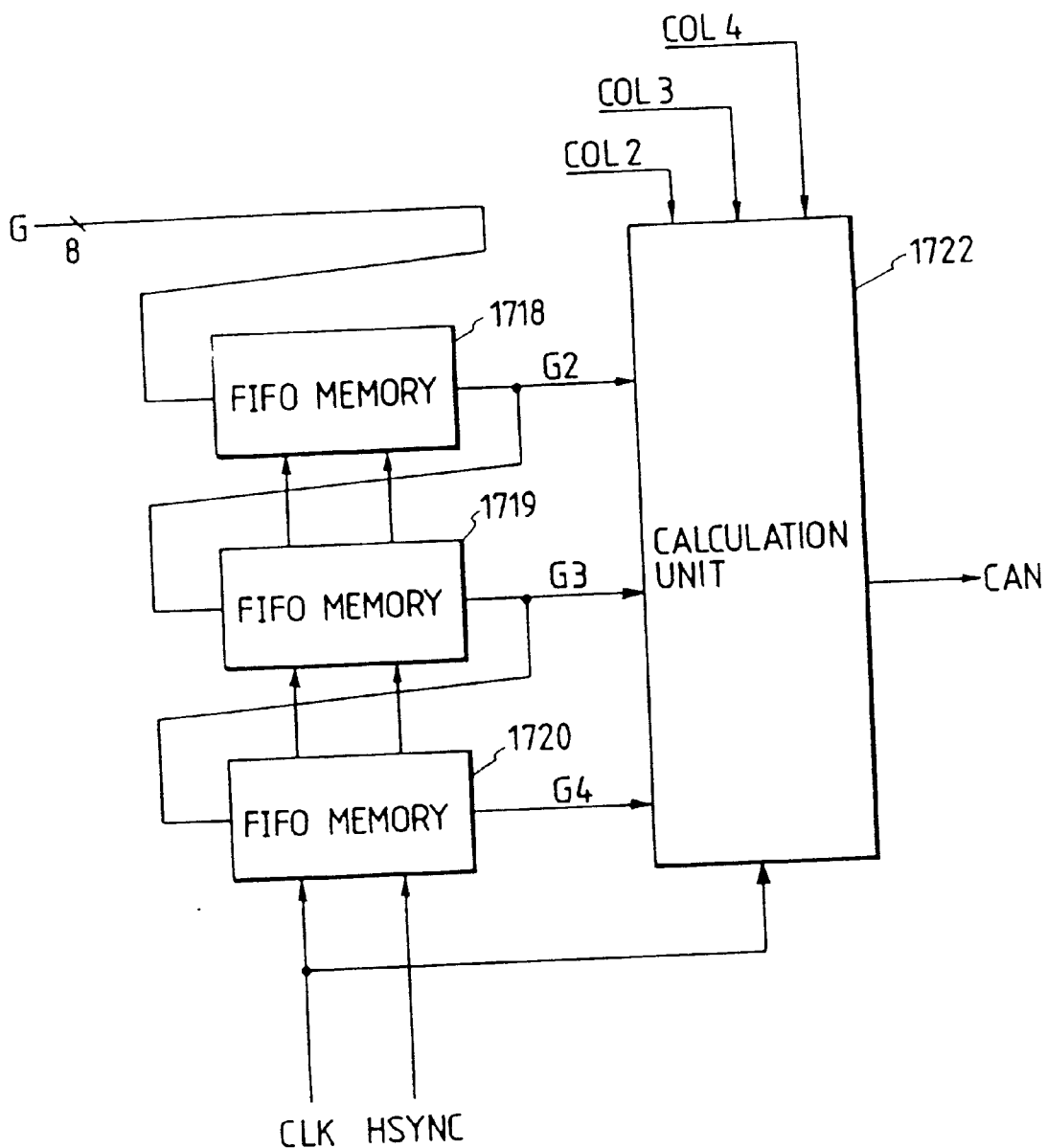
Figures 2, 17:
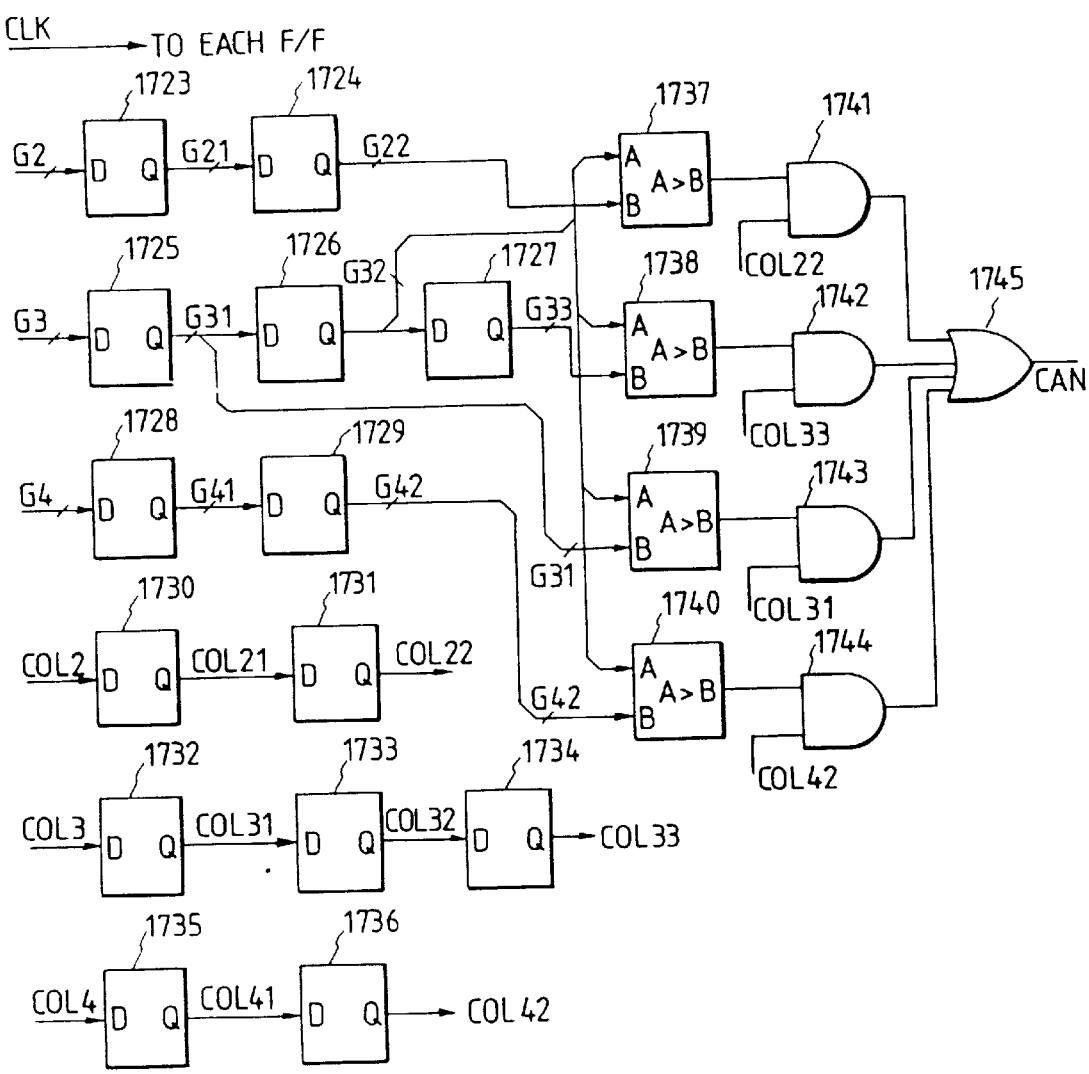

FIG. 17-1 shows the construction of a CAN signal generator in the area processing unit shown in FIG. 11.

Figure 9:
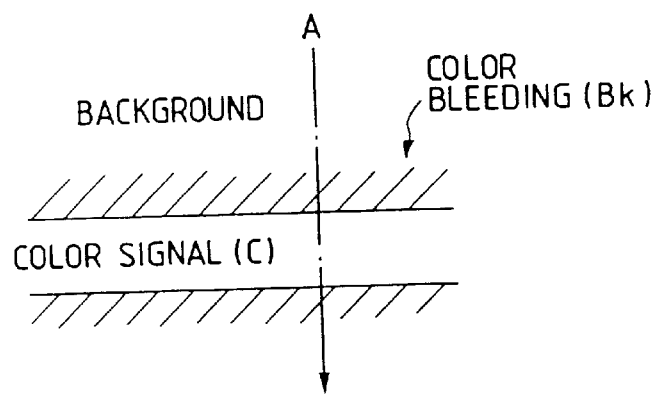
FIGS. 9 and 10 are views showing a state of color bleeding.
Figure 10:
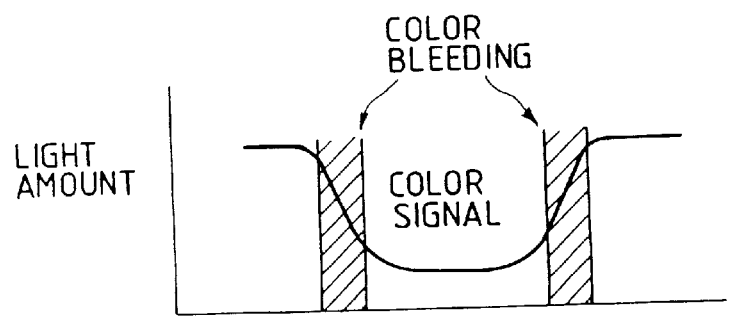

In the logic circuit for BL signal generation shown in FIG. 7, if a given pixel is a black pixel, BL signal is provided irrespective of the surrounding status. However, if there is scanning speed irregularity or focusing magnification error as noted above, a black signal (Bk) is liable to be generated due to color bleeding around color signal (C) as shown in FIG. 9. The black signal (Bk) due to this color bleeding (C) is generated around the color signal as shown in FIG. 10, thus increasing the light amount compared to the color signal. Accordingly, the CAN signal generator shown in FIG. 17-1 generates a CAN signal by checking whether a color signal (COL) of a lower light amount than a given pixel is present around the given pixel.

In this embodiment, G signal which is closest in characteristic to the spectral luminous efficiency is used as light amount signal. This G signal is delayed by one-line FIFO memories 1718 to 1720, and G3 signal of a given (objective) line and G2 and G4 signals spaced part from G3 signal by one line are supplied to calculation unit 1722. At the same time, color judgement signals COL2, COL3 and COL4 for three lines produced in FIG. 7 are supplied to unit 1722.

FIG. 17-2 shows calculation unit 1722 in detail.

The G2, G3, G4, COL2, COL3 and COL4 signals are delayed by two or three pixels by flip-flops (F/F) 1723 to 1735. Comparators 1737 to 1740 compare signal G32 to neighboring pixels G22, G31, G33 and G42, and they provide output H if the light amount of the compared neighboring pixel is lower than that of the given pixel. AND gates 1741 to 1744 obtain AND for color judgement signals of neighboring pixels, and OR gate 1745 provides CAN signal.

More specifically, if pixels neighboring a given pixel are lower than the level of the given pixel and have color component, it is decided that there is color bleeding as shown in FIGS. 9 and 10, and the CAN signal is generated.

This is convenient for preventing the generation of "black bleeding" around a "reddish-brown" character generated when processing an electric signal obtained by reading out the color character.

Character Edge Judgement Unit

The operation of the character edge judgement unit will be described with reference to FIGS. 19A and 19B.

Figure 19A:
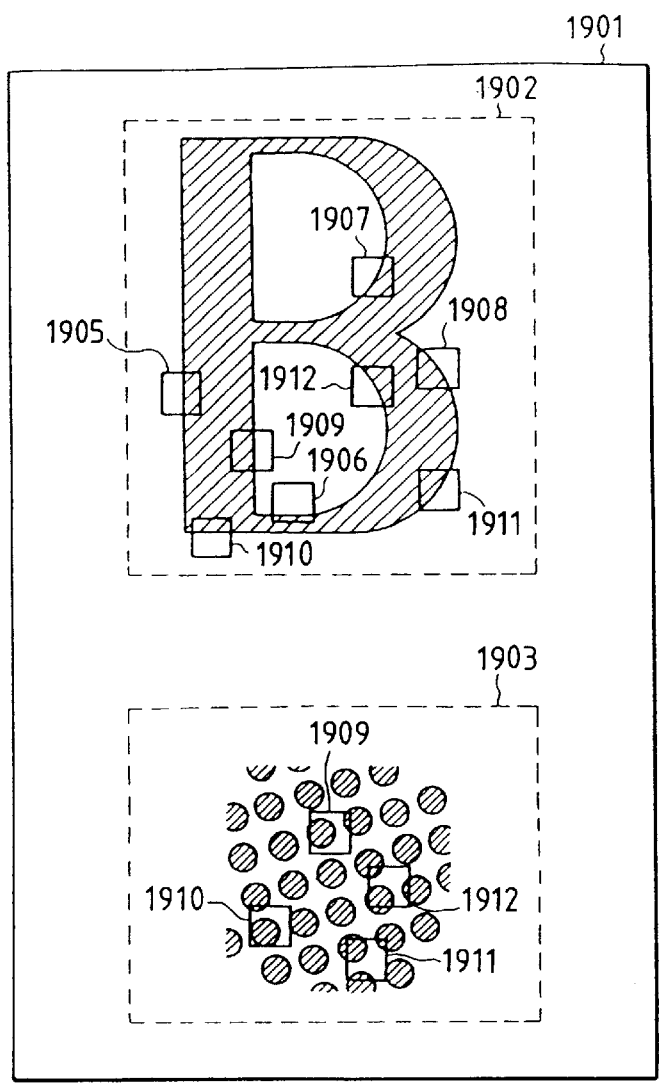
FIGS. 19A and 19B are views for explaining the operation of character edge judgement unit.

Original 190 as schematically shown in FIG. 19A is an example of an image having shades, and it includes character edge area 1902 and intermedaite tone (gradation) area 1903 represented by dots (a screen). In this embodiment, edge data in the image is extracted by a method, in which a check is done as to whether there is a sharp density change in a unit pixel block consisting of nine pixels with given pixel $x_{i,j}$ at the center, as shown at 1904, and which utilizes a fact that sharp (abrupt) density change points occur continuously in a particular direction.

Specifically, for given pixel $x_{i,j}$ difference values of the neighboring pixels are taken, and a check as to whether there is a sharp density change is done by judging magnitudes of parameters given as $$\left.\begin{aligned} J_1 &= |x_{i,j+1} - x_{i,j-1}| \\ J_2 &= |x_{i+1,j} - x_{i-1,j}| \\ J_3 &= |x_{i+1,j+1} - x_{i-1,j-1}| \\ J_4 &= |x_{i+1,j-1} - x_{i-1,j+1}| \\ J_5 &= x_{i,j-1} - x_{i,j+1} \\ J_6 &= x_{i-1,j} - x_{i+1,j} \\ J_7 &= x_{i-1,j-1} - x_{i+1,j+1} \\ J_8 &= x_{i-1,j+1} - x_{i+1,j-1} \end{aligned}\right\} \quad \text{equation 6}$$

Further, a check is done as to whether sharp density change points are continuous in a particular direction. Represented by $x_{i,j}$ and the like are given pixel and neighboring pixels as shown in FIG. 19B.

Figure 21:
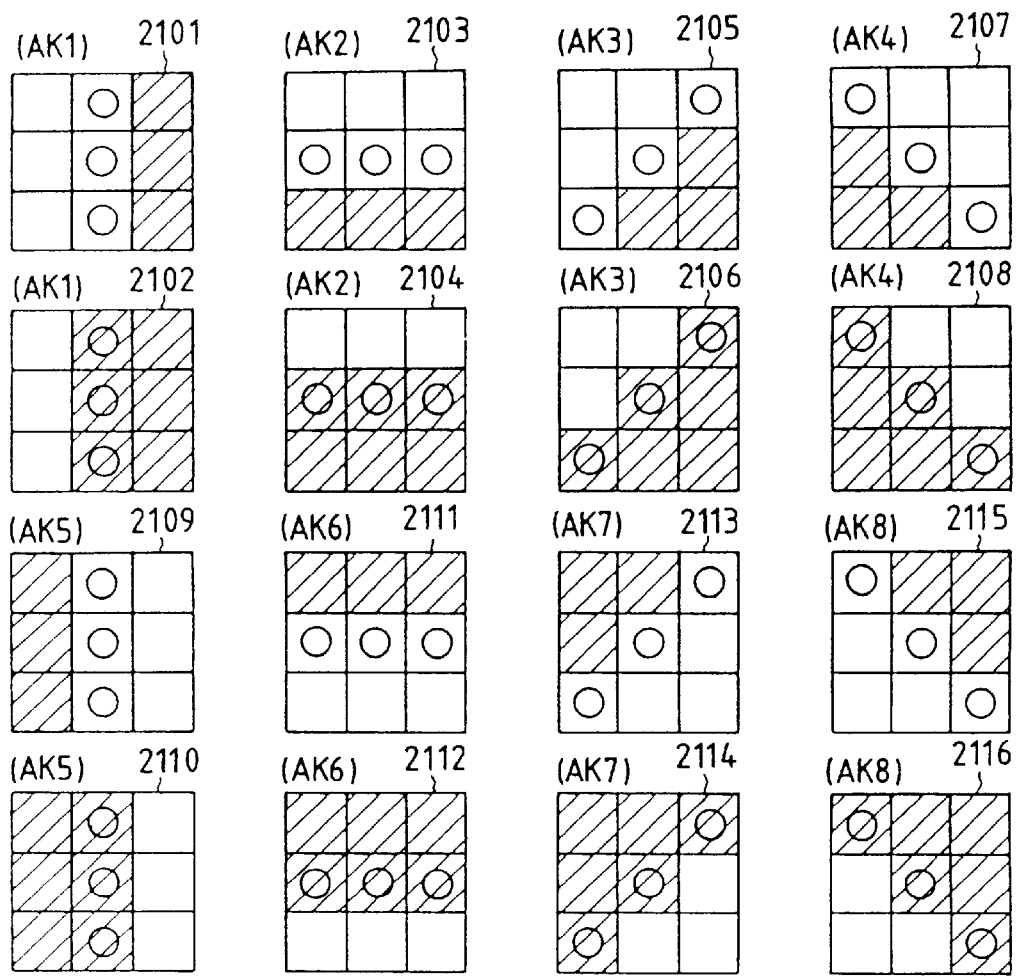
FIG. 21 is a view showing a typical dot arrangement of patterns 1905 to 1912 shown in FIG. 19.

Specifically, an edge extending in a vertical direction with high density on the right side as indicated at 1905 in FIG. 19A has a character that pionts with large value as $J_1$ in equations 6 are continuous in the vertical direction (as shown at 2101 and 2102 in FIG. 21). An edge extending in a horizontal direction with high density on the lower side as indicated at 1906 has a character that points with large values as $J_2$ in equations 6 are continuous in the horizontal direction (as shown at 2103 and 2104 in FIG. 21). An edge extending in a rightwardly oblique direction with high density on right lower side as indicated at 1907 has a character that points with large values as $J_3$ in equations 6 are continuous in a rightwardly oblique direction (as shown at 2105 and 2106 in FIG. 21). An edge extending in a left-wardly oblique direction with high density on a left lower side at indicated at 1908 has a character that points with large values as $J_4$ in equations 6 are continuous in a leftwardly oblique direction (as shown at 2107 and 2108 in FIG. 21). An edge extending in a vertical direction and with high density on the left side as indicated at 1909 has a character that points with large values as $J_5$ in equations 6 are continuous in the vertical direction (as shown at 2109 and 2110 in FIG. 21). An edge extending in a horizontal direction and with high density on the upper side as indicated at 1910 has a character that points with large values as $J_6$ in equations 6 are continuous in the horizontal direction (as shown at 2111 and 2112 in FIG. 21). An edge extending in a rightwardly oblique direction and with high density on a left upper side as indicated at 1911 has a character that points with large values as $J_7$ in equations 6 are continuous in a righrwardly oblique direction (as shown at 2113 and 2114 in FIG. 21). An edge extending in a leftwardly oblique direction and with high density on right upper side as indicated at 1912 has a character that points with large values as $J_8$ in equations 6 are continuous in a leftwardly oblique direction (as shown at 2115 and 2116 in FIG. 21).

Meanwhile, values of $J_1$ to $J_4$ are increased in dot portions (or screen portions) as shown at 1909 to 1912. Further, when the dot (or screen) is increased in size, a continuity in a particular direction is generated, and therefore, the dot portion is erroneously judged to be a character edge.

Figures 1, 22:
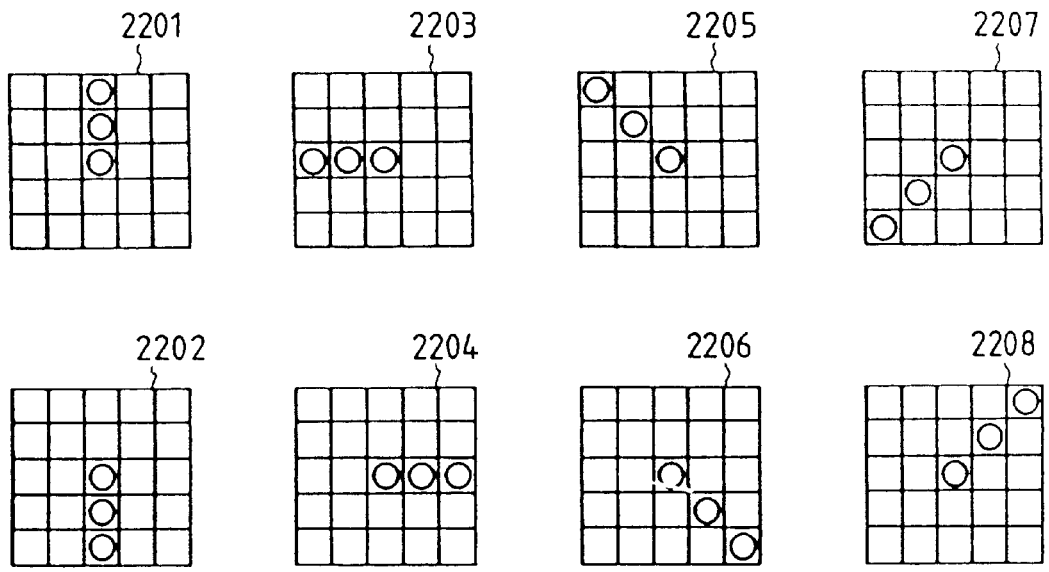
Figures 2, 22:
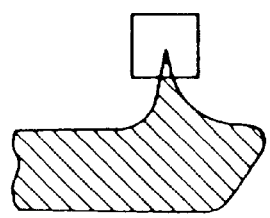

This dot image (or screen image) has a density symmetricity as shown in FIG. 22-2 (as will be described later in detail). In this embodiment, means for extracting features of this dot image is provided, and results of character edge detection are cancelled when an image is determined as a dot (or screen).

FIG. 18-1 is a block diagram showing a character edge judgement unit. Referring to FIG. 18-1, reference numeral 1801 designates a density change detection unit, and 1802 a unit for detecting the continuity of density changes for extracting character edge. Reference numeral 1842 designates a dot (screen) judgement unit for detecting that a given pixel is a dot image. The unit includes dot feature extraction unit 1827 and dot area judgement unit 1828 (detailed internal constructions being described later). When dot detection signal DOT becomes "1", the output of NAND gate 1840 becomes "0" (ATLAS=0), and character edge judgement signal EDGE0 is cancelled by AND gate 1841 (EDGE=0). In other words, even a portion which is judged to have an edge, is excluded from the edge if it is determined to be a dot (or a screen), and in this case character edge judgement signal is "0".

However, in such original as map, minute characters are provided in a dot image. Therefore, if the operator selects a map mode through operation unit 407 so that control unit 401 correspondingly makes ATLAS=1, DOT signal is cancelled by NAND gate 1840, and character edge data in the dot is provided as EDGE=1.

Now, density change point detection unit 1801 shown in FIG. 18-1 will now be described.

Image signal is converted by signal conversion table 1826 into TXG signal. FIG. 18-8 shows the construction of signal conversion table 1826.

Referring to FIG. 18-8, there are two different signal conversion tables 1881 and 1882. The relation between input and output in table 1881 is constructed according to an equation $$\text{OUT} = \left(\frac{\text{in}}{255}\right)^2$$

Both the inputs and outputs of the table are 8-bit signals, and the signal values are in a range of 0 to 255. Table 1881 is used for character edge judgements of ordinary color photographs and various and originals containing dot photographs and various data.

The character edge judgement unit usually functions to separate character data in an original from photograph data. In many usual character data are recorded in white background. On the other hand, photograph data is recorded in the form of continuous changes of density data, and sharp density changes are hardly present in white background.

In table 1881 great data level changes are provided in the neighborhood of white background (i.e., a level of 255) in order to facilitate the understanding of character data in white background. In order to make it more difficult to detect as character edge a density change with respect to a background having a certain density as is often the case with a photograph, level changes of data in the neighborhood of black background (level 0) are compressed. For this reason, table 1881 uses a range of $0 \leq x \leq 1$ with a characteristic of $y=x^2$.

Table 1882, on the other hand, is free form level conversion between the input and output as in an equation out=in.

This signal conversion table 1882 is provided for separating minute character data recorded in a colored background as in a map. Therefore, it is provided that input= output for equally separating character data in colored and white backgrounds. Selector 1883 selects the outputs of these two tables to provide TXG signal. ATLAS signal is supplied as selection singal to selector 1883. With H level the output of table 1882 is provided, and with L level the output of table 1881 is provided.

Figures 1, 2, 20:
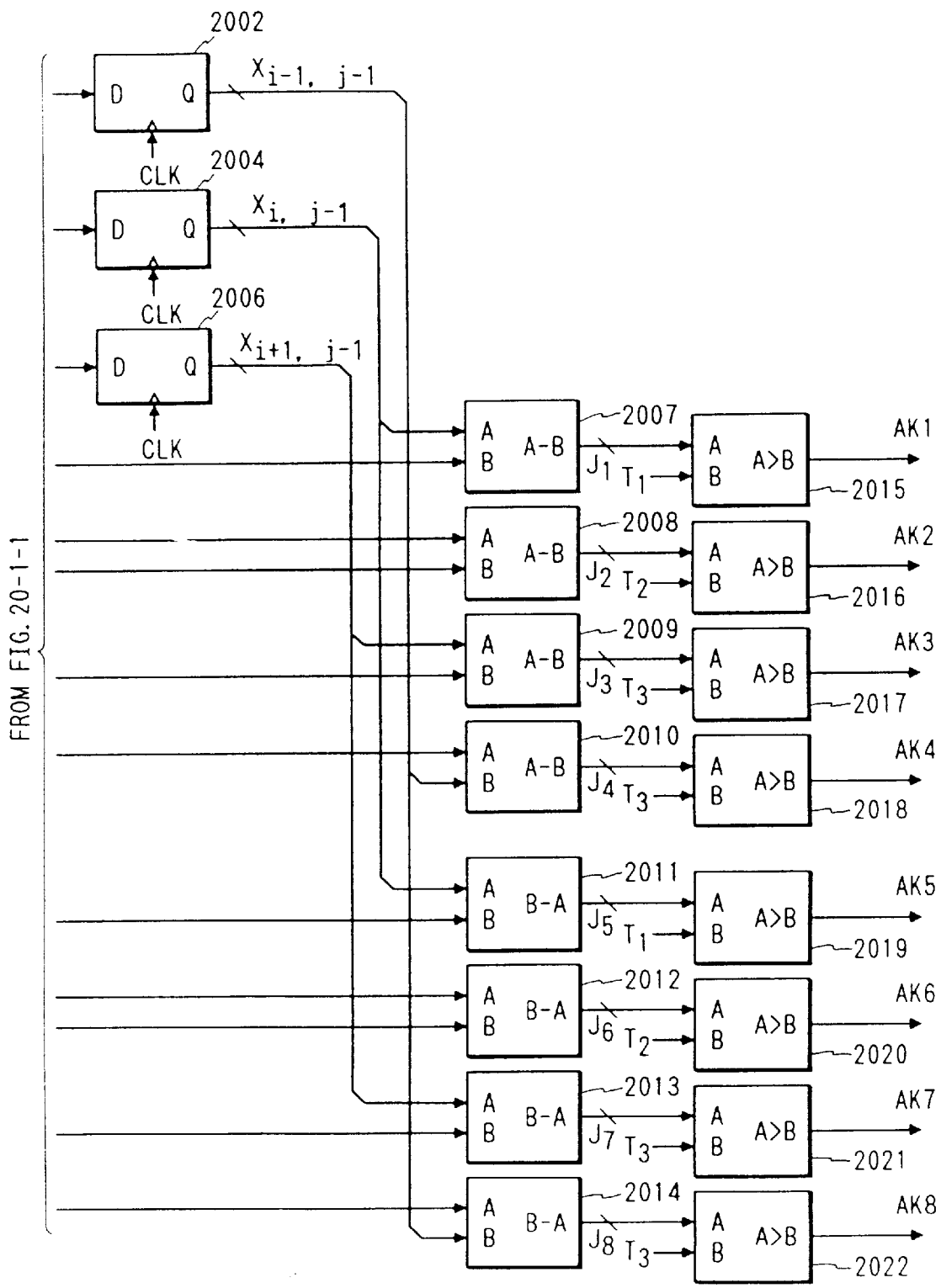

TXG signal provided from selector 1883 shown in FIG. 18-8 is delayed by line memories 1803 and 1804, and three line data are simultaneously input to detector 1805 shown in FIG. 18-1 (the internal construction of which is shown in FIG. 20-1), and which thus provides eight different density change data AK1 to AK8.

The data AK1 to AK8 are given as $$AK1 = \begin{cases} 1 \text{ if } J_1 > T_1 \\ 0 \text{ if } J_1 \leq T_1 \end{cases} \quad \text{(right)}$$

$$AK2 = \begin{cases} 1 \text{ if } J_2 > T_2 \\ 0 \text{ if } J_2 \leq T_2 \end{cases} \quad \text{(left)}$$

$$AK3 = \begin{cases} 1 \text{ if } J_3 > T_3 \\ 0 \text{ if } J_3 \leq T_3 \end{cases} \quad \text{(lower right)}$$

$$AK4 = \begin{cases} 1 \text{ if } J_4 > T_3 \\ 0 \text{ if } J_4 \leq T_3 \end{cases} \quad \text{(lower left)}$$

$$AK5 = \begin{cases} 1 \text{ if } J_5 > T_1 \\ 0 \text{ if } J_5 \leq T_1 \end{cases} \quad \text{(left)}$$

$$AK6 = \begin{cases} 1 \text{ if } J_6 > T_2 \\ 0 \text{ if } J_6 \leq T_2 \end{cases} \quad \text{(upper)}$$

$$AK7 = \begin{cases} 1 \text{ if } J_7 > T_3 \\ 0 \text{ if } J_7 \leq T_3 \end{cases} \quad \text{(upper left)}$$

$$AK8 = \begin{cases} 1 \text{ if } J_8 > T_3 \\ 0 \text{ if } J_8 \leq T_3 \end{cases} \quad \text{(upper right)}$$

equation 7

Any of these signals is "1" if there is a sharp density increase in rightward, downward, rightwardly downward, leftwardly downward, leftward, upward, leftwardly upward and rightwardly upward directions with respect to a given pixel and is "0" otherwise.

In the case of the above equations, $T_1$ represents main scanning direction density change detection slice level, $T_2$ auxiliary scanning direction density change detection slice level, and $T_3$ oblique direction density change detection slice level. These levels are controlled according to ATLAS signal and 4-bit SEG signal. The SEG signal is supplied by the user from operation unit 407 as shown in FIG. 1.

Detector 1805, as shown in FIG. 20-1, includes flip-flops (F/F) 2001 to 2006, differential calculators 2007 and 2014 and comparators 2015 to 2122.

Figure 19B:
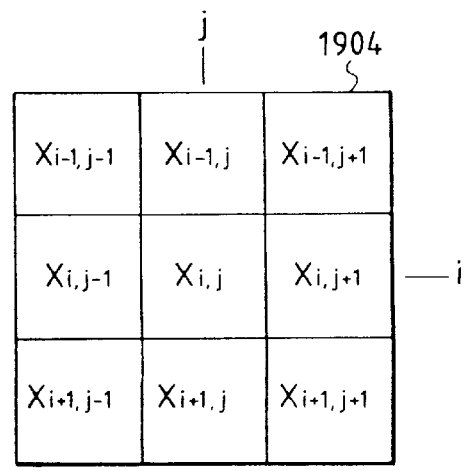

Referring to FIG. 20-1, flip-flops 2001 to 2006 latch image data of pixel 1094 shown in FIG. 19B, differential calculators 2007 to 2014 calculate $J_1$ to $J_8$ noted above, and comparators 2015 to 2022 judgement results AK1 to AK8. Density change detection slice level generator is a ROM table, which receives ATLAS and SEG signals as address and provides $T_1$, $T_2$ and $T_3$ as output data.

In this embodiment, the SEG signal may assume nine different step values "0" to "8". An increase of this value increases slice levels $T_1$, $T_2$ and $T_3$. Consequently, if there is no great density change in original, density change signals AK1 to AK8 vanish. Conversely, reduction of the SEG signal value reduces $T_1$, $T_2$ and $T_3$. Consequently, signals AK1 to AK8 are generated with a small density change in original. It is to be understood that in this embodiment the extent of detection of density change is varied through control of the SEG signal. When the ATLAS signal is "1", the values of $T_1$, $T_2$ and $T_3$ are reduced to one half as a whole compared to the "0" ATLAS singal, thus making it reader to detect small density changes in original. In consequence, in the "1" ATLAS singal case, minute character data in original can be detected.

Referring back to FIG. 18-1, enclosed in dashed rectangle 1802 is a circuit for detecting that sharp density change is continuous in a direction at an angle of 90 degrees with respect to the direction of the density change. For example, designated at 2201 and 2202 in FIG. 22-1 are reference pixels when detecting the continuity of vertical edge. These reference pixels are for a case when detecting three consequtive pixels, round which the neighboring pixels have a density change feature given as AK1 or AK5. Reference pixels 2203 and 2204 are for a case when detecting the continuity of AK2 or AK6. Reference pixels 2205 and 2206 are for a case when detecting the continuity of AK4 or AK8. Reference pixels 2207 and 2208 are for a case when detecting the continuity of AK3 or AK4.

In this embodiment, when extracting density change continuity the given pixel is not set as center of the continuity check in order to determine a pixel constituting a character end as pixel contained in continuous edge as shown in FIG. 22-2.

For detection of density change continuity in the 5×5 area noted above, the edges in the eight directions detected for each pixel in the density change point detection unit are delayed line memories 1805 to 1808 of four lines. The density change data AK1 to AK8, BK1 to BK8, CK1 to CK8, DK1 to DK8 and EK1 to EK8 formed for five lines in the above way are delayed by pixel delay in the 1-st to 5-th step flip-flops for continuity check shown in FIG. 22-1. Subsequently, NAND gates 1809 to 1824 check continuity of three pixels with center pixel (CPU3, CBT3, CLF3, CRT3, CUL3, CBR3, CUR3 and CBL3) as end, and NOR gates 1825 generate EDGE0 signal indicating that the center pixel constitutes a continuous edge. For example, gate 1809 detects that the feature of AK6 is continuous in form 2203 shown in FIG. 22-1.

Gate 1810 detects that the feature of AK6 is continuous in form 2204 as shown in FIG. 22-1. Likewise, gate 1811 detects that the feature of AK2 is continuous in form 2203. Gate 1812 detects that the feature of AK2 is continuous in form 2204. Gate 1813 detects that the feature of AKS is continuous in form 2201. Gate 1814 detects that the feature of AK5 is continuous in form 2202. Gate 1815 detects that the feature of AK1 is continuous in form 2201. Gate 1816 detects that the feature of AK1 is continuous in form 2202. Gate 1817 detects that the feature of AK7 is continuous in form 2208. Gate 1818 detects that the feature of AK7 is continuous in form 2207. Gate 1819 detects that the feature of AK3 is continuous in form 2208. Gate 1820 detects that the feature of AK3 is continuous in form 2207. Gate 1821 detects that the feature of AK8 is continuous in form 2205. Gate 1822 detects that the feature of AK8 is continuous in form 2206. Gate 1823 detects that the feature of AK4 is continuous in form 2205. Gate 1824 detects that the feature of AK4 is continuous in form 2206.

It will be seen that in character area 1902 shown in FIG. 19A only character edges are detected and provided as EDGE signal.

Dot (Screen) Judgement Unit

Figures 1, 23:
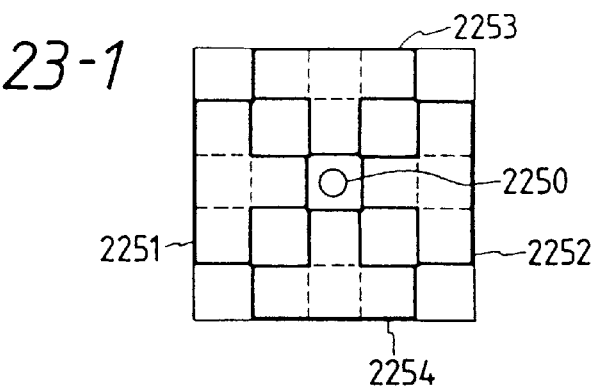
Figures 2, 23:
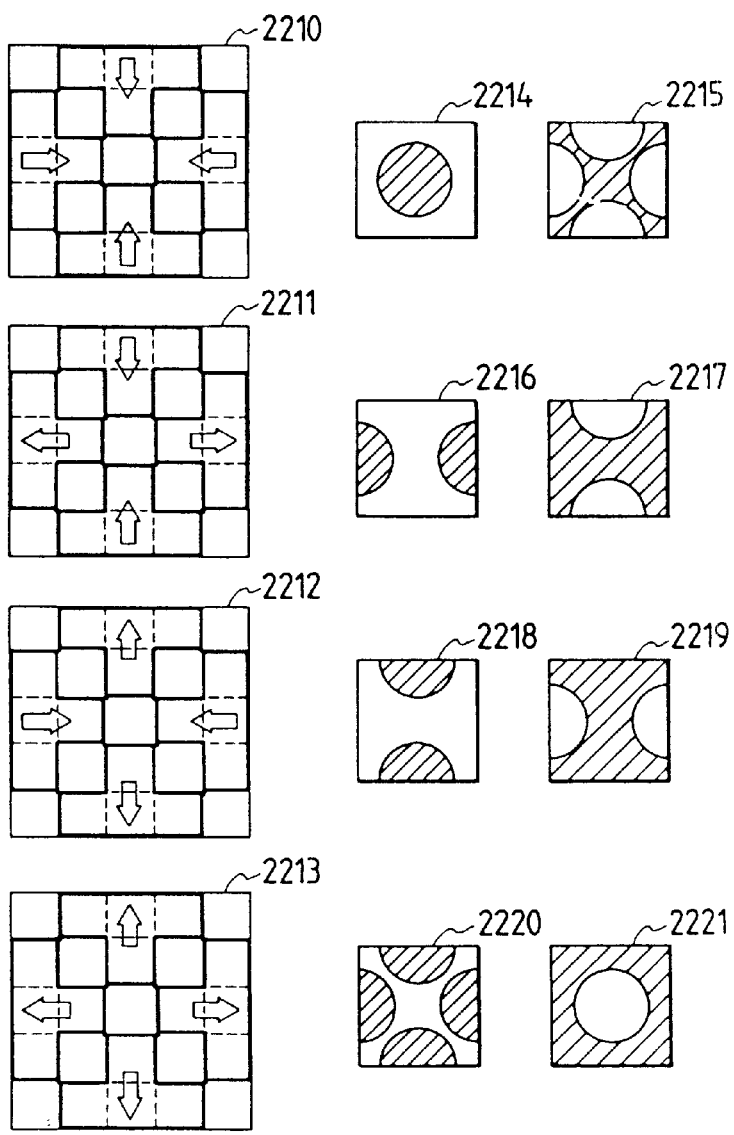

Shown enclosed by dashed rectangle 1824 in FIG. 18-1 is a dot (screen) judgement unit that includes dot feature extruction unit 1827 for detecting a symmetrical density change in dot (or screen) as shown in FIG. 23-2 and dot area detection unit 1828 for detecting distribution of more than a predetermined number of dot feature signals DOT0 in an area of a predetermined size.

This is so because even complicated character data of Chinese characters (Kanji) or the like contain portions showing symmetrical density changes as shown in FIG. 23-2. Symmetrical density changes are not distributed in a wide area in a complicated character but are distributed in a wide area in a dot original (or a screen original). In this embodiment, area judgement of dots is effected by counting DOT0 signals in a predetermined size area.

FIG. 23-1 shows a judgement pixel group for dot judgement. As shown in FIG. 23-1, enclosed in thick frames 2251 to 2254 are respective pixel groups which are found around given pixel 2250 as center and each consisting of four pixels. In each pixel group, a dot is detected by detecting a characteristic density change.

FIG. 18-2 shows the construction of dot feature extraction unit 1827. Referring to FIG. 18-2, dot (or screen) detection is done according to density direction signal DSL from the character edge judgement unit in the following way.

The output of gate 1851 indicates the presence of a downward density change in at least one pixel in pixel group 2254.

Gate 1852 indicates the presence of an upward density change in at least one pixel in pixel group 2253.

The output of gate 1853 indicates the presence of an upward density change in at least one pixel in pixel group 2254.

The output of gate 1854 indicates the presence of a downward density change in at least one pixel in pixel group 2254.

The output of gate 1855 indicates the presence of a rightward density change in at least one pixel in pixel group 2252.

The output of gate 1856 indicates the presence of a leftward density change in at least one pixel in pixel group 1856.

The output of gate 1857 indicates the presence of a leftward density change in at least one pixel in pixel group 2252.

The output of gate 1858 indicates the presence of a rightward density change in at least one pixel in pixel group 2251.

Gates 1859 to 1865 perform logic calculation on these outputs, and in consequence output DOT0 is "1" in four cases 2210 to 2213 as shown in FIG. 23-2.

FIG. 23-2 shows that symbol ⇒ indicates the presence of a rightward density change in at least one pixel in pixel group enclosed in thick frame.

Symbol ⇐ indicates the presence of a leftward density change in at least one pixel in pixel group enclosed in thick frame.

Symbol ⇑ indicates the presence of an upward density change in at least one pixel in pixel group enclosed in thick frame.

Symbol ⇓ indicates the presence of a downward density change in at least one pixel in pixel group enclosed in thick frame.

Case 2210 corresponds to dot portion (or screen portion) 2214 or 2215. Case 2211 corresponds to dot portion 2216 or 2217. Case 2212 corresponds to dot portion 2218 or 2219. Case 2213 corresponds to dot portion 2220 or 2221.

FIG. 18-3 designates a dot area detection unit, which executes judgement in wire area on DOT0 signal generated in 1827 to form signal DOT1 concerning whether there is a point of DOT0="1" in the neighborhood of a given pixel.

Reference numeral 1831 designates a judgement unit, which executes a check as to whether at least one point of DOT0="1" is present in a 4×3 window containing a given pixel (objective pixel). If such a point is present, signal "1" is provided as DOT0' signal, and otherwise "0" is provided as DOT0' signal. Line memories 18311 and 18312 provide one-line delay, and DOT0 signals for three lines are simultaneously supplied to flip-flop 18313. OR gate 18314, and flip-flops 18315 to 18317 provide one-clock delay, and the delayed outputs are supplied to OR gate 18318 to obtain DOT0' signal. At this time, if "1"s (■) and "0"s (□) are provided as DOT0 in a mixed fashion in three consequtive lines, as shown in FIG. 18-4, for instance, for given pixel 1851 OR is taken in 3-by-4 window 1852 to obtain DOT0' signal.

In this operation, DOT0 signal, which is present in a scattered fashion in a dot image, is converted to comparatively continuous DOT0' signal.

Meanwhile, circuit 1832 in FIG. 18-3 calculates DOT0' signal over a wide area to generate DOT0 signal concerning whether a given pixel is in a dot area (screen area).

Reference numerals 18321 and 18322 designate line memories, and 18323 and 18324 calculators.

As shown in FIG. 18-5, with respect to given pixel 1861 (on i-th sub scanning line and j-th main scanning line) DOT0' is sampled for every four pixels in main scanning line and every other line in sub scanning line. By setting N to be a suitable integer (N=16 in this embodiment), in a line immediately preceding a given pixel (i.e., (i−1)-th line), sum SUML1 of pixels in j-th, (j−4)-th, (j−8)-th, . . . , (j−4N)-th lines provided DOT0'=1, and sum SUMR1 of pixels in j-th, (j+4)-th, (j+8)-th, . . . , (j+4N)-th lines provided DOT0'=1; and in a line immediately succeeding the given pixel (i.e., (i+1)-th line), sum SUML2 of pixels in j-th, (j−4)-th, (j−8)-th, . . . , (j−4N)-th lines provided DOT0'=1, and sum SUMR2 of pixels in j-th, (j+4)-th, (j+8)-th, . . . , (j+4N)-th lines provided DOT0'=1.

Adder 18325 performs operation SUML1+SUML2 ⇒ SUML to obtain sampling sum SUML of DOT0' on the left side a given pixel, and adder 18326 performs operation SUMR1+SUMR2 ⇒ SUMR to obtain sampling sum SUMR of DOT0' on the right side of the given pixel.

Reference numerals 18327 and 18328 designate comparators, 18329 an OR gate, and 18330 a ROM table for providing dot judgement slice level value $T_4$ in correspondence to 4-bit SEG signal supplied as address. Since in this embodiment N=16, dot (or screen) detection is done for every 4N=64 pixels before and after a given pixel in the main scanning direction and two 5-line areas in the auxiliary scanning direction. It at least either SUML>$T_4$ or SUMR>$T_4$, DOT is "1", and otherwise it is "0". Signal DOT is consequently an area signal assuming "1" for a dot area.

FIG. 18-6 shows the contents of RUM table 1830. With increase of the SEG signal value, the slice level of dot judgement is reduced, and if density patterns as shown in FIG. 23-2 are prevent only slightly in FIG. 23-2, presence of dot (or screen) is decided, and DOT signal is provided.

In the above embodiment, for judgement of dot image a check is done as to whether continuous dots like screen are present in a 4×3 window, for instance, and a decision of a dot area is made if a predetermined number of continuous dot portions are prevent in a predetermined area.

The description so far concerned feature extraction unit 403 shown in FIG. 1. Now, the operation of color signal processing unit 402 and color processing control signal generation unit 404 using color judgement signals SL, UNK, COL and CAN and character edge judgement singal EDGE for each pixel from the feature extraction unit will be described with reference to the color processing circuit shown in FIG. 1.

Light amount signal/density signal conversion unit 103 converts R, G and B signals in a range of 0 to 225 are converted into C, M and Y signals in a range of 0 to 225 according to equations $$C = -255 \cdot \log_{10}\left(\frac{R}{255}\right)$$

$$M = -255 \cdot \log_{10}\left(\frac{G}{255}\right)$$

$$Y = -255 \cdot \log_{10}\left(\frac{B}{255}\right)$$

Black extraction unit 104 determines black component K in C, M and Y signals as in an equation $$K = \min(C, M, Y)$$

The four color density signals C, M, Y and K inclusive of signal K are processed in UCR/MASK unit 105 according to an equation $$\begin{pmatrix} M' \\ C' \\ Y' \\ K' \end{pmatrix} = \begin{pmatrix} a_{11}, a_{12}, a_{13}, a_{14}(1-u_1) \\ a_{21}, a_{22}, a_{23}, a_{24}(1-u_2) \\ a_{31}, a_{32}, a_{33}, a_{34}(1-u_3) \\ a_{41}, a_{42}, a_{43}, a_{44} \end{pmatrix} \begin{pmatrix} M \\ C \\ Y \\ K \end{pmatrix}$$

for removal of background color and color bleeding of developing material in printer 202.

In the above equation, $a_{11}$ to $a_{14}$, $a_{21}$ to $a_{24}$, $a_{31}$ to $a_{34}$ and $a_{41}$ to $a_{44}$ are masking coefficients for removal of bleeding of predetermined colors, and $u_1$, $u_2$ and $u_3$ are UCR coefficients for removing K component from M, C and Y components. M', C', Y' and K' are selected one by one according to 2-bit developing color signal PHASE from control unit 4-1 to be provided as Vl signal. M', C', Y' and K' are selected in correspondence to 0, 1, 2, 3 of PHASE signal.

Line delay memories 112 and 113 delay $V_1$ and M signals for three lines and four clocks for the generation of character edge judgement signal from the feature extruction unit.

Color judgement unit 106 provides a delay for 2 lines and 2 clocks until generation of judgement signals BL, UNK and so forth. In order to make this extent of delay equal to the delay in character edge judgement unit 107, line delay memory 120 provides a delay for one line and two clocks to generate signals BL1, UNK1, COL1 and CAN1.

WEIGHT PROVISION UNIT

The operation of weight provision unit consisting of components 114 to 116 in FIG. 1 will be described. FIG. 24-1 to 24-7 show color judgement signal and character edge judgement signal in character "A" read out in various color states. FIGS. 24-1 to 24-6 show judgement signals of section a of the character shown in FIG. 24-7.

FIG. 24-1 shows a timing chart of signals when black letter "A" is read out as black, and these signals are color-free signals (hereinafter referred to as ND signals). M2 signal delayed by circuit 113 is read out as dull signal compared to the case of FIG. 24-7 due to shade-off in the optical system for reading. Edge signal is formed such that it is rather expanded compared to character edge due to the density change continuity of AK3 and AK7 noted above. As color judgement signal only BL1 is generated.

M2 and EDGE signals representing ND signal use green color disassembly signal, and therefore outputs in FIG. 24-2 and following figures are similar to those in FIG. 24-1 other than green letter. In the case of green letter, M2 and EDGE signals are not generated.

FIG. 24-2 shows a case when letter "A" as colored letter is read out. As shown, COL1 signal indicating color and CAN1 signal indicating the presence of a colored pixel around a given pixel and having a higher density than that of the given pixel.

FIG. 24-3 shows a case when a letter "A" constituted by an intermediate saturation character is read. In this case, UNK1 signal representing an intermediate saturation is generated.

FIG. 24-4 shows a case when a letter "A" constituted by a black letter is read out by color deviation. In this case, the BL1 signal is thinner compared to the case of FIG. 24-1, and intermediate saturation signal UNK1 is generated around the BL1 signal due to color deviation. FIG. 24-5 shows a case when a letter "A" constituted by a colored letter is read out by color deviation. In this case, the COL1 signal is thinner compared to the case of FIG. 24-2, and UNK1 signal is generated in character edge portions. Further, the CAN1 signal is thinner for portion corresponding to the outer side of character edge portion in correspondence to reduction of a portion determined to be a colored portion.

FIG. 24-6 shows a case when a colored letter close to intermediate saturation is read out by color deviation, leading to generation of pixels judged to be black in edge portion. In this case, the same signal as in the case of FIG. 24-5 is generated except for that BL1 signal is generated in lieu of UNK1 signal.

FIGS. 25-1 to 25-3 show, to an enlarged scale, section a of black letter, intermediate saturation letter and black letter with intermediate saturation edges. Shown at V2 is an example of output signal of circuit 105 in case when developing colors of M, C, Y and Bk are used.

FIG. 25-1 is a case when a black letter is read out. In this case, circuit 105 provides UCR, and color components of M, C and Y are reduced to about 20%. However, since this letter is a black letter, it is desirable to use black toner as much as possible for recording.

Further, for intermediate saturation generated in edges of a black letter as in the case of FIG. 24-4 the color components of M, C and Y are desirable reduced as much as possible. In contrast, for intermediate saturation generated in edges of a colored letter as in the case of FIG. 24-5, the K component is desirable reduced. Further, black component generated in edges of a colored letter as shown in FIG. 24-6 is desirably distinguished from black character edge shown in FIG. 24-1.

As shown above, in this embodiment color recording is effected by suitably combining color recording signal V2 (M', C', Y' and K') from UCR/MASK circuit 105 and ND signal M2 according to the result of color judgement signal and character edge judgement signal as shown in FIG. 26.

Entry (a) in FIG. 26 corresponds to black character EDGE shown in FIG. 24-1, and 0 signal (representing no development) is provided for developing colors of M, C and Y, while providing density signal M2 for developing color of Bk. Entry (c) in FIG. 26 corresponds to intermediate saturation edges shown in FIG. 24-3 or 24-5. In this case, in order to emphasize the black component of edge, halves of M', C' and Y' generated from circuit 105 are provided as color recording signal V2 for developing colors of M, C and Y, while a signal obtained by addition of 50% each of K' output of color recording signal V2 and density signal M2 is provided for developing color of Bk. Entry (f) in FIG. 26 corresponds to non-edge portion of black letter shown in FIG. 24-1. Here, in order to provide for improved connection of signals with respect to edge portions recorded in Bk monochrome, the M', C' and Y' components of color recording signal V2 are reduced to ¾, and ¼ of density signal M2 is added to ¾ of K' component in case of Bk recording. Entries (b), (d) and (b) in FIG. 26 are for cases without the black emphasizing operation noted above.

Now, changes in image signal by operation in FIG. 26 will be described with reference to FIGS. 25-1 to 25-3. Shown at V2(M) is the output V2 when PHASE=0 (i.e., when the developing color is magenta), and likewise shown at V2(V), V2(Y) and V2(Bk) are the output V2 when the developing color is cyan, yellow and black, respectively.

FIG. 25-1 shows a black character portion, and a portion "b" is an edge portion corresponding to entry (a) in FIG. 26. Here, the recorded signal levels of M, C and Y are "0", and density signal M2 is provided as Bk signal. Portion C is a non-edge portion in black portion corresponding to entry (f) in FIG. 26. V4 signals V4(M), V4(C) and V4(Y) of developing colors M, C and Y are ¾ of V2(M), V2(C) and V2(Y), respectively, and Bk signal is the sum of ¾ of V2(Bk) and ¼ of M2.

FIG. 25-2 shows an intermediate saturation character, with portion "d" being an edge portion corresponding to entry (c) in FIG. 26. Here, V4(M), V4(C) and V4(Y) are ½ of V2(M), V2(C) and V2(Y), respectively, and V4(Bk) is the sum of ½ of V2(Bk) and ½ of M2.

FIG. 25-3 illustrates a case when intermediate saturation is found in an edge portion of a black character. Edge portion "e" is processed in the same way as portion "d", and non-edge portion is processed in the same way as portion "c" (BL=1) by black judgement. Thus, color signal of black character edge portion is reduced.

To generate V4 signal in FIG. 26, the circuit of FIG. 1 uses multipliers 114 and 115 and adder 116. Multiplification factor coefficient generation unit 108 receives color judgement signals BL1, UNK1, COL1 and CAN1 and character edge judgement signal EDGE and generates multiplification factors (or coefficients) GAIN1 and GAIN2 of the respective mulpliers.

Figures 27, 28:
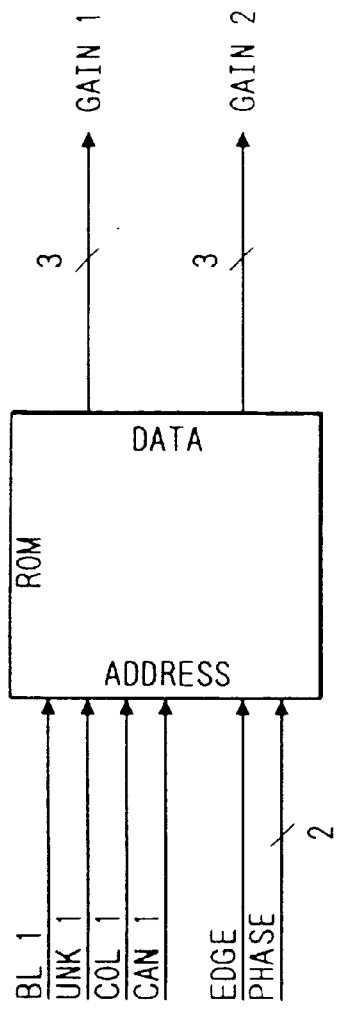
FIG. 27 is a view showing the construction of multiplification factor generation unit 108 shown in FIG. 1.
FIG. 28 is a view showing the relation between input address and output of ROM shown in FIG. 27.

Multiplification factor generation unit 108 is constituted by ROMS, as shown in FIG. 27, and it receives 5-bit judgement signals BL1, UNK1, COL1, CAN1 and EDGE as shown as PHASE address and provides corresponding two 3-bit gain signals GAIN1 and GAIN2.

FIG. 28 shows the relation between address and output of the ROM. The gain signals here represent four times the actual gains, and are substantially multiplied by ¼ in multipliers 114 and 115 before multiplication of inputs V2 and M3.

Figure 29:
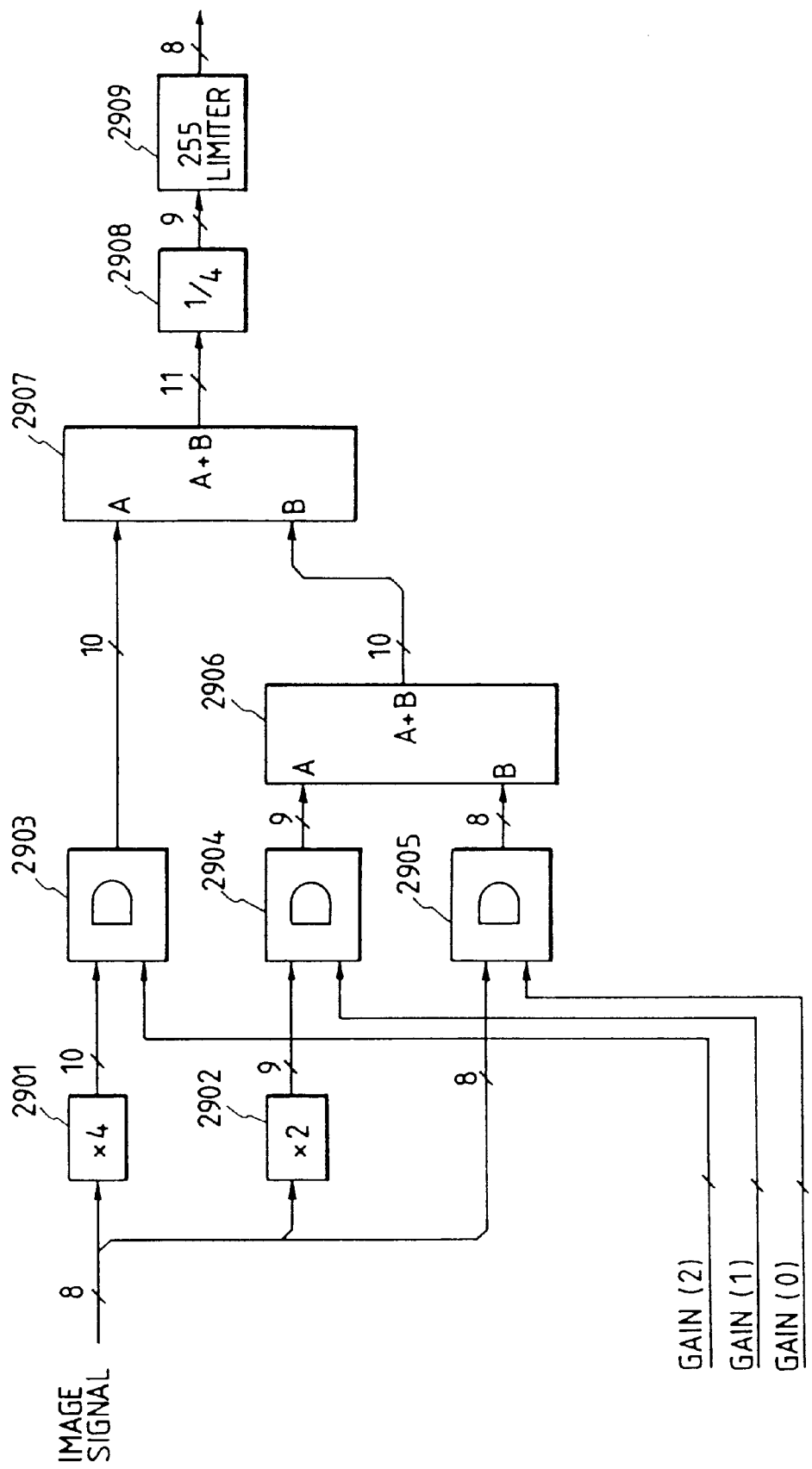
FIG. 29 is a view showing the construction of multiplier shown in FIG. 1.

FIG. 29 shows details of multipliers 114 and 115. Bit-shift type multipliers 2901 and 290 multiply 8-bit image signal by 4 and 2, respectively. The resultant signals are selected by gates 2903 to 2905 according to 3-bit gain signals GAIN(2), GAIN(1) and GAIN(0) and then added by adders 2906 and 2907. The output is then multiplied by ¼ by bit-shift type divider 2908, the output of which is then coupled to 255 limiter 2909 to round all 9-bit data not lower than 255 to 8-bit data of 255.

Through the above weight provision and addition according to color judgement signals and character edge judgement signals color recording singal V2 and density signal M2 are provided, which are then fed to spatial filter 117.

Spatial Filter

Figure 30:
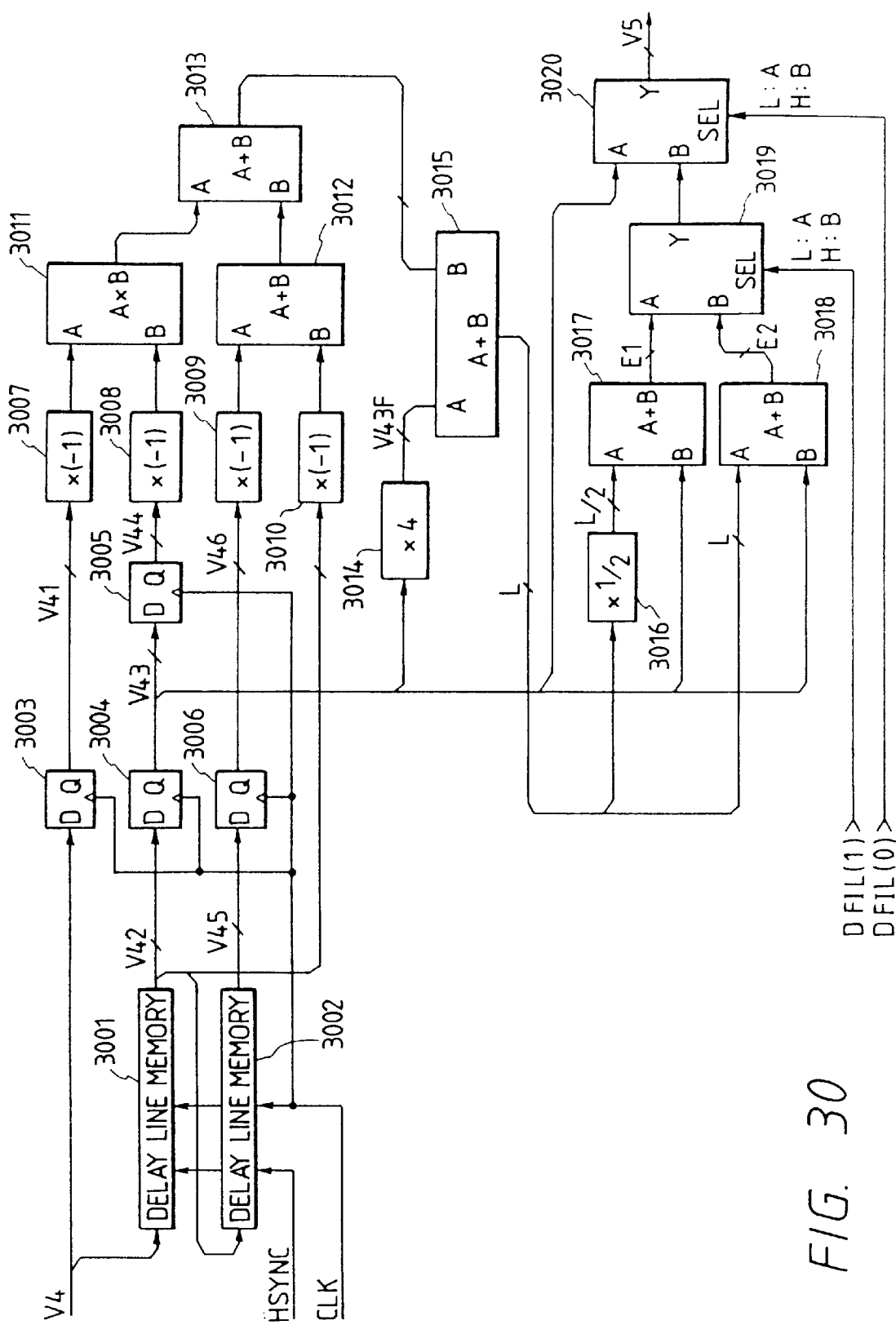
FIG. 30 is a view showing the internal construction of filter 117 shown in FIG. 1.

FIG. 30 shows the construction of the spatial filter (117 in FIG. 1) in this embodiment. The spatial filter shown in FIG. 30 is an edge emphasis filter using a 3×3 pixel Laplacian filter, which is capable of switching two Laplacian multipliers of ½ and 1.

Reference numerals 3001 and 3002 designate line delay memories, and image signals V4, V42 abd V45 of three lines delayed by these line delay memories are delayed by one clock in flip-flops 3003 to 3006. Here V43 is for a given (objective) pixel, V41, V42, V44 and V46 are multiplied by −1 in multipliers 3007 to 3010 to constitute Laplacian before addition through adders 3011 to 3013. Further, V43 is multiplied by 4 in multiplier 3014, the output of which is added to the output of adder 3013 in adder 3015 to generate Laplacian L. This Laplacian L is multiplied by ½ in multiplier 3016. Adder 3017 adds V43 and L/2 together to generate weak edge emphasis signal E1. Adder 3018 adds V43 and Laplacian L together to generate strong emphasis signal E2. The two different edge emphasis signals and signal V43 for the given pixel itself are selected under control of control signals DFIL(1) and DFIL(0) to provide V5 signal. In case when DFIL(l) is "0" and DFIL(0) is "1", weak edge emphasis signal E1 is selected. When DFIL(1) is "1" and DFIL(0) is "1", strong edge emphasis signal E2 is selected. When DFIL(0) is "0", image signal V43 free from edge emphasis is selected and provided as V5 signal.

The 2-bit DFIL signal consisting of filter switcing signals DFIL(1) and DFIL(0) is generated by the filter control signal generation unit.

Figures 31, 32:
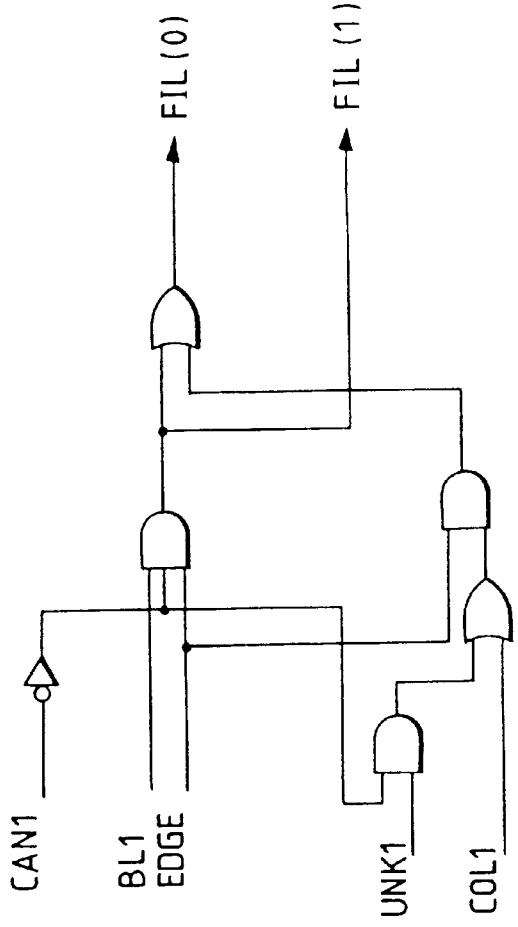
FIG. 31 is a view showing the construction of filter control signal generation unit 109 shown in FIG. 1.
FIG. 32 is a table showing logics of gate circuit shown in FIG. 31.

In this embodiment, strong edge emphasis is provided to black character edge portions to provide black edges sharply. For non-edge portions no edge emphasis is provided in order to prevent changes in color hue due to edge emphasis. For intermediate saturation and color character edge portions weak edge emphasis is provided in order that color hue changes due to edge emphasis are not so pronounced while permitting sharp recording of edges. When CAN1 signal is "1", BL1 and UNK1 signals are provided due to color deviation of color character edges, and therefore, EDGE emphasis is not provided. FIG. 31 shows the circuit construction of filter control signal generation unit 109 shown in FIG. 1 for controlling the filter shown in FIG. 30, and FIG. 32 shows logics involved (or logical expression).

In spatial filter 117 a given pixel is delayed by one line and one clock, and FIL signal from filter control signal generation unit 109 is delayed by one line and one clock in one-line memory 121 to provide DFIL signal. Likewise, CAM and SCR signals from gamma and screen switching signal generation units 110 and 111 are delayed by one line and one clock to provide respective DGAM and DSCR signals.

Gamma Conversion Unit

Figure 33:
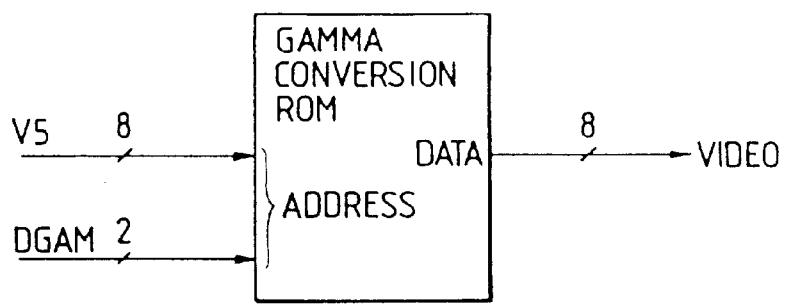
FIG. 33 is a view showing the constructon of gamma conversion unit 118 shown in FIG. 1.

Gamma conversion unit 118 of FIG. 1 is constituted by ROM, as shown in FIG. 33. More specifically, 8-bit V5 signal after filtering is input as address for ROM, and corresponding gamma conversion output is provided as 8-bit VIDEO signal from ROM data terminal. Four different gamma conversion characteristics can be selected according to 2-bit DGAM signal supplied to address line together with V5 signal, as shown in FIG. 34.

Figure 34:
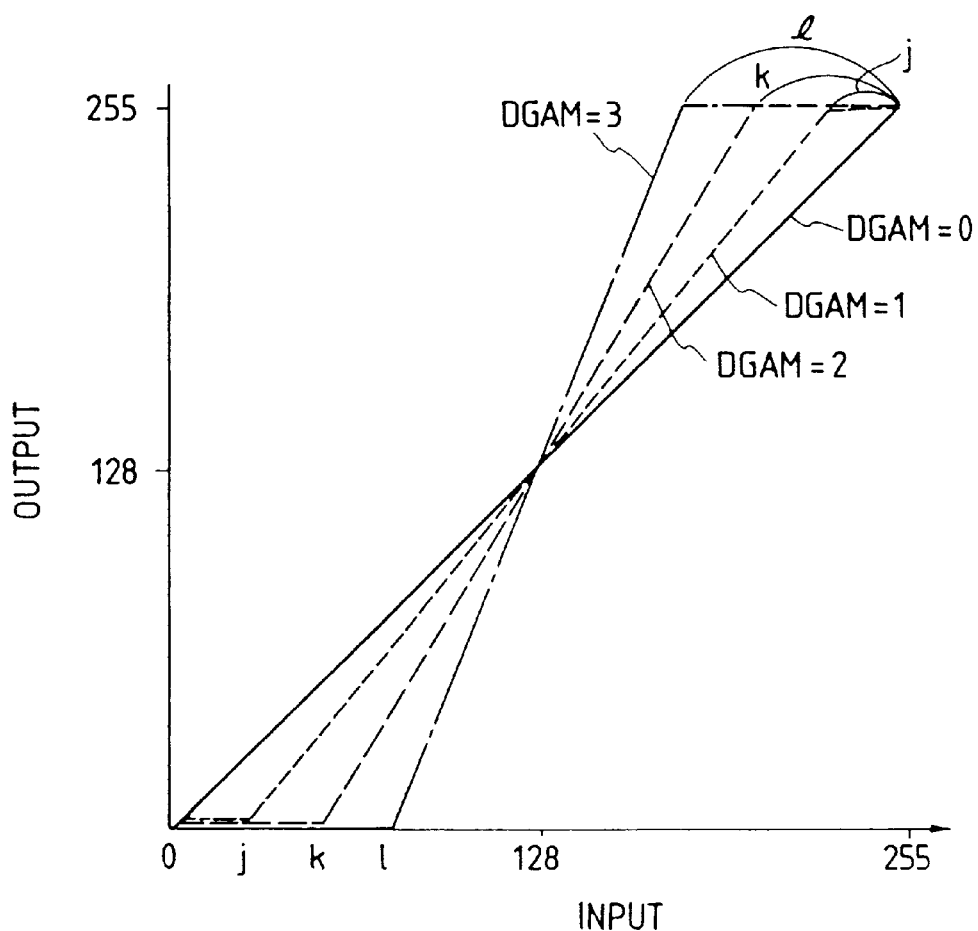
FIG. 34 is a view showing the relation between input and output of ROM shown in FIG. 33.

In case of DGAM=0 in FIG. 34, input is equal to output, and this is applicable to non-edge portions. In case of DGAM=1, the conversion characteristic is such that of input values of 0 to 255 for inputs in sections of j on the sides of 0 and 255 respective outputs of 0 and 255 are provided and these sections are connected by a line with a slope (inclination) of $255/(255-2_j)$. With this characteristic, for an input in the neighborhood of "0" as low density input a lower density video signal is provided, while for an input in the neighborhood of "255" as high density input a higher density video signal is provided, thus providing emphasis on density change of input in the neighborhood of "128" as intermediate density. It is thus possible to permit sharper recording of character edges. This DGAM1 is applicable for color character edge.

In case of DGAM=2, k having a greater value is substituted for j in case of DGAM=1 to permit further sharper recording of character edges. In this case, however, the linearity between input and output is sacrificed, and therefore, color tone is no longer guaranteed. For this reason, DGAM=2 is adapted for intermediate saturation character edges.

In case of DGAM=3, l is used, which has a greater value than k, and this characteristic is used for black character edges, for which greater sharpness is required.

Figures 35, 36:
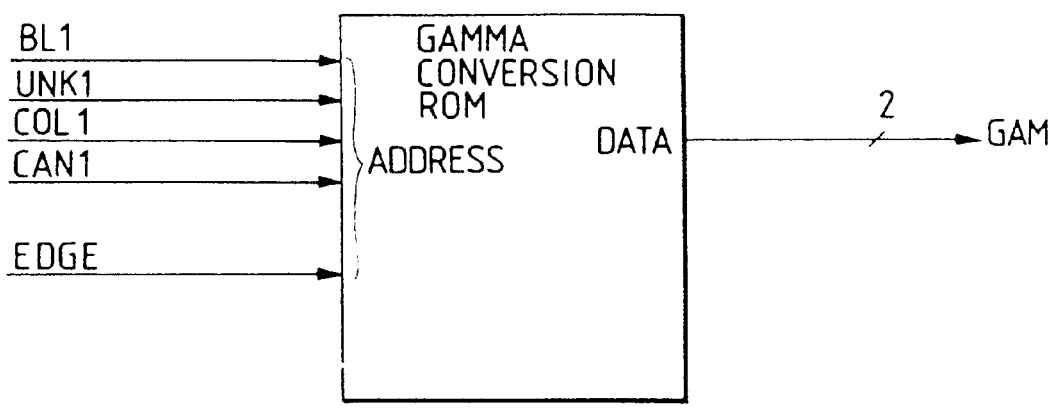
FIG. 35 is a block diagram showing the construction of gamma switching signal generation unit 110 shown in FIG. 1.
FIG. 36 is a view showing the relation between input and output of ROM shown in FIG. 35.

This gamma switching signal DGAM is obtained as a result of delaying GAM signal from gamma switching signal generation unit 110 in line delay 121 by one line and one clock. Gamma switching signal generation unit 110, as shown in FIG. 35, consists of a ROM, which receives color judgement signal and character edge judgement signal as address and provides GAM signal as data. FIG. 36 shows the contents of the ROM table. As shown before, GAM=3 in case of black character edge portion (EDGE=1, BL1=1), and GAM=2 in case of intermediate saturation character edge portion (EDGE=1, UNK=1). In either case, if CAN1 signal indicating BL1=1 or UNK=1 is provided due to color deviation, GAM=0 is provided to inhibit emphasis on character edges.

PWM Conversion Unit

VIDEO signal obtained after gamma conversion is converted in PWM conversion unit 119 into a pulse width signal. This pulse width modulation signal is used to control the "on" time of laser 213 so as to obtain copy output 406 with gradation density expression.

Figure 37:
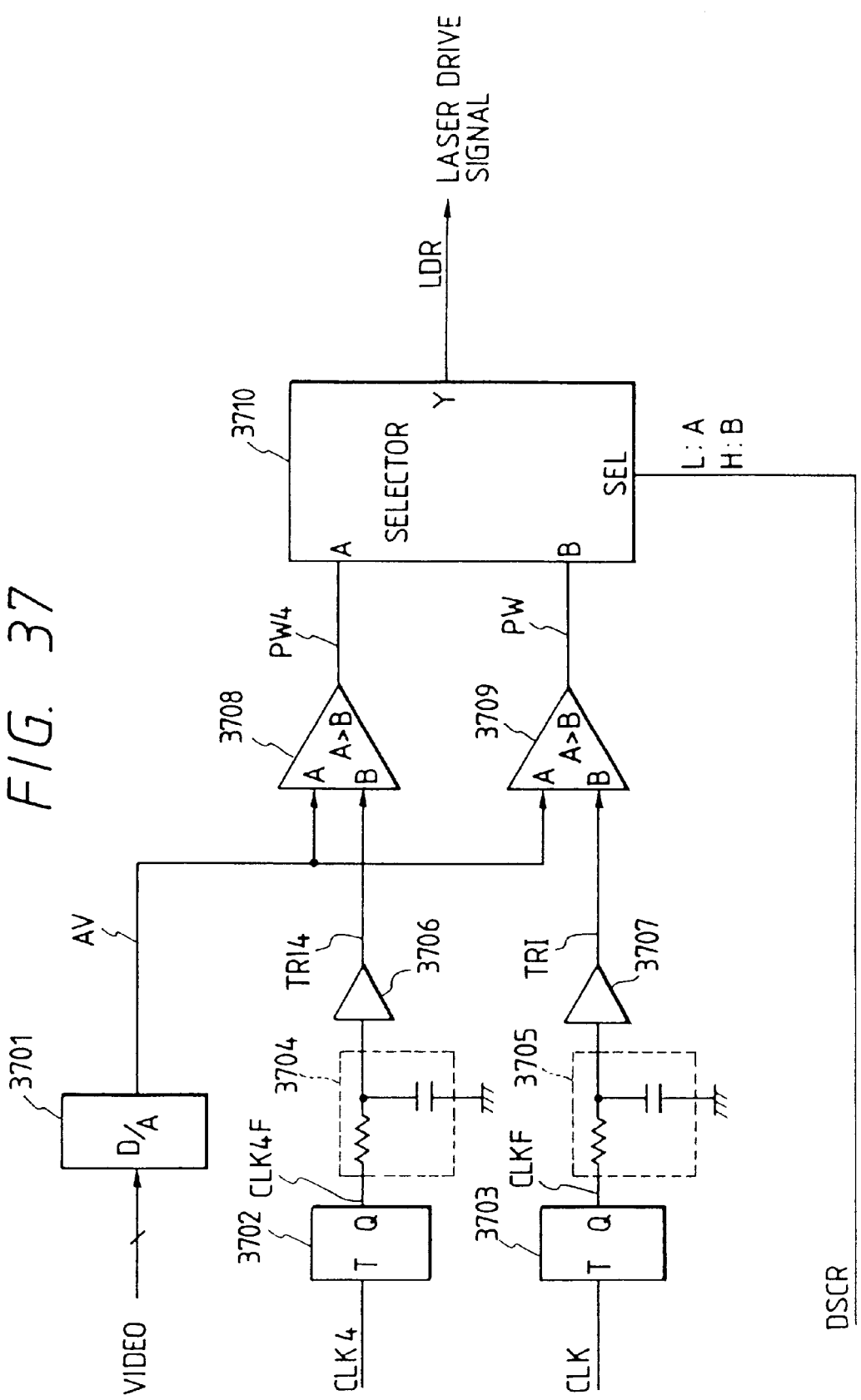
FIG. 37 is a block diagram showing the construction of RWM modulation unit 119 shown in FIG. 1.

FIG. 37 shows details of PWM modulation circuit used in the modulation unit.

D/A converter 3701 converts VIDEO signal into analog image signal AV, and toggle flip-flops 3702 and 3803 subject image signal CLK synchronized to VIDEO signal and screen clock CLK4 at double the frequency to HSYNC synchronization and frequency division to ½ to obtain clocks CLK4F and CLKF with duty ratio of 50%. These two clocks are deformed by integrators 3704 and 3705 into triangular waves, which are then peak regulated by amplifiers 3706 and 3707 into the output dynamic range of A/D covnerter for comparison with AV signal in analog comparators 3708 and 3709. Consequently, AV signal is converted into two pulse width modulation signals PW4 and PW. Subsequently, selector 3710 either PW4 or PW according to DSCR signal to provide laser drive signal LDR.

Figure 38:
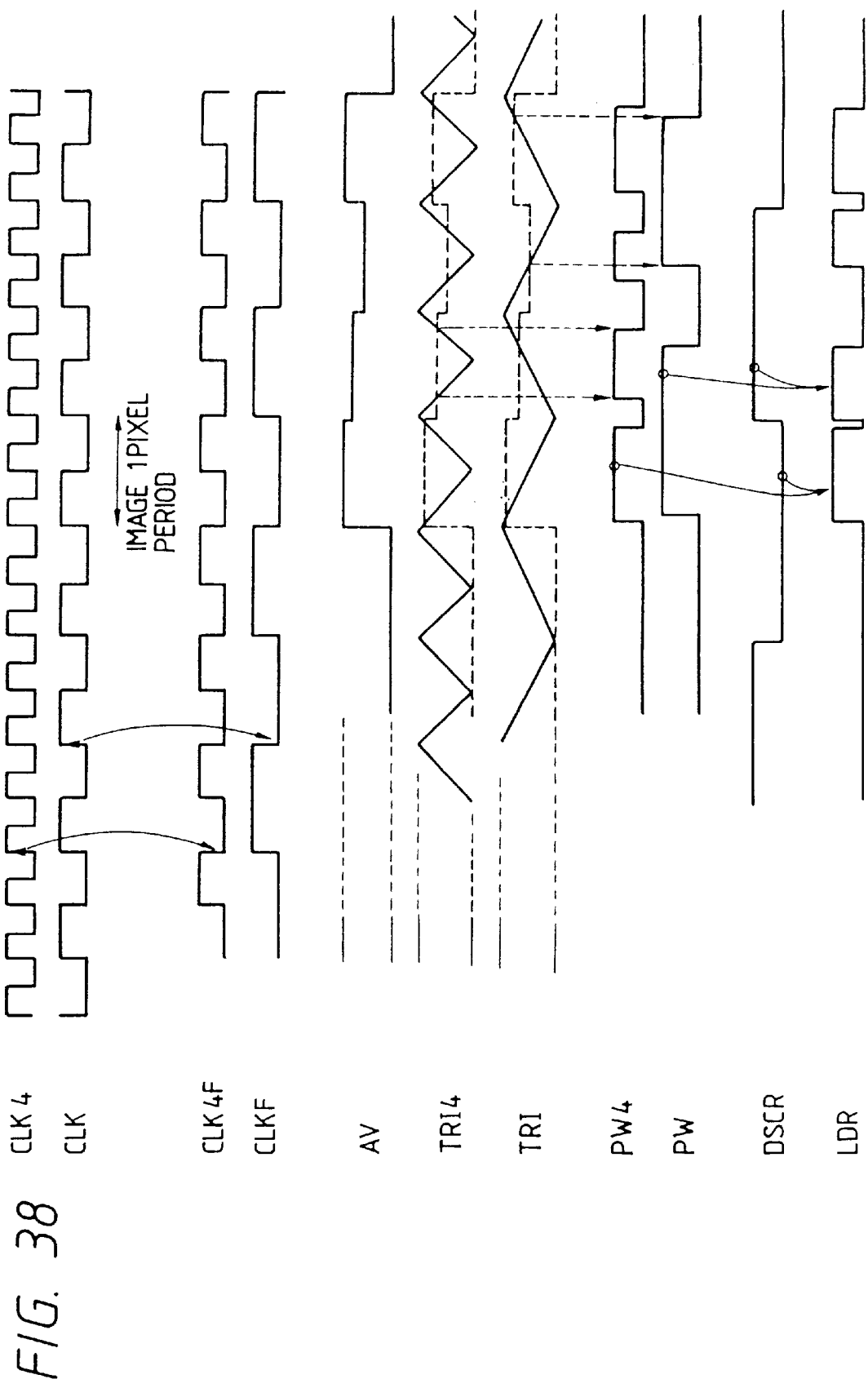
FIG. 38 is a timing chart for explaining the operation of individual blocks shown in FIG. 37.

The timing chart of the operation of this circuit is shown in FIG. 38. As shown, triangular wave TRI4 obtained by integrating clock 4F obtained by frequency dividing CLK4 by ½ has a frequency corresponding to one pixel of image. This triangular wave is changed substantially linearly over the entire output range of D/A converter. Thus, this triangular wave and analog image signal AV are compared to each other, whereby AV signal is pulse width modulated with one pixel interval of image as one cycle period to obtain PW4. Likewise, TRl is obtained from CLKF obtained by frequency dividing pixel clock CLK by ½. Thus, according to TRI the AV signal is pulse width modulated with two pixels of image as one cycle to obtain PW. PW4 signal obtained as a result of pulse width modulation with a period of one pixel is recorded by printer with the same resolution as clock CLK. However, if PW4 signal is used for image recording, sufficient graduation expression can not be obtained by the features of etectrophotographic process using a printer for the basic density unit is as small as one pixel.

On the other hand, with PW signal the density is reproduced with two pixels as unit. Thus, sufficient graduation expression can be obtained. However, the resolution of the recording is reduced to one half compared to the case of PW4.

Figure 39:
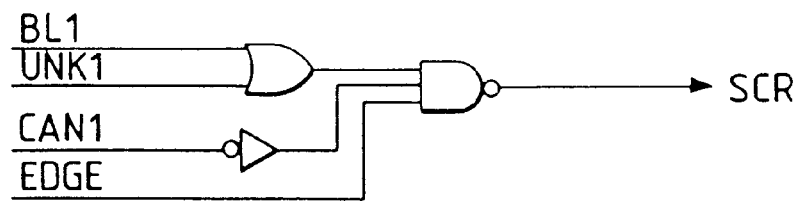
FIG. 39 is a block diagram showing detailed internal construction of screen switcing signal generation unit 111 shown in FIG. 1.
Figure 40:
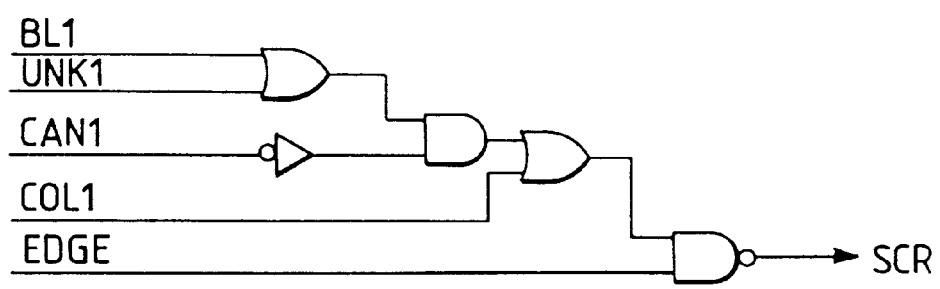
FIG. 40 is a block diagram showing detailed internal construction of screen switching signal generation unit 111 when recording thin colored character.

For the above reason, in this embodiment PW and PW4 are switched for each pixel by controlling DSCR according to the kind of image. More specifically, PW4 is used for black and intermediate saturation character edge portions requiring high resolution. On the other hand, PW is used for colored character edge portions and non-edge portions in a sense of attaching importance to the color tone. It is experimentally recognized, however, with an original constituted by thin colored characters such as a map it is better to use PW4 with importance attached to the resolution for colored character edges as well even with sacrifice in the color tone. Signal DSCR for switching PW and PW4 is obtained by delaying SCR signal from screen switching signal generation unit 111 in line delay 121 by one line and one clock. FIG. 39 shows details of screen switching signal generation unit 111, and FIG. 40 shows details of screen switching signal generation unit 111 in case when PW4 is used for thin colored characters as well. Screen switching signal generation unit 111 includes these circuits shown in FIGS. 39 and 40, and these two circuits are switched according to the mode input from operation unit 407. Therefore, DSCR shown in FIG. 38 is LOW for black or intermediate saturation character edge portions (and also colored character edge portions as well in the case of FIG. 40), and during these periods PW4 is provided as LDR signal. During this time, even if judgement as edge portion is provided, in case of character edge portion (CAN1=1) having color deviation, PW4 signal is not used in order to prevent deterioration of the quality of recorded image due to emphasis of color deviation.

Through the above processing, laser drive signal LDR is generated to be supplied to printer 201 shown in FIG. 2. According to this signal, semiconductor laser 213 is driven by pulse width modulation driving for each pixel, and the resultant laser beam is used for line scanning of photosensitive drum 217.

Figure 45:
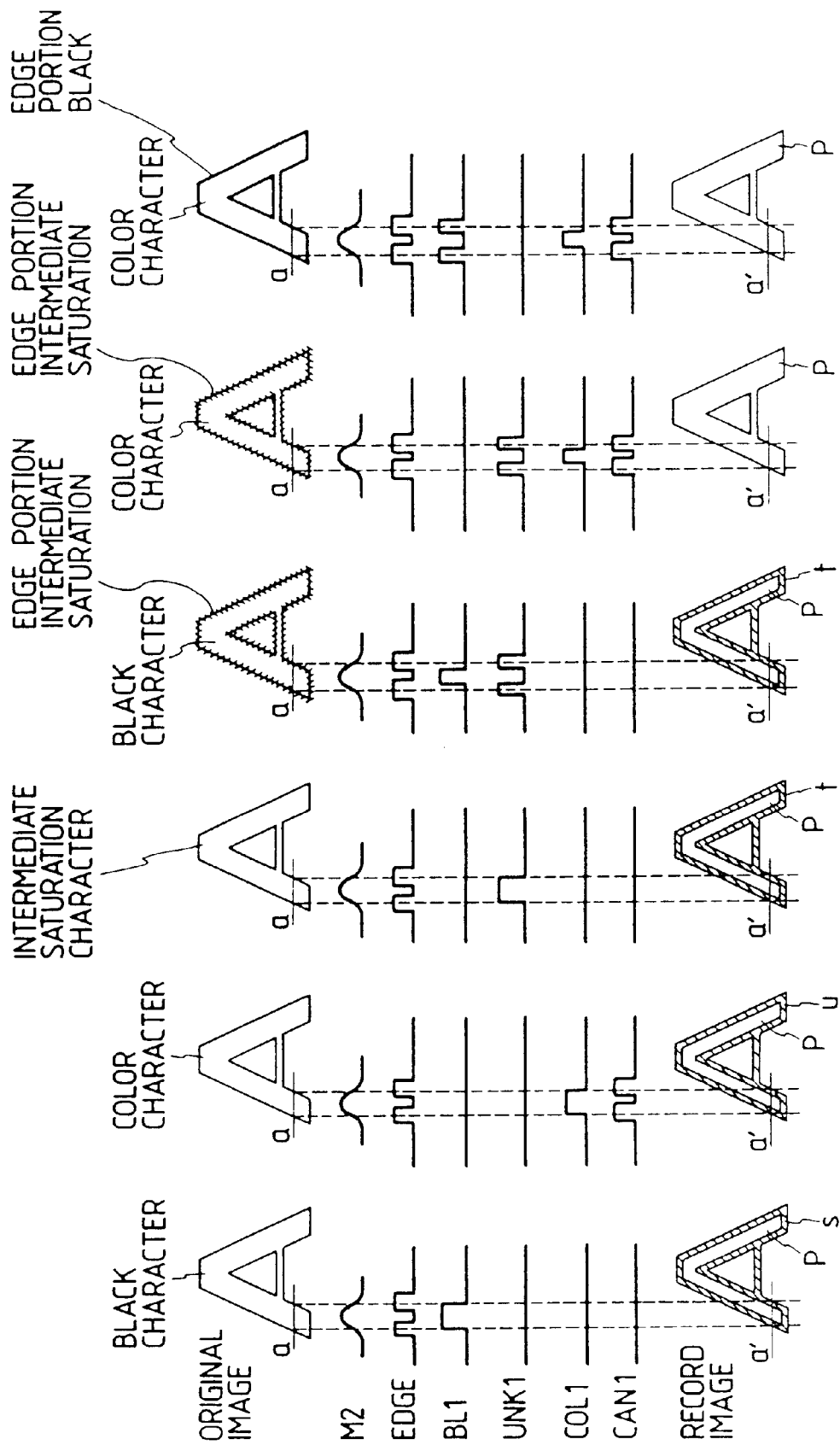

Consequently, recorded image provided from printer 201 is as shown in FIGS. 45-1 to 45-6.

The originals shown in FIGS. 45-1 to 45-6 are the same as those of various characters shown in FIGS. 24-1 to 24-6. FIG. 45-1 shows a black character image. EDGE signal determined in the neighborhood of character edges BL7 signal determined by the whole character are used for separate processings of edge portions S and non-edge portions P of the recorded image as shown.

For edge portion S, which is strongly black, sole black tonor is recorded according to density signal M2 as shown in FIG. 26. Further, strong edge emphasis as shown in FIG. 32 is provided.

Further, gamma conversion characteristic of DGAM=3 as shown in FIG. 34 is used. Consequently, the black character edge portion is recorded as sharp image close to binary image with strong edge emphasis on black tonor color and sharp slop (inclination) gamma characteristic. Further, for portion S the DSCR signal shown in FIG. 37 is LOW, and there laser is therefore driven with PWM modulation signal PW4 with a cycle period of one pixel to obtain recorded image of high resolution for each pixel.

For non-edge portion P, on the other hand, four color developing materials Y, M, C and Bk are recorded with V2 signal having been UCR/masking color processed, no edge emphasis is provided, and further linear gamma conversion characteristic of DGAM=0 is used. Therefore, recording is effected in color tone and graduation faithful to the original. Further, in portion P the DSCR signal is HIGH, and therefore PWM modulation signal PW with two-pixel cycle period is used for laser driving. Consequently, in the printer the density is expressed for every two pixels, and recorded image with high gradation can be obtained.

Figures 1, 46:
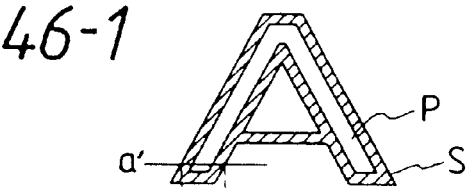
Figures 2, 46:
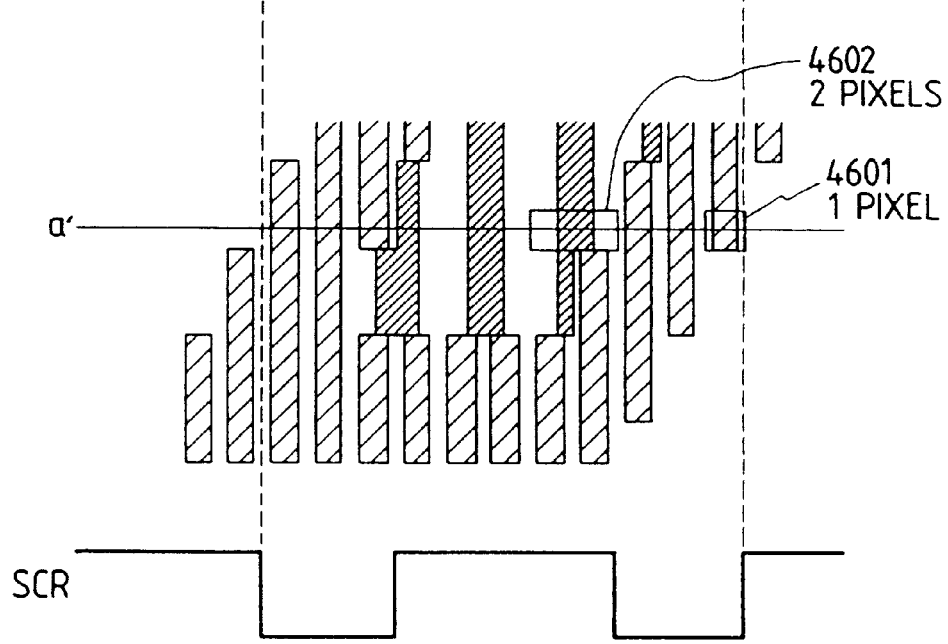

FIGS. 46-1 and 46-2 show recorded image as a result of switching of the laser drive signal between pulse width modulation signal PW for every two pixels and pulse width modulation signal for every pixel according to DSCR signal. FIG. 46-2 shows, to an enlarged scale, portion a' of the recorded image shown in FIG. 46-1 (corresponding to portion a in the original).

Here, the shaded portions are recorded according to pulse width modulation signal for each pixel as shown at 4601, and hatched portions are recorded with pulse width modulation signal for every two pixels as shown at 4602. While the laser beam scans section a', SCR signal corresponding to character edge portion is generated. Therefore, marginal portions of character are recorded with pulse width modulation singal for every pixel as shown. As a result, marginal portions of character are sharp recorded image faithful to the original and with less irregularities.

FIG. 45-2 shows recorded image corresponding to a colored character original. As shown in (e) in FIG. 26, for edge portion u in colored character recorded image, color signal V2 with making and UCR is given weak edge emphasis for individual developing colors M, C, V and Bk. In addition, the sharpness is improved with gamma conversion characteristic with slight DGAM=1. Further, the laser is driven with pulse width modulation signal with two-pixel cycle period. Therefore, the color tone (or gradation) is faithfully reproduced although the sharpness of the character edge is slightly inferior.

Further, non-edge portion P is similar to that shown in FIG. 45-1. In FIGS. 45-3 and 45-4, edge portion t is based on intermediate saturation judgement. In this portion, as shown in (c) of FIG. 26, V2 signal is used only by one half for developing colors of M, C and Y, and a signal obtained by adding together one halves of V2 and M2 signals is used for developing color Bk.

These signals are given weak edge emphasis. Further, characteristic DGAM=2 is used as gamma conversion characteristic. Therefore, the signal change of character edge is made comparatively sharp although it is not so sharp as for black character edges. As laser drive signal, pulse width modulation signal for every pixel is used for portion t only when Bk developing material is used.

Further, the color hue of edge portion is maintained by recording developing materials of Y, M and C according to pulse width modulation signal for every two pixels.

Thus, the color hue of portion t of intermediate saturation is repdocued with developing materials of Y, M and C, and the sharpness of character edge is reproduced with developing material of Bk.

In the cases of FIGS. 45-5 and 45-6, intermediate saturation and black components are generated in character edge portions due to color deviation. In this case, the processing of edge portion as described before with reference to FIGS. 45-1 to 45-4 is all cancelled by CAN1 signal. This has an effect of preventing color deviation portion to be recorded by emphasis.

When copying is done with ATLAS signal of "1", EDGE signal shown in FIG. 45 is generated even with very minute density change. For this reason, even in case of thin characters or characters in colored background, black, colored and intermediate saturation characters are recorded sharply as shown in FIGS. 45-1 to 45-4. Thus, it is possible to obtain satisfactorily modulated image.

Now, a control operation of control unit 401 for varying ATLAS and SEG signals according to the operation unit input shown in FIG. 6 will be described hereinafter.

Map Mode/Standard Mode

As described above, the map mode is one, in which thin characters and low density characters can be readily judged to be character edges. When this mode is selected, the control unit makes ATLAS signal to be "1".

In consequence, character edge judgement unit 107 detects minute density changes over the entire density range from white to black as described before with reference to FIG. 20-2. To select this map mode, the operator depresses image creation key 613 shown in FIG. 6 (block 4702 in FIG. 47). As a result, control unit 401 switches standard screen 4701 displayed on liquid crystal display unit over to image creation mode setting screen 4703, as shown in FIG. 47.

In screen 4701, designated at 4713 is copying magnification, 4714 recording sheet size, and 4715 set number of copies.

Every time the operator depresses ▼ key 608, as indicated at 4704, cursor is lowered by one step. When key 608 is depressed three times, the display screen is switched over to display 4705, and when key 608 is depressed further twice, i.e., a total of five times, cursor 4712 is moved to a preset position in the map mode.

Here, the OFF display is a dark display under bright background, and the ON display is a bright display under dark background. It is shown that the map mode is OFF (i.e., not set).

When ok key 611 is depressed, as shown at 4707, map mode=OFF is discriminated, and ATLAS signal is made "0", while switcing the display back to the standard display, as shown at 4711.

When ▶ key 610 is depressed, as shown at 4705, control unit 401 causes display of the OFF state of the map mode as bright display under dark background, as shown at 4708 and causes display of the ON state as dark display under bright background to indicate that the map mode is ON (i.e., set).

When ok key 611 is depressed at this time, as shown at 4709, control unit 401 discriminates map mode=ON for making ATLAS signal "1" and switching the display back to standard display 4711. When ◀ key 609 is depressed at 4708, control unit 401 switches the display back to the state shown at 4705, thus indicating that the map mode is turned OFF again. When copy start key 602 is depressed in the presence of display 4711, control unit 401 causes copying operation according to ATLAS signal as set above. When copy start key 602 is depressed in display state 4705 or 4708, control unit 401 changes ATLAS signal in correspondence to the map mode display state noted above and switches the display back to display 4711. Copying operation is started subsequently.

Control of SEG Signal

Now, an operation of control unit 401 to control SEG signal to character edge judgement unit 107 according to key input to the operation unit shown in FIG. 6, will now be described with reference to FIG. 48.

When asterisk key 612 is depressed, as shown at 4802, in standard screen 4801, control unit 401. changes the display on the liquid crystal display unit over to asterisk (*) mode set screen display 4803.

When the operator depresses ▼ key five times, for instance, to select character/photograph separation level 6, control unit 401 provides display 4805 and brings cursor 4815 to character/photograph separation level position. When the operator depresses asterisk key 612 or ok key 611 at this time, the display is changed to one 4807 for setting the character/photograph separation level.

The character/photograph separation level is one of nine levels as shown, and each display position corresponds to SEG signal value. When cursor 4816 is at the leftmost position, SEG=0. As the cursor position is shifted by one step to the right, the SEG signal value is increased by one. When the cursor comes to the rightmost position, SEG=8. In display state 4807 SEG=4. When ◀ key 609 is depressed twice, as shown at 4808, control unit 401 provides display 4809 and recognizes SEG=2.

When ▶ key 610 is depressed three times in display state 4807, as shown at 4810, the display is changed to one 4811, and SEG=7 is recognized.

When ok key is depressed in display states 4809 and 4811 as shown at 4812 and 4813, control unit 401 provides SEG signal value and causes display 4814 again. Even when copy start key 602 is depressed in either of display states 4807, 4809 and 4811, control unit 401 provides the SEG signal value and provides display 4814 again to start copying operation.

In case when ATLAS=0, by increasing the SEG signal value dot judgement slice level $T_4$ in the dot area (screen area) judgement unit is reduced. In this case, determination as dote (screen) takes place even with slight dot feature signal DOT0. As shown in FIG. 20-2, slice levels $T_1$, $T_2$ and $T_3$ are increased, making the character edge extraction more difficult. As a result, portions which are sharply recorded as character edges in recorded image are reduced. This means that the process is suited for recording soft photograph as a whole (preference to photograph). When the SEG signal value is reduced on the other hand, $T_4$ is increased, thus making generation of dot signal DOT more difficult and reducing $T_1$, $T_2$ and $T_3$. Thus, character edges are more readily extracted. As a result, portions which are sharply recorded as character edges in recorded image are increased, and even fine character data is sharply recorded (preference to character).

In case of ATLAS=1 (i.e., when the map mode is ON), $T_1$, $T_2$ and $T_3$ are changed according to the magnitude of SEG signal with the same tendency as in the case of ATLAS=0. For this reason, preference to photograph is obtained by increasing SEG, while preference to character is obtained by reducing SEG.

In case of ATLAS=1, DOT signal is ignored as shown in FIG. 18-1. Further, as shown in FIG. 20-2, the values of $T_1$, $T_2$ and $T_3$ are respectively reduced to be less than one half compared to the case of ATLAS=0. Therefore, finer characters and also characters in colored background due to the circuit of FIG. 18-7 are extracted.

In the above description, color disassembly signal G is used as brightness signal of color image signal. However, character edge extraction means are not limited to those dealing with color read-out singals, but the invention is also applicable to those dealing with read-out signals of monochromatic original reader without color disassembly function such as facsimile apparatus.

Second Embodiment

Character edge judgement unit 107 as noted above detects character edge according to the level difference of preceding and succeeding pixels with respect to a given (objective) pixel.

However, deviation of original image focusing lens 209 shown in FIG. 2 from the set position causes fading of the optical image focused by CCD 210. Due to this fading, there are cases when a character original can be detected as character edge and when this can not.

Figure 49A:
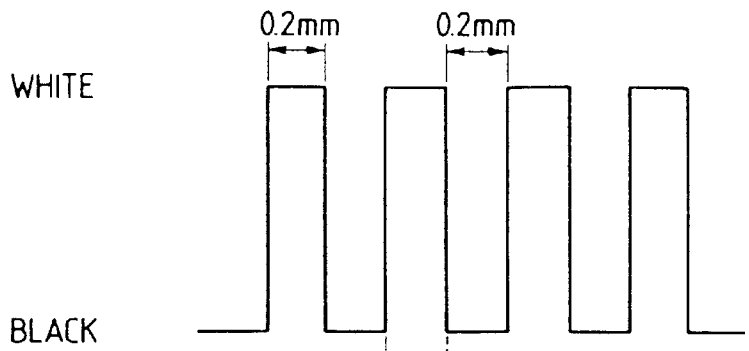
FIGS. 49A to 49D are views showing MTF of the output of CCD 201.
Figure 49B:
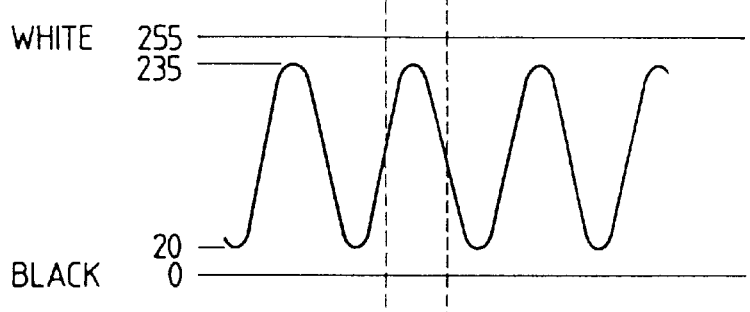
Figure 49C:
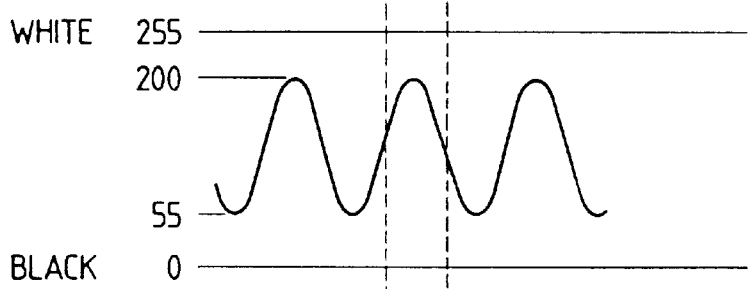

With an original, in which black and white recur at a pitch of about 0.2 mm as shown in FIG. 49A, the CCD output for G has a MTF of about 85% in the best focus state of the focusing lens used in this embodiment (FIG. 49B). In view of fluctuations at the time of mass production, the average value of MTF is about 55% (FIG. 49C).

Figure 49D:
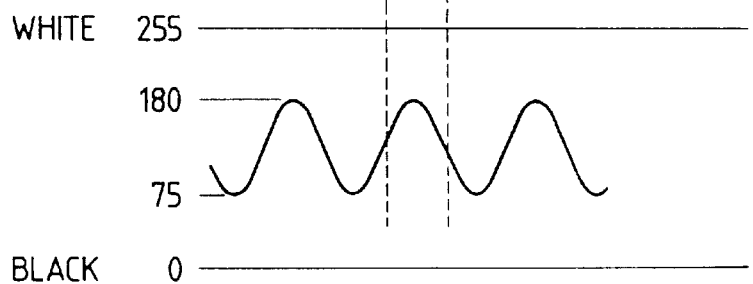

Further, the worst value of MTF due to fading amounts to about 40% (FIG. 49D).

In this embodiment the original is disassembled into 400 dots per inch 25.5 mm. Therefore, 0.2 mm corresponds to about three pixels. In other words, the pitch of recurrence of white and black in the original shown in FIG. 49A is about three pixels.

Meanwhile, in the character edge extraction in this embodiment, level difference at a distance of about 2 pixels is detected for taking level difference of pixels leftwardly, rightwardly, upwardly, downwardly and oblique with respect to a given pixel.

In this embodiment, the theorem of sampling is used to obtain disassembling at the limit. Further, using an original a three-pixel cycle slightly coarser than the two-pixel cycle, edge detection slice levels $T_1$, $T_2$ and $T_3$ as shown in FIG. 20-2 and dot area judgement slice level $T_4$ as shown in FIG. 18-6 are made variable according to MTF value of G signal in the original.

In the original shown in FIG. 49A, black has a density of 2.0. An actual original may contain characters recorded as black data with a density of 0.2. In this case, the black level is about 170, the range of black and white is 85 level and one-third of the value in case when the black data density is 2.0. In order to permit determination of black data with density of 0.2 as character, control unit 401 generates SEG signal to make the value of one-third of amplitude value W determined by measurement to be the center value of character/photograph separation level shown at 4807 in FIG. 48.

In case of MTF of 55%, W=145. Therefore, SEG=6 which is closest to $T_1$=48 with ATLAS=0 at $T_1$=W/3, is made to correspond to the center value of the character/photograph separation level.

In case of MTF of 85%, W=215. In this case, therefore, $T_1$=71. Therefore, SEG=8 which is closet to $T_1$=71 and corresponds to $T_1$=80 is made to correspond to the center value of the character/photograph separation level.

In case of MTF=40%, W=105, and $T_1$=35. Thus, SEG=4 is made to correspond to the center of the character/photograph separation level.

In this embodiment, SEG corresponding to the center value of character/photograph separation level is limited to five values of SEG=4 to SEG=8, and these values are made to correspond to respective center values of CENTER=0 to CENTER=4.

FIG. 52 shows values of SEG selected by control unit 401 in correspondence to the display scale of character/photograph separation level shown at 4807 in FIG. 48 in case of CENTER values of 0 to 4. Character/photograph level 1 shows the left end of the display scale and corresponds to the reference to character. Level 9 shows the right end of the display scale and corresponds to the preference to photograph.

Figure 53:
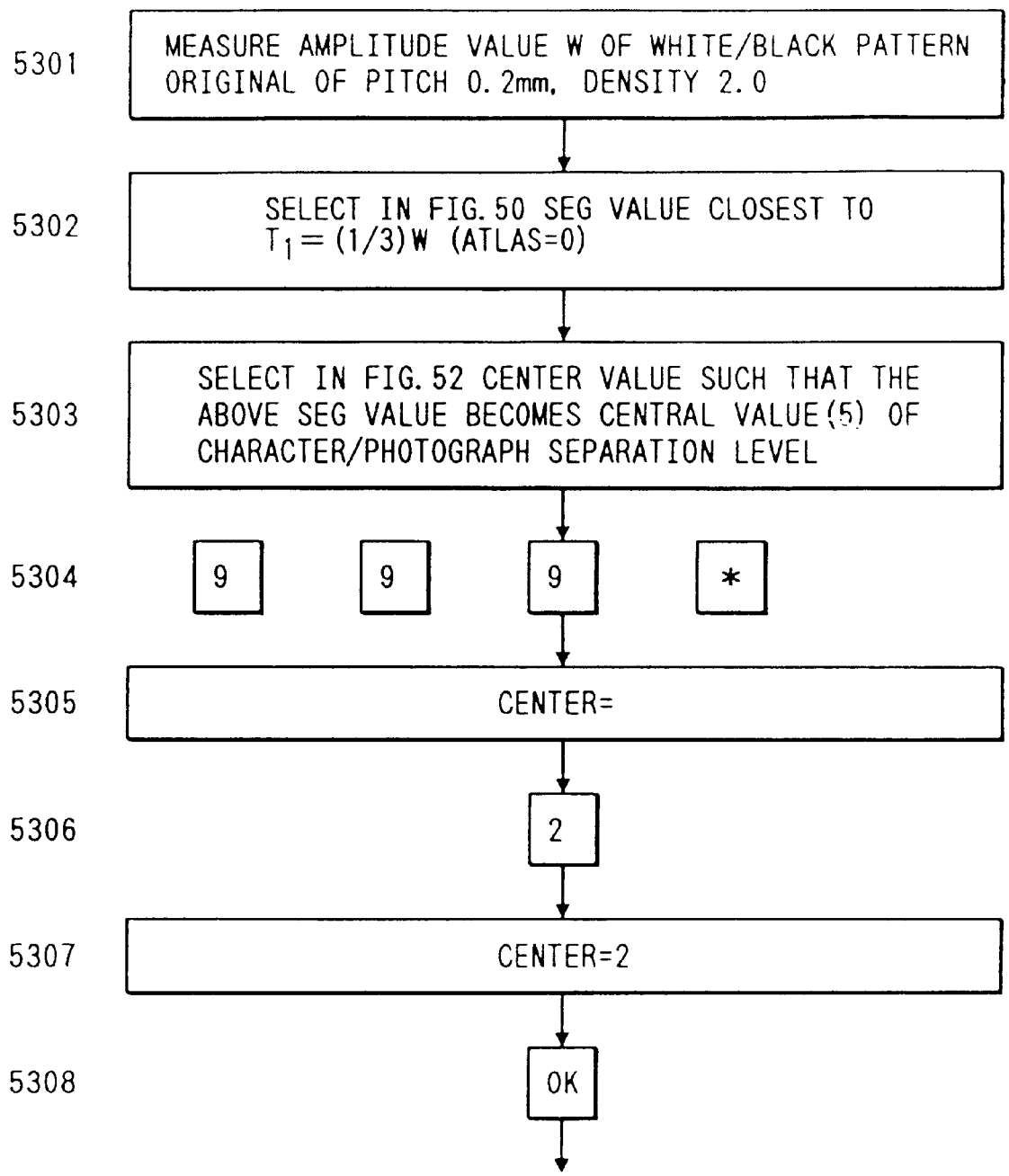
FIG. 53 is a view showing a CENTER value input flow.
Figure 54:
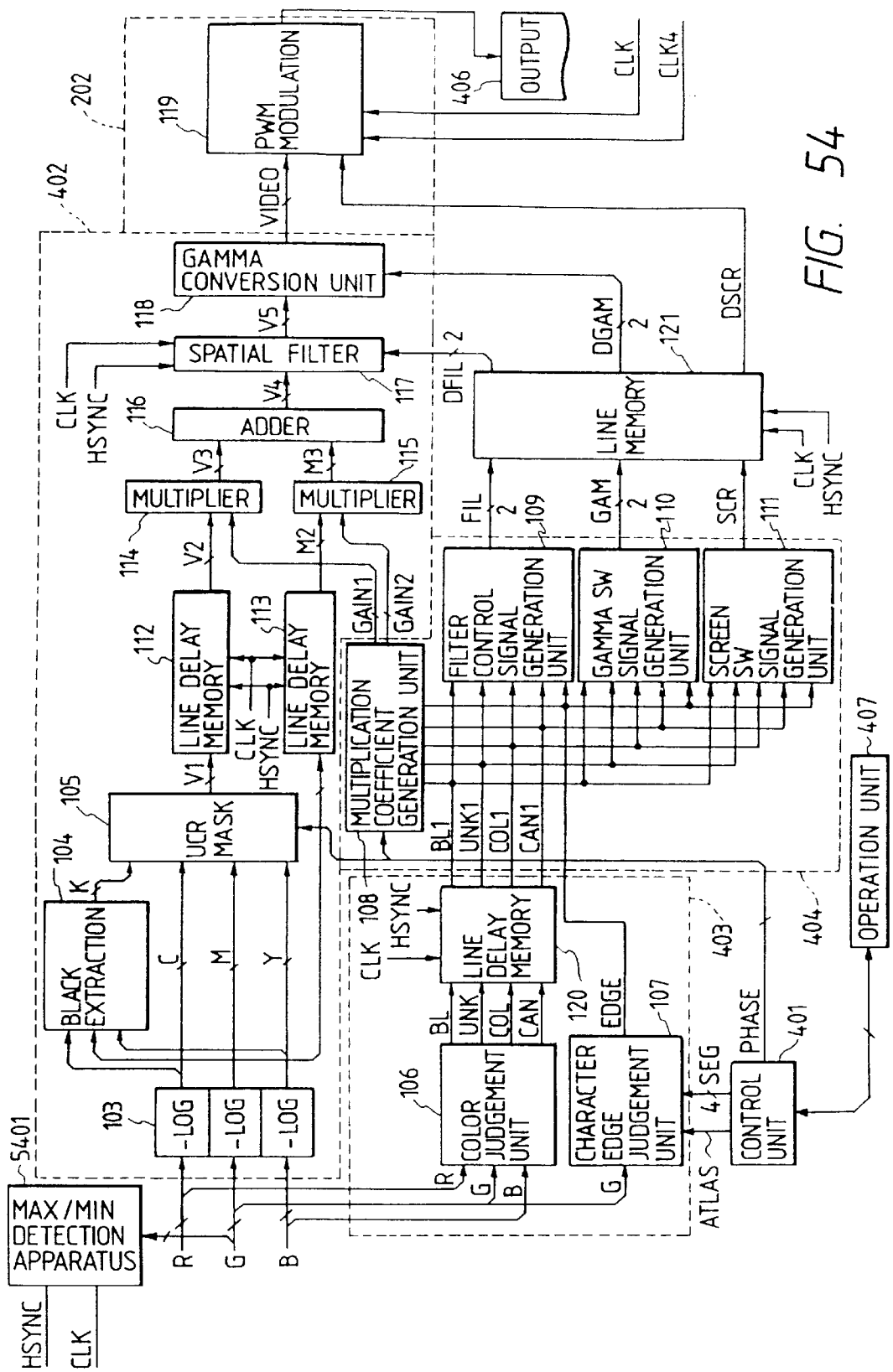
FIG. 54 is a view showing a different embodiment from that of FIG. 1.

FIG. 53 shows a flow of CENTER value input in plant or by a service man.

In this embodiment, steps 5301 to 5303 may be executed either by the operator or automatically.

When the operator inputs data from ten key set 604 and asterisk key 612, a character/photograph separation level center value input mode is set. Control unit 401 recognizes this mode input and causes display 5305 on liquid crystal display unit 601. The operator then inputs the CENTER value calculated in step 5306 (in the illustrated case "2" is input). The control unit recognizes the CENTER value input by the ten key set and provides display as shown at 5307.

The operator then provides input from  key 611, whereupon the CENTER value is stored in non-volatile memory. In the usual copying operation, control unit 401 selects a SEG value corresponding to character/photograph separation level input according to the CENTER value shown in FIG. 52. This SEG value is generated in $T_4$ generator 1830 and $T_1$, $T_2$, $T_3$ generator 2023.

The constitution of this second embodiment is the same as that of the first embodiment except for that the contents of table 1830 are as shown in FIG. 51 and that the contents of table 2023 are as shown in FIG. 50. In FIG. 50, the values of $T_1$ to $T_3$ in case of ATLAS=1 are determined experimentally such that they are greater than one half of the values in case of ATLAS=0.

The value of $T_4$ shown in FIG. 51 is substantially the same as the values of $T_1$, $T_2$, $T_3$ and $T_4$ with the same value as SEG as in the first embodiment, that is, it is determined experimentally as in the first embodiment.

As shown, in this second embodiment means is provided, which varies the character edge detection level in correspondence to the fading in the optical system. Thus, the same character edge judgement signal EDGE may be provided for apparatuses with different optical system MTF values.

In this embodiment, a memory for storing one-line signal of G signal is added to the construction shown in FIG. 1, and also means is provided for causing control unit 401 to recognize the setting of original shown in FIG. 49A on the original table by a man, thus causing G signal due to original to be stored in the memory to let control unit 401 automatically set the CENTER value shown in FIG. 53 using the maximum and minimum values of the signal values.

As has been shown, with this embodiment, by the provision of means for varying the character edge judgement level, it is possible to suppress generation of discontinuity of density in photograph recorded image or sharp high density dots due to erroneous determination of photograph original as character original.

Further, it is possible to obtain clear recording of low density character data and thin character data.

It is further possible to clearly record characters in colored background such as in maps and characters in dots (screen).

It is yet further possible to make up for lack of uniformity of character edge judgement due to fluctuations of the MTF of original reading/focusing lens with different apparatuses.

Third Embodiment

Areas which are not judged as EDGE by character edge judgement unit 107 in the first embodiment include dot (screen) originals as shown at 1903 in FIG. 19. If such dot original is read pixel by pixel by the CCD, moire fringe is generated due to CCD's pixel regularity and regularity of the dot original. In order to prevent this, this embodiment is constructed such that FILTER circuit 117 provides smoothing for an original area not determined as character edge (i.e., an area which is highly possibly a dot or screen). As smoothing filter is used one as shown in FIG. 41, which adds together ½ of a given pixel and ⅛ of the four neighbor pixels.

Figure 42:
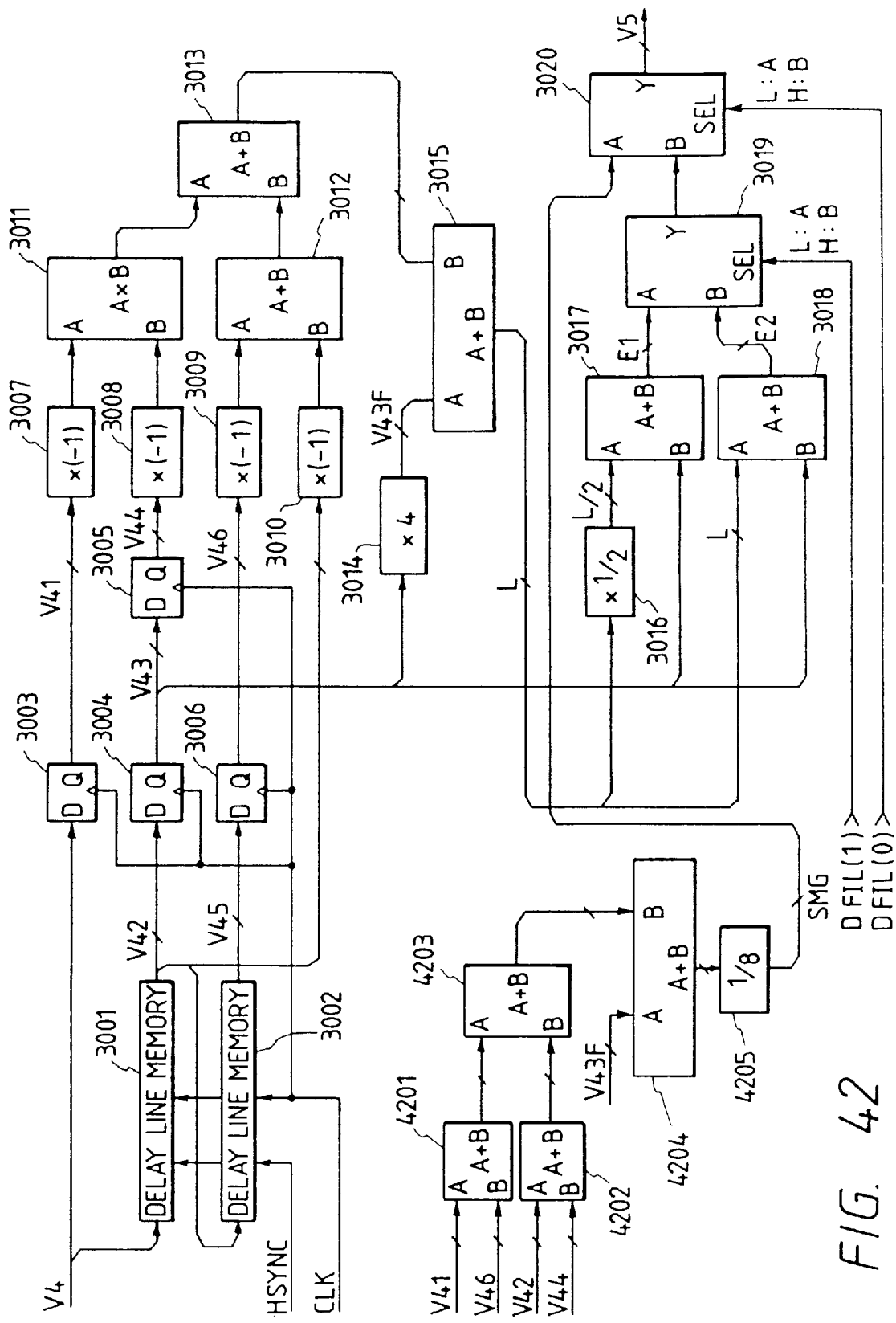
FIG. 42 is a view showing a different example of filter circuit shown in FIG. 1.

FIG. 42 shows FILTER circuit 117 in this embodiment in detail.

Figure 41:
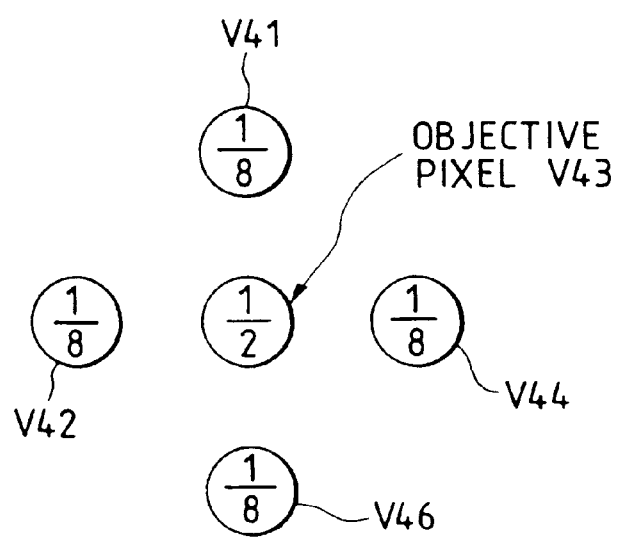
FIG. 41 is a view showing positional relation between given pixel and neighboring pixels.

In this instance, in lieu of given pixel V43 selected under condition of entry (c) in FIG. 32, SMG signal obtained from smoothing filter shown in FIG. 41 is selected and supplied as input A to selector 3020.

Adders 4201 to 4203 add signals V41, V42, V44 and V46 of the four pixels neighboring the given pixel, and adder 4204 adds together the resultant sum and signal V43F obtained by multiplying signal V43 of the given pixel by 4. Bit shift type multiplier 4205 multiplies the result by ⅛ to obtain smoothing filter signal SM.

Fourth Embodiment

In this embodiment, only Bk (black) is used as developing color, for which pulse width modulation signal of one pixel cycle period is used in the PWM modulation unit shown in FIG. 1.

As mentioned before in connection with the first embodiment, black character edges are required to be sharp character edges, while in the case of colored character edges the reproduction of the color hue of original is more important.

Meanwhile, toners of M, C and Y are not present in black character edge portion, as shown in FIG. 25-1. Further, Bk toner is hardly present in colored characters due to the action of UCR circuit 105. Further, Bk toner and also M, C and Y toners are present adequately in intermediate saturation character edge portion, as shown in FIG. 25-2.

With the above features taken into considerations, in this embodiment the character edge judgement unit is adapted such that it can use pulse width modulation signal PW4 with one pixel cycle period for laser driving only for Bk toner.

With this arrangement, sharpness comparable to that in case of the first embodiment can be realized for black character edges, in which color components are intrinsically not much. In addition, colored character edges with some color components are recorded sharply for the sole Bk component. Further, gradation property of the color components can be maintained to guarantee satisfactory color reproducibility.

Figure 43:
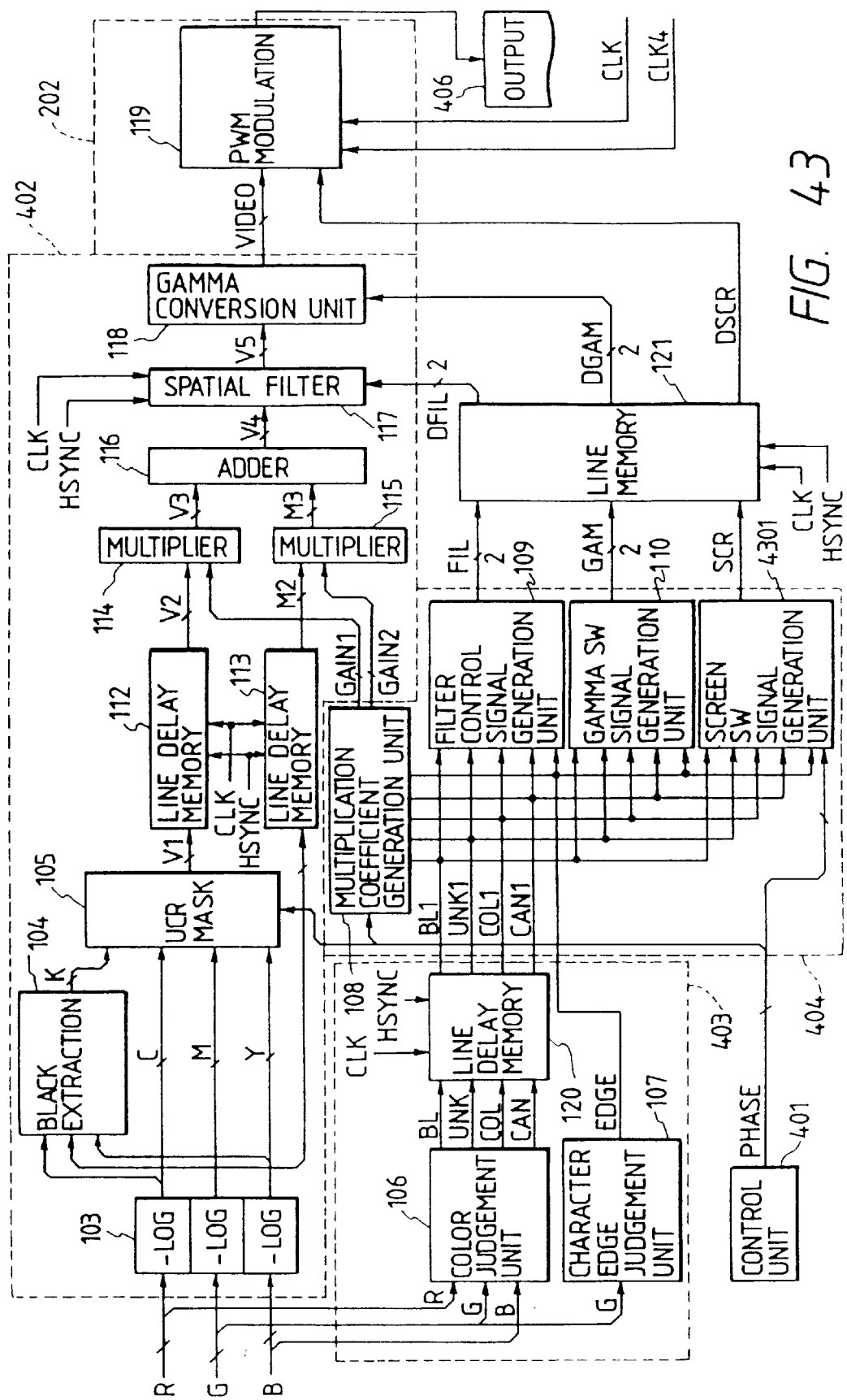
FIG. 43 is a view showing a different example of color processing circuit showing filter shown in FIG. 42.
Figure 44:
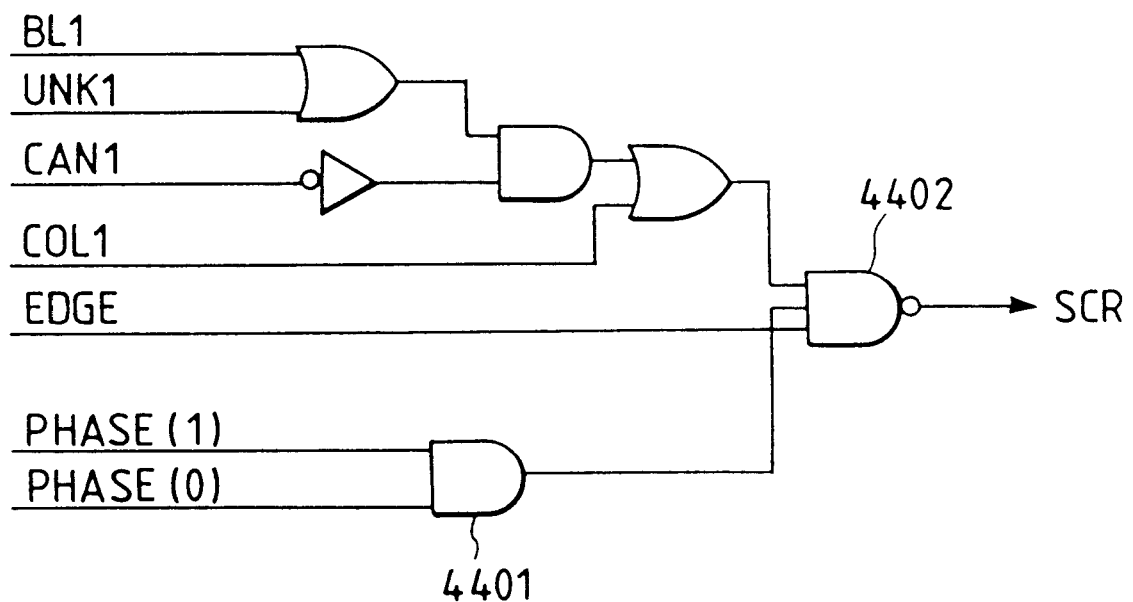
FIG. 44 is a view showing the internal construction of screen switching signal generation unit 4301 shown in FIG. 43.

FIG. 43 shows a color processing circuit used in this embodiment. This circuit corresponds to the circuit shown in FIG. 1, and PHASE signal is supplied to screen switching signal generation unit 4301. FIG. 44 shows details of screen switching signal generation unit 4301 in this embodiment in detail.

Gate 4401 provides an output permission signal to NAND gate 4402 by decoding that 2-bit PHASE signal is "3", i.e., the developing color is Bk. Other gates shown in FIG. 44 are the same as those in FIG. 40. Thus, SCR signal is "0" only when the developing color is Bk for character edge portion.

As described above, according to the invention the character edge judgement and saturation judgement of original are executed simultaneously, whereby it is possible while maintaining the color hue of colored character portion to improve the sharpness of color-free character portion, remove color impurity in black character portion and suppress moire fringe of dot original portion while improving the sharpness of character portion and increasing the amount of black color material of black character portion to permit clear reproduction of black character.

Fifth Embodiment

It has been described in connection with the first embodiment that intermediate saturation judgement signal UNK and black judgement signal BL are generated due to color bleeding around colored character due to scanning speed fluctuations and focusing magnification errors.

According to the invention, it is intended to find out black portions and intermediate saturation portions of the original and use an increased amount of black toner for recording these portions, thus obtaining sharper recording of black or intermediate saturation image.

Therefore, if UNK or BL signal is generated due to erroneous judgement caused by color bleeding as noted above, a great amount of black toner is used for colored character edge portions of recorded image, thus resulting in an unseemly image.

To prevent this, in the first embodiment CAN signal is generated through detection of the presence of small light amount color signal (COL) around a given pixel.

In this case, if the given pixel is of intermediate saturation or in case of black signal, it is determined to be due to color bleeding around colored character, thus preventing use of a great quantity of black toner through a process as shown in the table of FIG. 26.

In the first embodiment G signal is used for the detection of light quantity signal. However, a G signal provided in response to the reading of a green color original indicates a maximum light quantity value like the case of a white original. Therefore, with color deviation portions generated around a green character, the G signal has reduced signal value compared to the green character portion, and CAN signal is generated. As a result, a great amount of tonor is used around green character in recorded image, thus resulting in deterioration of recorded image.

Figure 55:
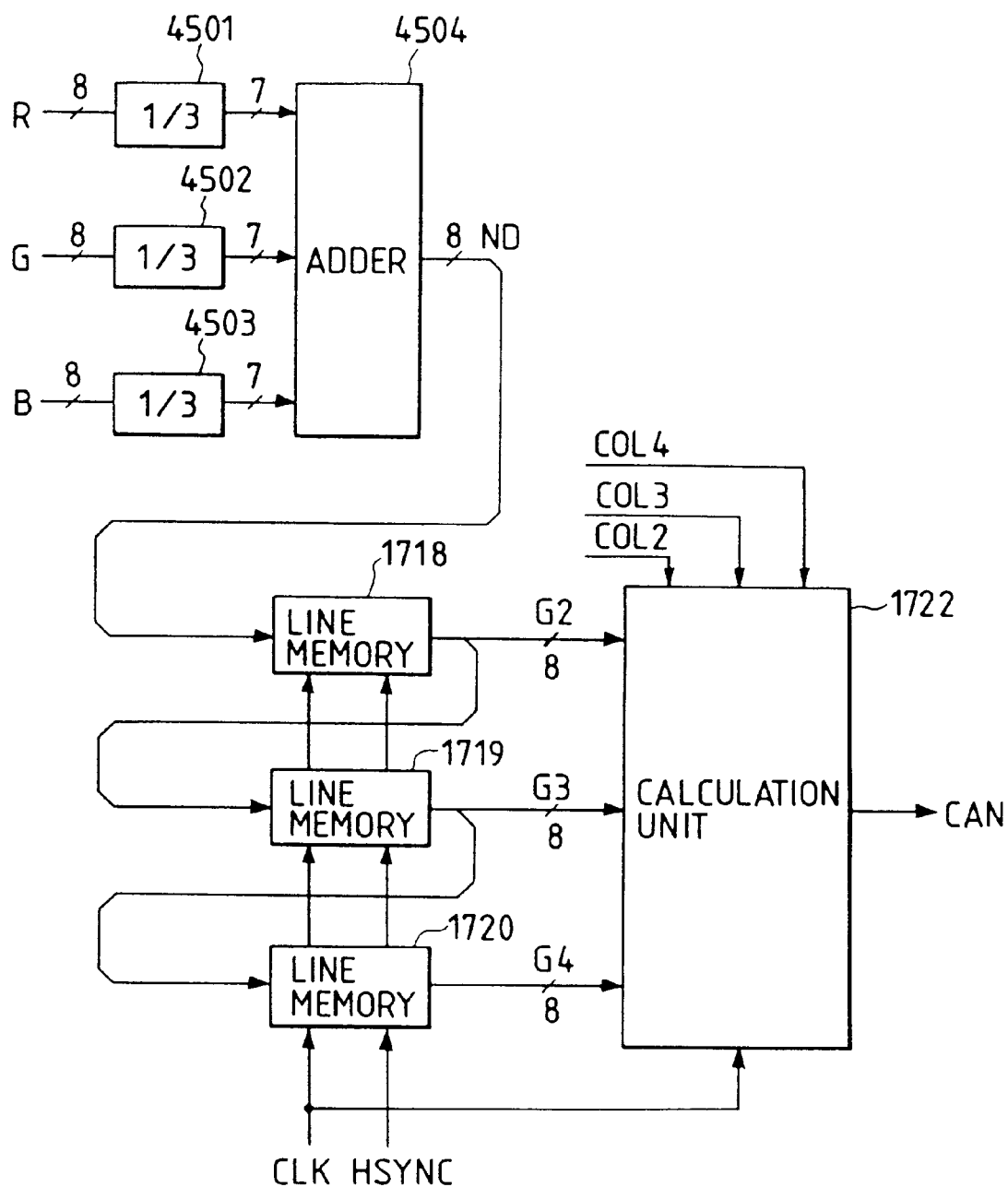
FIGS. 55 and 57 are block diagrams showing different examples of the construction of FIG. 17-1.

In this embodiment, a light quantity signal independent of color hue is used in lieu of G signal for the detection of light quantity signal. FIG. 55 shows a CAN signal generation unit in this embodiment.

FIG. 55 corresponds to FIG. 17-1 in case of the first embodiment. In this instance, ND signal is generated in lieu of G signal in FIG. 17-1. Three line memories 1718 to 1720 each delays ND signal by one line to generate G2, G3 and G4 signals, respectively. These G2, G3 and G4 signals are supplied to calculation unit 1722 same as that in the first embodiment to generate the CAN signal.

The ND signal represents the brightness of original independent of the color hue, and it is generated by supplying the outputs of multipliers 4501 to 4503, which provide ⅓ of respective color disassembly signals R, G and B of the original, to adder 4504. Since the ND signal is thus a sum of ⅓ of each of signals R, G and B, it has all color components.

By using this ND signal as brightness singal, it is possible to generate CAN signal from calculation unit 1722 for color bleeding generated around colored characters of all color hues.

Consequently, as shown in the table of FIG. 2b, intermediate saturation and black judgements generated due to color bleeding are all cancelled to eliminate the possibility of use of black toner for areas around colored characters.

Sixth Embodiment

Figure 56:
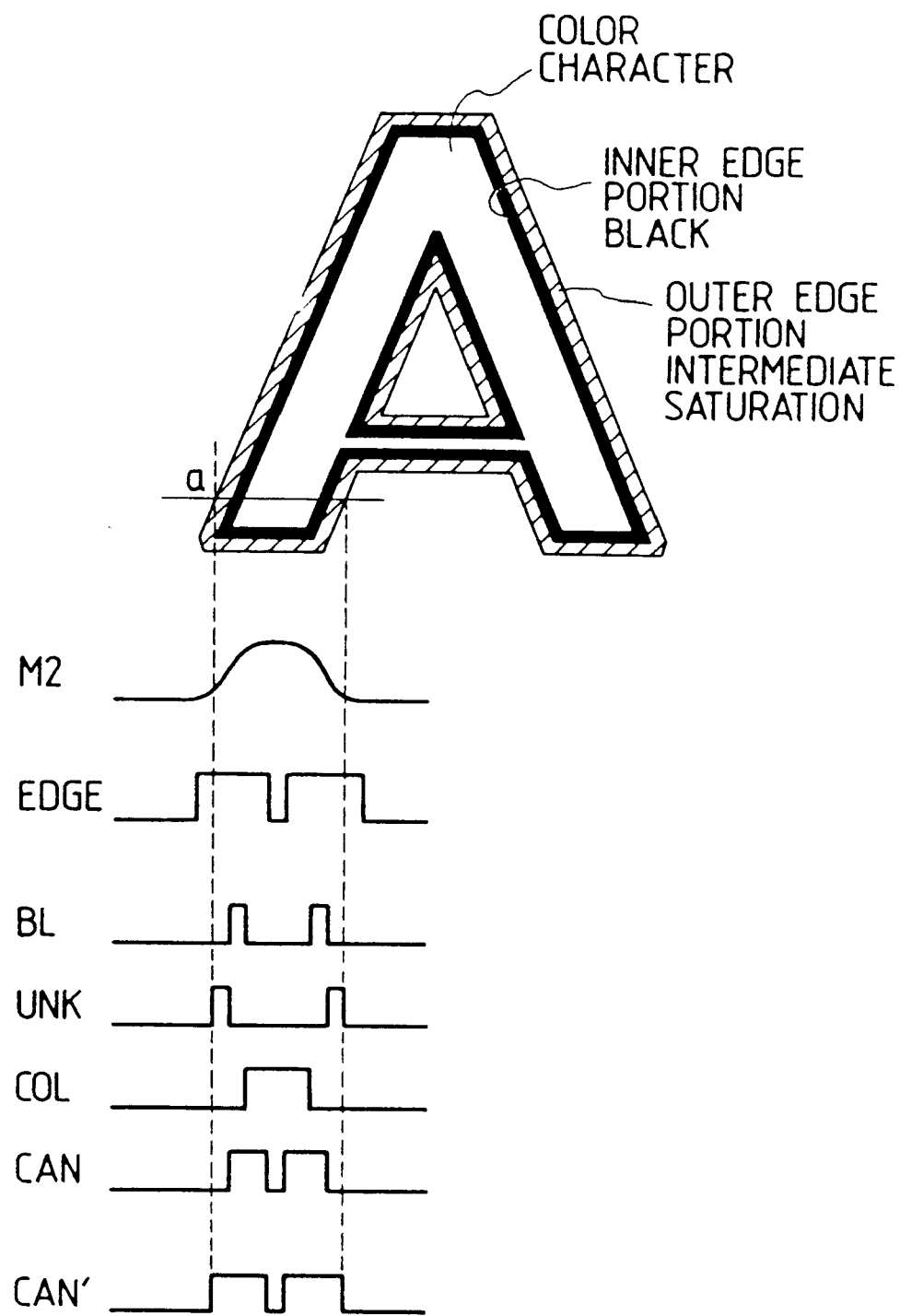
FIG. 56 is a view for explaining the operation of the embodiment shown in FIG. 57.

FIG. 56 shows an example, in which color bleeding when color disassembly signal is read out covers two pixels. In the Figure, black signal due to color deviation at the time of reading is generated for one pixel in the edge of colored character. Further, intermediate saturation is generated due to slight color deviation around the black signal.

In the embodiments of FIGS. 1 and 2, it is possible to generate CAN signal for cancelling intermediate saturation judgement or black judgement up to one pixel around pixel, with which color judgement signal COL is generated. However, UNK signal two pixels outside COL signal shown in FIG. 56 remains for CAN signal is not generated. Consequently, CAN signal is generated as well for portions, for which black judgement signal BL is generated. Thus, developing colors M, C and Y as well as developing color Bk are recorded with color signal $V_2$ generated from UCR/MASK circuit 105, as shown in FIG. 26. On the other hand, for portion, for which intermediate saturation signal UNK is generated, CAN signal is not generated. Therefore, only one half of color signal $V_2$ generated in UCR/MASK circuit 105 is used for developing colors M, C and Y, and density signal M2 is provided for developing color Bk. Therefore, there are cases when a greater amount of Bk toner is used for outer intermediate saturation portion than inner black portion, and in such cases recorded image is formed, in which two-dot black edges are present around colored character.

In the sixth embodiment, CAN signal is generated, which cancels BL and UNK signals generated for two dots around the above color judgement signal. FIG. 51 shows an involved structure.

This Figure is a substitute for FIG. 17-3 in the first embodiment. Like the fifth embodiment, ND1 signal, which represents the average value of R, G and B signals, is provided from adder 4504. Line memories 4701 to 4704 each delays the light quantity signal ND1 by one line to provide light quantity signals ND1, ND2, ND3, ND4 and ND5 for five lines. This light quantity signal is supplied to calculation unit 4705. At the same time, 5-line color judgement signals COL1, COL2, COL3, COL4 and COL5 corresponding to the respective light quantity signals are also supplied to calculation unit 4705.

Figure 58B:
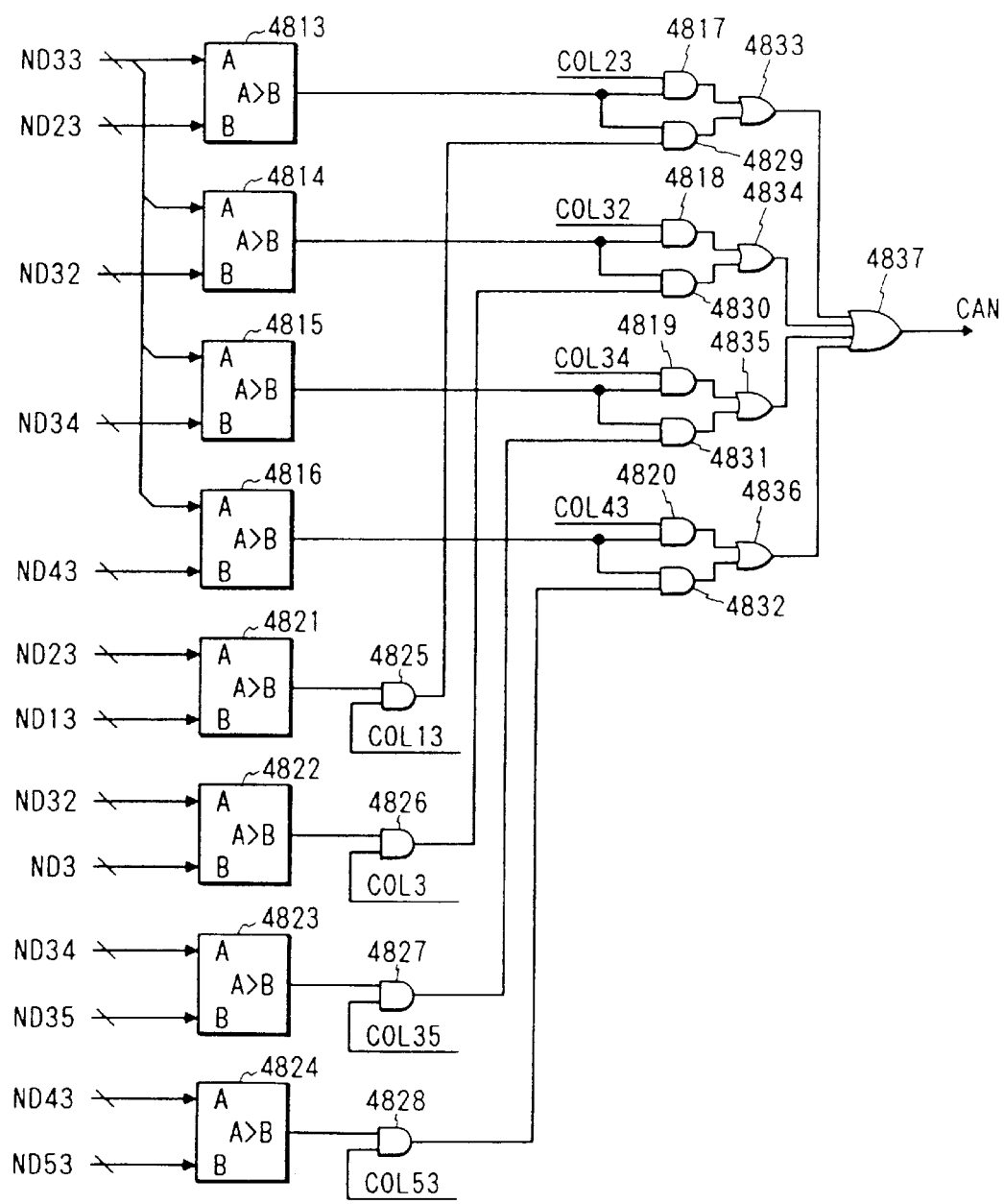

FIG. 58 shows calculation unit 4705 in detail.

The light quantity signals ND1 to ND5 and color judgement signals COL1 to COL5 for five lines are delayed by four clocks at the most by flip-flops 4801 to 4812. Here, ND33 and COL33 are of the given pixel. Like the case of FIG. 17-2, comparators 4813 to 4816 and AND gates 4817 to 4820 execute judgement as to whether there is a pixel with less light quantity (higher density) than a given pixel and judged to be a colored pixel around the given pixel. This completes a check concerning one pixel around the given pixel.

Subsequently, comparators 4812, 4822, 4823 and 4824 and AND gates 4825 to 4828 execute a check as to whether there is a pixel with less light quantity value and judged to be a colored pixel one pixel outwardly of the pixel one pixel outwardly of the given pixel. This check is done for checking whether there are two pixels having a color deviation feature outwardly of the given pixel.

Further, light quantity levels of the given pixel and a pixel one pixel outwardly of the given pixel are compared, and if the given pixel is higher in the light quantity value (i.e., lower in density), the given pixel is liable to be of erroneous judgement due to influence of color judgement pixel two pixels outwardly of it.

To check this, AND gates 4818 to 4832 AND the outputs of AND gates 4825 to 4828 and outputs of comparators 4813 to 4816.

For example, comparator 4821 compares ND23 of pixel one pixel above the given pixel and ND13 of pixel further one pixel above. If ND13 is lower in the light quanatity value (i.e., higher in density) than ND23 and concerns a color judgement pixel (COL13=1), ND23 is a color deviation pixel of colored pixel ND13, and AND gate 4825 provides output of "1".

If ND23 is lower in the light quantity value than the given pixel ND33 in addition, the given pixel ND33 is a color deviation pixel two pixels outwardly of colored pixel ND13, and AND gate 4829 provides output of "1".

The outputs of AND gates 4817 to 4820 indicating the presence of a high density colored pixel one pixel outwardly of the given pixel and outputs of AND gates 4829 to 4832 indicating the presence of a high density colored pixel two pixels outwards are ORed by OR gates 4833 to 4837, whereby CAN signal is provided.

The CAN signal is dealt with in the same way as CAN signal in FIG. 1 and is used for cancelling BL and UNK signals two pixels outwardly of COL signal.

As described above, with this embodiment it is possible to distinguish color bleeding component contained around color edge portion of original and signal of color-free or intermediate saturation.

In consequence, at the time of image recording color-free edge portions can be recorded sharply by using a greater amount of black toner, while there is no need of using unnecessary black toner for color edge portion, thus permitting high saturation image recording.

Further, particularly with this embodiment a signal obtained by combining R, B and G signals is used for the judgement of character edge portion, and therefore it is possible to effectively prevent black color bleeding around a sole green color character, for instance.

Seventh Embodiment

In the embodiment shown in FIG. 42, a smoothing process is performed for all areas other than character edge areas. The smoothing process, although it has an advantage of alleviating dot moire (or screen moire), has a demerit of sacrifice in the sharpness of image.

Figure 57:
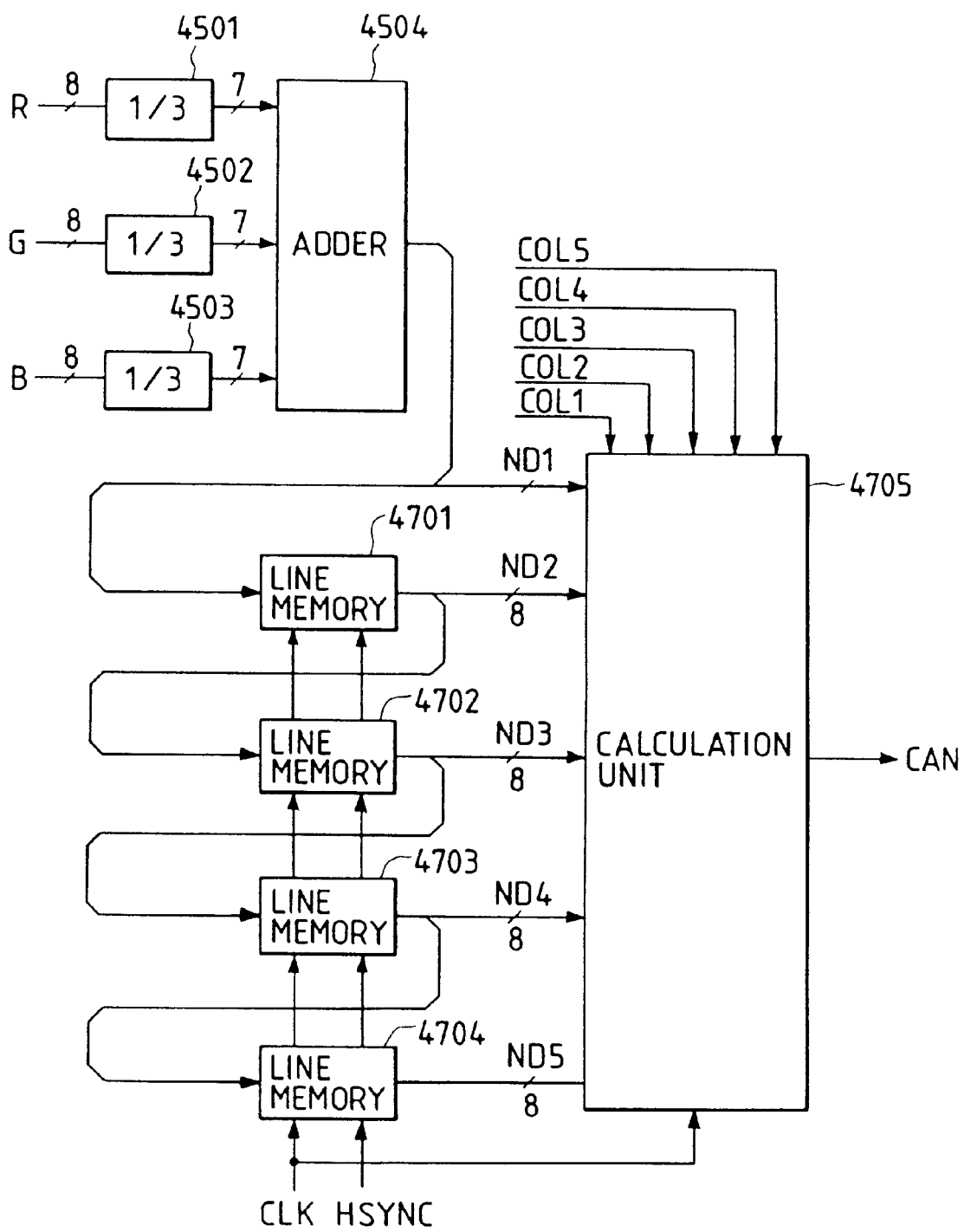
Figure 59:
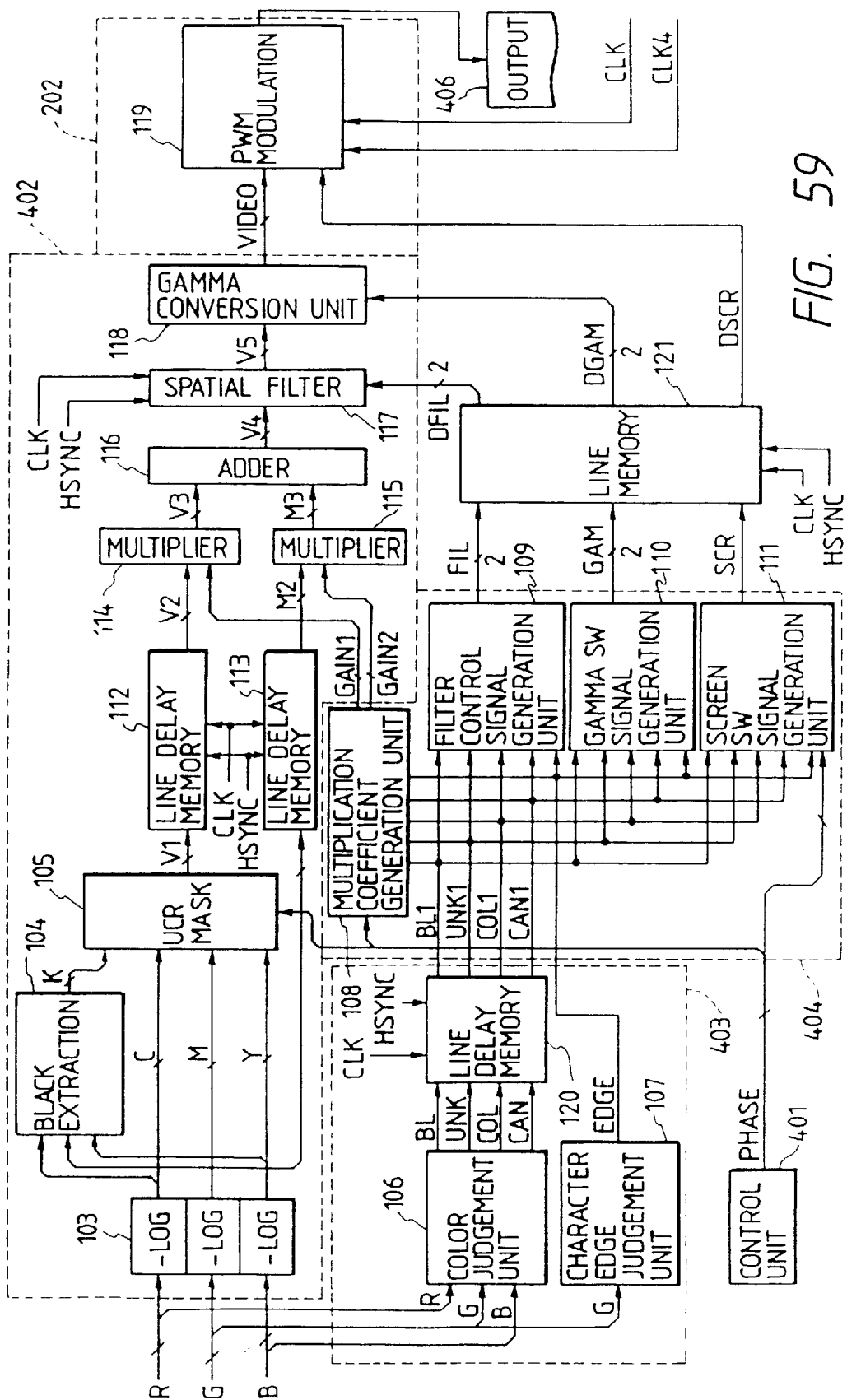
Figures 60, 61:
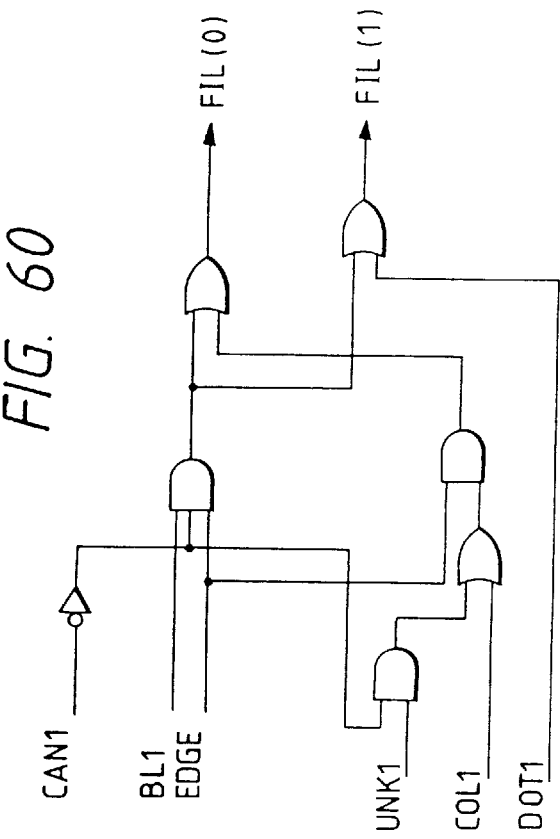
Figure 62:
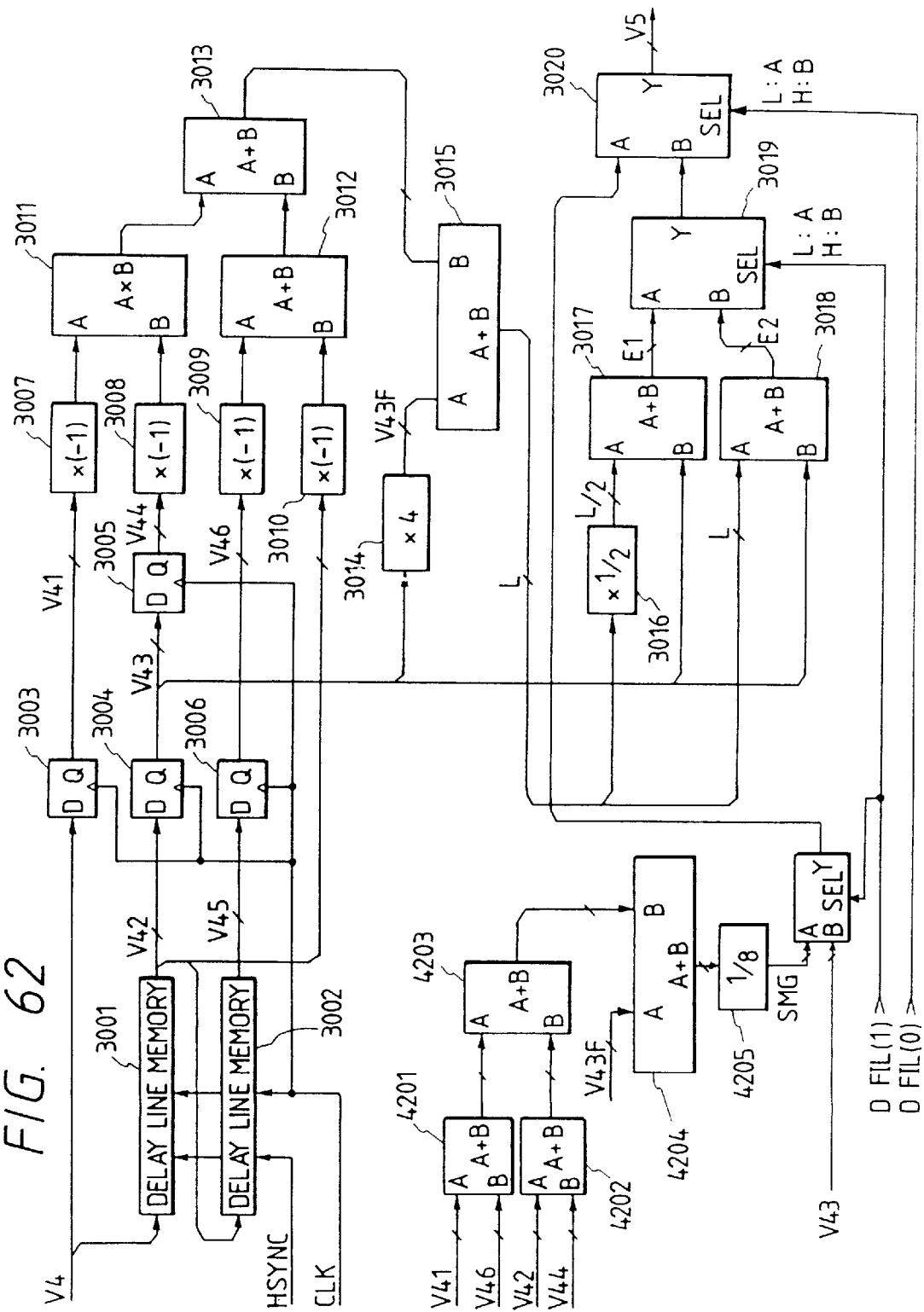

The seventh embodiment seeks to improve this difficiency. As shown in FIG. 59, character judgement unit 107 supplies dot area signal DOT1 along with character edge area signal EDGE to filter control signal generation unit 107. As shown in FIGS. 60 and 61, four areas are provided, and FIL(0) and FIL(1) are provided for them in respective combinations. FIGS. 57 and 58 show modification of the circuit of FIGS. 31 and 32. Filter 117 has four different characteristics as shown in FIG. 62, and loss of sharpness of image other than dots is prevented by providing smoothing for dots alone.

Eighth Embodiment

In the preceding embodiment, only character edges are provided in the single black color by considering the reproduction of black character.

However, it is possible to provide black dots in the single black color for faithful reproduction of the color hue (or gray balance) of black dots. FIG. 60 shows multiplification factor in this case. More specifically, in the embodiment of FIG. 26 by providing single black color in case of DOT="1" and BL1="1" as shown in (i) it is possible to provide black character and black dot image in the single black color.

The above embodiments of the invention concerned with color copier. However, the invention is applicable not only to such color copier but also to other apparatuses, for instance a sole scanner or a sole image processor without any scanner section.

Further, in the above embodiments the image processing is switched by switching spatial filter, switching or switching screen (line number). However, the invention is applicable to each of such processes as well.

Further, while the above description concerned an electrophotographic color printer, this is by no means limitative, and the invention is applicable as well to other printers, for instance a thermal printer, an ink jet printer and a bubble jet printer.

Nineth Embodiment

Now, a nineth embodiment of the invention will be described. This embodiment is adapted to permit independent setting of sharpness in each of developing colors of Y (yellow), M (magenta), C (cyan) and Bk (black) and selection of suitable sharpness value for each of the colors M, C, Y and Bk.

Further, it is permitted to permit independent setting of character sharpness and photograph sharpness and selection of appropriate sharpness for character portion and photograph portion.

Further, in view of the above problems, character edge areas are selected from image signal having density from continuity of density changes in the given pixel and neighboring pixels, dots are detected separately from the character edge areas from the presence of density changes in different directions around the given pixel, and the process is switched selectively in a mode selected according to the result of detection and will of the operator.

Figure 67:
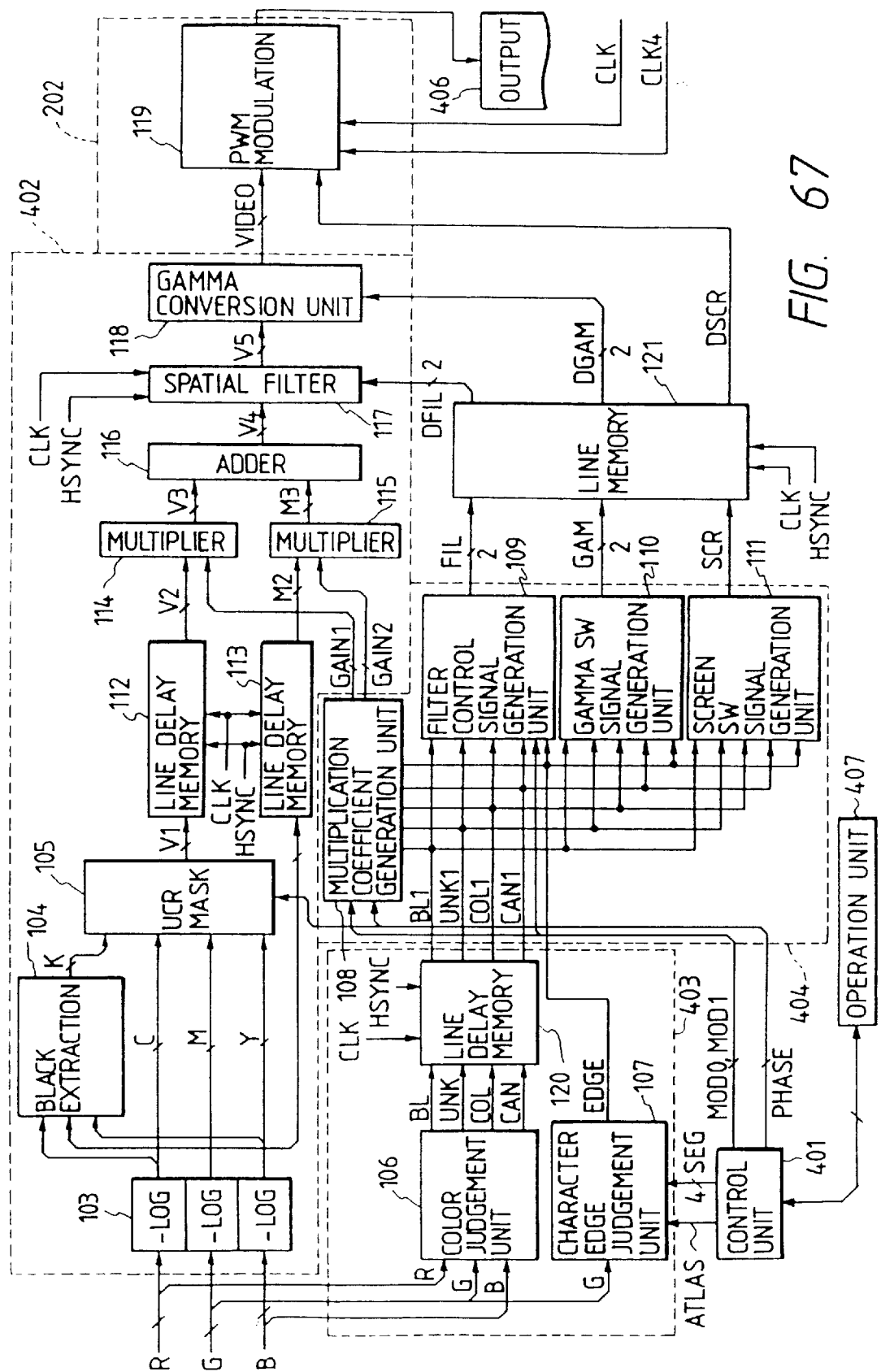
FIG. 67 is a block diagram showing a nineth embodiment of the invention.

FIG. 67 is a block diagram showing this embodiment. The illustrated circuit is substantially common to the circuit of the first embodiment shown in FIG. 1, and common circuit components are not described. As will be described later, this embodiment is different from the embodiment of FIG. 1 in that MOD0 and MOD1 signals are supplied from control unit 401 to multiplification factor generation unit 108, filter control signal generation unit 109 and screen switching signal generation unit 111.

Description of Operation Unit

Figure 64:
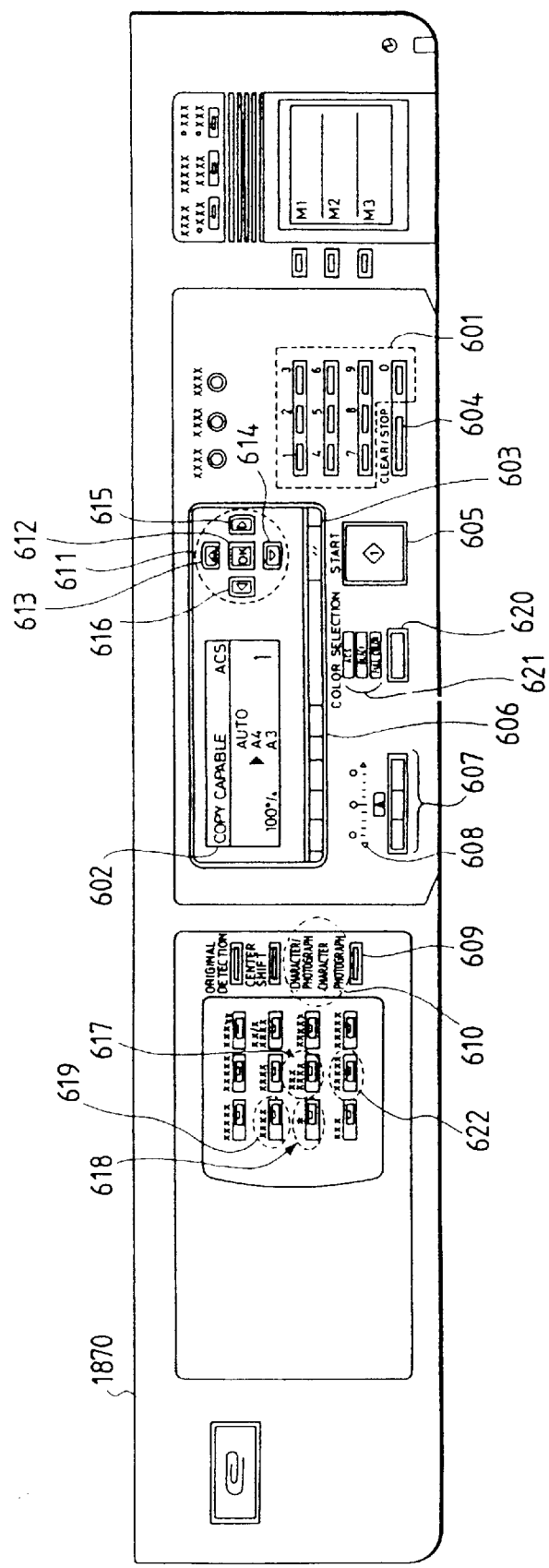
FIG. 64 is a perspective view showing operation unit.

FIG. 64 shows details of operation unit 1870 shown in FIG. 6.

Reference numeral 601 designates a ten key set for inputting numerals "0" to "9" for providing such data as number of copies and zooming magnification.

Reference numeral 602 designates a liquid crystal display panel for informing the present mode of machine, copying sheet size, copying magnification, etc. to the operator.

Reference numeral 603 designates a reset key for initializing the prevailing mode. This key is used when desired setting fails to be obtained, for instance.

Reference numeral 604 designates a clear/stop key. It is used to stop operation while the machine is operative and clear numbers set by the ten key set when the machine is inoperative.

Reference numeral 605 designates a copy start key. It is used for starting the copying operation.

Reference numeral 606 is a sheet size selection key. The selected sheet size (for instance A4 size) is displayed on display panel 602.

Reference numeral 607 designates a density key for controlling the copy density from lower to higher values. Reference numeral 608 designates a display consisting of nine LEDs for displaying the prevailing density level.

Reference numeral 609 designates a mode selection key for selecting character mode, photograph mode and character/photograph mode according to the kind of original.

Reference numeral 610 designates LEDs indicating that the character mode, photograph mode and character/photograph mode are selected, respectively. Of these three LEDs, only one is turned on.

Reference numeral 611 designates a control key set consisting of ⌧ key 612, upper arrow ⌧ key 613, lower arrow ⌧ key 614, right arrow ⌧ key 615 and left arrow ⌧ key 616. This key set is used when setting each mode by moving the cursor on display panel 602.

Reference numeral 617 designates an image create key used when it is desired to provide a processed image or when it is desired to adjust various image processing conditions.

Reference numeral 618 designates an asterisk key use for determining magnification in conformity to the sheet size and also for registering the copy mode as will be described later.

Reference numeral 619 designates a color mode key for designating such color modes as four-color (Y, M, C and Bk color) mode, three-color (Y, M, C color) mode and monocolor mode.

Reference numeral 621 designates a color selection display unit, and a lamp indicating a color mode selected by the color selection key is turned on.

Reference numeral 622 designates an area designation key used for area designation using area designation means such as an editor.

Sharpness

In this embodiment, it is possible to automatically judge or manually set character portion and photograph portion with respect to an original and designate sharpness and smoothness of image for each judged portion. The function is hereinafter referred to as "character sharpness" and "photograph sharpness". FIG. 65 shows method of designation and changes in the display panel. Specifically, the "sharpness" can be obtained by edge emphasis, and "smoothness" can be obtained by smoothing.

Reference numeral 701 designates a standard screen display. Usually, this state is displayed on display panel 602.

When image create key 617 is depressed, various image create functions are displayed. Then, by depressing ▽ key 614 twice, the cursor in the display is progressively lowered, for instance to a row of character sharpness as shown at 703, thus permitting designation of character sharpness. By depressing ▷ key 615 and ◁ key 616 in this state, it is possible to designate five different character sharpness from weak level (1) to strong level (5).

For instance, in state 703 the character sharpness is shown by center value (3), but by depressing ▷ key state 704 is provided, in which the character sharpness is represented by "4". By depressing ◁ key in this state, state 703 is provided again.

When ▽ key is depressed in state 703 or 704, the cursor is shifted to the row of photograph sharpness to permit designation of the photograph sharpness with the ▷ and ◁ keys like the character sharpness (705, 706). In each of cases 703 to 706, by depressing ⌧ key 612 standard screen display 701 is displayed again.

Description of Original Mode

FIG. 66 shows various modes.

In character mode, importance is attached to obtain clear copying of character original. In photograph mode, importance is attached to the color of original or graduation for really reproduction of photograph (including dots or screen).

In character/photograph mode, characters and photographs in an original containing such characters and photographs (including dots) are separated for clear reproduction of characters and really reproduction of photographs.

In almost all originals, when copied in the character/photograph mode, photograph portions are copied really (realistically), while character portions are copied clearly. With some originals, however, some difficiencies are found. A first difficiency is that with thin and intricated characters character edges are grasped difficultly and are liable to be grasped as part of photograph (dots or screen), thus resulting in failure of clear reproduction.

A second difficiency is that sharp edge portions in photograph are liable to be recognized as characters, thus resulting in unnatural edge emphasis to obtain unseemly image.

A third difficiency is that an image with characters provided on a dot background as in a map is liable to be detected as dot image to result in failure of clear copying of characters.

The first difficiency noted above is coped with by copying in the character mode with character sharpness adopted for all cases. The second difficiency is coped with in the photograph mode with photograph sharpness adopted for all cases. The third difficiency can be coped with the map mode as noted above. It is possible to obtain more satisfactory copy by selecting appropriate modes according to originals.

Figure 68:
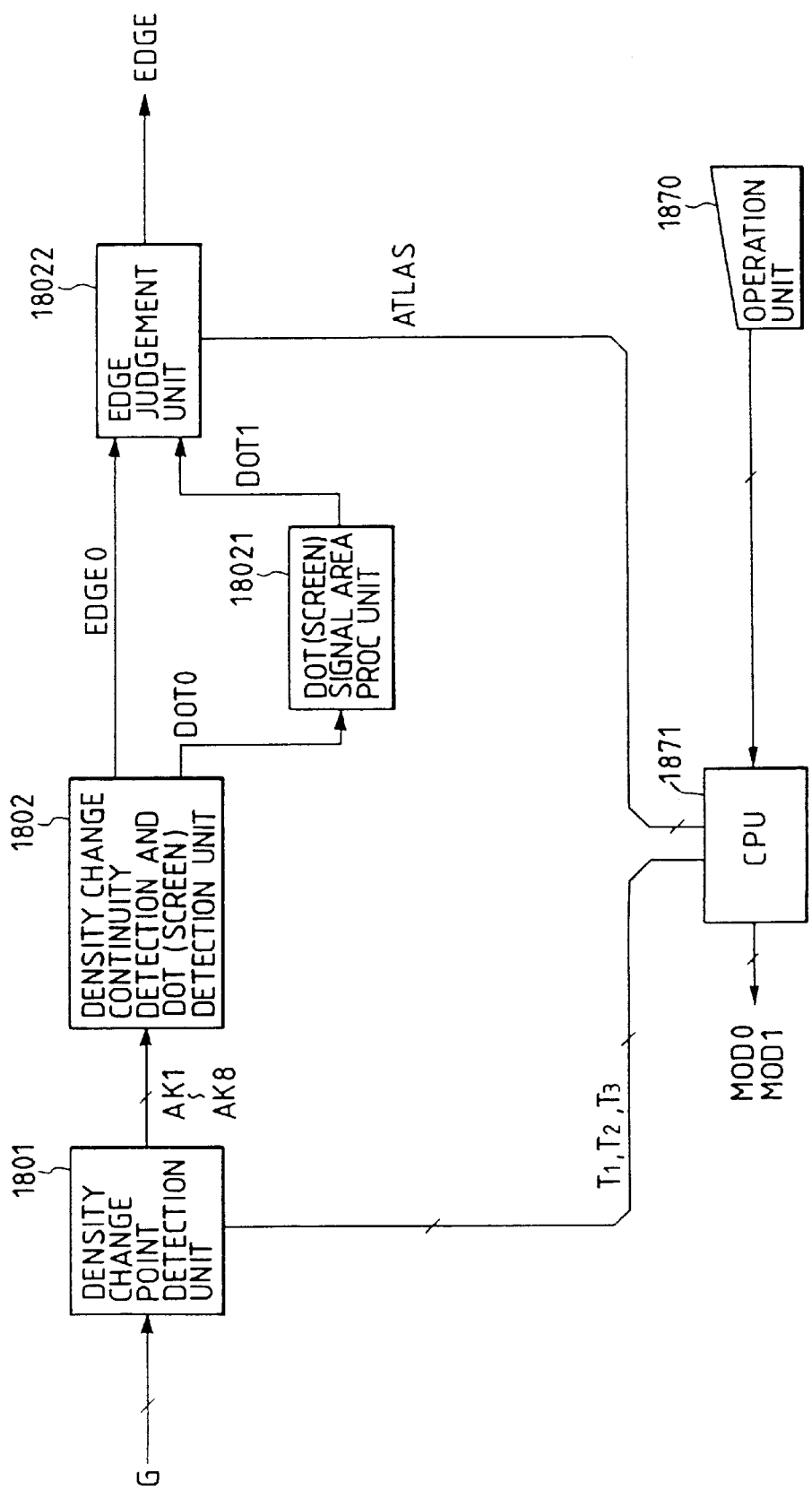
FIG. 68 is a basic block diagram showing the nineth embodiment of the invention.

FIG. 68 is a block diagram showing edge area judgement means 1103 in this embodiment (FIG. 11).

Referring to FIG. 68, reference numeral 1801 density change point detection unit, 1802 density change continuity detection and dot detection unit, 18021 a dot signal area processing unit, and 18022 an edge judgement unit for forming final character edge area signal EDGE according to continuous density change detected by unit 1802 and dot area detected by unit 18021.

Reference numeral 1871 designates a CPU in the control unit in FIG. 1. The CPU generates mode switching signals MOD0 and MOD1 as shown in FIG. 66 according to an opereator's instruction given to operation unit 1870 (407 in FIG. 1). Signals MOD0 and MOD1 are supplied to multiplification factor generation unit 108, filter control signal generation unit 109 and screen switching signal generation unit 111 according to the mode of each original.

CPU 1871 further supplies threshold data $T_1$, $T_2$ and $T_3$ determined to optimum values according to each mode to density change point detection unit 1801.

Figure 69B:
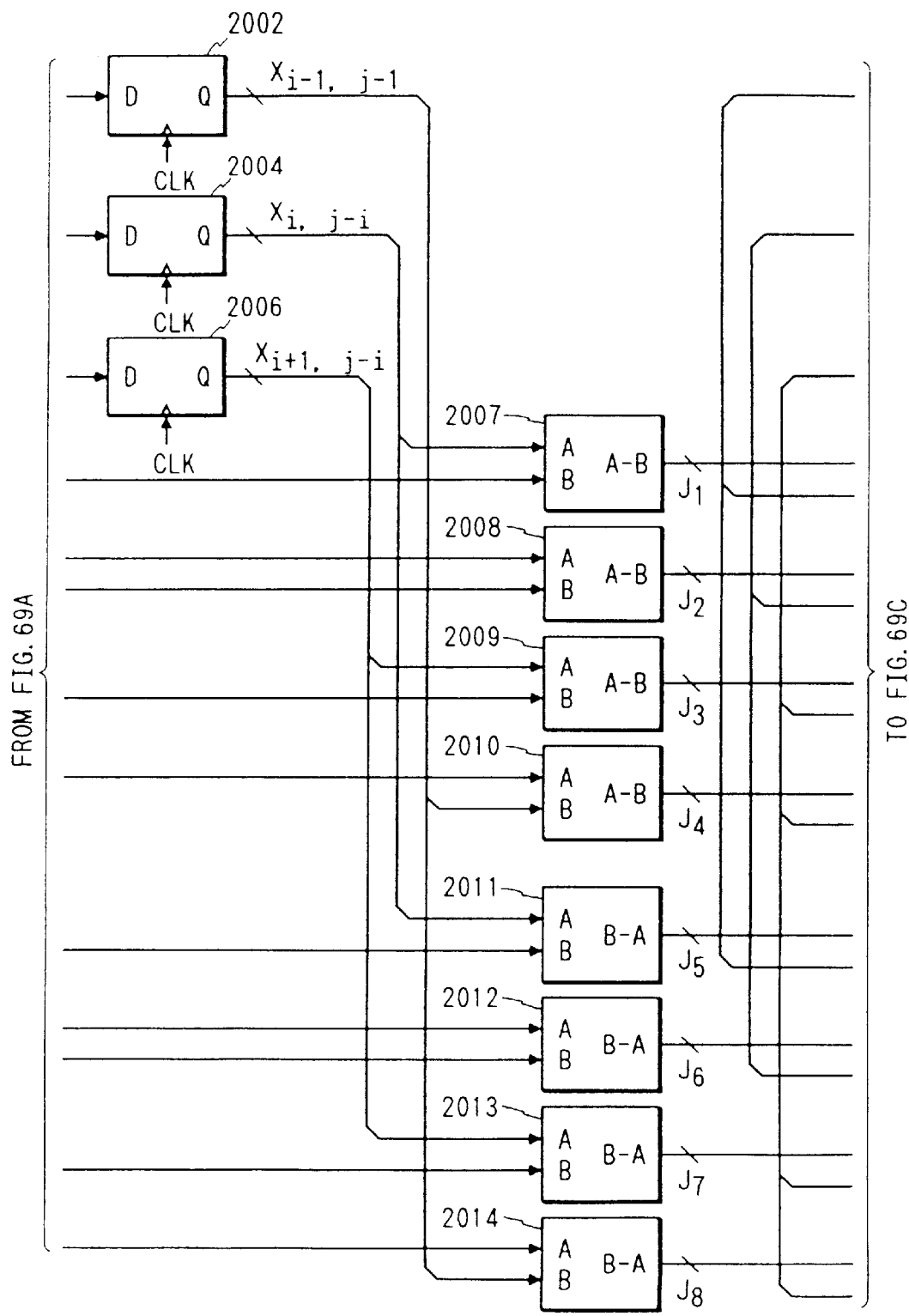
Figure 69C:
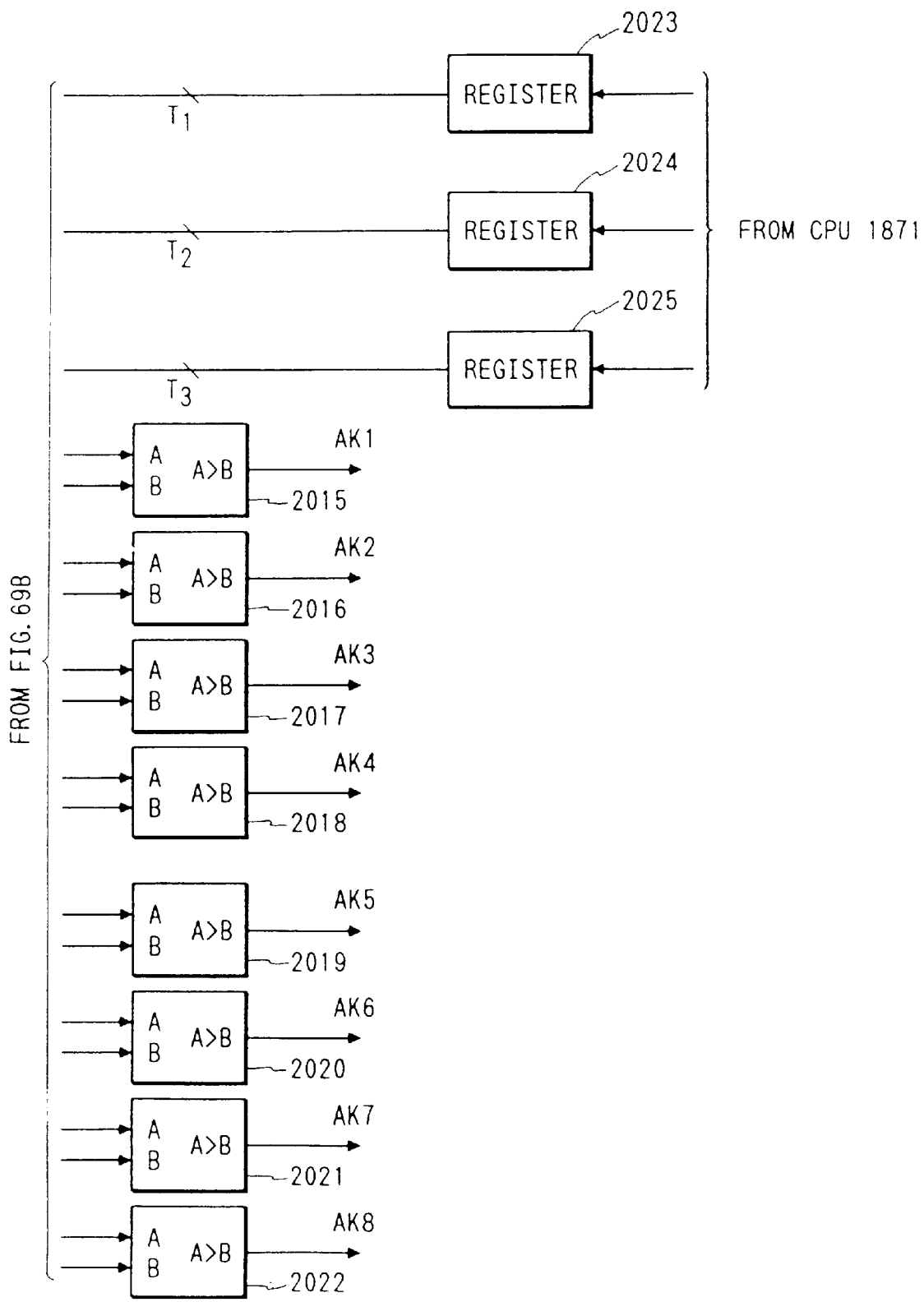

FIG. 69 shows the construction of density change point detection unit 1801. The construction and functions are substantially the same as those in case of FIG. 20-1. This embodiment is different from the first embodiment in that in liue of the ROM table in FIG. 20-1, for providing data $T_1$, $T_2$ and $T_3$ with ATLUS and SEG signals as addresses, in case of FIG. 60 data $T_1$, $T_2$ and $T_3$ are set in registers 2023 to 2025 directly from CPU 1871.

CPU 1801 sets combinations of optimum threshold value data ($T_1$, $T_2$ and $T_3$) for the character mode, photograph mode and character/photograph mode in registers 2023 to 2025 according to the mode of the original.

In this way, adequate AK1 to AK8 signals in each mode are provided from density change point detection unit 1801. In other words, it is possible to vary the strength of character edge detection, i.e., the degree of grasping character edges, by varying the values of $T_1$, $T_2$ and $T_3$.

The signals AK1 to AK8 are supplied to density change continuity detection and dot detection unit 1802 to generate EDGE0 and DOT0 signals. These signals are supplied to edge judgement unit 18022 and dot signal area processing unit 18021. Unit 18021 converts the DOT0 signal into DOT1 signal. This is the same as in the first embodiment described above.

Figure 70:
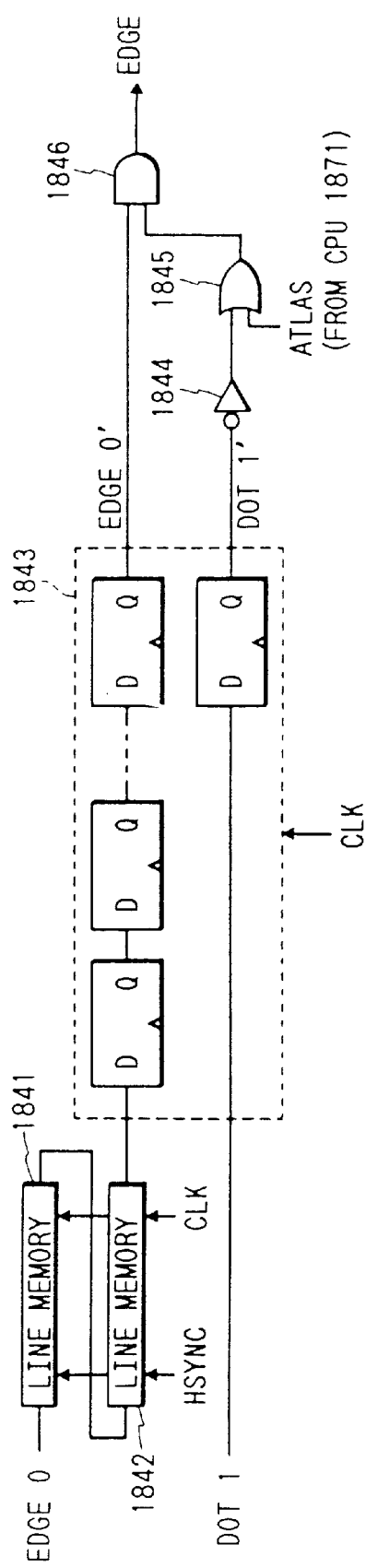
FIG. 70 is a circuit diagram showing edge judgement unit.

FIG. 70 shows EDGE signal formation unit 18022 (FIG. 68).

Line memories 1841 and 1842 altogether provide delay for two lines to EDGE0 for synchronization with DOT1 for two auxiliary scanning lines. Flip-flop 1843 effects main scanning synchronization of EDGE0 and DOT1 to provide EDGE0' and DOT1'.

Reference numeral 1844 designates an inverter, 1845 an OR gate, and 1846 an AND gate. ATLAS signal is supplied from CPU 1871 and indicates the map mode.

In case of ATLAS=0, that is, in a mode other than the map mode, DOT1 signal is inverted by inverter 1844 and then ANDed with EDGE0' signal in AND gate 1846. That is, a portion which is an edge (EDGE0'=1) and not a dot (DOT1'=0) is determined to be edge (EDGE=1).

On the other hand, in case of ATLAS=1, that is, in the case of the map mode, 1845 is "High" at all time, and only EDGE0' is effective in AND gate 1846. Therefore, the influence of dot signal DOT§' vanishes.

In other words, in the case of the map mode (ATLAS=1), the effect of dot detection is removed in character portion judgement. Therefore, even in case when there are thin characters in colored background like a map, it is possible to reproduce clear characters without erroneously judging characters as dots.

Such map mode is for performing character detection processing by removing the dot detection effect, and thus it is effective in the character mode and character/photograph mode for judging characters.

The above is the description of character edge judgement unit 107.

Multiplication Factor Generation Unit

Figure 71:
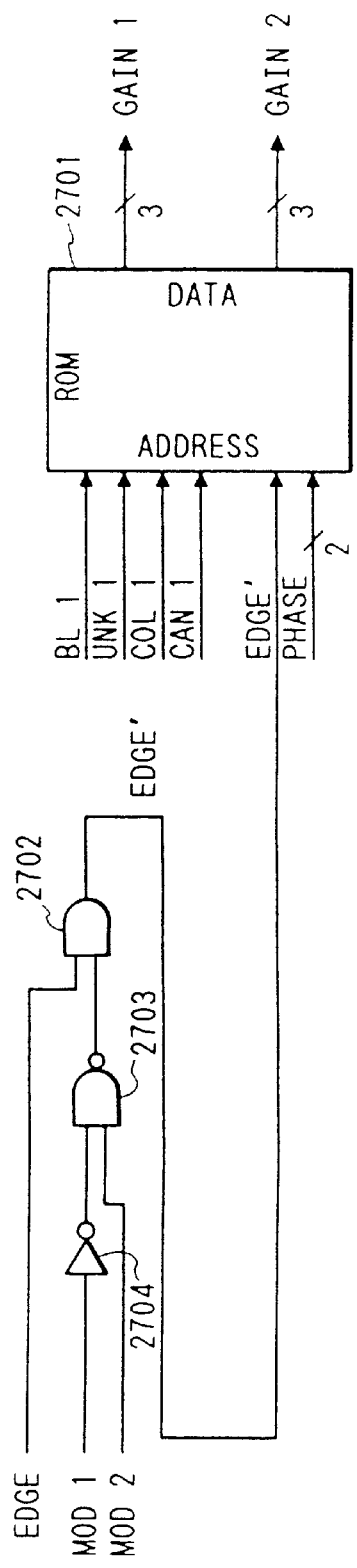
FIG. 71 is a circuit diagram showing multipliflication coefficient generation unit.

Multiplication factor generation unit 108, as shown in FIG. 71, includes ROM 2701, AND gate 2702, number gate 2703 and inverter 2704.

First, gates 2704, 2703 and 2702 generate EDGE' signal with a logic of EDGE'=EDGE (MOD1, MOD0). EDGE' signal is "1" when the mode is the character mode or character/photograph mode and EDGE=1. In other words, the EDGE' signal is "0" at all time in the photograph mode and otherwise "1" for character edges.

ROM 2701 receives four judgement signals BL1, UNK1, COL1, CAN1 and EDGE' and PHASE signal indicating the tonor color of M, C, Y or Bk in addresses and provides two gain signals GAIN1 and GAIN2 as 3-bit data.

Spacial Filter

Now, spacial filter used in this embodiment will be described.

Spacial filter 117 performs addition to input image signal of products of pixels neighboring a given pixel and a weight factor (i.e., performs convolution operation with factor matrix), thus permitting edge emphasis for clearly expressing characters, removal of high frequency noise and smoothing such as to remove moire in dot image.

Figure 72A:
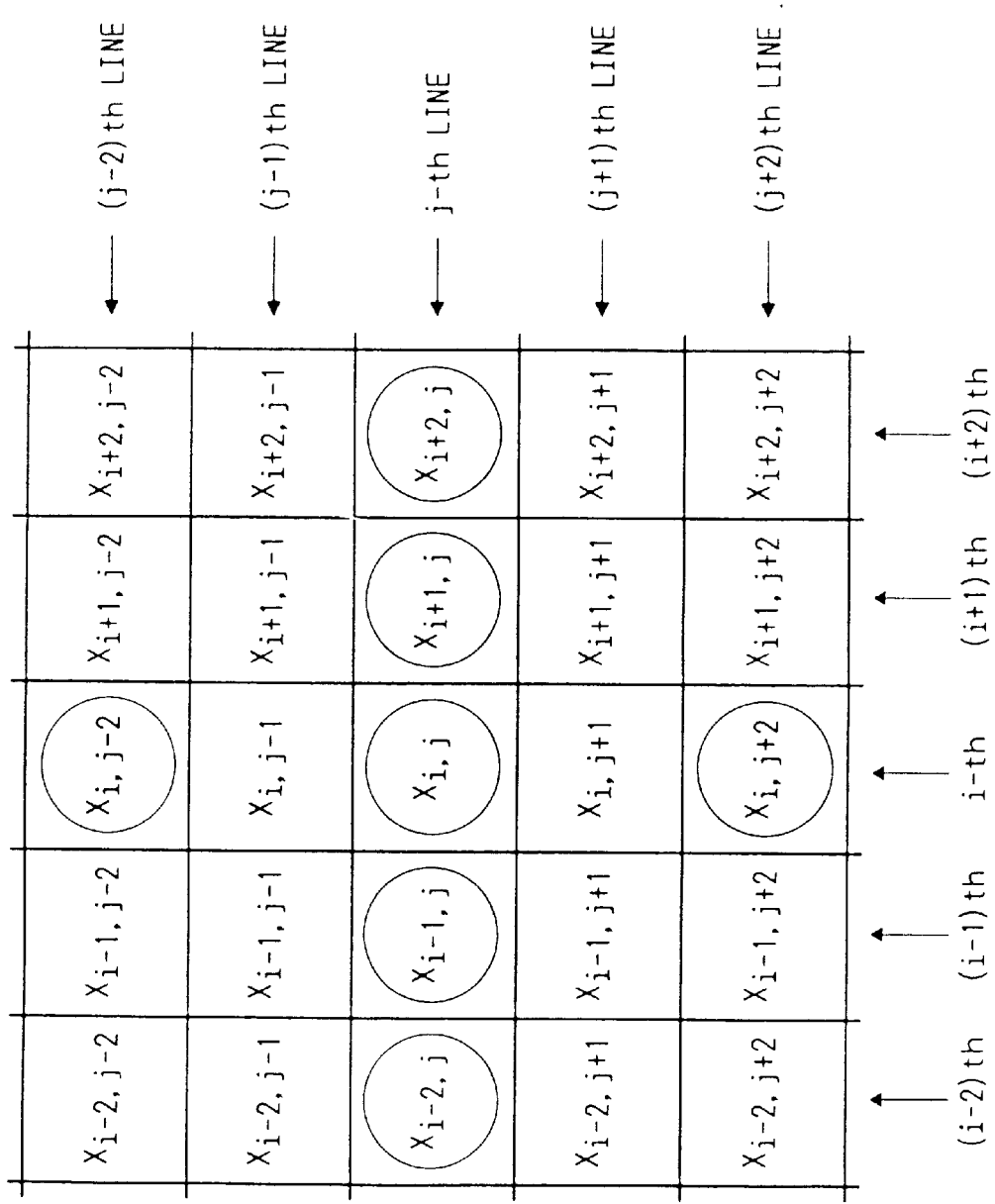

In the spacial filter in this embodiment, as shown in FIG. 72A, convolution operation is possible with respect to seven pixels shown enclosed in circles ○ in a 5×5 window centered on given $x_{i,j}$ (i: main scanning direction pixel number, j: auxiliary scanning direction line number).

Figure 72B:
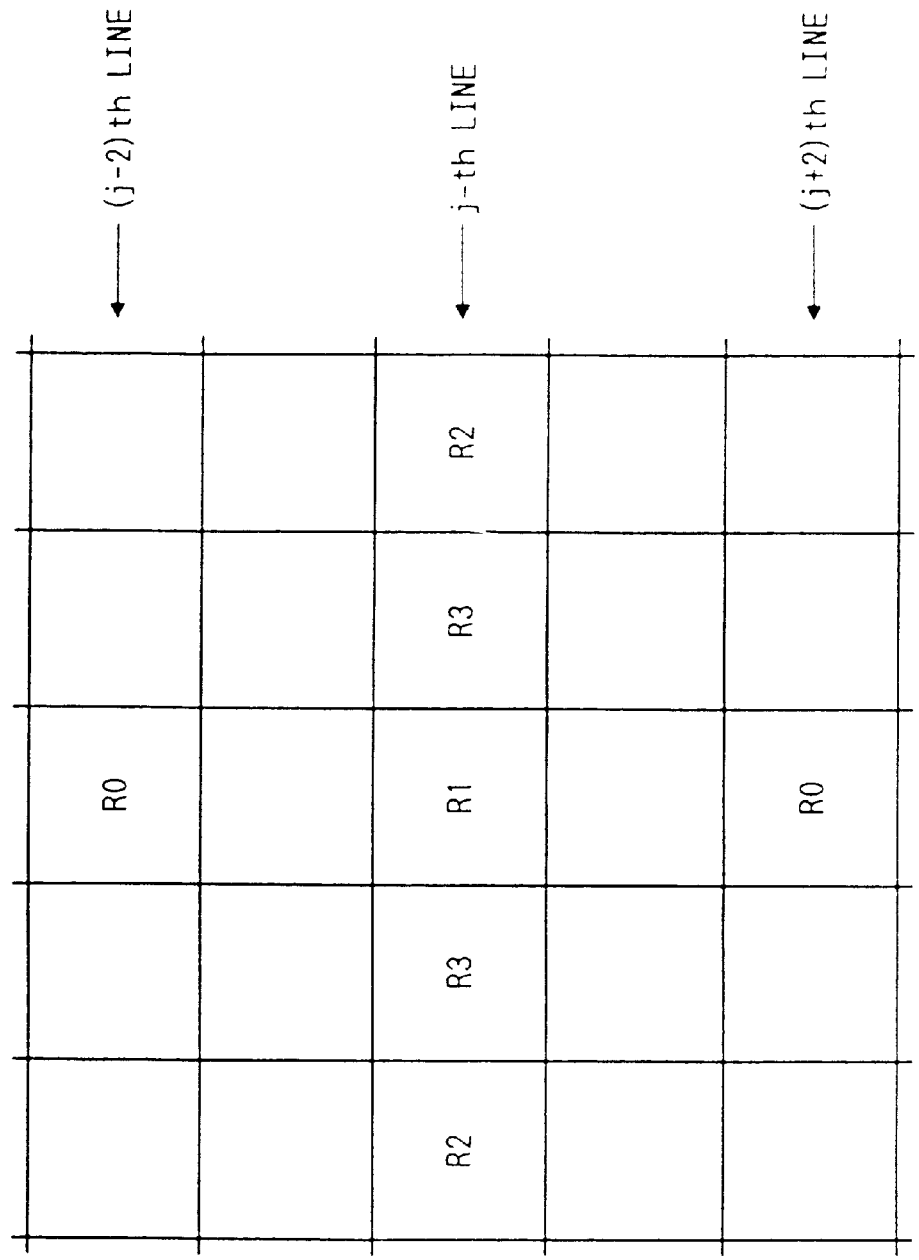

FIG. 72B shows the factor matrix. It is possible to set four different factors R0 to R3 independently. That is, an output given as $$R0 \times (X_{i,j-2} + X_{i,j+2}) + R1 \times X_{i,j} +$$
$$R3 \times (X_{i-1,j} + X_{i+1,j}) + R2 \times (X_{i-2,j} + X_{i+2,j})$$

is provided.

Figures 2, 72C:
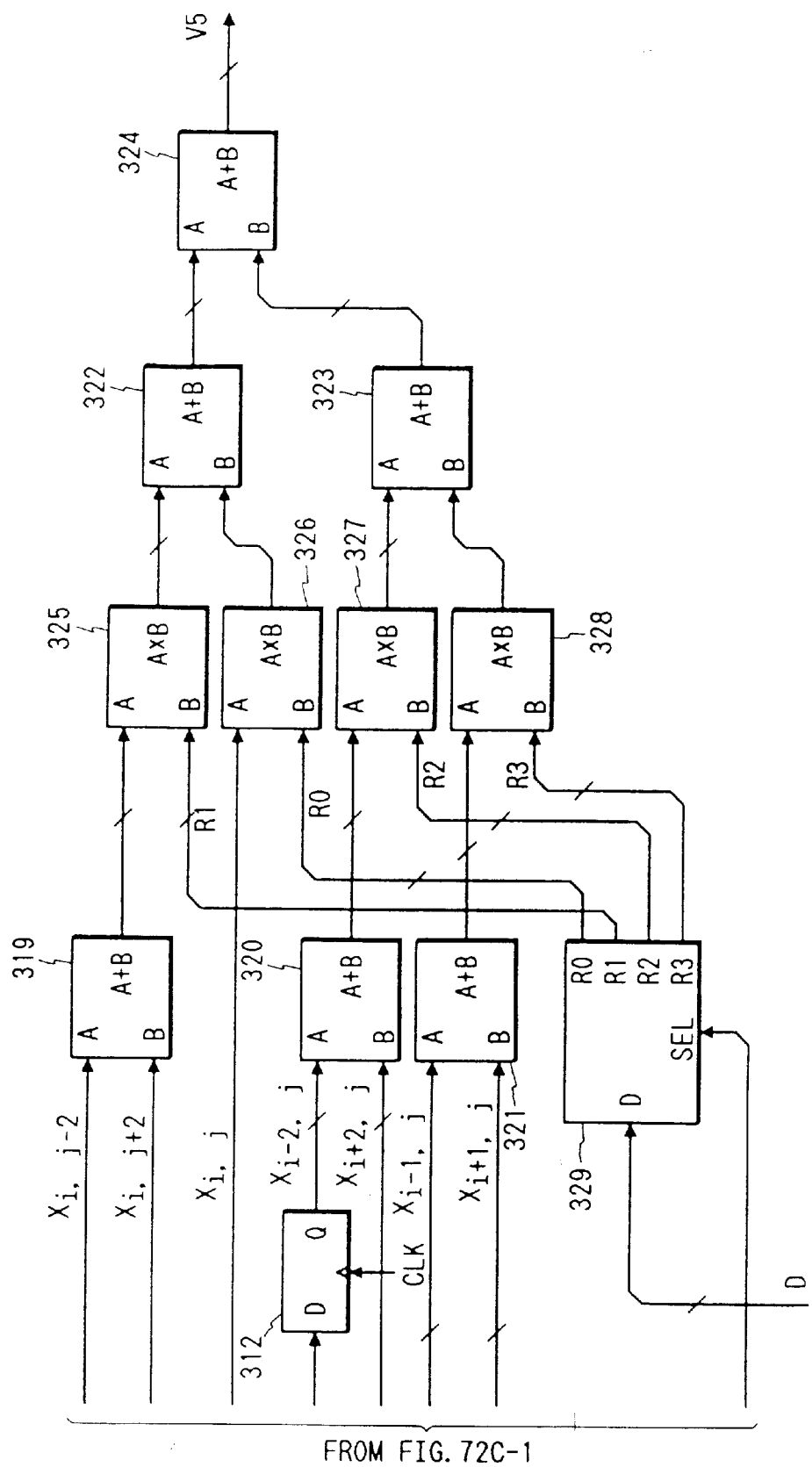

FIG. 72C shows a block diagram of filter 117. Filter 117 receives input image signal V4 and control signal DFIL to be described later and provides result V5 of processing.

FIF0 memories 301 to 304 each provide delay for one line.

Flip-flops (F/F) 305, 306, . . . , 318l latch input data with rising of CLK, provide delay for one pixel and extract pixels shown enclosed by circles ○ in FIG. 72A, necessary for circulation.

Reference numerals 319 to 324 designate adders, and 325 to 328 multipliers, performing spacial filtering operation.

Factor generator 329 generates factors R0, R1, R2 and R3 of the spacial filter. In consequence, operation given by equation (1) is performed to provide VS. In this embodiment, fine adjustment of factors R0 to R3 is possible, and thus sofisticated image reproduction can be obtained through spacial filtering.

Figures 2, 72D:
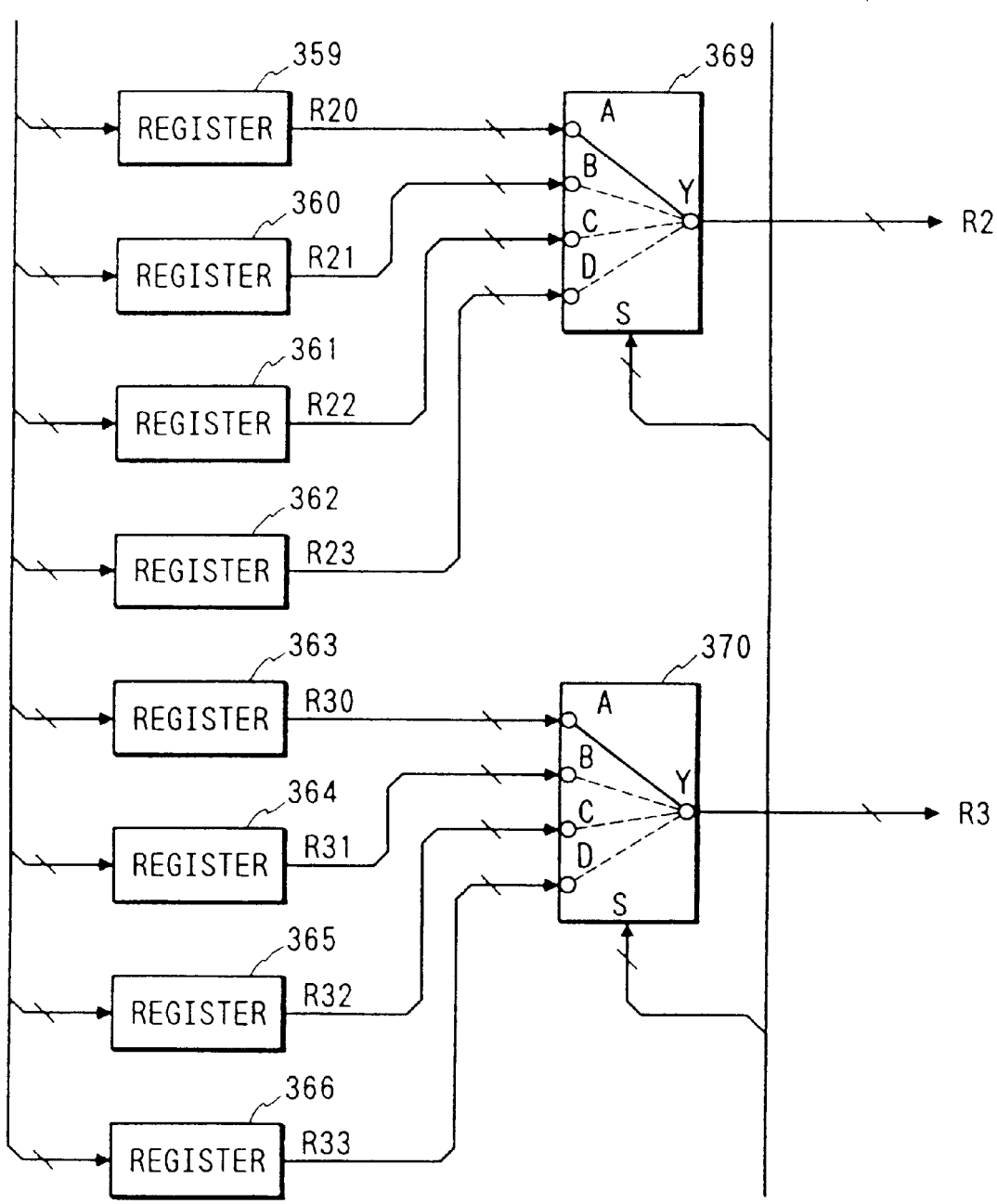

FIG. 72D is a block diagram showing factor generator 329.

Figures 72E, 72F:
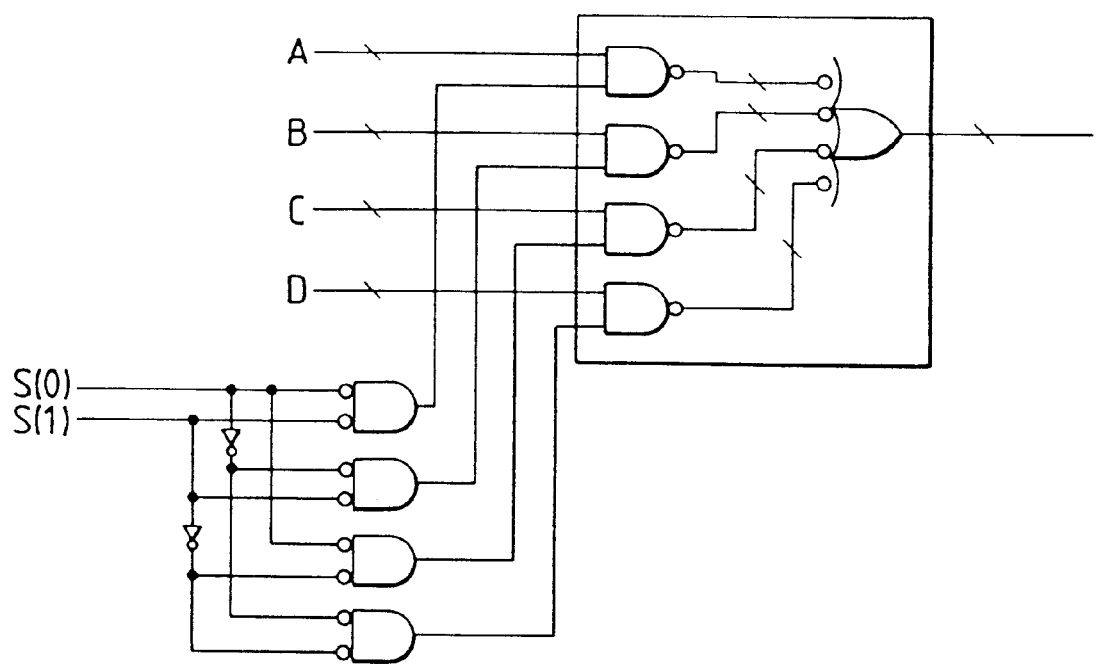

In sixteen registers 351 to 366, R00, R01, . . . , R33 are written and held by CPU 1871 in advance as necessary values under control of control unit 401. Reference numerals 367 to 370 designate 4 tol selectors. As shown in FIG. 72E, each consists of a gate circuit. As shown in FIG. 72F, 2-bit select signals (S(0), S(1)) are 0, 1, 2 and 3, four inputs A, B, C and D are selectively provided.

Therefore, in the spacial filter unit the factor matrix can be switched in synchronism to DFIL signal supplied in synchronism to a given pixel.

In this embodiment, predetermined values are set in registers 351 to 356 in advance such that the filter factor corresponds to photograph sharpness when DFIL=0, 1 and to character sharpness when DFIL=2, 3 with respect to filter switching signal DFIL. In this embodiment, the operator inputs values as shown in FIG. 72G to obtain a factor matrix shown in FIG. 72H, and thereby sets of factors corresponding to the values of sharpness set by the CPU are set in individual operators. For sharpness, the operator can input a desired value from operation unit 1870, and different values can be set for a plurality of areas by area designation.

FIG. 72H shows selectable spacial filter combinations. DFIL0 to DFIL4 are given in the horizontal direction, and the sharpness level (capable of being set to five levels in this embodiment) is shown in the vertical direction. For example, in case of sharpness of "3", smoothing is provided with DFIL=0, and edge emphasis is provided with DFIL=1. The degree of edge emphasis is increased as one goes to the right, e.g., DFIL2, DFIL3, . . . .

In case of DFIL=0, sharpness 1 represents strongest smoothing, and the degree of smoothing is reduced with sharpnesses 2, 3, and so forth. Sharpness 4 provides edge emphasis, and sharpness 5 provides strong edge emphasis.

In this way, the greater the value of DFIL and the value of sharpness the degree of edge emphasis is the stronger (i.e., the degree of smoothing is the weaker), and the smaller the value of DFIL and value of sharpness, the stronger is the degree of smoothing (the weaker is the degree of edge emphasis).

The filter control signal DFIL will now be described.

Filter Control Signal Generation Unit

Figure 73:
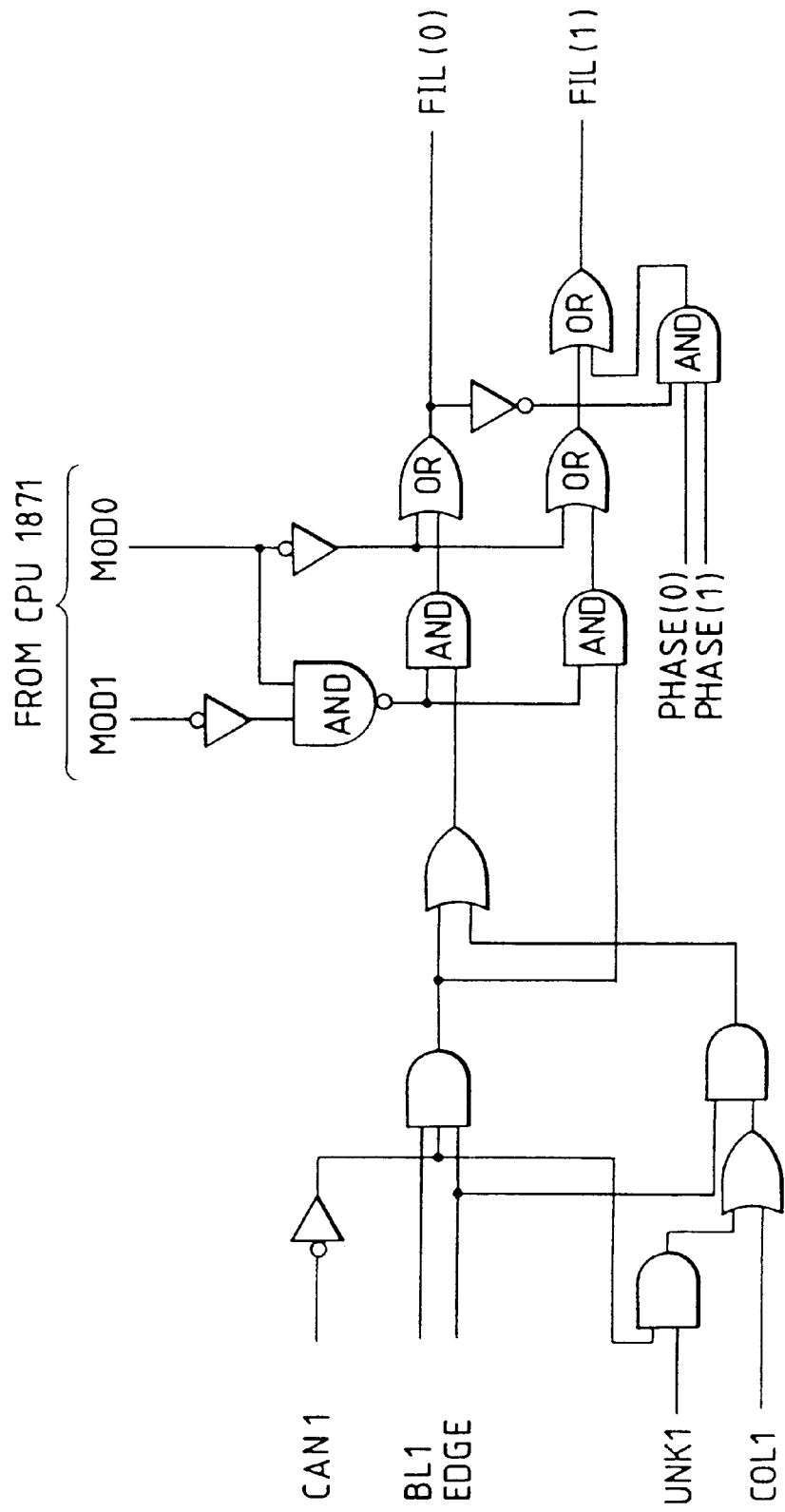
FIG. 73 is a circuit diagram showing filter control signal generation unit.

The case of FIG. 73 in this embodiment is basically the same as the case of FIG. 31, and the difference is that FIL(0) and FIL(1) signals are controlled according to MODE0, MODE2, PHASE(0) and PHASE(1) signals.

IN the case of the character mode the mode signal is MOD0=0 and MOD1=1, and the values of FIL(0) and FIL(1) are forcibly made "1" irrespective of BL1 signal (black pixel) and EDGE signal (edge). In the case of photograph mode, NOD0=1 and MOD1=0, and the values of FIL(0) and FIL(1) are forcibly made "0". Further, in automatic character/photograph judgement mode MOD0= MOD1=1 the values of FIL(0) and FIL(1) similarly depend on CAN1, BL1, EDGE, UNK1 and COL1.

More specifically, in the character mode in each original kind mode MOD0=0, and FIL(0)="1" and FIL(1)="1". Thus, strong edge emphasis is provided for the entire copy surface, and character sharpness is adopted.

In the photograph mode MOD0="1" and MOD1="0", and FIL(0)="0" or FIL(1)="0". Thus, photograph sharpness is adopted over the entire copy surface.

In the charactr/photograph mode MOD0="1" and MOD1="1", and FIL(0) and FIL(1) are switched according to the image area. Photograph sharpness and character sharpness are applied for each pixel.

In FIG. 73, when PHASE(0) and PHASE(1) are supplied and PHASE(0)=PHASE(1), that is, in case of Bk tonor development and FIL(0)=0, FIL(1) signal is held "1" at all time. This is done so in that in case of BK printing it is desirable to provide stronger edge emphasis compared to the case of Y, M and C for black pixels are reproduced more sharply and image becomes tenser.

Filter Switching

FIG. 74B shows the correspondence between the values of FIL(0) and FIL(1) and values of FIL.

FIG. 74A shows application of filter switching signal FIL to various original modes. In FIG. 74A, in case of the character mode FIL=3 is applied to the entire image area.

In case of the character/photograph mode, FIL=3 is applied for black character portion (Bk1=1 and EDGE=1). FIL=2 is applied for intermediate saturation character portion (UNK=1 and EDGE=1). For flat portion (EDGE=0) and colored portion (COL1=1 and EDGE=1), FIL=1 is used for development with Bk tonor (PHASE(0)=PHASE(1)=1), and FIL=0 is used for developing with C, M or Y tonor.

In case of the photograph mode, FIL=1 is used when Bk tonor is used for development, and FIL=0 C, M or Y tonor is used for development.

The value of FIL (DFIL) is for such processing as to enhance the sharpness in the order of values of 3, 2 and 1 and enhancing the smoothing effect in the order of values of 0,1, 2 and 3.

Filter of FIL=3 is used when the utmost sharpness is necessary, and it is used for overall image area in character mode and black character portion in original in case of character/photograph mode.

Filter of FIL=2 is used when sharpness next to FIL=3 is necessary, and is used for intermediate color character portion in original in character/photograph mode.

FIL=0 or FIL=1 is used for flat and colored portions in character/photograph mode or overall image area in photograph mode. It is possible to provide modulation of the overall image by setting the sharpness in case of development with Bk tonor to be stronger than the sharpness in case of development with Y, M or C tonor. FIL=1 is used when using Bk tonor for development, and FIL=0 is used when using Y, M or C tonor.

As shown in the note column in FIG. 74A, the case of FIL=0 and FIL=1 corresponds to photograph sharpness, and in case of switching the sharpness value in five steps with operation unit 1870, the filter factors of FIL=0 and FIL=1 are switched in an interlocked relation to one another by CPU 1871. Likewise, FIL=2 and FIL=3 are switched in an interlocked relation to one another in correspondence to the character sharpness.

The photograph sharpness and character sharpness are individually divided into two divisions for interlocking as above for the following reason. The case of FIL=0, 1 occurs when major portion of original is judged to be photograph image, while the case of FIL=2, 3 occurs when the major portion is judged to be character image. Therefore, variation of the sharpness strength in an interlocked fashion is more effective for preventing the reproduced image from becoming unnatural.

It is of course possible to permit setting of the sharpness strength independently for FIL=0 to 4. Particularly, such independent adjustment is effective if it is intended to provide for increased sharpness for character and obtain very smooth reproduction of photograph portion.

Screen Switching Signal Generation Unit

Figure 75:
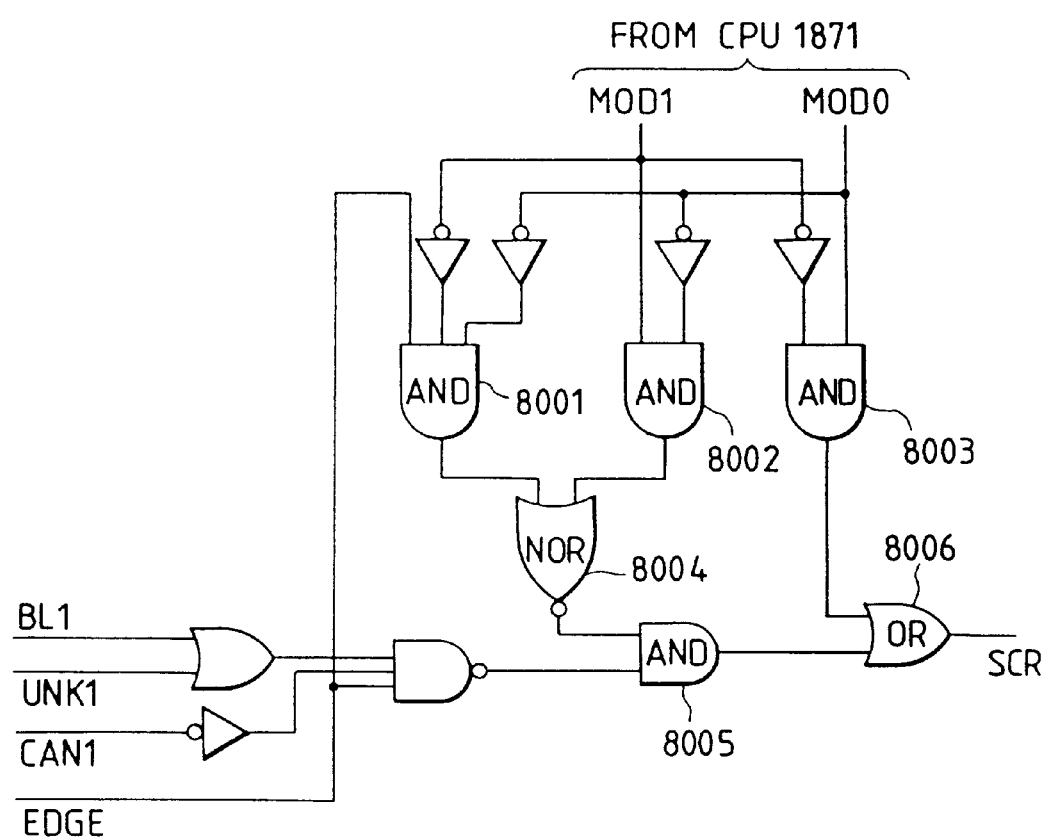
FIG. 75 is a circuit diagram showing screen switching signal generation unit.

FIG. 75 shows the circuit construction of screen switching signal generation unit 111. The basic construction and functions are the same as those in case of FIG. 39, and the difference is that MOD1 and MOD2 signals are supplied from CPU 1871.

In case of the character mode, the circuit shown in FIG. 75, including OR gate 8006, AND gates 8001 to 8005 and NOR gate 8004, provides MOD1=1 and MOD0=0, gate 8001 provides output of "0", gate 8002 provides output of "1", gate 8003 provides output of "0", gate 8004 provides output of "0", and gate 8005 provides output of "0" at all time. Thus, SCR=0 is provided at all time, that is, printing is done with PW4 at all time.

In case of the photograph mode, MOD1=0 and MOD0=1, gate 8001 provides output of "1", gate 8002 provides output of "0", gate 8003 provides output of "1", gate 8004 provides output of "1", and gate 8006 provides output of "1" at all time. Thus, SCR=1 at all time, that is, printing is done with PW at all time.

In case of character/photograph mode, MOD1=1 and MOD0=1. Gate 8001 provides output of "0", gate 8002 provides output of "0", gate 8003 provides output of "0", and gate 8004 provides output of "1". Thus, SCR signal corresponding to BL1, UNK1, CAN1 and EDGE is generated like the case of FIG. 39.

More specifically, in various original kind modes, in character mode (MOD=1 and MOD0=0) SCR="0" at all time, PW4 is selected at all time, and printing is done with high resolution of 400 dpi (dot per inch).

In photograph mode (MOD=0 and MOD0=1), SCR="1" at all time, PW is selected at all time, and printing is done with high graduation of 200 dpi, for instance.

In character/photograph mode (MOD=1 and MOD0=1), PW4 is selected for black character areas and PW for others.

In the above way, an input signal enable circuit may be formed for driving the laser driver for printing differently, i.e., for high resolution and high graduation, according to mode signals MOD1 and MOD0, thus permitting printing in correspondence to the kind of image.

In this embodiment, the combinations of modes, judgement conditions and processing conditions are not limited to the above specific example.

For example, in the case of FIG. 75 a map mode may be defined as MOD0=0 and MOD1=0 in addition to the three different modes noted above in this embodiment (other modes being the same as in the above embodiment). In the case of the map mode, with EDGE=1 SCR=0 is provided to select PW4 irrespective of BL1, UNK1 and CAN1. Thus, it is possible to maintain the sharpness of characters peculiar to the map.

Mode Setting Flow

Figure 76:
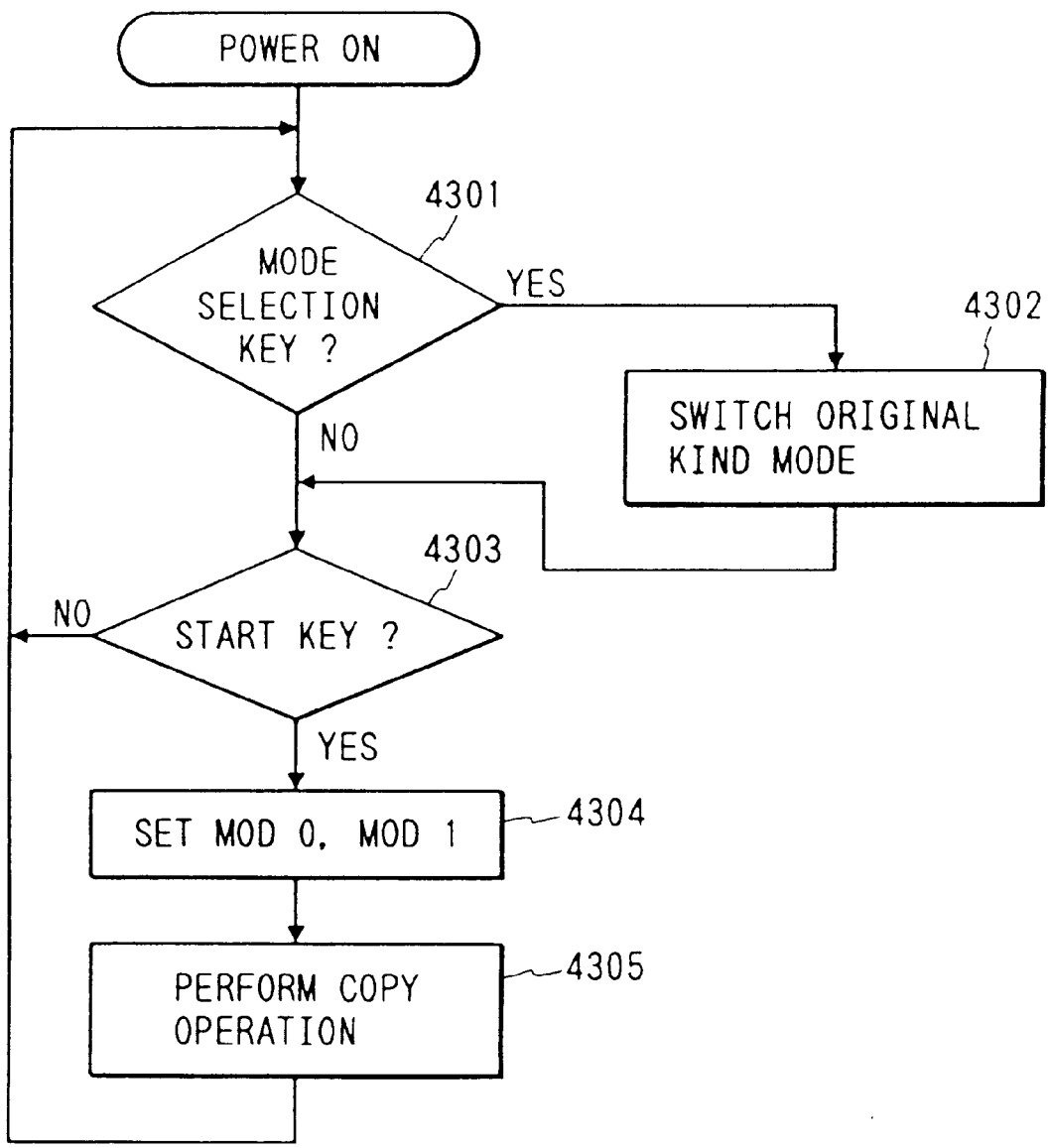
FIG. 76 is a flow chart for mode setting.

FIG. 76 shows a mode setting flow in this embodiment.

When the mode selection key is depressed in step 4301 after the connection of the power source, four original kind modes (i.e., character, photograph, character/photograph and map) are switched sequentially in step 4302.

When the copy start key is depressed in step 4303, steps 4304 and 4305 are executed. In step 4304, MOD0 and MOD1 are selected in a manner as shown in FIG. 442-1 according to the original kind mode finally selected in step 4302. In step 4305, a copying operation is executed.

Processing Flow

Figure 77:
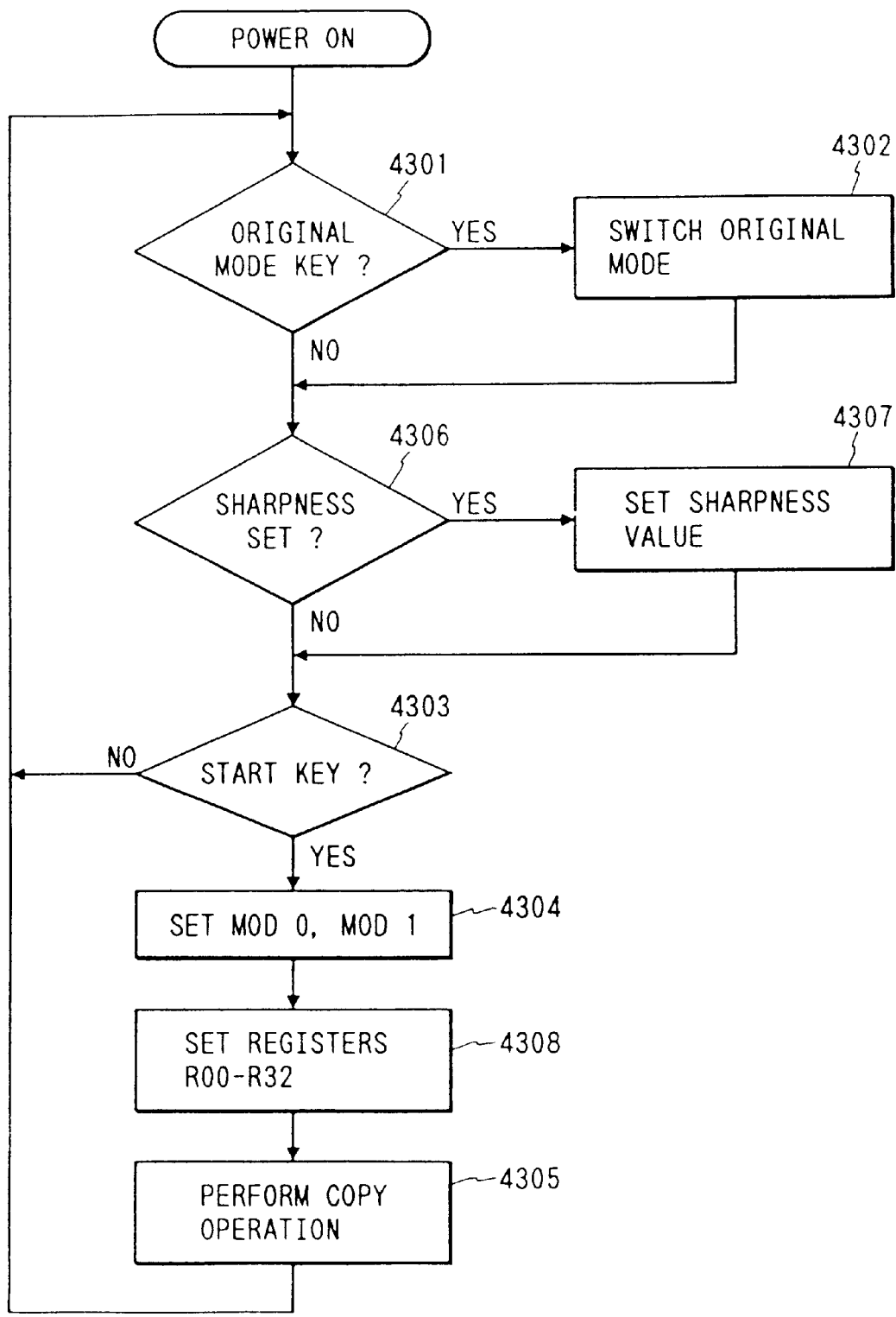
FIG. 77 is a flow chart for sharpness value setting.

FIG. 77 shows a processing flow in this embodiment. When the original mode key is depressed in step 4302 after connection of the power source, the original mode is switched in step 4302. When it is detected in step 4306 that sharpness is set, sharpness value is set and held in step 4307. In this case, character sharpness and photograph sharpness can be set independently.

When it is detected in step 4303 that the start key is depressed, MOD0 and MOD1 are set in step 4304 in correspondence to the original kind mode held in step 4302. In step 4308, values of R00 to R33 are set in registers in corresondence to the value of sharpness held in step 4307, and copying operation is executed in step 4305.

As shown above, with this embodiment of the invention the image processing may be varied in dependence on the mode selected according to the operator's will and also on the result of image judgement, thus permitting realization of the image quality intended by the operator.

Particularly, by altering black character processing according to the mode signal it is possible to cope sofisticatedly with photograph images, character images and character/photograph images to execute best processing in each case.

The mode setting is not limited to the above example, and it is possible to consider various other modes, for instance a gloss mode and gloss removal mode. Also, the processing which is altered according to the mode is not limited to black character processing (character edge detection, dot detection, etc.), but various other image processings such as alteration of screen signal are conceivable.

Further, while this embodiment has concerned a digital color copier, the invention again is applicable as well to various other image processing apparatuses.

Further, in this embodiment it is possible to permit independent selection of the sharpness of M, C and Y and that of Bk, and particularly it is possible to strengthen the sharpness of Bk to obtain adequate image quality.

More particularly, by permitting independent setting of the sharpness of a plurality of color component signals including Bk (black), it is possible to improve the image quality, for instance obtain image with enhanced shade of black.

Advantages of the Invention

Further, with this embodiment sharpness for character portion and that for photograph portion can be selected independently, and thus it is made possible to set sharpness of image continuously and independently in dependence on the king of input image (for instance, character image, photograph image and character/photograph image), thus permitting images of adequate sharpness to be obtained according to the use and taste.

The strength of sharpness may be set as key input to the operation unit, or it may be input from a keyboard of a computer when the apparatus is connected thereto.

Further, the setting range is not limited to the specific example of this embodiment. Further, the size, shape and factor of spacial filter may be freely altered.

Now, a further embodiment will be described, which permits improvement of the function of judgement of character or half-tone portion by executing area designation for image which can be difficultly judged to be a character portion or half-tone portion and effecting control of judging means for designated areas.

Operation Unit and Editor

Figure 78:
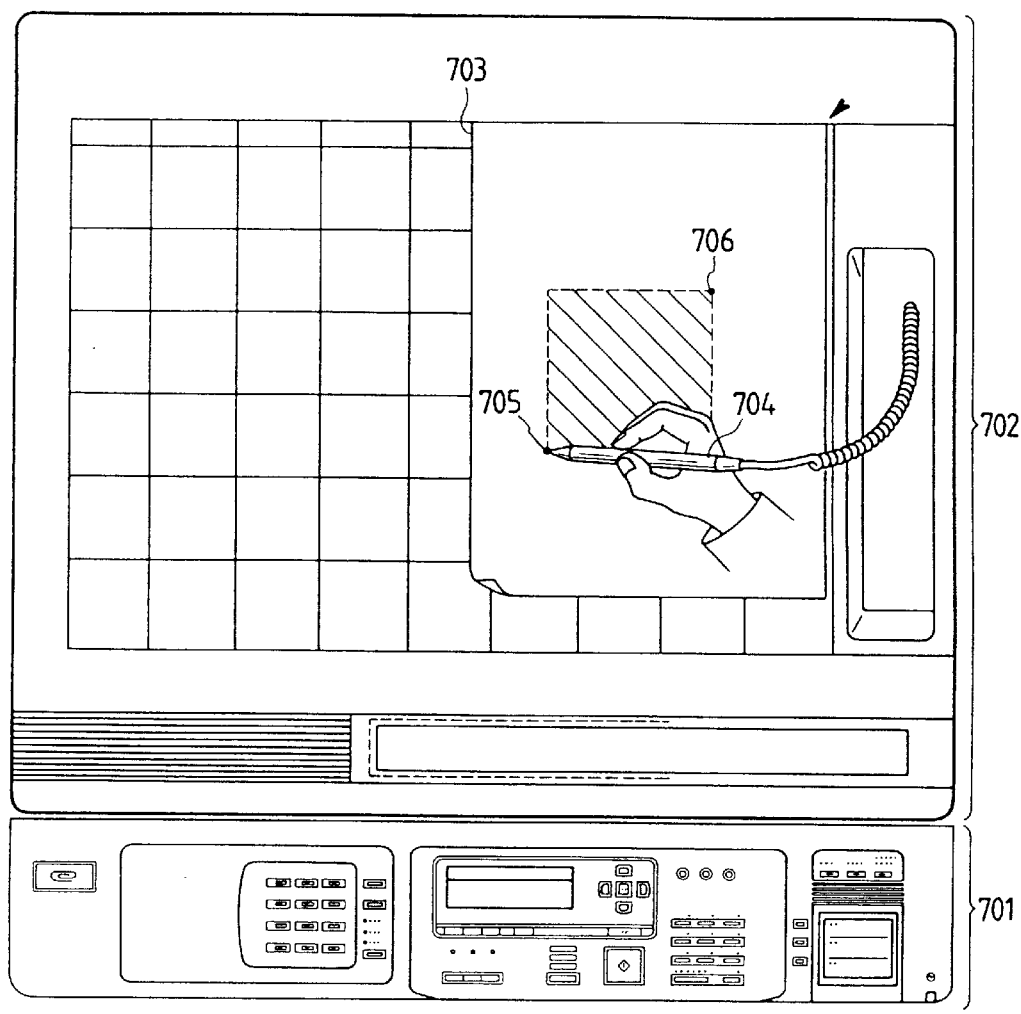
FIG. 78 is a view showing operation unit for area designation.

FIG. 78 is an elevational view showing the apparatus of this embodiment. Reference numeral 702 designates an editor which also serves as original holder 200. An area of shaded portion in original 703 held on editor 702 can be designated by designating two opposed corners 705 and 706 with touch pen 704.

Reference numeral 701 designates an operation unit including keys and a display unit.

Area Designation

In this embodiment, it is possible to designate four different areas at the most and select original kind modes independently for the designated areas.

Figure 79:
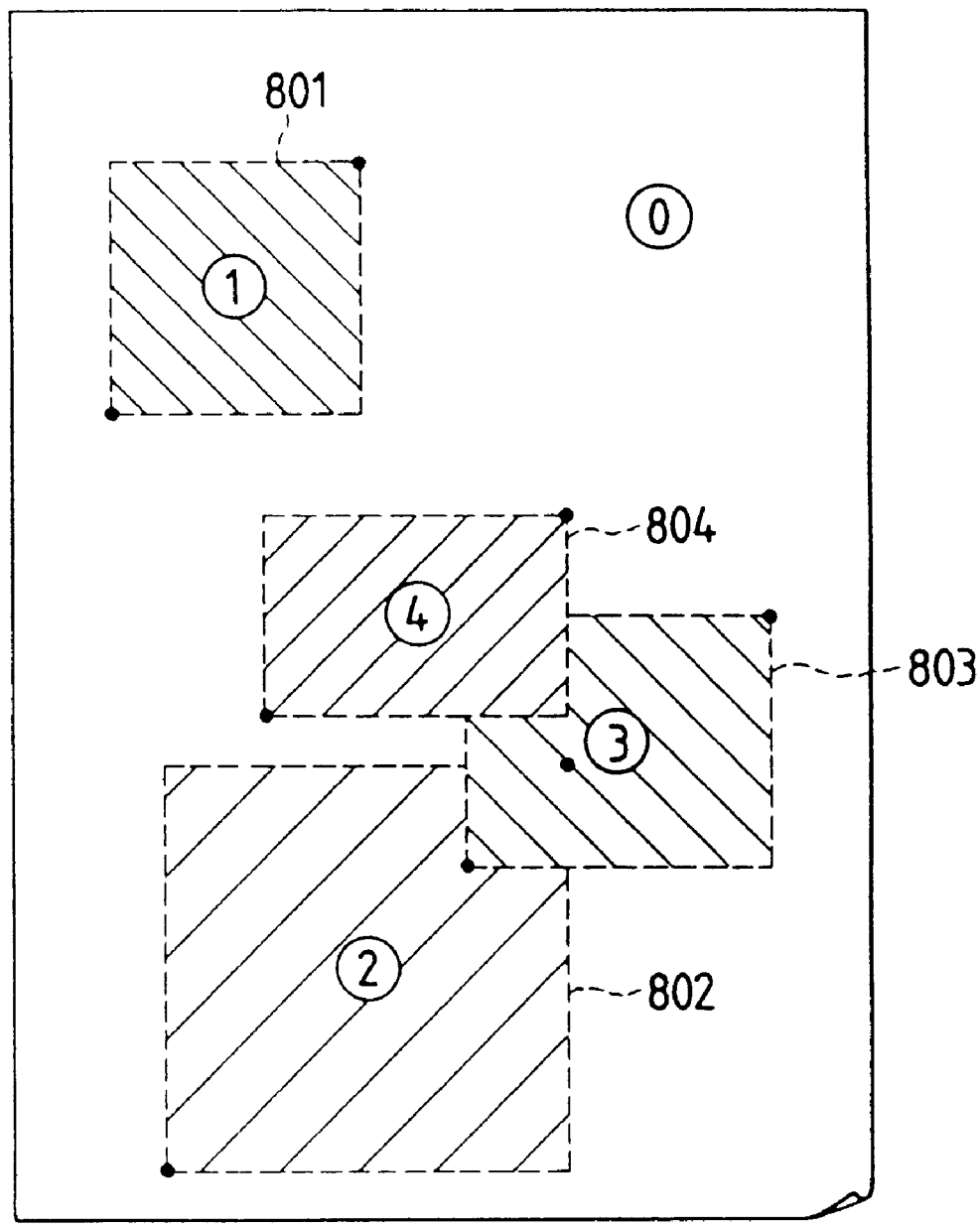
FIG. 79 is a view showing an example of areas designated by operation unit shown in FIG. 78.

FIG. 79 shows an example of this. It is possible to select original kind modes independently for four areas 801 (labeled ①), 802 (labeled ②), 803 (labeled ③) and 804 (labeled ④) and other area labeled ⓪. The numerals ① to ④ are identical with the orders set by the editor. While there are overlaps between areas ② and ③ and also between areas ③ and ④, preference is given to the area that is designated later, and four areas ① to ④ are designated absolutely as shown shaded in FIG. 79.

Designation of Original Mode

It is possible to designate original kind mode independently for areas ① to ④ and other areas ⓪ shown in FIG. 79. The method of designation will now be described.

For area ⓪, by depressing original mode key 609 shown in FIG. 6 the character mode, character/photograph mode and photograph mode are switched sequentially and displayed on 610. When original mode key 609 is not depressed, areas ① to ④ of default of apparatus are designated with the editor. This flow is shown in FIG. 80.

Figures 80, 80A:
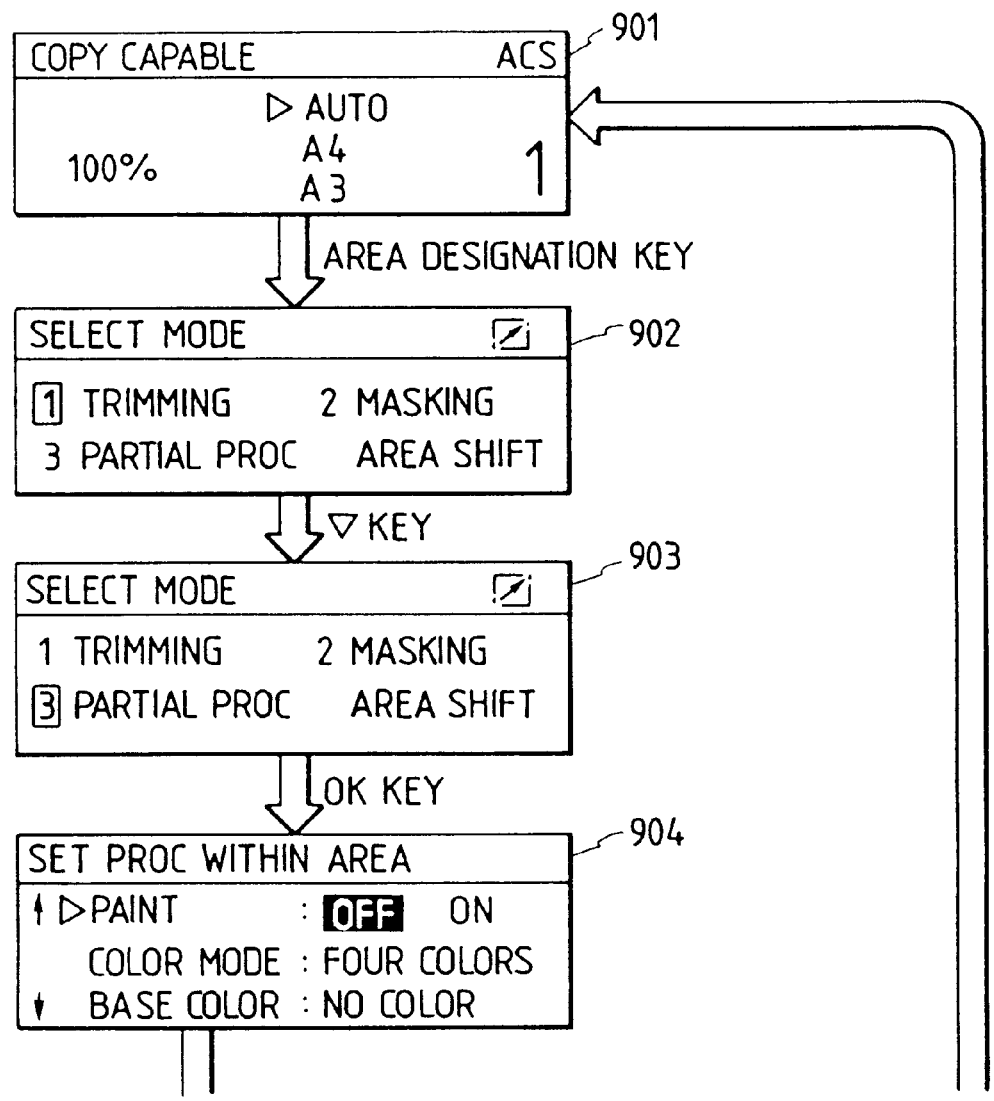
FIGS. 80, 80A and 80B are flow charts illustrating an operation procedure of the control unit shown in FIG. 78.
Figure 80B:
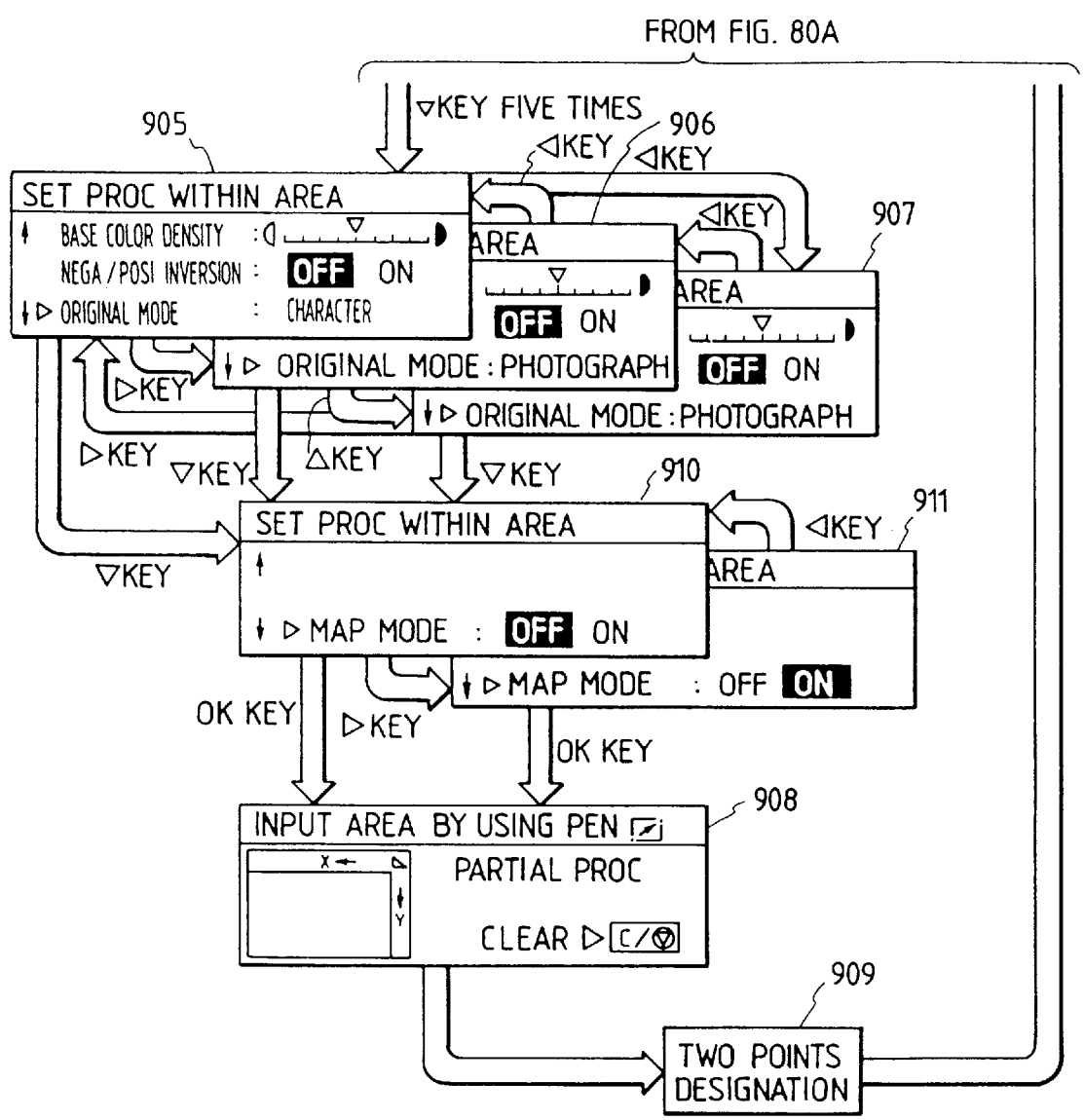

Referring to FIG. 80, reference numeral 901 designates a standard screen display. By depressing area designation key 618 display 902 is provided.

By depressing ▽ key in this state, partial processing is selected as shown at 903, and display 904 is provided.

In state 904, the contents of partial processing is displayed. By depressing ▽ key five times, the cursor is brought to the position of the original kind mode, and display 905 is provided. By depressing ◁ key sequentially in this state, the original kind modes are switched cyclically in the order of character mode (907), character/photograph mode (906), photograph mode (907) and character mode (905). By depressing ▷ key, switching is effected reversely. By depressing ▽ key in states 905 to 907, display 910 is provided for selection of map mode. In this state, switching of 910 (map mode OFF) and 911 (map mode ON) is done with ◁ and ▷ keys.

When OK key 612 is depressed in states 910 and 911, display 908 is provided. In this state, two points are designated with touch pen 704 in 909, and then OK key 612 is depressed. In consequence, a single area is designated, and standard screen display 901 is provided again.

When designating four areas ① to ④, the above operation may be executed repeatedly four times.

For ON/OFF switching of map mode corresponding to ⓪ in FIG. 79, after depressing image create key 619 shown in FIG. 6, ▽ key is depressed several times, and after providing display 910 in FIG. 80 the switching is done with ▷ and ◁ keys. Then standard screen display 901 is provided again by depressing OK key.

Further, in the character mode and character/photograph mode, map mode may be newly set for obtaining characters clearly (FIG. 44).

Mode Setting Flow

Figure 81:
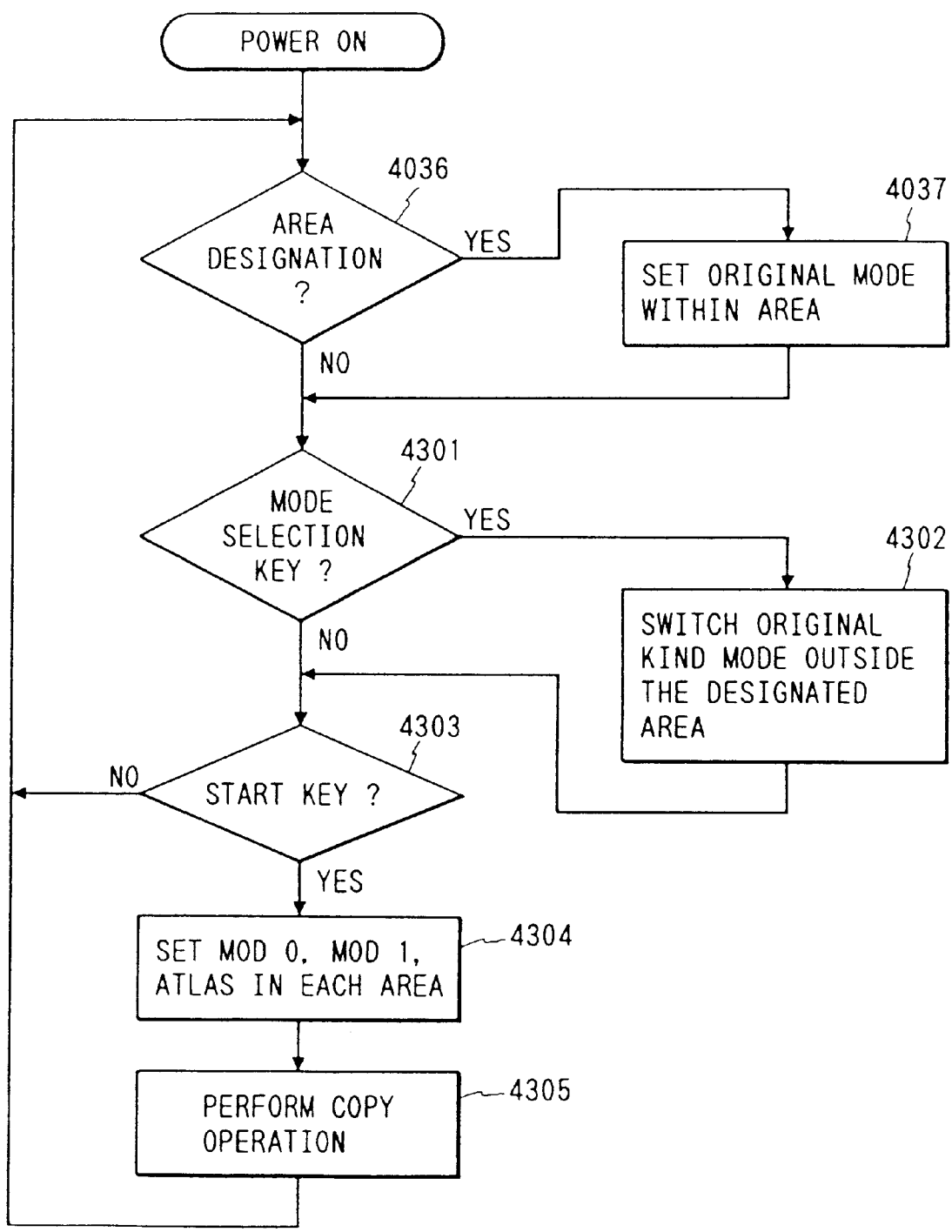
FIG. 81 is a flow chart illustrating an operation input procedure of control unit shown in FIG. 80.

FIG. 81 shows an original kind mode setting flow in this embodiment.

In step 4306, an area as shown in FIG. 80 is set, and in step 4037 an original mode in the area is set.

When a mode selection key is depressed in subsequent step 4301, four original kind modes (character, photograph, character/photograph and map) are switched sequentially in step 4302. When the copy start key is depressed in step 4303, in step 4304 MOD0 and MOD1 are set as shown in FIG. 42-1 according to the original kind mode finally selected in step 4302. In step 4305, copying operation is executed.

Signal Flow

Figure 82:
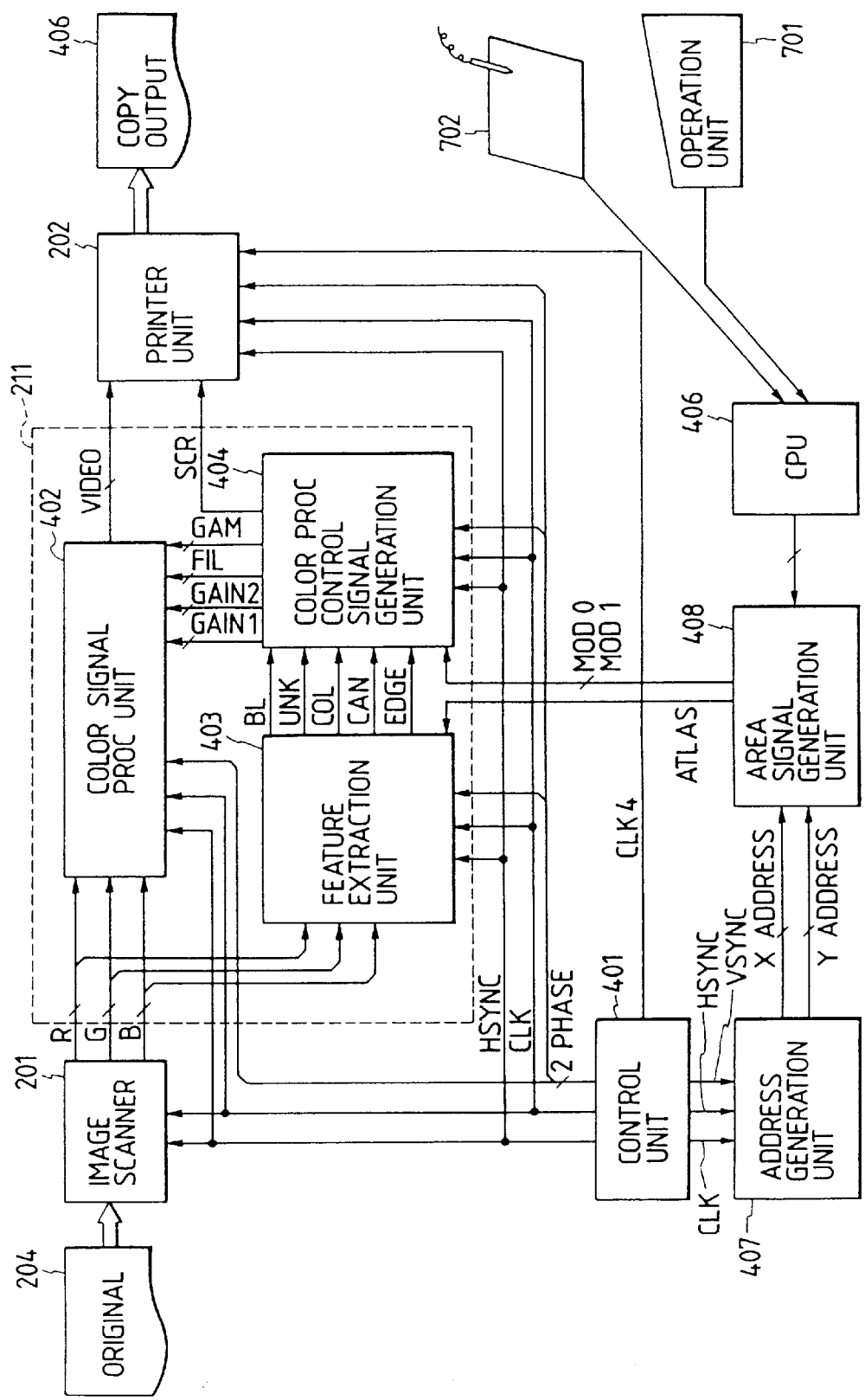
FIG. 82 is a block diagram showing the construction different from the construction shown in FIG. 4 and having an operation unit shown in FIG. 78.

The overall signal flow in this embodiment will now be described with reference to FIG. 82. FIG. 82 shows a modification of the circuit shown in FIG. 4, with parts like those in Figure being designated by like reference numerals and symbols.

Referring to FIG. 82, reference numeral 406 designates a CPU, and inputs of areas and original mode in each area are obtained from editor 702 and operation unit 701 by the method noted above.

Reference numeral 407 designates an address generation circuit, which generates main scanning address (Y address) and auxiliary scanning address (X address) according to sync signal, and 408 an area signal generator, which generates MOD0, MOD1 and ATLAS signals shown in FIG. 44 are generated in synchronism to the original scan. ATLAS signal is supplied to feature extraction unit 403, and MOD0 and MOD1 signals are supplied to color processing control signal generation unit 404.

Area Signal Generation Unit

Figure 84:
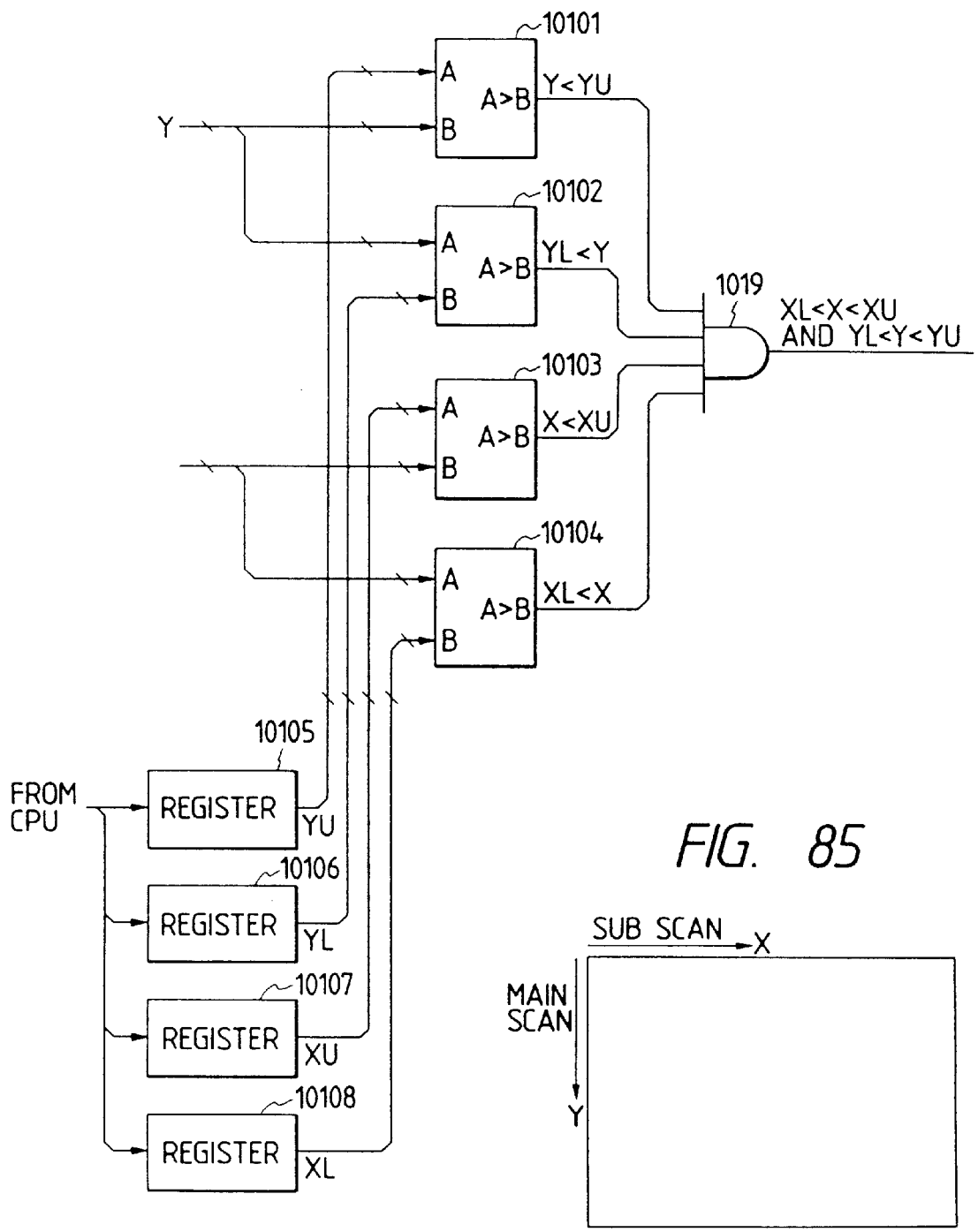
FIG. 84 is a block diagram showing the internal construction of 1003 to 1006 shown in FIG. 83.
Figure 85:
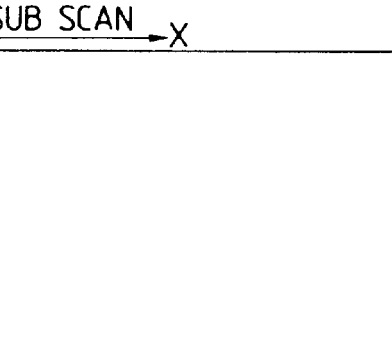
FIG. 85 is a view showing main and auxiliary scanning directions on digitizer.

FIG. 84 shows details of address generation circuit 407 and area signal generation unit 408. Upcounters 1001 and 1002 generate addresses corresponding to pixels in main and auxiliary scanning directions Y and X as shown in FIG. 85. Window compartors 1003 to 1006 compare their address inputs to values preset by the CPU for judgement as to whether pixels are in a designated area.

FIG. 84 shows the internal constructon of window comparators 1003 to 1006, and value corresponding to area designated in advance by the CPU is set in registers 10105 to 10108 consisting of comparators 10101 to 10104, registers 10105 to 10108 and AND gate 10109.

Figure 83:
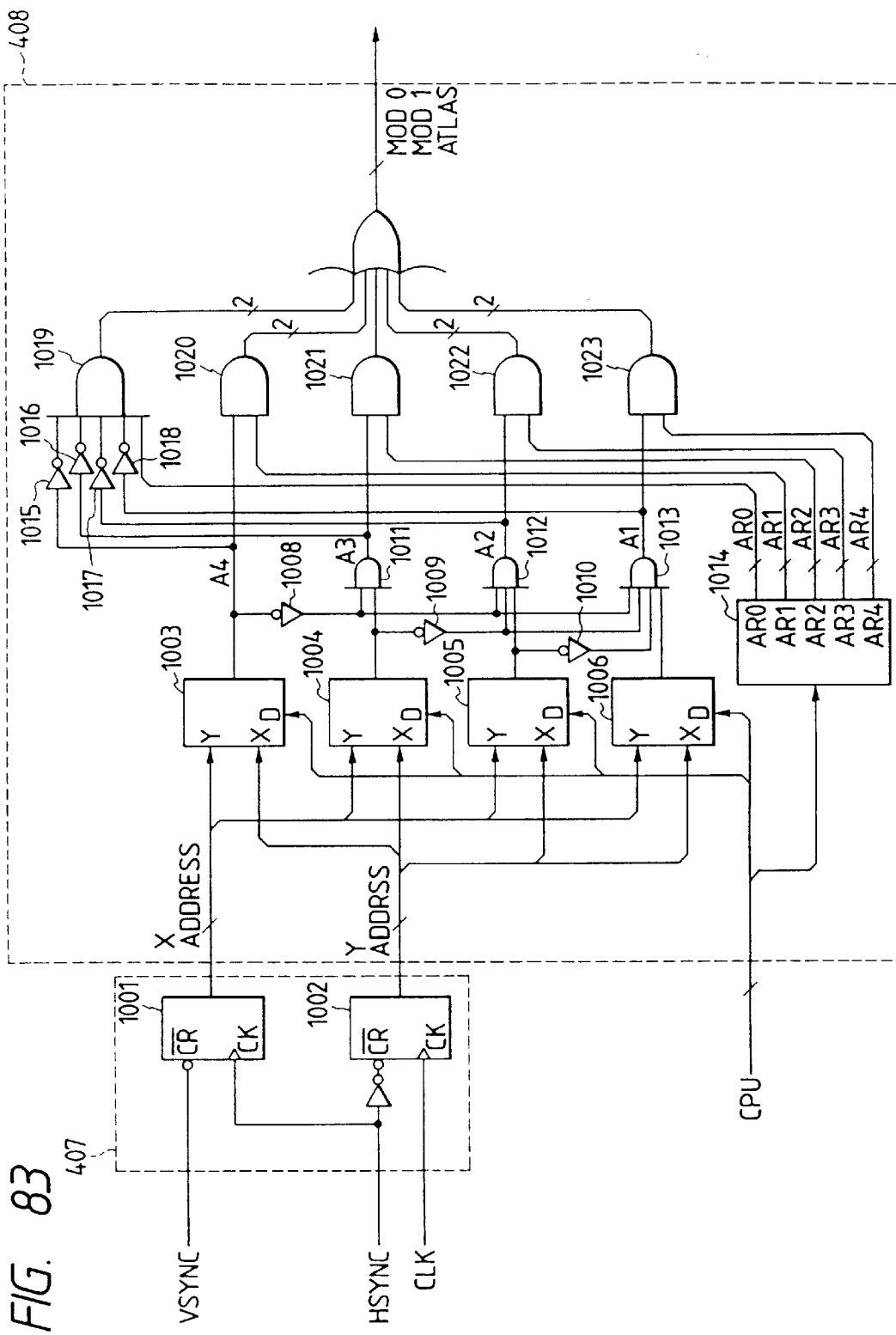
FIG. 83 is a block diagram showing the internal construction of address generator 407 and area signal generation unit 408 shown in FIG. 82.

More specifically, by setting the upper limit YU of main scanning in register 10105, lower limit YL of main scanning in register 10106, upper limit XU of auxiliary scanning in register 10107 and lower limit XL of auxiliary scanning in register 10108, output of "1" is provided when and only when XL<X<XU and YL<Y<YU, and a signal indicative of whether pixel is in a rectangular area is generated. Comparators 1003 to 1006 in FIG. 83 execute judgement as to whether pixels are in areas ④, ③, ② and ① in FIG. 79, and inverters 1008 1010 and AND gates 1011 to 1013 execute processing of providing preference to latter designation. Consequently, A4, A3, A2 and A1 are "1" in corresponding to areas ④, ③, ② and ① shown in FIG. 79 and never overlap.

Reference numeral 1014 designates a register directly coupled to the CPU. In this register are set in advance ATLAS, MOD0 and MOD1 in correspondence to mode in each of five areas ⓪, ①, ②, ③ and ④ in FIG. 79, and MOD0, MOD1 and ATRAS signals corresponding to each of areas ⓪ and ① to ④ are provided through inverters 1015 to 1018, AND gates 1019 to 1023 and OR gate 1024.

Modification of Embodiment of FIG. 82

Figure 86:
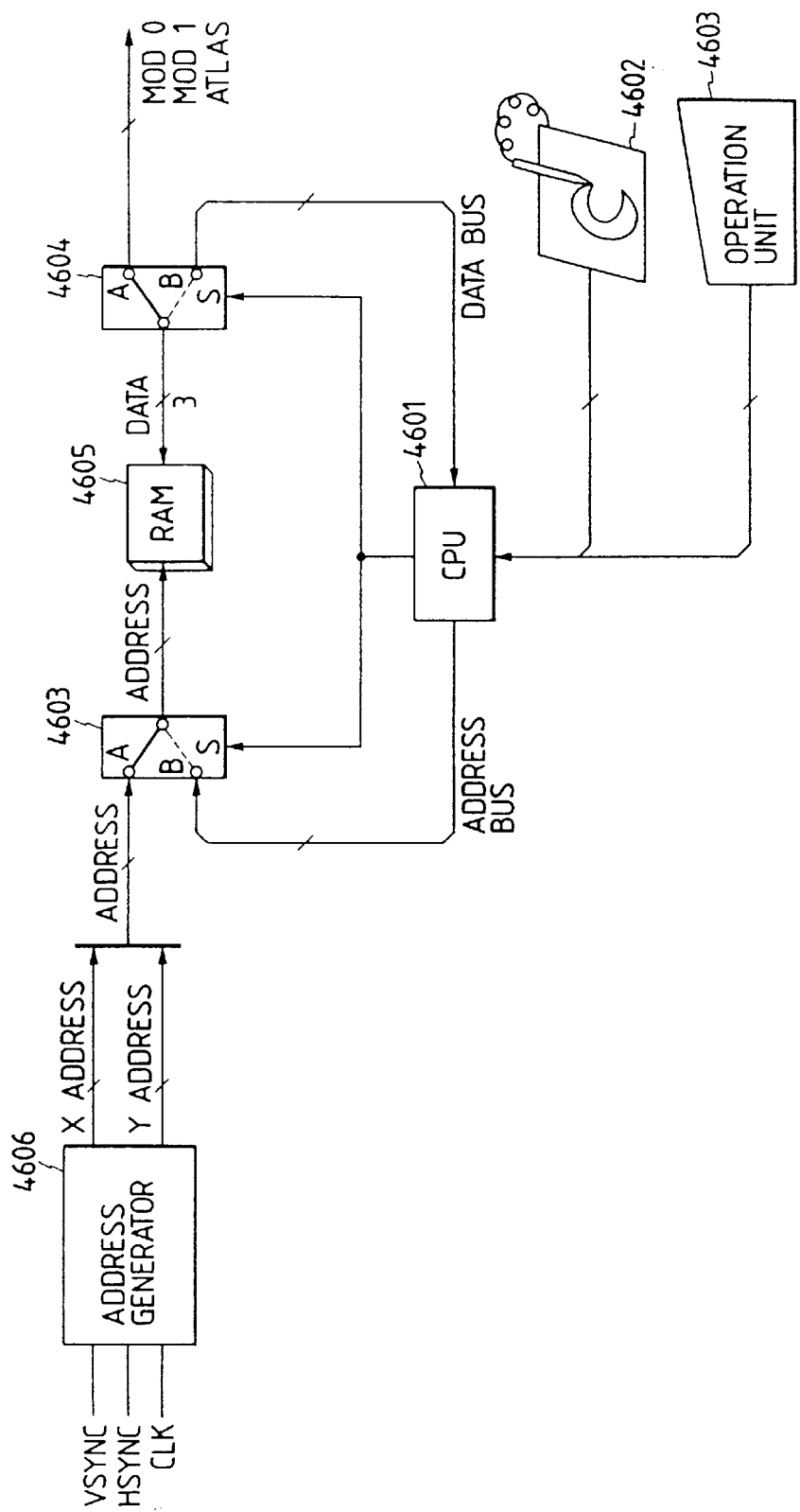
FIG. 86 is a block diagram showing a different example of area signal generation unit shown in FIG. 82.

FIG. 86 shows a modification of the embodiment shown in FIG. 82.

In the embodiment of FIG. 82, four rectangular areas are designated. However, the shape and number of areas as noted above are by no means limitative.

In the embodiment shown in FIG. 86 to be described later, it is possible to designate a desired number of areas having desired shapes. Referring to FIG. 86, reference numereal 4601 designates a CPU, and 4602 an editor, which can set non-rectangular area and mode in co-operation with operation unit 4603.

The results are written in bit map memory 4605. Bit map memory 4605 has three bits in the depth direction, and the individual bits respectively correspond to MOD0, MOD1 and ATLAS noted above. Reference numeral 4606 designates address generator same as 407, and 4603 and 4604 selectors. Portion shown in FIG. 46 corresponds to 408, 406, 701 and 702 in FIG. 82.

Once selectors 4603 and 4604 are set to B side, CPU 4601 can freely access bit map memory 4605, and it writes its modes MOD0, MOD1 and ATRAS in a developed form in this bit map memory 4605 in correspondence to non-rectangular area designated by editor 4062.

Then, the CPU may set selectors 4603 and 4604 to A side to access bit map memory 4605 with addresses generated from address generator 4606 for reading out MOD0 MOD1 and ATRAS written previously.

Other Embodiments

In the embodiments of FIGS. 82 and 86, original kind modes (character, character/photograph and photomodes) and map mode are designated for individual areas. However, these modes are by no means limitative, and it is possible to set other parameters.

Figures 1, 87A:
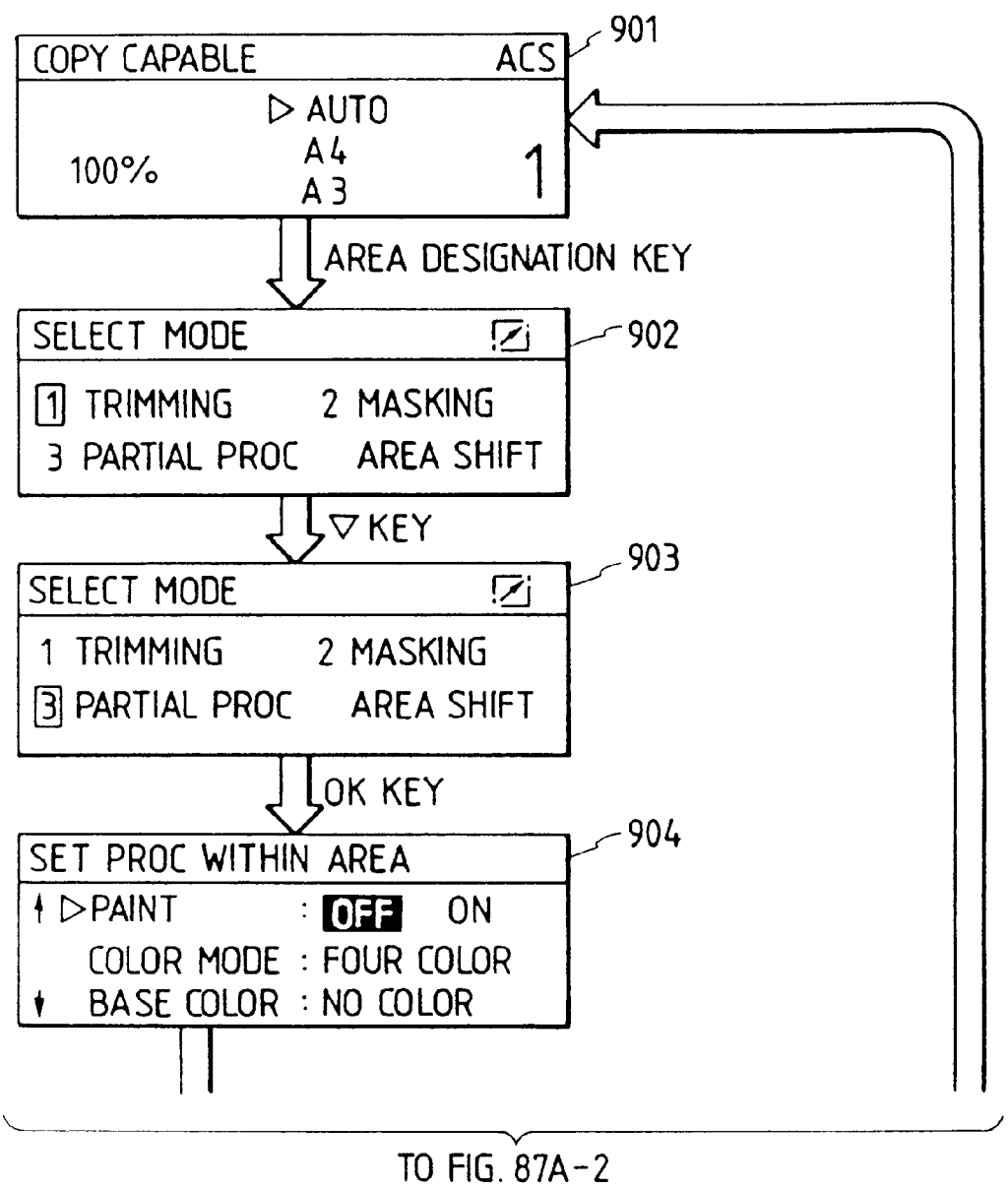
Figures 2, 87A:
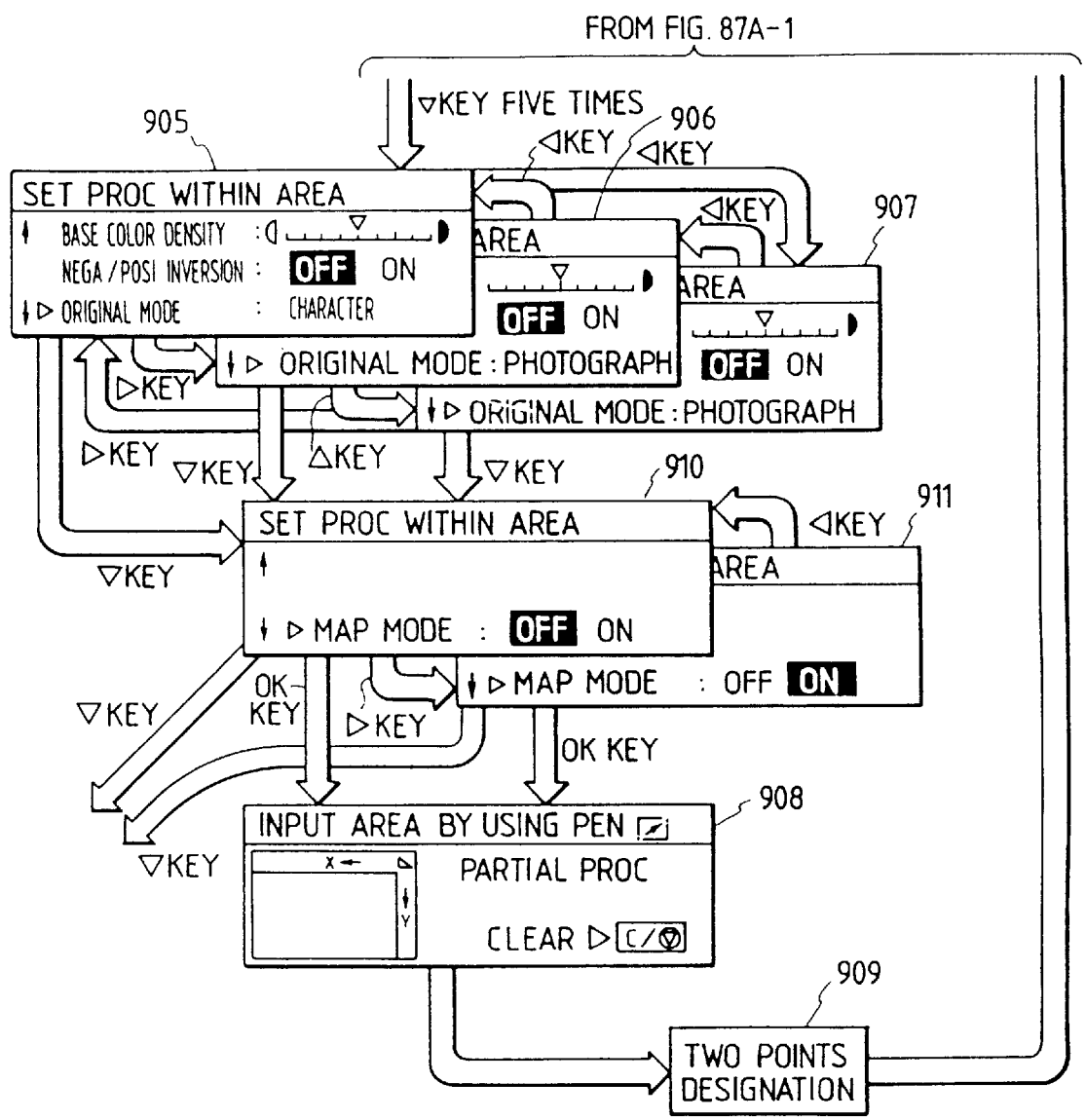
Figure 87B:
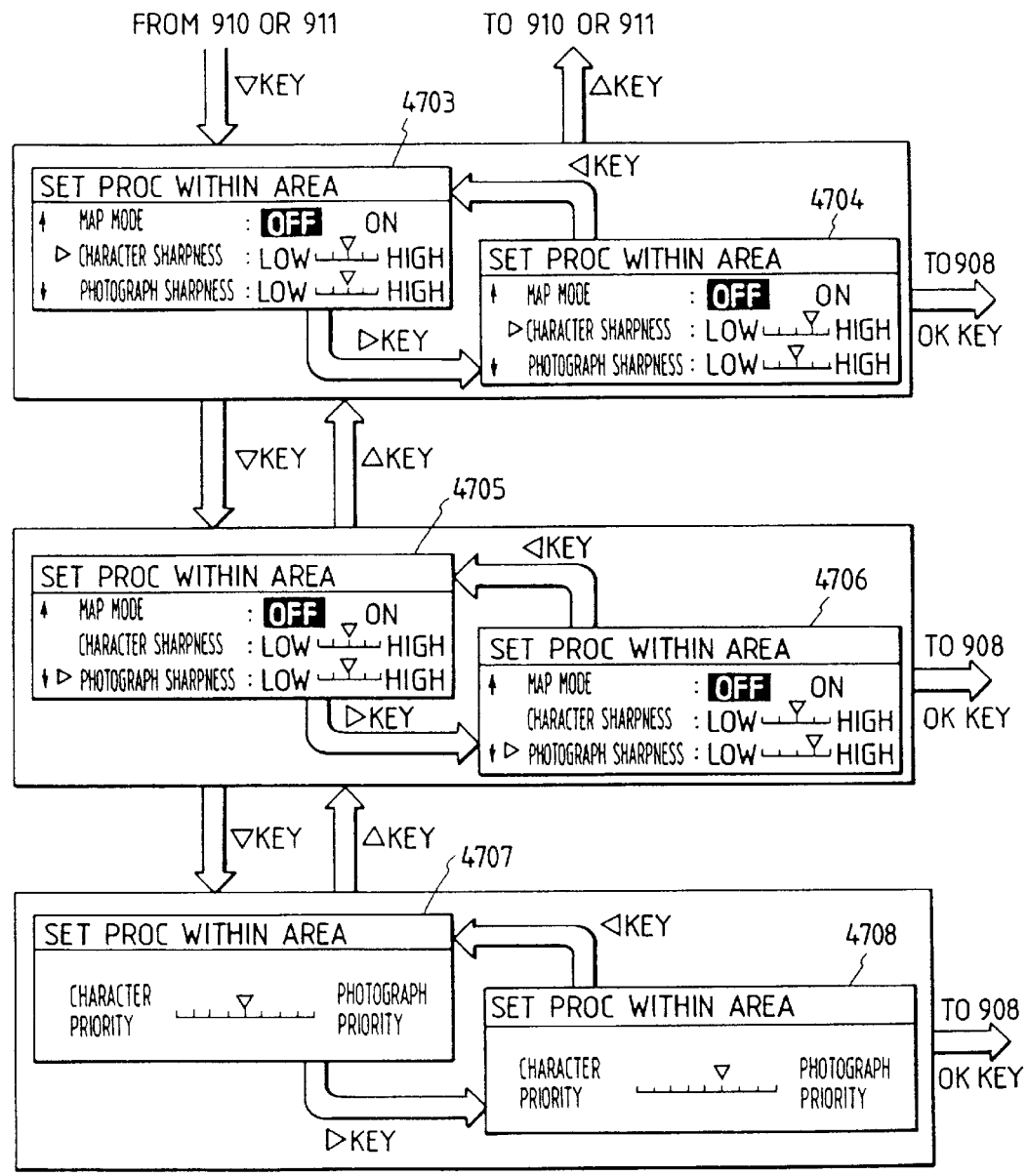

FIGS. 87A and 87B show such an embodiment. In these Figures, displays like those in FIG. 80 are designated by like reference numerals. Like the case of FIG. 80, when ▼ key is depressed in display 910 or 911 for map mode ON/OFF selection, display 4703 shown in FIG. 87B is provided, and the cursor is brought to character sharpness. Now, character sharpness can be designated in five steps such that the character sharpness designation is increased by one with ▷ key (4703 to 4704) and is reduced by one with ◁ key (4704 to 4703).

When ▼ key is depressed in state 4703 or 4704, the cursor is brought to photograph sharpness, and now photograph sharpness can be designated in five steps with ▷ and ◁ keys as in 4703 and 4704 (4705, 4706).

When ∇ key is depressed in state 4705 or 4706, character/photograph separation level can be set, and it can be designated in five steps with ▷ and ◁ keys (4707, 4708).

In either of cases 4703 to 4708, by depressing OK key things go to 908 in FIG. 87A to wait for area designation. (By repeating the above operation it is possible to designate sharpness without limitation on the number of areas.

In area ⓪ in FIG. 79, it is possible to designate character/photograph separation level and sharpness with usual operation as area other than designated area.

Figure 88:
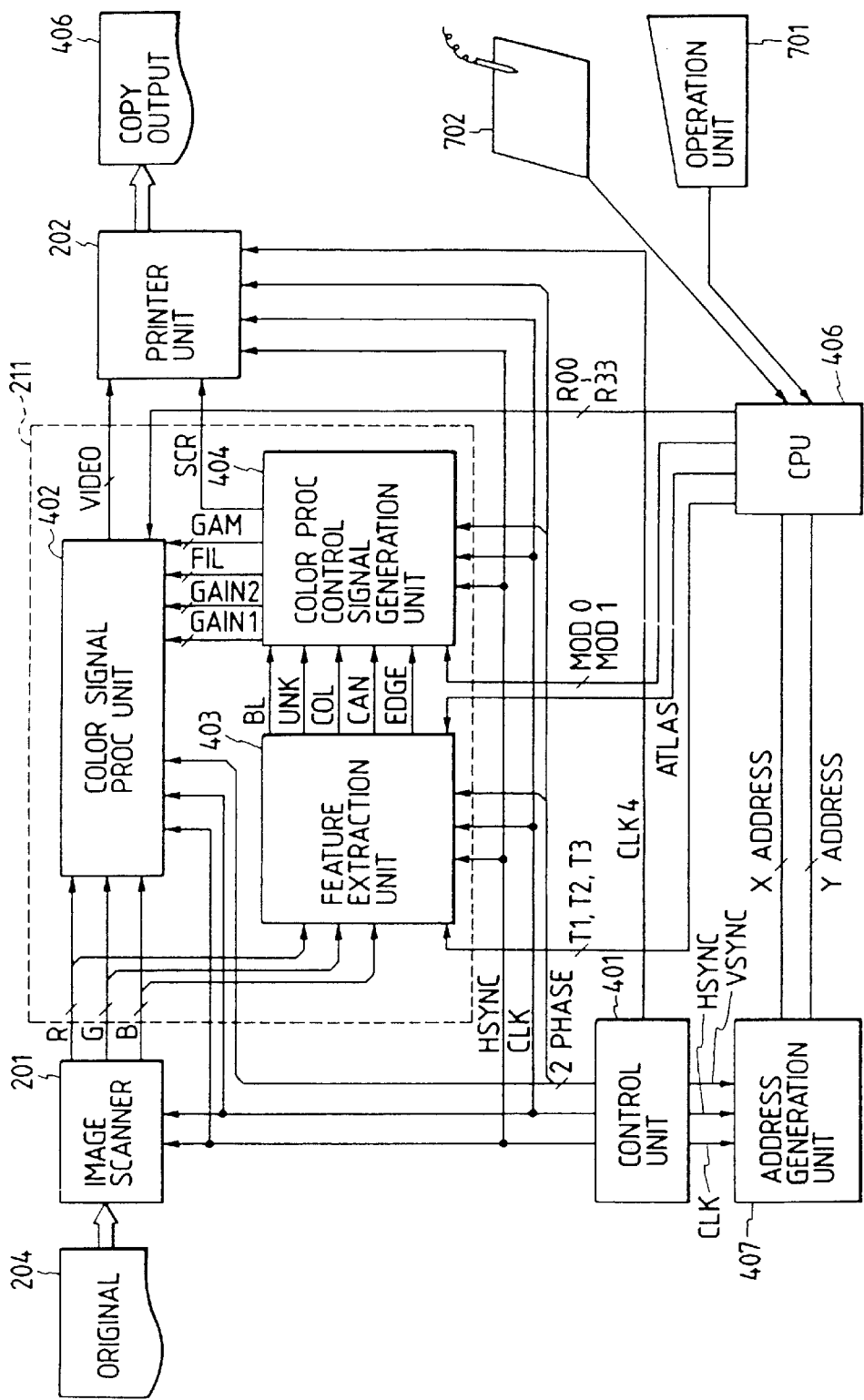
FIG. 88 is a block diagram showing a different example from the example of FIG. 82.

Further, as shown in FIG. 88 CPU 406 may receive address from address generator 407 and generate MOD0, MOD1 and ATLAS signals in synchronism to each address.

Further, for providing filter corresponding to the values of character sharpness and photograph sharpness in each area, the CPU supplies the values of R00 to R33 to 402 and supplies T1 to T3 to 403 according to the value of the character/photograph separation level.

Figure 89:
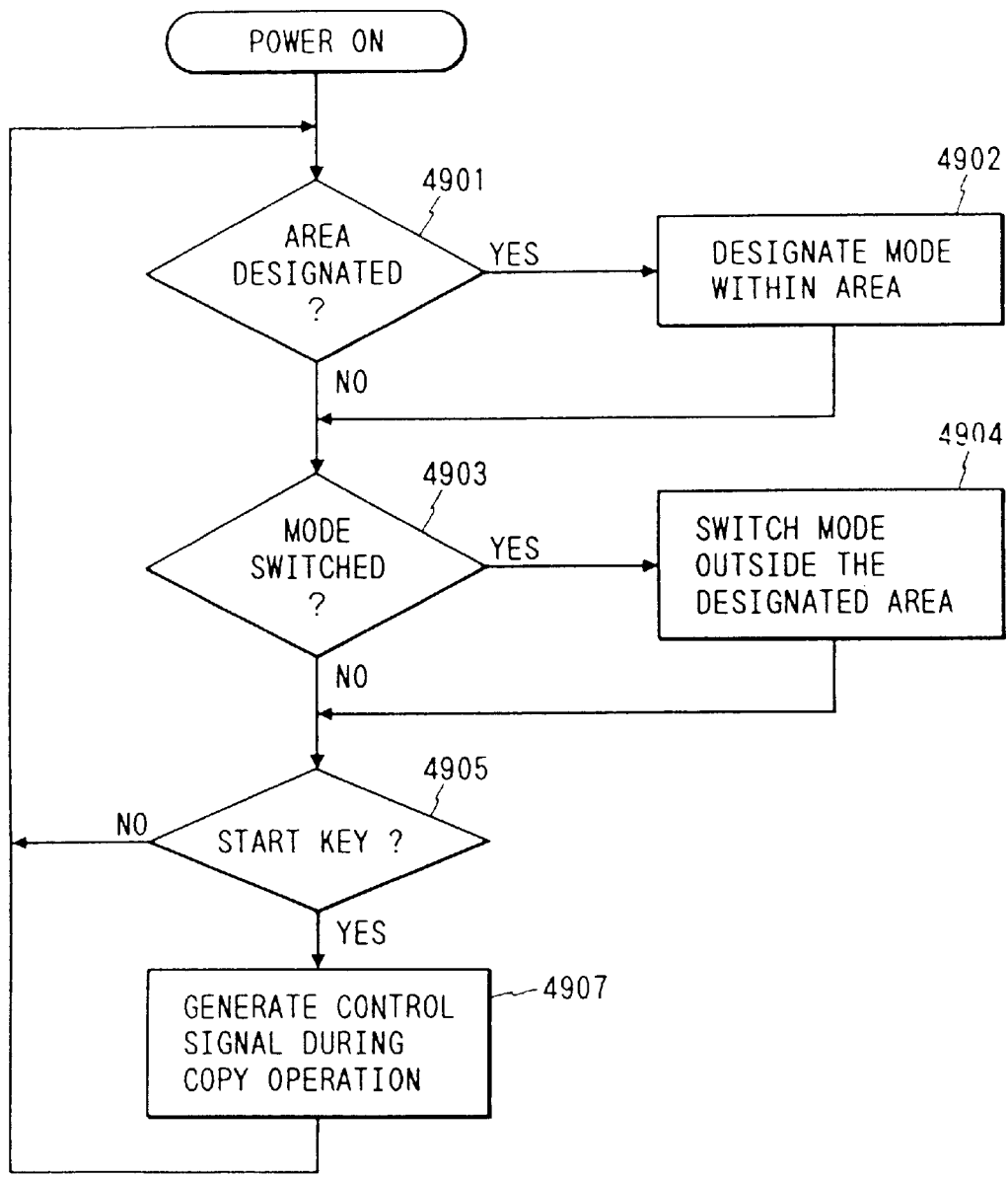
FIG. 89 is a flow chart showing a different example from the example of FIG. 81.

FIG. 89 shows processing flow. When it is detected in step 4901 that area designation has been made, in step 4902 a mode (character, character/photograph, photograph, map, sharpness, character/photograph separation level) is designated for the designated area.

When it is detected in step 4903 that the mode is switched by the usual key operation, mode (character, character/photograph, map, sharpness, separation level) for an area outside designated area ⓪ shown in FIG. 79 is switched.

When it is detected in step 4905 that the start key is depressed, in step 4907 T1 to T3 are provided according to character/photograph separation level, R00 to R33 according to sharpness, and MOD0, MOD1 and ATRAS according to original mode, during copying operation and in synchronism to the designated area.

In the above embodiments shown in FIG. 78 and following Figures, by varying the standards of character/photograph judgement in an area designation range, it is possible, even if an area subject to erroneous character/photograph judgement is present in an image under consideration, to obtain satisfactory image judgement by designating such range in advance and inputting judgement standards such as to permit satisfactory judgement in the designated area.

Further, while this embodiment is adapted to permit variation of the standards of character/photograph judgement, this is by no means limitative; for example, it is possible to permit setting of the character mode or photograph mode noted above absolutely without character/photograph judgement for a particular area. This embodiment deals with color images for processing, and this means that there are many cases of processing of dot color images. Therefore, with combination of the area designation and character/photograph judgement control it is possible to obtain image area judgement with very high accuracy.

Further, in this embodiment it is possible to set map mode, character sharpness and photograph sharpness independently in area designatoni area as shown in FIGS. 87A and 87B. Thus, for an area in an image under consideration, for which emphasis is desired, for instance, for a character portion in image where character and photograph are present in superimposition on each other such as a commercial catalog, area designation may be done for such portion, and slightly stronger character sharpness may be provided for that area. Alternatively, map mode may be designated to obtain a desired image with emphasis provided to edges of character portion.

Now, modifications of the above embodiments will be described.

Figure 90:
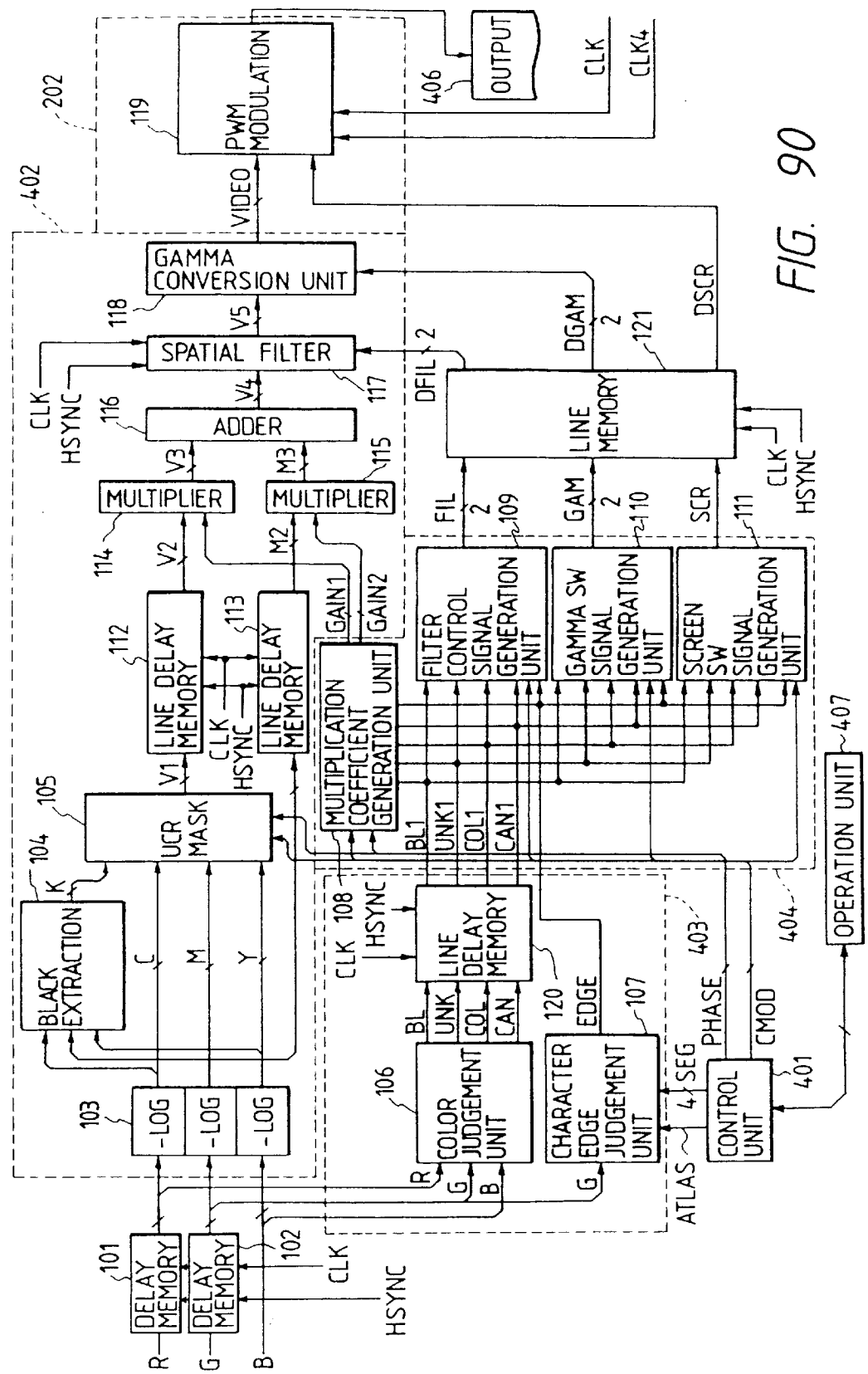
FIG. 90 is a view showing a modification of the embodiment of FIG. 1.
Figure 91:
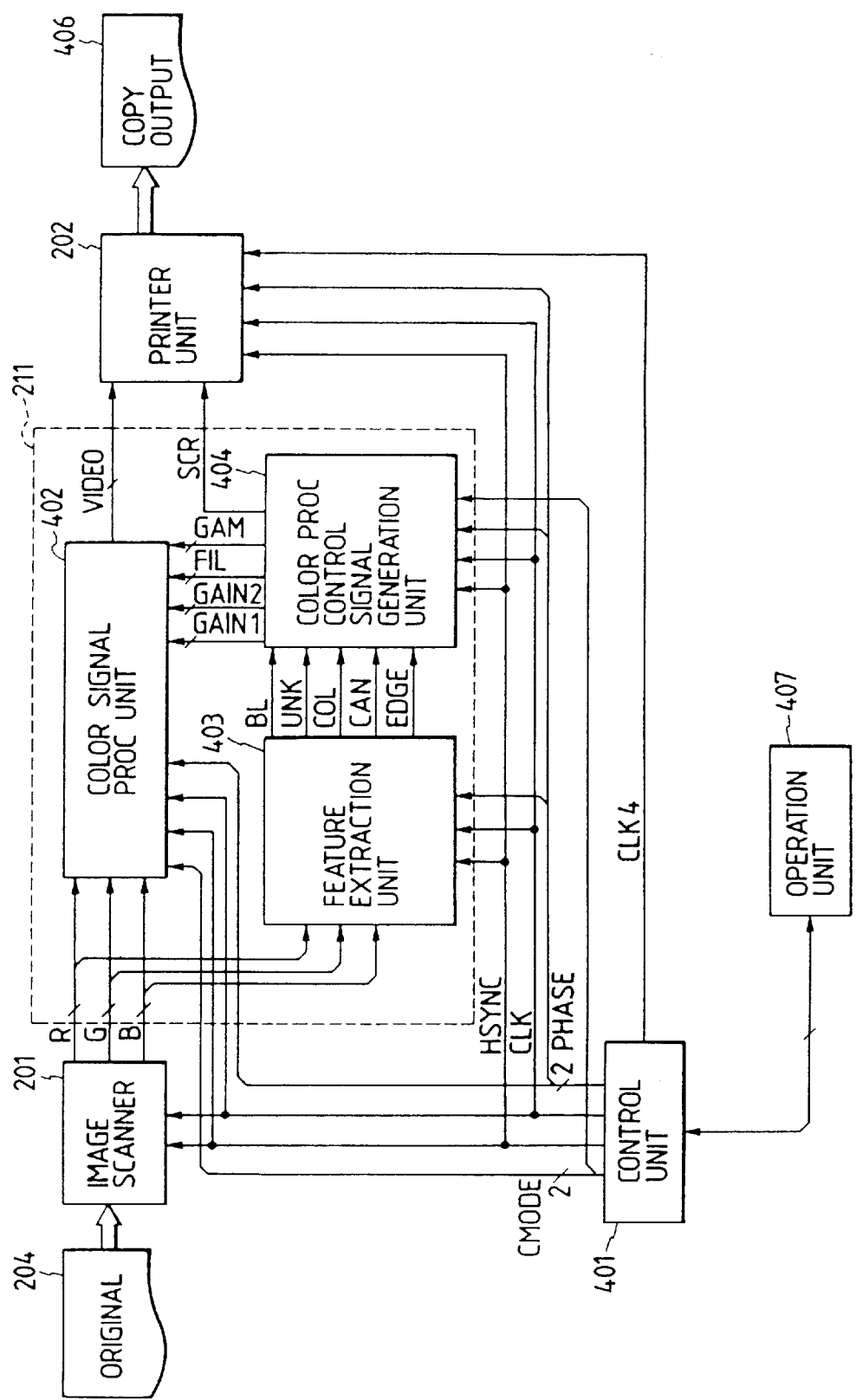
FIG. 91 is a view showing a modification of the embodiment of FIG. 4.

FIG. 90 shows a modification of the embodiment shown in FIG. 1.

Figures 94, 95:
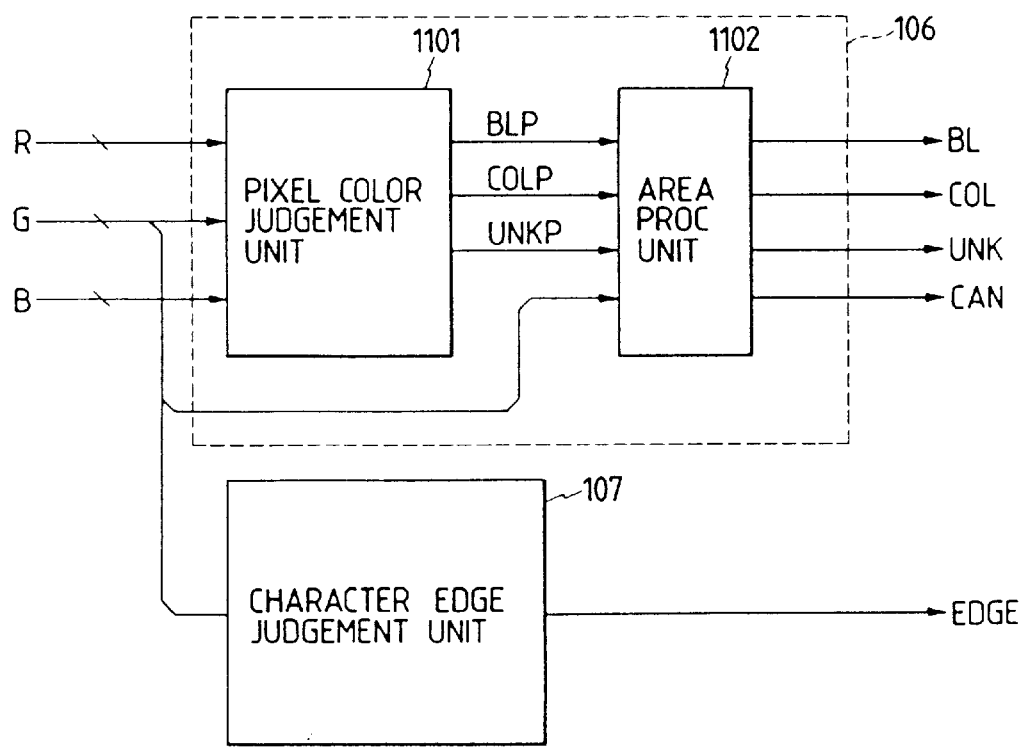
FIG. 94 is a view showing the relation between color mode and CMODE signal.
FIG. 95 is a view showing a modification of the embodient of FIG. 11.

Control unit 401 shown in FIG. 90 provides to each process block, in addition to 2-bit PHASE signal, 2-bit CMODE signal to inform each process block of copying color mode data. The 2-bit CMOS signal represent color modes as shown in FIG. 94. The upper and lower signals in the 2-bit signal are hereinafter referred to as C1 and C0, respectively.

Color signal processing unit generates recording video signal VIDEO for printer unit 202 according to the PHASE and CMODE signals and also to the color processing control signal noted above.

Figure 92:
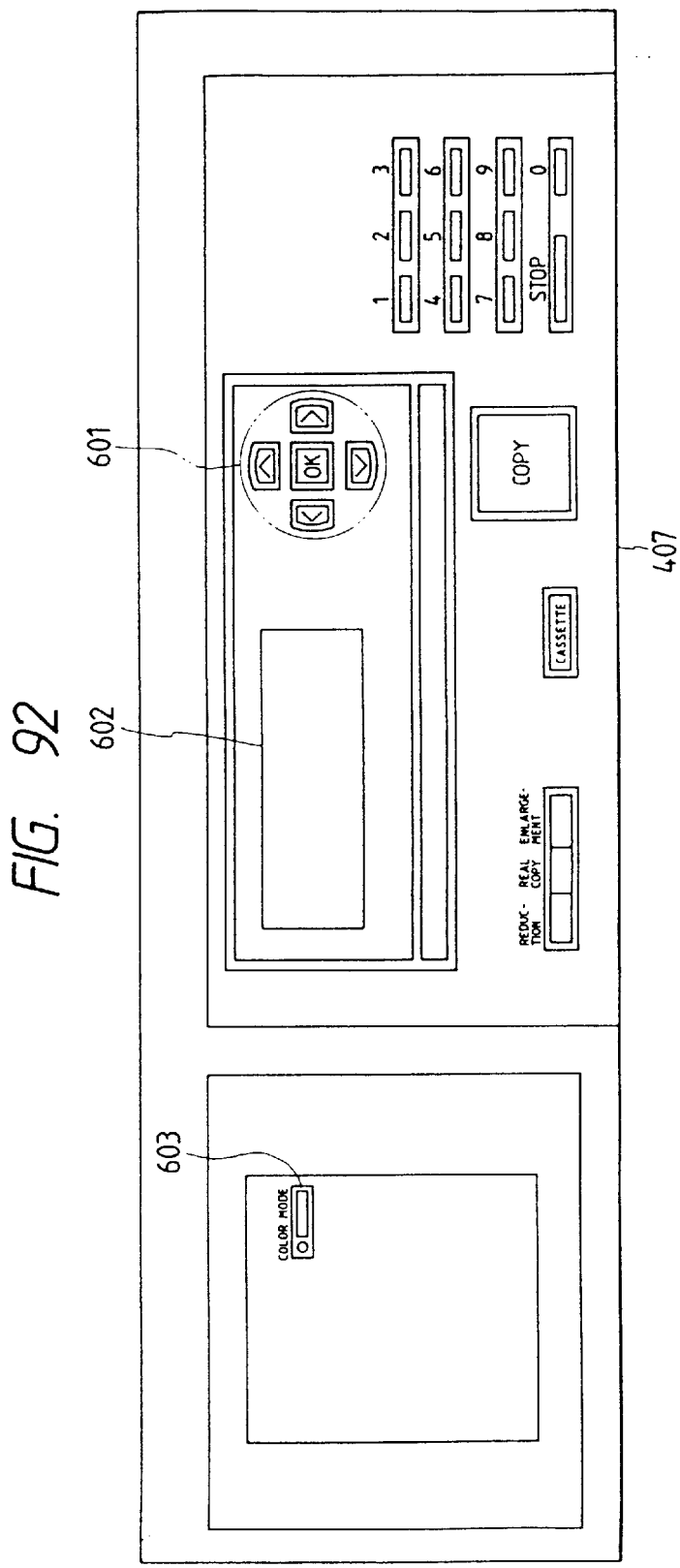
FIG. 92 is a view showing an operation panel of a copier in the embodiment of FIG. 90.

FIG. 92 shows a specific example of operation panel 407 of copier in the embodiment shown in FIG. 90.

Reference numeral 602 designates a display screen, 601 setting keys for setting in display screen and consisting of cursor movement keys and an OK key, and 603 a color mode key for selecting a color mode. As color mode, there are a four-color mode, a three-color mode and a mono-color mode. The four-color means a full color, for which four developing colors of magenta, cyan, yellow and black are used. The three-color means a full color, for which magenta, cyan and yellow are used. The mono-color is a case for providing output in a single color. In this embodiment, red, green, blue, magenta, yellow and black are available for that color.

The status of screen display when selecting a color mode will now be described with reference to FIG. 93. As an example, a case of selecting green mono-color mode will be considered. First, color mode key 603 is depressed once, whereupon display 701 is provided. Subsequently, a color mode is selected by using setting keys 601. Shown at 702 is a display provided when green is selected. If the setting is all right, OK key is depressed, whereupon standard screen display 703 is provided. In state 703 the display of G represents that green is selected.

When each color mode is selected, CMODE signal is provided from control unit 401 correspondingly as shown in FIG. (4.

SCR signal is supplied from color processing control signal generation unit 404 to printer unit 202. In printer unit 202, a plurality of pulse width modulation basic clocks (screen clocks) are switched according to the SCR signal for optimum density expression to the original.

The 2-bit color mode signal CMODE is also supplied to color singal processing unit 402. Color signal processing unit 402 undertakes the following process according to the input 2-bit signal CMODE. That is, $$\begin{pmatrix} M' \\ C' \\ Y' \\ K' \end{pmatrix} = \begin{pmatrix} a_{11}, a_{12}, a_{13}, a_{14}(1-u_1) \\ a_{21}, a_{22}, a_{23}, a_{24}(1-u_2) \\ a_{31}, a_{32}, a_{33}, a_{34}(1-u_3) \\ a_{41}, a_{42}, a_{43}, a_{44} \end{pmatrix} \begin{pmatrix} M \\ C \\ Y \\ K \end{pmatrix}$$

where $a_{11}$ to $a_{14}$, $a_{21}$ to $a_{24}$, $a_{31}$ to $a_{34}$ and $a_{41}$ to $a_{44}$ are predetermined masking coefficients for removal of color impurity, and u1 to u3 are UCR coefficients for removing K component from color components of M, C and Y. Of M', C', Y' and K' one is selected according to 2-bit developing color signal PHASE from control unit 401 to be provided as V1 signal. M', C', Y' and K' are selected in correspondence to 0, 1, 2 and 3 of PHASE signal, respectively. This is done so in the case of four-color mode.

In the case of the three-color mode, M', C', Y and K' are calculated as follows.

$$\begin{pmatrix} M' \\ C' \\ Y' \\ K' \end{pmatrix} = \begin{pmatrix} b_{11}, b_{12}, b_{13}, 0 \\ b_{21}, b_{22}, b_{23}, 0 \\ b_{31}, b_{32}, b_{33}, 0 \\ 0, 0, 0, 0 \end{pmatrix} \begin{pmatrix} M \\ C \\ Y \\ K \end{pmatrix}$$

Here, $b_{11}$ to $b_{14}$, $b_{21}$ to $b_{24}$, $b_{31}$ to $b_{34}$ and $b_{41}$ to $b_{44}$ are predetermined masking coefficients for the case of three-color mode.

In the mono-color case, M', C', Y' and K' are calculated as $$\begin{pmatrix} M' \\ C' \\ Y' \\ K' \end{pmatrix} = \begin{pmatrix} 1/3 & 1/3 & 1/3 & 0 \\ 1/3 & 1/3 & 1/3 & 0 \\ 1/3 & 1/3 & 1/3 & 0 \\ 1/3 & 1/3 & 1/3 & 0 \end{pmatrix} \begin{pmatrix} M \\ C \\ Y \\ K \end{pmatrix}$$

The discrimination of the four-color, three-color and mono-color cases is done according to 2 bits of color mode signal CMODE.

FIG. 96 is a view showing a modification of the table in FIG. 26 noted before, and FIG. 97 is a view showing a modification of R0M shown in FIG. 25.

In FIG. 96, labeled (a) to (h) are cases of four-color. Values in the three-color and mono-color cases are not related to the results of color judgement and edge portion extraction as shown in the Figure. More specifically, in the three-color and mono-color modes there is no need of any process concerning black character, and such judgement result is unnecessary. That is, V2 may be used as output singal at all time. At this time, CMOS signal, C1 and C0 are used as switching signal.

Figure 97:
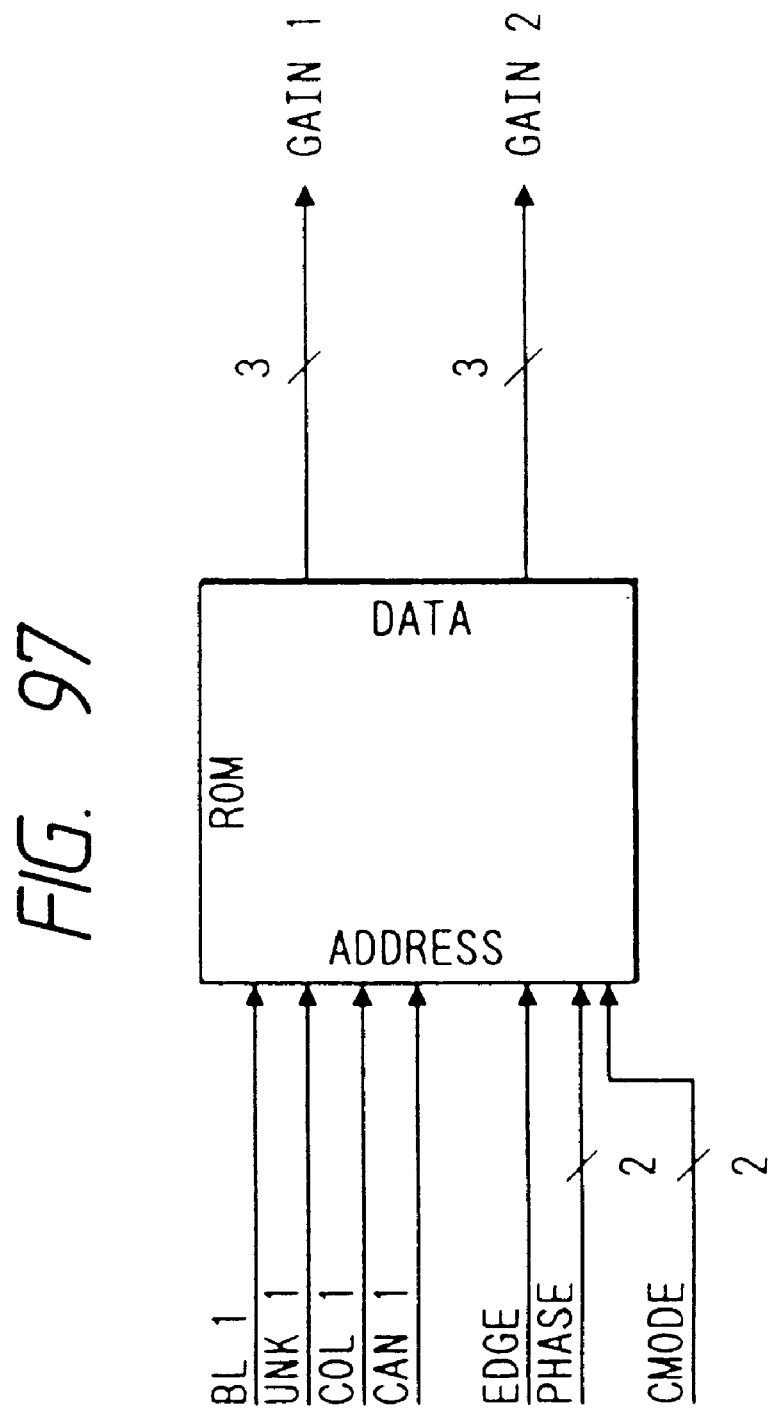
FIG. 97 is a view showing a modification of the embodiment of FIG. 27.

Multiplification factor generation unit 108 shown in FIG. 90 consists of a R0M as shown in FIG. 97, and it receives 5-bit judgement signals (PHASE and CMODE) as address and provides corresponding two 3-bit gain signals GAIN1 and GAIN2.

FIG. 98 shows the relation between address and output of the R0M.

In the three-color and mono-color modes, GAIN1 and GAIN2 take fixed values of "4" and "0".

Figure 99:
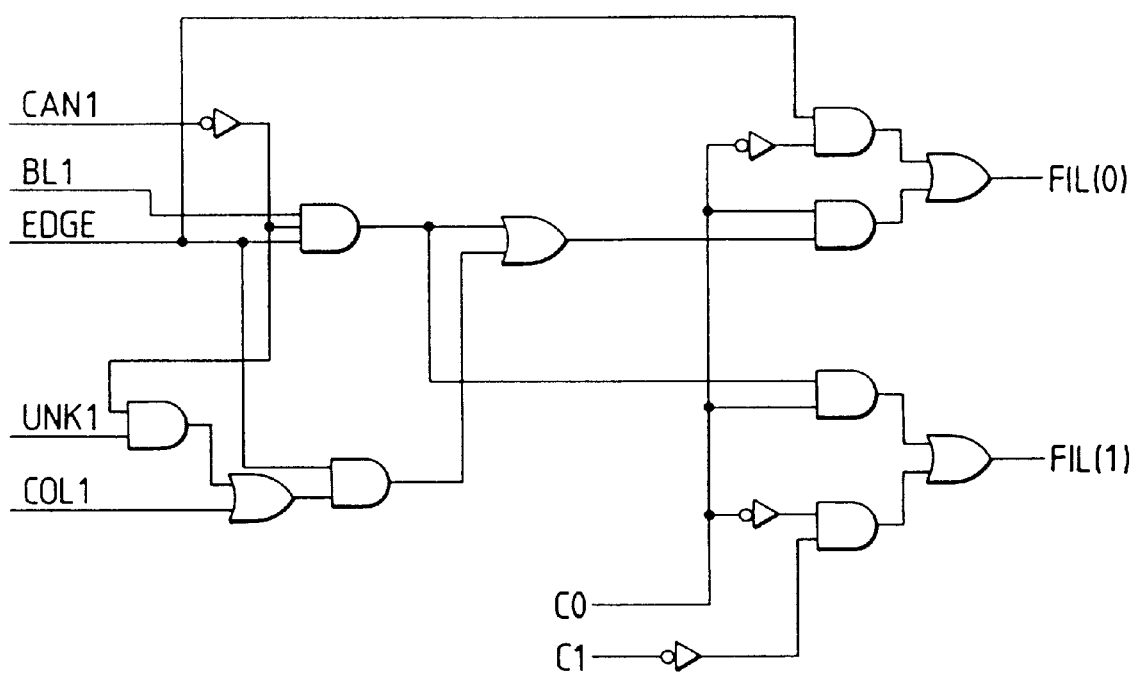
FIG. 99 is a modification of the embodiment of FIG. 31.

FIG. 99 shows a modification of the construction shown in FIG. 73, and FIG. 100 shows a modification of the construction shown in FIG. 74A.

In FIGS. 99 and 100, in the three-color and monocolor cases the values of FIL(0) and FIL(1) have no bearing on color judgement results BL1, UNK, C0L and CAN, and equivalently provide for an operation as in the case without use of color judgement results.

Figures 101, 102:
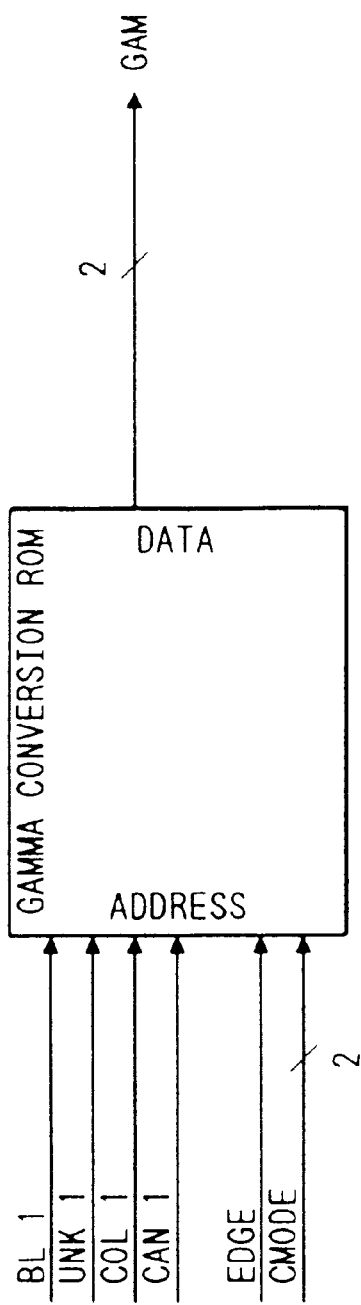
FIG. 101 is a view showing a modification of the embodiment of FIG. 35.
FIG. 102 is a view showing a modification of the embodiment of FIG. 36.

FIG. 101 shows a modification of the construction shown in FIG. 35.

Referring to FIG. 101, gamma switching signal generation unit 110 consists of a R0M, and it receives color judgement signal, character edge judgement signal (and color mode signal) as address and provides GAM signal as data. FIG. 102 shows contents of Rom table. As noted before, GAM=3 for black character edge portion (EDGE=1, BL1=1), and GAM=2 for intermediate saturation character edge portion (EDGE=1, UNK=1). In either case, if there is CAN1 signal indicating BL1=1 or UNK=1 due to color deviation, GAM=0 is provided in order not to emphasize character edges. However, in three-color and mono-color cases the operation is equivalent to that without use of color judgement signal.

Figure 103:
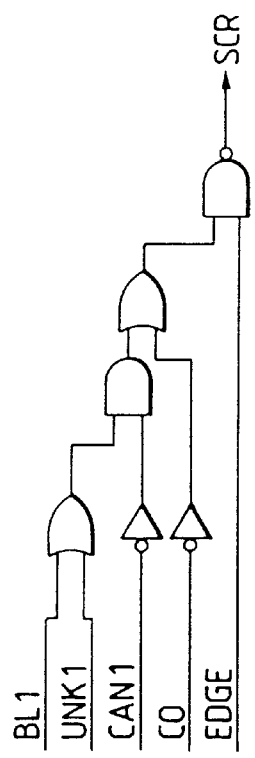
FIG. 103 is a view showing a modification of the embodiment of FIG. 39.

Thus, SCR shown in FIG. 103 is LOW for portion corresponding to black or intermediate saturation character edge portion (as well as colored character edge portion in case of FIG. 4). For these portions, PW4 is provided as LDR signal. If judgement as character edge portion is given at this time, PW4 is not used in case of character edge portion (CAN=1) in order to prevent degradation of the recorded image quality due to emphasis of color deviation.

In the embodiment shown in FIG. 103, if C0 (i.e., lower bit of CMODE signal) is other than "1", i.e., if in a color mode other than the four-color mode, DSCR is determined solely by EDGE without any bearing on color judgement signals BL1, UNK1 and CAN1.

Now, a different example of character edge judgement unit 107 shown in FIG. 1 will be described.

Figure 104:
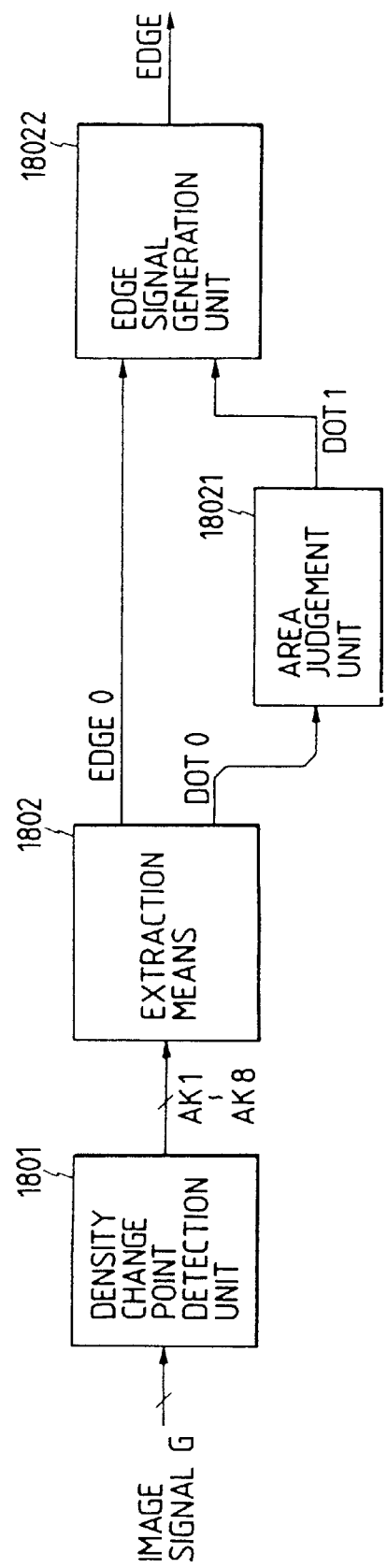
FIG. 104 is a view showing a further embodiment of the invention.

FIG. 104 is a block diagram showing character edge judgement circuit 11-3 in this embodiment.

In the Figure, reference numeral 1801 designates a density change point detection unit, 1802 a density change continuity and dot extraction means, 1802 an area judgement unit for effecting area judgement of extracted dot signal, and 18022 an edge signal generation unit for forming final character edge area signal EDGE from continuous density change and dot area both detected by unit 1802.

Density change point detection unit 1801 and density change continuity and dot extraction means 1802 have constructions as shown in FIG. 18-2.

Figure 107:
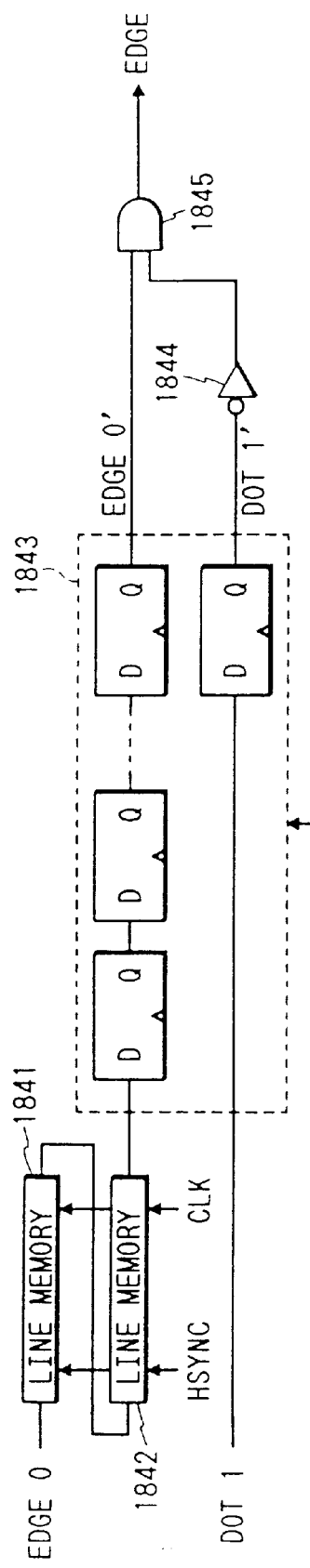
FIG. 107 is a view showing a modification of the embodiment of FIG. 70.

FIG. 107 is a block showing edge signal generation unit 18022 shown in FIG. 104.

Referring to the Figure, line memories 1841 and 1842 provide a delay for two lines as a whole to EDGE0 for synchronization with auxiliary scanning with DOT1.

Flip-flop 1843 effects main scanning synchronization of EDGE0 and DOT1 to provide EDGE0' and DOT1'. Reference numeral 1844 designates an inverter, and 1845 an AND gate.

In this construction, EDGE=1 as output when and only when EDGE0'="1" and DOT1'="0". In other words, if EDGE="1" in a given pixel, i.e., if a continuous density change is present and DOT1=0, i.e., no dot area is present, it is regarded as edge of character, drawing, etc., and EDGE="1".

Figure 105:
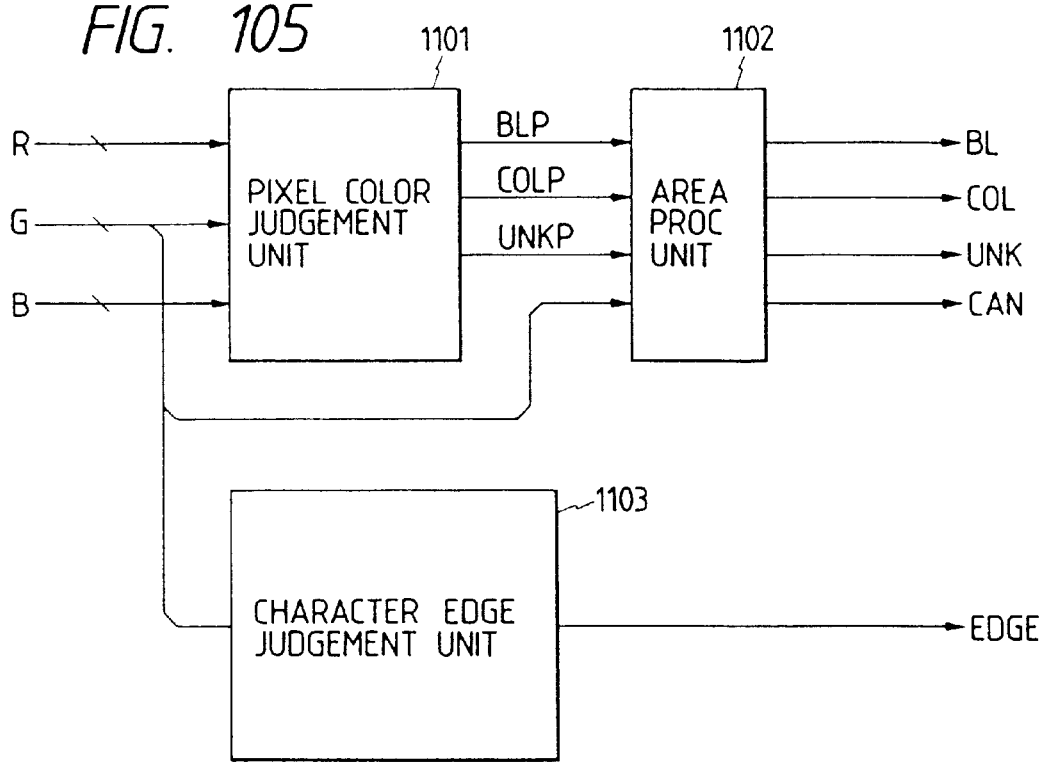
FIG. 105 is a view showing a further modification of the embodient of FIG. 95.

FIGS. 95 and 105 show modifications of the circuit shown in FIG. 11. These Figures are block diagrams showing the internal construction of feature extraction unit 403. Pixel, color judgement unit 1101 generates, for each pixel, BLP signal indicating black, COL signal indicating a color trace, and UNK signal indicating obscurity, these signals being supplied to area processing unit 1102. Area processing unit 1102 executes area judgement of BLP, COLP, UNKP and G signals in a 5-by-5 area including a given pixel to remove errors, thus generating BL, COL and UNK signals as well as CAN signal.

Character edge judgement unit 1103 executes judgement as to whether a portion is a character edge portion according to G signal and generates EDGE signal. The reason for making judgement as to whether a portion is a character edge portion according to the sole G signal is as follows. As shown in FIG. 7, among R, G and B signals G signal is closest to the spectral luminous efficiency characteristic, and therefore it can represent character edge detection signal of white/black image. With this embodiment, it is possible to simplify the construction.

The construction of FIG. 105 is obtained by adding conversion unit 1104 to the construction of FIG. 95 to permit character edge judgement with increased accuracy.

Figure 106:
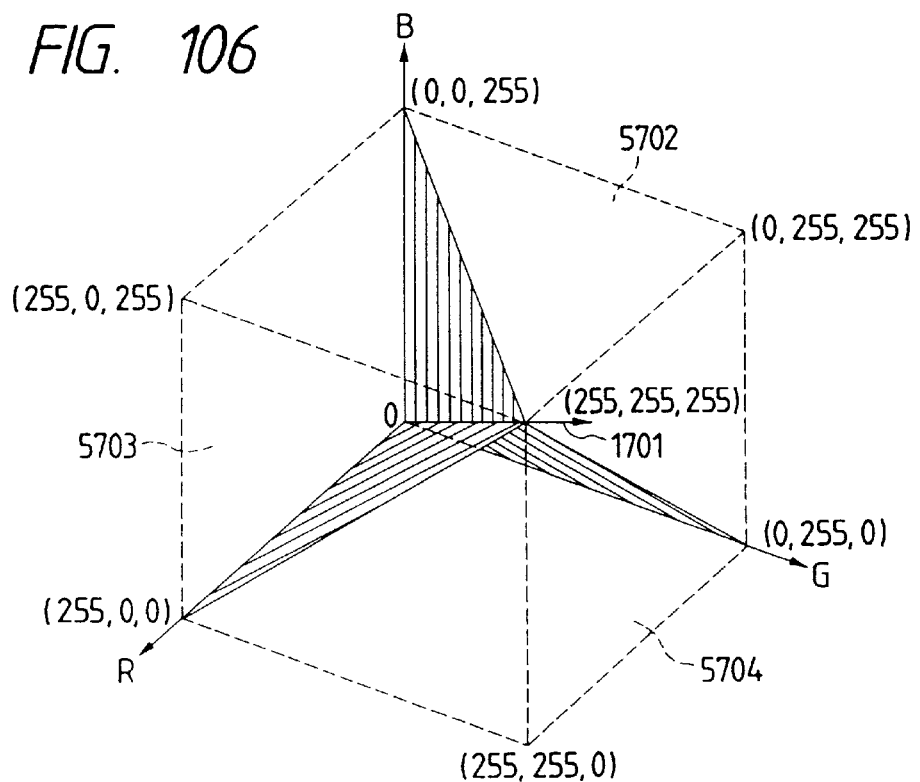
FIG. 106 is a view for explaining the operation of FIG. 13 in further detail.

FIG. 106 is a view for supplementary explanation of the reason for altering the values of constants ka, kb, kc, ia, ib and ic according to the output of the MAX/MIN detection circuit shown in FIG. 106.

Generally, a full-color sensor has a peculier color balance deviation. Therefore, if colored/color-free judgement is made for all color hues with the same judgement standards, it will result in erroneous judgement. Accordingly, the three-dimensional space of R-G-B is divided into three, as shown in FIG. 13, to cope with the balance characteristic of the sensor. More specifically, the three-dimensional space of R-G-B is divided into area 5702 with MIN=R, area 5703 with MIN=G and area 5704 with MIN=B, and corresponding values of ka, kb, kc, ia, ib and ic are used.

For example, for a sensor, with which R component signal is rather low, the values of KAR, KBR, KCR, iAR, iBR and iCR in FIG. 13 are set to be slightly greater. By so doing, in case of MIN=R it is possible in the area shown in FIG. 12-1 to make area A wide and area C narrow. In this way, it is possible to cope with various sensors sofisticatedly.

Subtractors 1310 to 1312 and comparators 1316 to 1318 judge magnitude relations between MAX–ka and 2MIN, between MAX–kb and MIN and between MAX–kc and MIN2.

Subtractors 1313 to 1315 and comparators 1319 to 1321 judge magnitude relations between MAX–ia and 2MIN, between MAX–ib and MIN and between MAX–ic and MIN2

Comparators 1322 and 1323 judge magnitude relations between MAX and WMX and between MIN and WMN.

In the above way, the area judgement is performed, and the results are provided as judgement signals BL1, UNK1 and COL1.

FIG. 107 is a block diagram showing a different example of edge signal generation unit 18022 shown in FIG. 70.

In the Figure, line memories 1841 and 1842 provide delay for two lines as a whole to EDGE0 for synchronization of DOT1 in auxiliary scanning.

Flip-flop 1843 effects synchronization of DOT1 in main scanning and provides EDGE0' and DOT1'.

In this construction, EDGE="1" is provided as output when and only when EDGE0'="1" and DOT1'="0". In other words, if EDGE0 ="1" in a given pixel, i.e., if there is continuous density change and DOT1="0", it is regarded to be an edge of character, drawing, etc., and EDGE="1" is the output. It will be seen that this construction is like the construction shown in FIG. 70, except for that in the case of FIG. 70. Or gate 1845 is not provided.

Figure 108B:
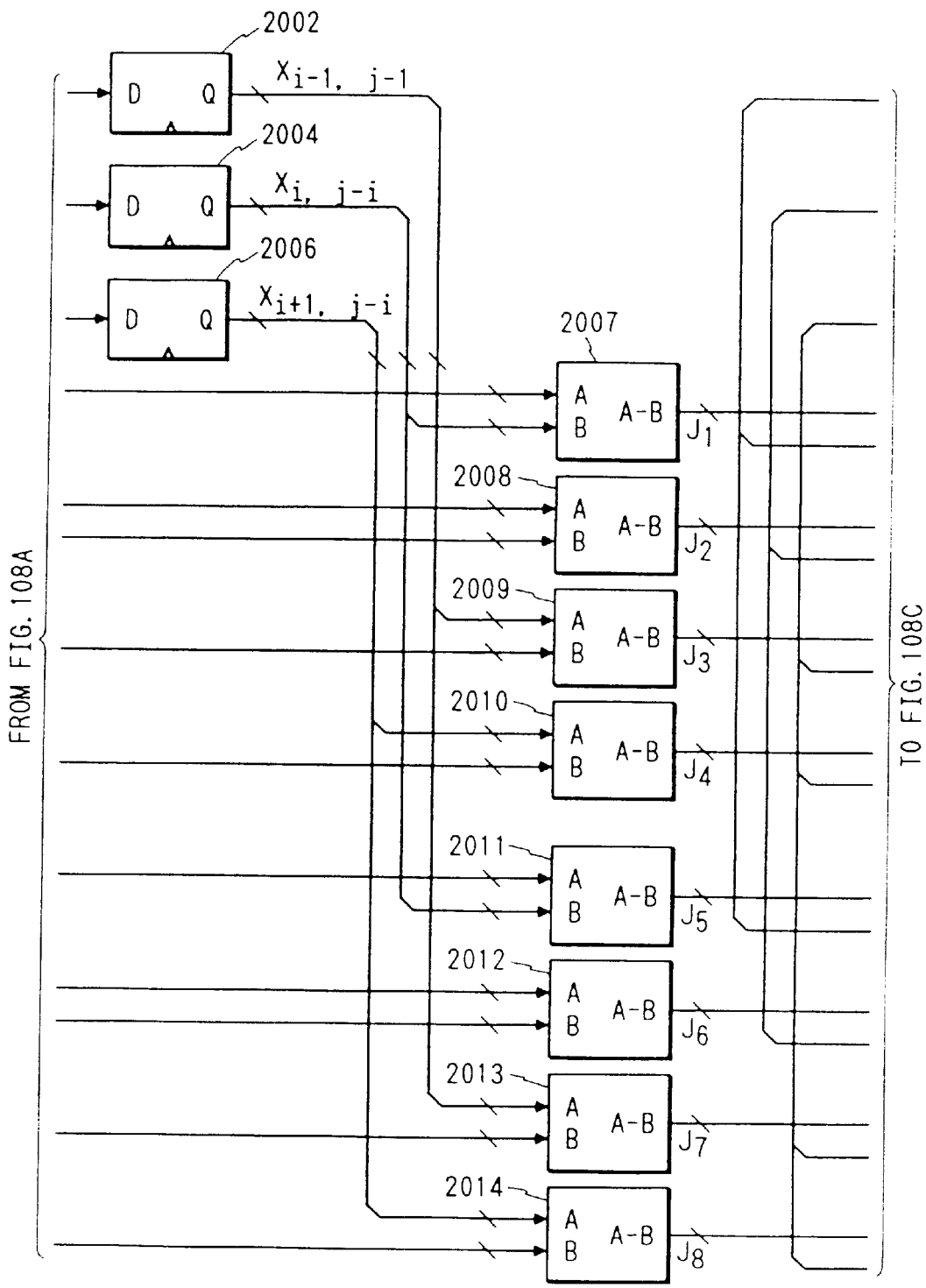
Figure 108C:
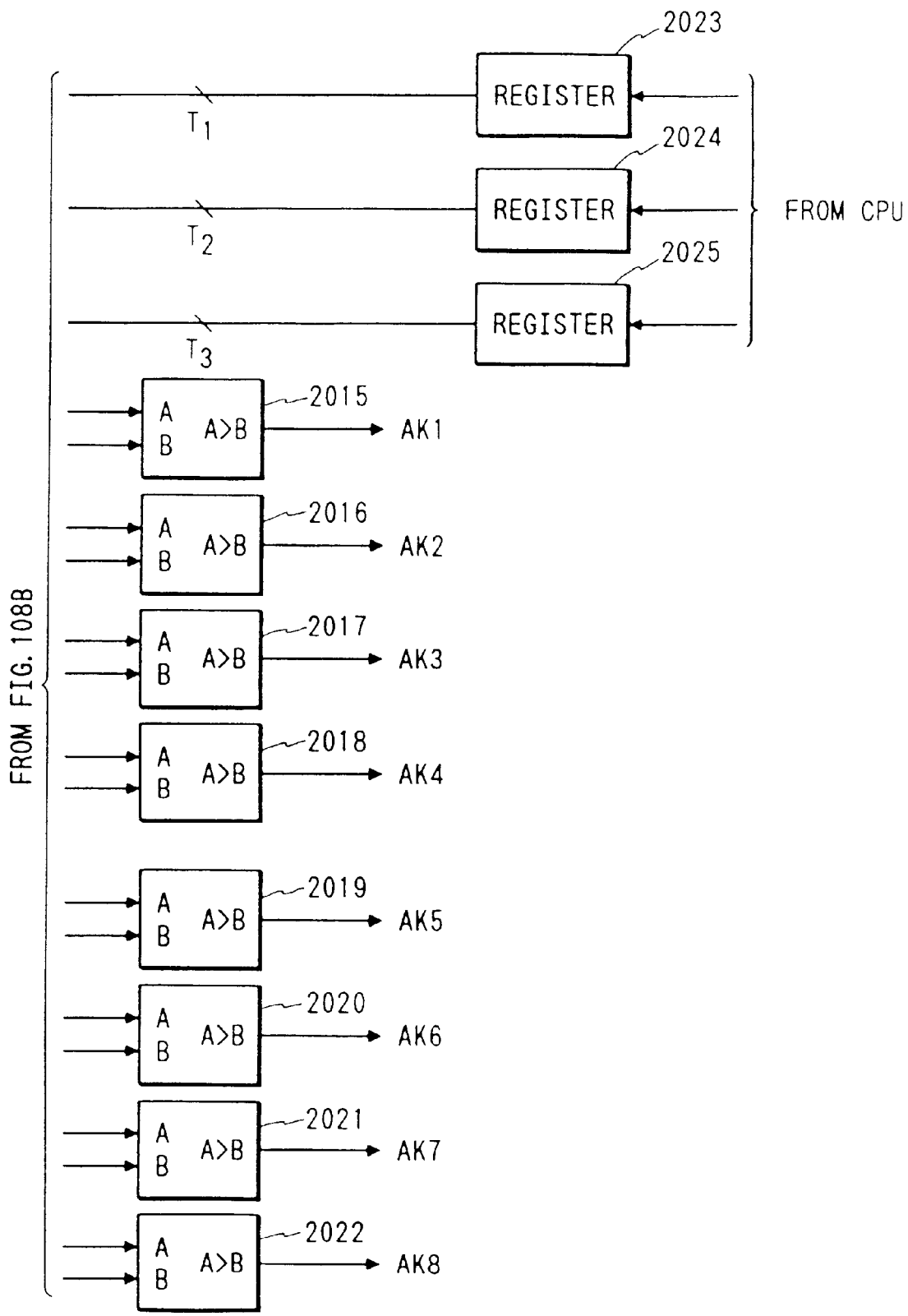

FIG. 108 shows a modification of the embodiment shown in FIG. 20-1. In this instance, the values of T1 to T3 are set in registers 2023 and 2024 directly from the CPU. For the rest, the construction is the same as in FIG. 20-1.

Figure 109B:
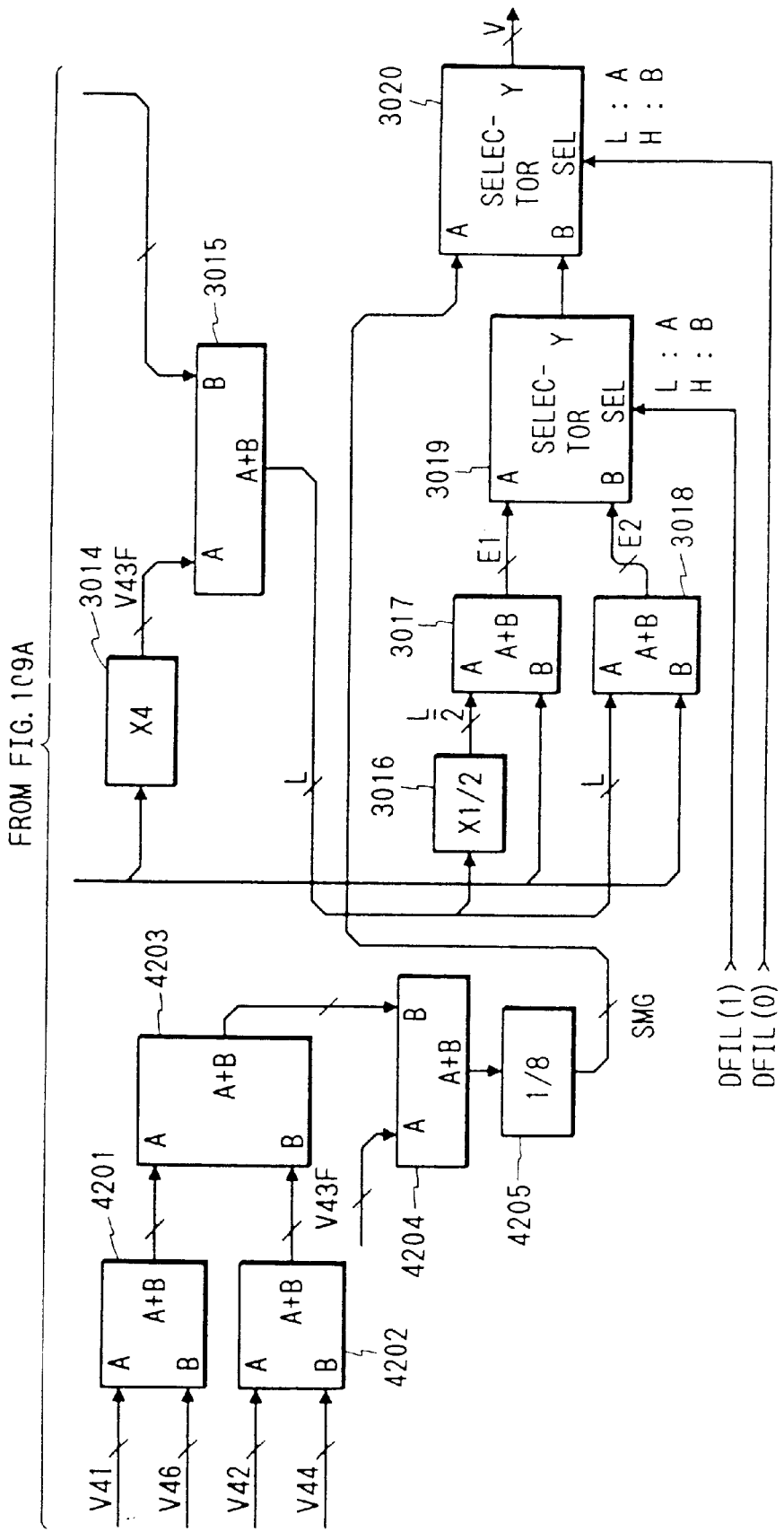

FIG. 109 shows a modification of the construction shown in FIG. 30. In this instance, only a section of smoothing processing is the modified section.

Adders 4201 to 4203 add for pixels V41, V42, V44 and V46 neighboring a given pixel. Adder 4204 adds signal V43F, which is four times the given pixel V43, to the sum signal. Bit-shift type divider 4205 produces $1/8$ of the result, thus obtaining smoothing filter signal SMG.

Selector 3020 provides either output of smoothing filter signal SMG or output of selector 3019.

The black character detection method in this embodiment is not limited to the above example, and also the matrix size for the detection is not limited to the above example.

Further, the method of black character processing is not limited to the single black color printing as described above, and the method of setting black component signal is not limited to that shown in FIG. 24. The way of providing weights to V2 and M2 is determined freely.

As has been shown, with the above embodiments of the invention by performing character edge judgement and saturation judgement of original simultaneously and also using color processing mode data it is possible to improve the sharpness of color-free character portions while holding the color hue of colored character portions, remove color impurity of black character portions, improve the sharpness of character portions while suppressing moire fringes in dot original portions, permit clear black character reproduction with increase of black material for black character portions. Further, by varying the above operations according to the color processing mode it is possible to obtain clear output image due to optimum processing for each color processing mode.

The above embodiment has concerned with color laser copier, but the invention is applicable as well to color heat transfer printers, color ink jet printers and other image processing apparatuses for providing color image outputs.

Further, while the above embodiment permits setting of three color modes, i.e., four-color, three-color and monocolor modes, it is possible to permit only two modes, i.e., one for black character processing and the other not for such processing.

At this moment, DSCR in FIG. 38 will be described in greater detail. DSCR in FIG. 38 is LOW for black or intermediate saturation character edge portions corresponding to black toner development. Only for these portions, PW4 is selected, and LDR signal is provided. Even if judgement as character edge portion is provided in this case, PW4 signal is not used in case of character edge portion with color deviation (CAN=1) in order to prevent degradation of recorded image quality due to emphasis of color deviation.

This is based on a viewpoint that it is black character edge that is required to be a sharp character edge and in case of colored character edge reproduction of the color hue of original is more important.

Figure 110:
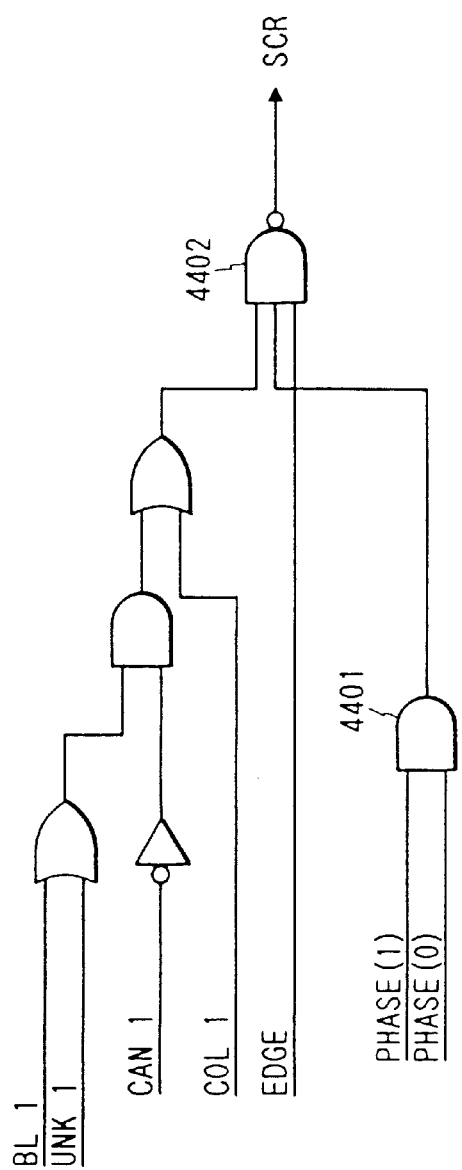
FIG. 110 is a view for explaining DSCR shown in FIG. 38 in detail.

Meanwhile, in black character edge portion the tonors of M, C and Y are not present as shown in FIG. 25-1. Further, in colored character Bk toner is hardly present due to the action of UCR circuit 105. Further, in intermediate saturation character edge portion both Bk toner and M, C and Y toners are adequately present as shown in FIG. 25-2. FIG. 110 shows a different example of screen switching signal generation unit 111.

By taking the above features into considerations, in this embodiment the character edge judgement unit is permitted to use pulse width modulation signal PW4 of one-pixel cycle period for laser driving only for Bk toner.

This permits realization of sharpness comparable to that obtainable with the first embodiment for black character edges, in which there are intrinsically less color components. In addition, with color character edges in which color components are slightly contained, only Bk component is recorded sharply, graduation of color components can be maintained, and satisfactory color reproducibility can be ensured.

The operation of screen switching signal generation unit 111 in FIG. 110 will now be described.

Gate 4401 decodes that 2-bit PHASE signal is "3", i.e., the developing color is Bk, and its output is made an output permission singal for NAND gate 4402. The other gates are the same as those in FIG. 39, and SCR signal is "0" when and only when a portion in consideration is a character edge portion and the developing color is Bk.

In the above embodiment full-color images are dealt with for judgement, and the invention is of course effective as well for white/black images.

Figure 111:
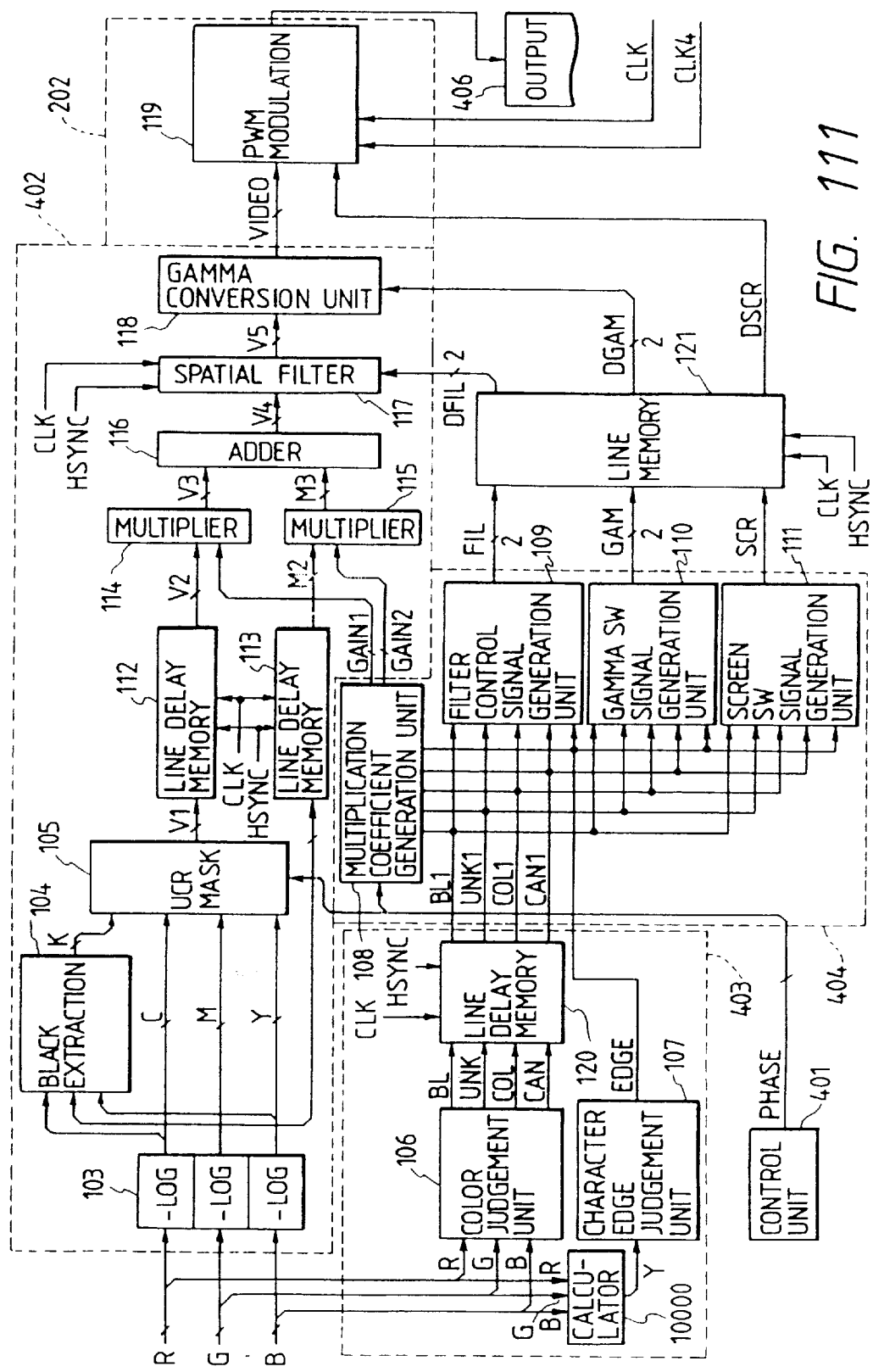
FIG. 111 is a view showing a modification of the embodiment of FIG. 1.

In the above embodiment G signal is used, and this gives rise to a problem that character edges are difficultly detected with yellow characters. Accordingly, as shown in FIG. 111, calculator 1000 may be provided to perform calculation on three signals of R, G and B such that, for instance, Y=aR+ bG+cB (a, b and c being constants) to obtain edge detection with respect to y.

As has been shown, with this embodiment it is possible to reliably determine intermediate saturation areas with flat density, dots for representing intermediate tone in input image and edges of characters and drawings. In addition, visible image is formed according to the result of determination. Thus, it is possible to reproduce image faithful to original.

The above embodiment concerned a color digital copier, but the invention is appliable as well to a monochromatic copier. Further, the principles of the invention are of course applicable to apparatuses other than copiers.

Further, with the above embodiment it is possible to cope sofisticatedly with photograph images, character images and character/photograph images for optimum processing by altering black character processing according to mode signal.

The mode setting is not limited to the above example, but it is possible to consider various other modes such as gloss mode and gloss removal mode. Further, the processing altered according to mode is not limited to the black character processing (character edge detection, dot detection, etc.), but it is possible to consider various other image processings such as alteration of screen signal.

Further, although the above embodiment concerned a digital color copying apparatus, the invention is of course applicable to various other image processing apparatuses as well as noted before.

Further, with the above embodiment by permitting independent selection of sharpness for M, C and Y and that for Bk, adequate image quality can be obtained by providing particularly strong sharpness for Bk.

More specifically, by permitting independent setting of sharpness of each of a plurality of color component signals including Bk (black) signal, it is possible to obtain image with enhanced black or otherwise improve the image quality.

Further, with this embodiment it is possible to obtain images with adequate sharpness according to use or taste by permitting independent selection of the sharpness for character portions and that for photograph portions, i.e., by permitting continuous and independent setting of the sharpness of input image according to the kind thereof (for instance character image, photograph image, character/ photograph image, etc.).

The strength of sharpness may be set by key input to the operation unit or from a keyboard of a computer when the apparatus is connected thereto.

Further, the setting ranges are not limited to specific examples in the above embodiment, and it is possible to freely vary the size, type and coefficients of the spatial filter.

While the above embdiments of the ivention concerned color copiers, this is by no means limitative, and the invention is applicable as well to other apparatuses, for instance a scanner alone or an image processing unit alone without any scanner.

Further in the above embodiment the image processing is switched by switching spacial filters, switching γ or switching screens (i.e., numbers of lines), and according to the invention it is possible to permit a sole one of such processings.

Further, while an electrophotographic color printer has been dealt with, this is by no means limitative, and the invention is applicable as well to other printers such as a thermal printer or ink jet printer or bubble jet printer.

As has been shown, with the above embodiment it is possible to obtain reliable separation judgement of dot image areas and characters or drawings.

The mode switching in the above embodiment may be done for various processes such as filter processing, gamma conversion, UCR-Masking coefficients.

As shown above, with the above embodiment adequate image processings can be permitted according to various printing modes.

Further, since judgement conditions of judgement means for judging character portion or half-tone portion are set for a designated area in image under consideration, for an area subject to erroneous judgement in the above judgement satisfactory judgement can be obtained by controlling the judgement means, for instance inputting judgement conditions suited to such area.

Further, since spatial filter means or density conversion means for processing input image signal is controlled according to the degree of color or freedom from color in imput image signal, it is possible to provide selective edge emphasis to predetermined image, for instance black characters alone.

Further, it is possible to control character edge judgement standards by operation of the operation unit.

Further, it is possible to discriminate color impurity portions contained in the neighborhood of colored edge portions of original and color-free or intermediate saturation signal. Thus, when recording an image colorfree edge portions can be recorded sharply using much black toner. On the other hand, for colored edge portions high saturation image recording is possible without use of unnecessary black toner.

Thus, with the above embodiment it is possible to permit satisfactory judgement of colored character portions and improve the quality thereof.

As has been described in the foregoing, with the above embodiment it is possible to permit image processing for reproducing image of very excellent quality.

We claim:

1. An image processing apparatus comprising:
   detecting means for detecting a black character according to an input image signal;
   processing means for performing a predetermined black character processing according to a result of the black character detection by said detecting means; and
   setting means, manually operated by an operator, for setting a reproduction mode for reproducing the input image signal
   wherein said processing means performs the predetermined black character processing on a black character when said setting means is manually set to a first reproduction mode, and wherein said processing means does not perform the predetermined black character processing on the black character when said setting means is manually set to a second reproduction mode.

2. An apparatus according to claim 1, wherein said detecting means detects the black character according to a saturation judgment and an edge judgment on the input image signal.

3. An apparatus according to claim 1, wherein said preprocessing means reproduces the black character detected by said detecting means in a single black color.

4. An apparatus according to claim 1, wherein said first reproduction mode is a four-color reproduction mode.

5. An apparatus according to claim 1, wherein said second reproduction mode includes a three-color reproduction mode, a two-color reproduction mode and a single color reproduction mode.

6. An image processing apparatus comprising:
   a) judgment means for judging an image characteristic of an input image;
   b) an operation unit for manually setting a judgment standard of said judgment means in a range between character priority and photograph priority, said operation unit including means for setting a slice level with which judgment of the dot image area is performed;
   c) display means for displaying the judgment standard set by said operation unit; and
   d) control means for controlling the judgment standard of said judgment means according to the setting set by said operation unit,
   wherein said judgment means includes dot judgment means for judging dot image areas in the input image.

7. An apparatus according to claim 6, wherein said judgment means includes means for amplifying an image signal level for low density portions.

8. An image processing apparatus comprising:
   a) judgment means for judging an image characteristic of an input image;
   b) an operation unit for manually setting a judgment standard of said judgment means in a range between character priority and photograph priority;
   c) display means for displaying the judgment standard set by said operation unit; and
   d) control means for controlling the judgment standard of said judgment means according to the setting set by said operation unit,
   wherein said judgment means includes means for amplifying an image signal for low density portions, and wherein said operation unit includes means for selecting use/non-use of said means for amplifying the image signal level for low density portions.

9. An apparatus for image processing comprising:
   processing means for performing black character processing on an input image signal according to one black character processing mode selected from among plural such black character processing modes;
   generating means for generating an image processing mode signal; and
   control means for selecting the one black character processing mode by which said processing means performs black character processing on the input image signal, according to the image processing mode signal.

10. An apparatus according to claim 9, wherein said image processing mode signal includes at least signals representing a character mode, a photograph mode and a character/photograph mode.

11. An image processing method comprising:
   a) a judgment step of judging an image characteristic of an image by using a judgment standard;
   b) a designation step for manually designating image areas in the image to be judged; and
   c) a control step of controlling the judgment standard of said judgment step independently for each of the image areas designated in said designation step, said control step setting a plurality of judgement conditions of said judgement step with respect to a plurality of designated image areas, respectively.

12. A method according to claim 11, wherein said detecting step detects the black character according to a saturation judgment and an edge judgment on the input image signal.

13. A method according to claim 11, wherein said processing step reproduces the black character detected by said detecting step in a single black color.

14. A method according to claim 11, wherein said first reproduction mode is a four-color reproduction mode.

15. A method according to claim 11, wherein said second reproduction mode includes a three-color reproduction mode, a two-color reproduction mode and a single color reproduction mode.

16. An image processing method comprising:
 a processing step of performing black character processing on an input image signal according to one black character processing mode selected from among plural such black character processing modes;
 a generating step of generating an image processing mode signal; and
 a control step of selecting the one black character processing mode by which said processing means performs black character processing on the input image signal, according to the image processing mode signal.

17. A method according to claim 16, wherein said image processing mode signal includes at least signals representing a character mode, a photograph mode and a character/photograph mode.

18. An image processing method comprising the steps of:
 a) judging an image characteristic of an input image;
 b) manually setting a judgment standard used in said judging step in a range between character priority and photograph priority;
 c) displaying the set judgment standard; and
 d) controlling the judgment standard used in said judging step according to the setting in said manually setting step,
  wherein said judging step includes a step of judging dot image areas in the input image, and wherein said manually setting step includes a step of setting a slice level with which judgment of the dot image area is performed.

19. A method according to claim 18, wherein said judging step includes a step for amplifying an image signal level for low density portions.

20. A method according to claim 18, wherein said manually setting step includes a step for selecting use/non-use of said step for amplifying the image signal level for low density portions.

21. An image processing method comprising the steps of:
 a) judging an image characteristic of an input image;
 b) manually setting a judgment standard used in said judging step in a range between character priority and photograph priority;
 c) displaying the set judgment standard; and
 d) controlling the judgment standard used in said judging step according to the setting step by said operation unit,
  wherein said judging step includes a step of amplifying an image signal level for low density portions, and wherein said manually setting step includes a step for setting a slice level with which judgment of the dot image is performed.

22. A method according to claim 21, wherein said manually setting step includes a step for selecting use/non-use of said step for amplifying the image signal level for low density portions.

* * * * *

UNITED STATES PATENT AND TRADEMARK OFFICE
CERTIFICATE OF CORRECTION

| PATENT NO. | : 6,181,819 B1 |
|---|---|
| DATED | : January 30, 2001 |
| INVENTOR(S) | : Shinobu Arunoto et al. |

It is certified that error appears in the above-identified patent and that said Letters Patent is hereby corrected as shown below:

<u>Title page,</u>
Item [56], under References Cited, FOREIGN PATENT DOCUMENTS, ""5960580" should read -- 59 - 60580 --.

<u>Column 2,</u>
Line 10, "psuedowise" should read -- pseudowise --;
Line 40, "100-101." should read -- 100-101). -- ; and
Line 59, "(Br)." should read -- (BK). -- .

<u>Column 3,</u>
Line 12, "blut" should read -- blur -- ;
Line 37, "characteristicds" should read -- characteristicds" should read
-- characteristics -- ;
Line 50, "singal" should read -- signal -- ; and
Line 51, "singal" should read -- signal -- .

<u>Column 6,</u>
Line 14, "58, 58A and 58B" should read -- 58A and 58B -- ;
Line 19, "65, 65A and 65B" should read --65A and 65B -- ;
Line 23, "nineth" should read -- ninth -- ;
Line 25, "nineth" should read -- ninth -- ;
Line 27, "69," should be deleted ;
Line 33, "72," should be deleted ;
Line 49, "80," should be deleted ; and
Line 66, "87A-2" should read -- 87A and 87B -- .

<u>Column 7,</u>
Line 43, "108," should be deleted ; and
Line 45, "109," should be deleted .

<u>Column 10,</u>
Line 47, "singals" should read -- signals --.

<u>Column 11,</u>
Line 37, "point" should read -- Point -- .

UNITED STATES PATENT AND TRADEMARK OFFICE
CERTIFICATE OF CORRECTION

PATENT NO. : 6,181,819 B1
DATED : January 30, 2001
INVENTOR(S) : Shinobu Arunoto et al.

Page 2 of 4

It is certified that error appears in the above-identified patent and that said Letters Patent is hereby corrected as shown below:

Column 12,
Line 1, "MIN≤WMN or MAX ≤ MAX and either one of conditions" should be a smaller font size.

Column 13,
Line 38, "aree" should read -- area -- .

Column 17,
Line 7, "form" should read -- from -- ; and
Line 16, "singal" should read -- signal -- .

Column 18,
Line 24, "singal" should read -- signal -- ;
Line 26, "signal" should read -- signal -- ; and
Line 66, "AKS" should read -- AK5 -- .

Column 21,
Line 25, "signal" should read -- signal -- .

Column 24,
Line 56, "switcing" should read -- switching -- .

Column 27,
Line 32, "slop" should read -- slope -- ; and
Line 32, "slop" should read -- slope -- .

Column 30,
Line 4, "dote" should read -- dot -- ; and
Line 33, "singals" should read -- signals -- .

Column 34,
Line 31, "singal" should read -- signal -- .

UNITED STATES PATENT AND TRADEMARK OFFICE
CERTIFICATE OF CORRECTION

PATENT NO. : 6,181,819 B1
DATED : January 30, 2001
INVENTOR(S) : Shinobu Arunoto et al.

It is certified that error appears in the above-identified patent and that said Letters Patent is hereby corrected as shown below:

Column 39
Line 32, "liue" should read -- lieu -- ; and
Line 33, "ATLUS" should read -- ATLAS -- .

Column 40,
Line 4, "DOT§'" should read -- DOT1' -- .

Column 47,
Line 17, "ATRAS" should read -- ATLAS -- ;
Line 45, "ATRAS" should read -- ATLAS -- ; and
Line 51, "ATRAS" should read -- ATLAS -- .

Column 48,
Line 38, "ATRAS" should read -- ATLAS -- .

Column 49,
Line 48, "(4." should read -- 4 . -- ; and
Line 55, "singal" should read -- signal -- .

UNITED STATES PATENT AND TRADEMARK OFFICE
CERTIFICATE OF CORRECTION

PATENT NO. : 6,181,819 B1
DATED : January 30, 2001
INVENTOR(S) : Shinobu Arunoto et al.

It is certified that error appears in the above-identified patent and that said Letters Patent is hereby corrected as shown below:

Column 50,
Line 41, "singal" should read -- signal -- .

Column 54,
Line 22, "appliable" should read -- applicable -- .

Signed and Sealed this

Twenty-seventh Day of November, 2001

Attest:

*Attesting Officer*

NICHOLAS P. GODICI
*Acting Director of the United States Patent and Trademark Office*